(12) United States Patent
Ziebell et al.

(10) Patent No.: US 11,283,857 B2
(45) Date of Patent: Mar. 22, 2022

(54) SYSTEMS, METHODS AND MEDIA FOR A DISTRIBUTED SOCIAL MEDIA NETWORK AND SYSTEM OF RECORD

(71) Applicants: William J. Ziebell, Eagle, ID (US); Angela M. Ziebell, Eagle, ID (US)

(72) Inventors: William J. Ziebell, Eagle, ID (US); Angela M. Ziebell, Eagle, ID (US)

( * ) Notice: Subject to any disclaimer, the term of this patent is extended or adjusted under 35 U.S.C. 154(b) by 0 days.

(21) Appl. No.: 16/540,976

(22) Filed: Aug. 14, 2019

(65) Prior Publication Data

US 2019/0373047 A1    Dec. 5, 2019

Related U.S. Application Data

(63) Continuation of application No. 16/376,934, filed on Apr. 5, 2019, now Pat. No. 10,986,169.

(60) Provisional application No. 62/660,118, filed on Apr. 19, 2018.

(51) Int. Cl.
| | |
|---|---|
| *H04L 29/08* | (2006.01) |
| *G06F 9/54* | (2006.01) |
| *G06F 16/901* | (2019.01) |
| *G06F 21/62* | (2013.01) |
| *H04L 67/10* | (2022.01) |
| *H04L 67/53* | (2022.01) |

(52) U.S. Cl.
CPC .............. *H04L 67/10* (2013.01); *G06F 9/547* (2013.01); *G06F 16/9014* (2019.01); *G06F 16/9024* (2019.01); *G06F 21/6263* (2013.01); *H04L 67/20* (2013.01)

(58) Field of Classification Search
CPC ......... H04L 67/10; H04L 67/20; G06F 9/547; G06F 16/9024; G06F 16/9014; G06F 16/9536; G06F 21/6263; G06F 21/64; G06F 21/6245; G06F 2221/2101; G06F 2221/2151; G06Q 10/107; G06Q 50/01; G06Q 2220/10

See application file for complete search history.

(56) References Cited

U.S. PATENT DOCUMENTS

| | | | |
|---|---|---|---|
| 8,370,062 B1 | 2/2013 | Starenky et al. | |
| 8,972,379 B1 | 3/2015 | Grieselhuber et al. | |
| 9,858,298 B1 | 1/2018 | Barak et al. | |
| 10,304,062 B1 * | 5/2019 | Hines ................... | G06Q 30/018 |

(Continued)

OTHER PUBLICATIONS https://en.wikipedia.org/wiki/Proof_of_stake (Year: 2015).*

(Continued)

*Primary Examiner* — Kostas J Katsikis
(74) *Attorney, Agent, or Firm* — Carr & Ferrell LLP

(57) ABSTRACT

Provided herein are exemplary distributed architectures including a platform system communicatively coupled to a network, a social media system communicatively coupled to the network and configured for interaction by one or more users, and a social media application communicatively coupled to the network and configured for interaction by one or more users. Further exemplary embodiments include a third party service communicatively coupled to the network, a public auditor communicatively coupled to the network, and a public archivist communicatively coupled to the network. The one or more users may include any of individuals, businesses, charities and non-profit organizations, and government organizations.

6 Claims, 105 Drawing Sheets

(56) References Cited

U.S. PATENT DOCUMENTS

| | | | | |
|---|---|---|---|---|
| 10,628,833 | B2* | 4/2020 | Hines | G06F 21/602 |
| 2012/0137367 | A1 | 5/2012 | Dupont et al. | |
| 2014/0280180 | A1 | 9/2014 | Edecker et al. | |
| 2014/0282016 | A1 | 9/2014 | Hosier, Jr. | |
| 2015/0149930 | A1 | 5/2015 | Walkin et al. | |
| 2016/0105388 | A1 | 4/2016 | Bin Mahfooz et al. | |
| 2017/0359374 | A1* | 12/2017 | Smith | G06F 21/6245 |
| 2018/0124159 | A1* | 5/2018 | Sun | H04L 67/306 |
| 2018/0139278 | A1* | 5/2018 | Bathen | H04L 9/3236 |
| 2019/0065532 | A1* | 2/2019 | Conahan | G06Q 50/01 |
| 2019/0065615 | A1* | 2/2019 | Room | G06F 16/90348 |
| 2019/0163887 | A1* | 5/2019 | Frederick | G06F 16/27 |
| 2019/0166133 | A1* | 5/2019 | Frederick | H04L 63/12 |
| 2019/0252059 | A1* | 8/2019 | Gleason | G06N 5/048 |
| 2019/0295102 | A1* | 9/2019 | Hines | G06F 21/64 |
| 2019/0303541 | A1* | 10/2019 | Reddy | H04L 9/0643 |
| 2019/0327292 | A1* | 10/2019 | Ziebell | H04L 67/20 |
| 2019/0356641 | A1* | 11/2019 | Isaacson | H04W 12/00407 |
| 2019/0373047 | A1* | 12/2019 | Ziebell | G06Q 50/01 |
| 2020/0019680 | A1* | 1/2020 | Frederick | G06F 21/64 |
| 2020/0068009 | A1* | 2/2020 | Ziebell | G06F 21/6263 |
| 2021/0004777 | A1* | 1/2021 | Kim | G06Q 20/3825 |

OTHER PUBLICATIONS https://academy.binance.com/en/glossary/proof-of-stake (Year: 2020).*
Asheley R. Landrum & Matthew H. Slater (2020) Open Questions in Scientific Consensus Messaging Research, Environmental Communication, 14:8, 1033-1046, DOI: 10.1080/17524032.2020. 1776746 (Year: 2020).*
"Partial Supplementary European Search Report", European Patent Application No. 19788669, dated Nov. 24, 2021, 11 pages.

* cited by examiner

| Platform Systems 102 | |
|---|---|
| API System 200 | Trending System 244 |
| Archive System 202 | Endorsement System 246 |
| Audit System 204 | Ad System 248 |
| Chronicle System 206 | Content Verification System 250 |
| Directory System 208 | Index System 252 |
| Identity System 210 | |
| Ledger System 212 | |
| Onboarding System 214 | |
| Payment System 216 | |
| Platform Management System 218 | |
| Search System 220 | |
| Third Party Systems 222 | |
| Account System 224 | |
| Telemetry System 226 | |
| User Verification System 228 | |
| Connection System 230 | |
| Consensus System 232 | |
| SDK System 234 | |
| AI System 236 | |
| Analytics System 238 | |
| Machine Learning System 240 | |

FIGURE 2

| Platform Modules 600 ||
|---|---|
| Compute Module 602 | Networking Module 608 |
| Integration Module 604 | Security Module 610 |
| Management Module 606 | Storage Module 612 |

FIGURE 6

| System Modules 800 ||
|---|---|
| Ad System Modules 802 | Search System Modules 840 |
| AI System Modules 804 | Subscription System Modules 842 |
| Analytics System Modules 806 | Third Party System Modules 844 |
| Archive System Modules 808 | Wallet System Modules 846 |
| Audit System Modules 810 | Endorsement System Modules 848 |
| Chronicle System Modules 812 | Compliance System Modules 850 |
| Connection System Modules 814 | Consensus System Modules 852 |
| Content System Modules 816 | Notary System Modules 854 |
| Directory System Modules 818 | Certified Email System Modules 856 |
| Distribution System Modules 820 | Workflow System Modules 858 |
| Identity System Modules 822 | SDK System Modules 860 |
| Ledger System Modules 824 | Copyright System Modules 862 |
| Licensing System Modules 826 | Rhetoric System Modules 864 |
| Machine Learning System Modules 828 | User Verification System Modules 866 |
| Message Board System Modules 830 | Trending System Modules 868 |
| Onboarding System Modules 832 | Account System Modules 870 |
| Payment System Modules 834 | Content Verification System Modules 872 |
| Posting System Modules 836 | Index System Modules 874 |
| Publishing System Modules 838 | |

Core Modules 700

FIGURE 8

| Chronicle Record 2000 | |
|---|---|
| Record Header 2002 | |
| Id 2004 | Version 2006 |
| Timestamp 2008 | Previous Record Hash 2010 |
| Record Nonce 2012 | Record Hash 2014 |
| Record Header Graph 2016 | Record Signature 2018 |
| Source Graph 2020 | Contracts Graph 2022 |
| Content Graph 2024 | Workflow Graph 2026 |
| Index Graph 2028 | State Graph 2030 |
| Audit Graph 2032 | Directory Graph 2034 |
| Conference Graph 2036 | Other Graph 2038 |
| Base Graph 2050 | |
| Base Graph Schema 2052 | Base Graph Schema Version 2054 |
| Base Graph Hash 2056 | Base Graph Signature 2058 |
| Base Graph Estimated Work 2060 | Base Graph Actual Work 2062 |
| Graph Collection 2070 | |
| Node(s) 2072 | Edge(s) 2074 |
| Hash Algorithms 2080 | |
| Merkle Tree 2082 | Object Graph Hash Algorithm 2084 |
| Graph Schema Hash Algorithm 2086 | |

FIGURE 20

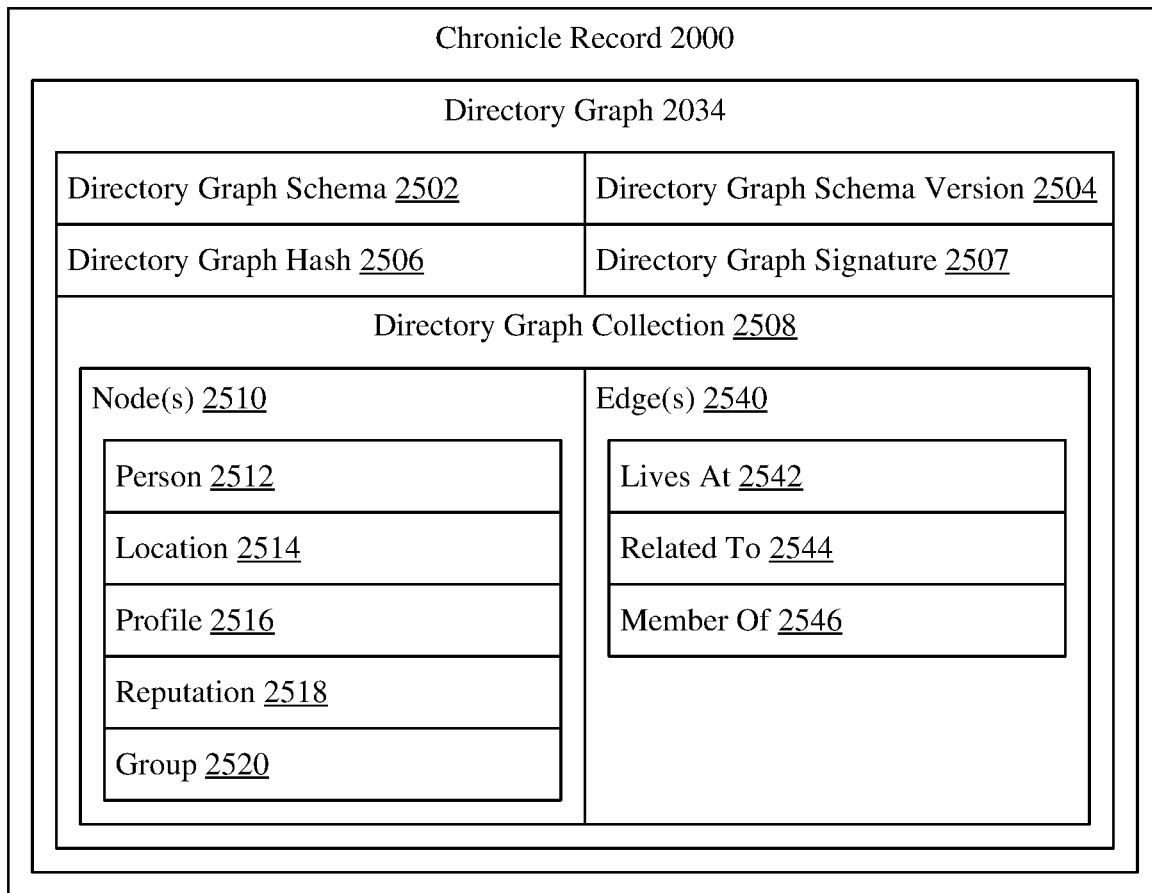
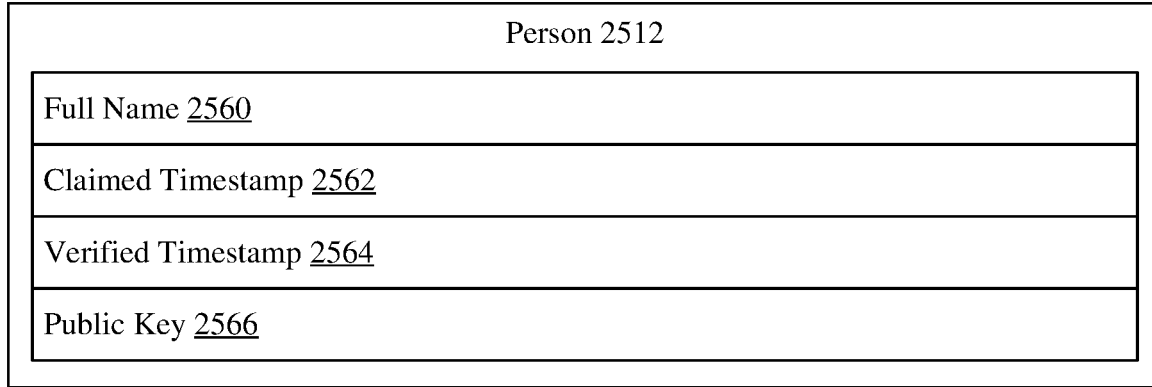
FIGURE 25

| Platform Tenets 3600 |
|---|
| Complete Traceability 3602 |
| Complete Transparency 3604 |
| Fair Intrinsic Value 3606 |
| Integrity is the Currency 3608 |
| Level Playing Field 3610 |
| Permanent Public Record 3612 |
| Platform Anti-Counterfeiting Measures 3614 |
| Public Archiving 3616 |
| Public Auditing 3618 |
| Records are Signed 3620 |
| Right of First Refusal 3622 |
| Users are Known 3624 |
| Users are Verified 3626 |
| Users Get Paid for their Content 3628 |
| Content is Verified 3630 |

FIGURE 36

| Publishable Content Types 3700 ||
|---|---|
| Announcements 3702 | Recantation 3732 |
| Broadcast 3704 | Retraction 3734 |
| Business 3706 | Rhetoric 3736 |
| Calendar of Events 3708 | Streaming 3738 |
| Circular Ads 3710 | Sports 3740 |
| Comics 3712 | Subject Based 3742 |
| Crossword Puzzles 3714 | Other 3744 |
| Classified Ads 3716 | This Day in History 3746 |
| Display Ads 3718 | Advice 3748 |
| Editorial/Opinion 3720 | |
| Features 3722 | |
| Medium Based 3724 | |
| News 3726 | |
| Notifications 3728 | |
| IANA Media Type Based 3730 | |

FIGURE 37

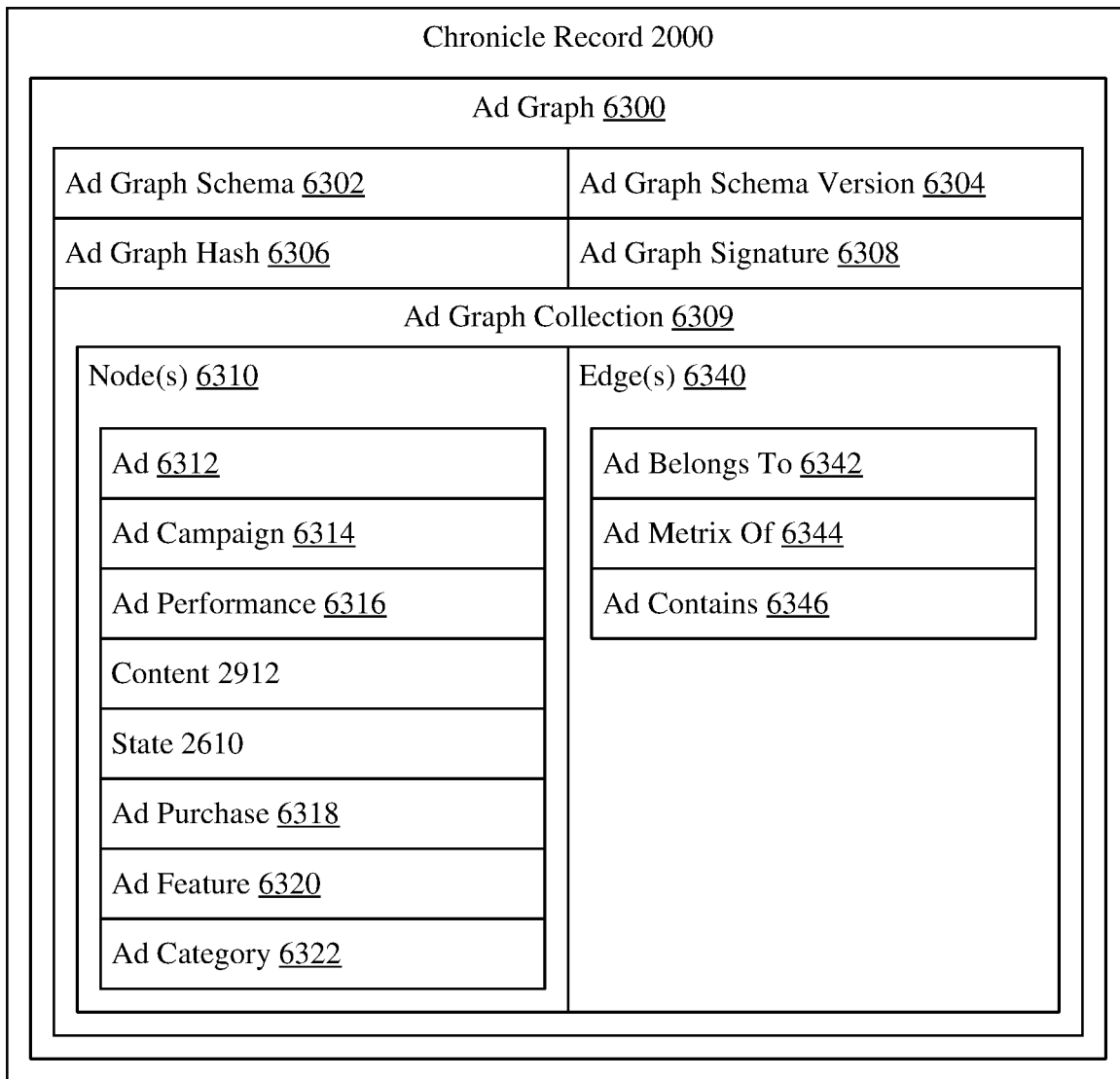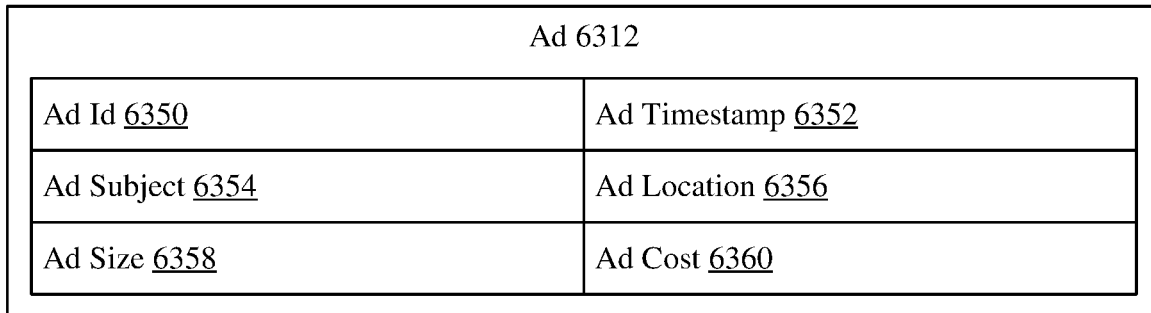
FIGURE 63

| Ad Campaign 6314 ||
|---|---|
| Ad Campaign Id 6470 | Ad Campaign Timestamp 6472 |
| Ad Campaign Duration 6474 | Ad Campaign Reach 6476 |
| Ad Campaign Frequency 6478 | Ad Campaign Targets 6480 |
| Ad Campaign Rotation 6482 | Ad Campaign Cost 6484 |

| Ad Performance 6316 ||
|---|---|
| Ad Performance Id 6485 | Ad Performance Timestamp 6486 |
| Ad Performance Impressions 6488 | Ad Performance Cost Per Impression 6490 |
| Ad Performance Click Thru Rate 6492 | Ad Performance Cost Per Click 6494 |
| Ad Performance Actions 6496 | Ad Performance Cost Per Action 6498 |
| Ad Performance Return on Spend 6499 | |

FIGURE 64

| Chronicle Record 2000 ||
|---|---|
| User Verification Features 7200 ||
| Password Confirmation by Email 7202 | 2FA Enabled 7204 |
| Email Source 7206 | Device Type 7208 |
| Device Count 7210 | Mobile Network 7212 |
| Verification Location Match 7214 | Verification Purchase 7216 |
| Verification Payment Method 7218 | ACH Authorization Verification 7220 |
| In-Person Verification 7222 | In-Person Verification Id Type 7224 |
| In-Person Verification Id Check 7226 | In-Person Verification Photo Taken 7228 |
| SSN Verification 7230 | EIN Verification 7232 |
| Credit Soft Inquiry 7234 | Background Check 7236 |

FIGURE 72

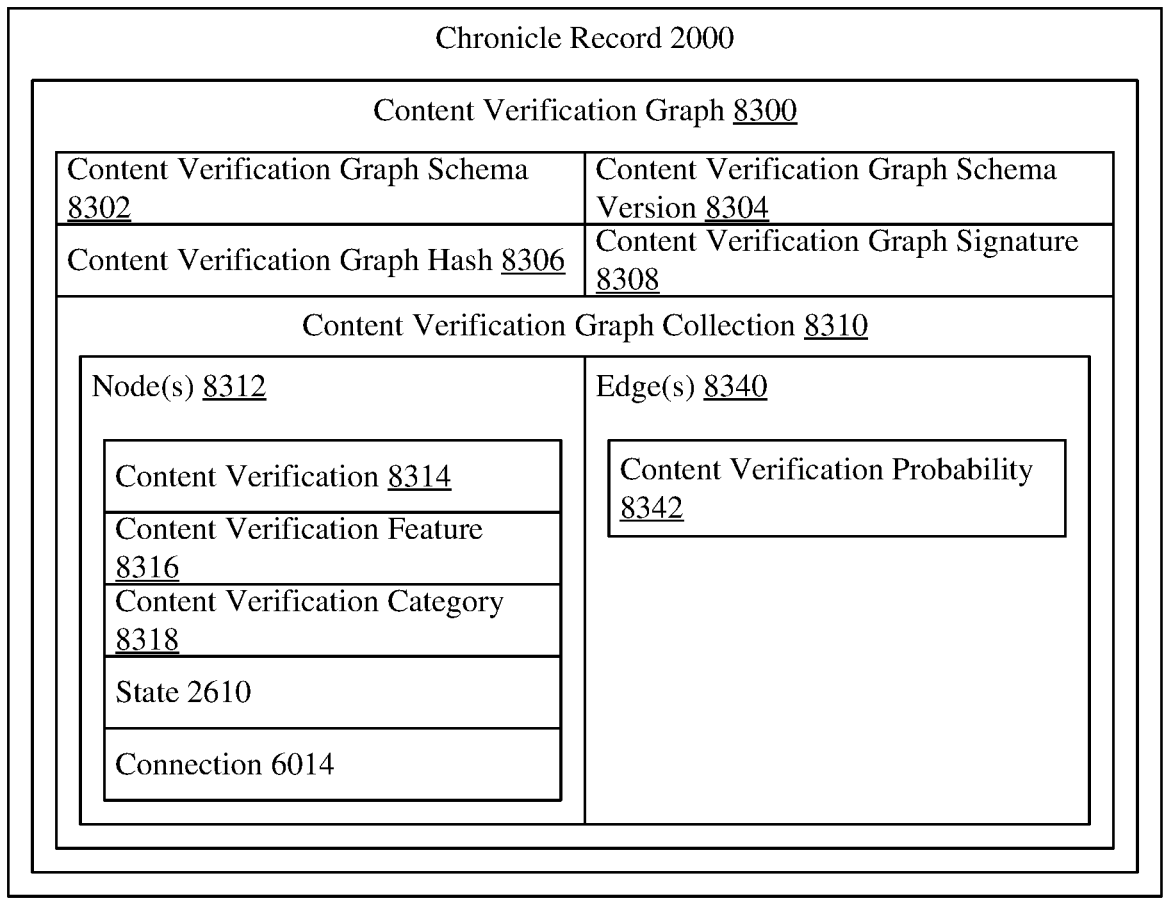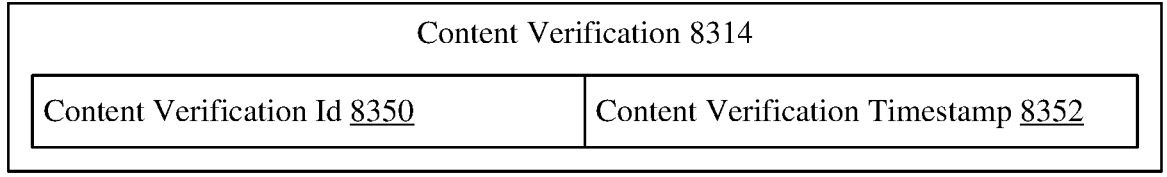
FIGURE 83

| Chronicle Record 2000 ||
|---|---|
| Content Verification Features 8400 ||
| Content Type 8402 | Content Meta Data 8404 |
| Source Location 8406 | Content Size 8408 |
| Associated Content 8410 | Content Source Frequency 8412 |
| Content Device 8414 | Content Filter Scan 8416 |
| Video Sound Analysis 8418 | Video Text Analysis 8420 |
| Video Object Analysis 8422 | Video Subject Analysis 8424 |
| Picture Text Analysis 8426 | Picture Object Analysis 8428 |
| Picture Subject Analysis 8430 | Source Hash Analysis 8432 |
| Text Subject Analysis 8434 | Text Key Word Analysis 8436 |

FIGURE 84

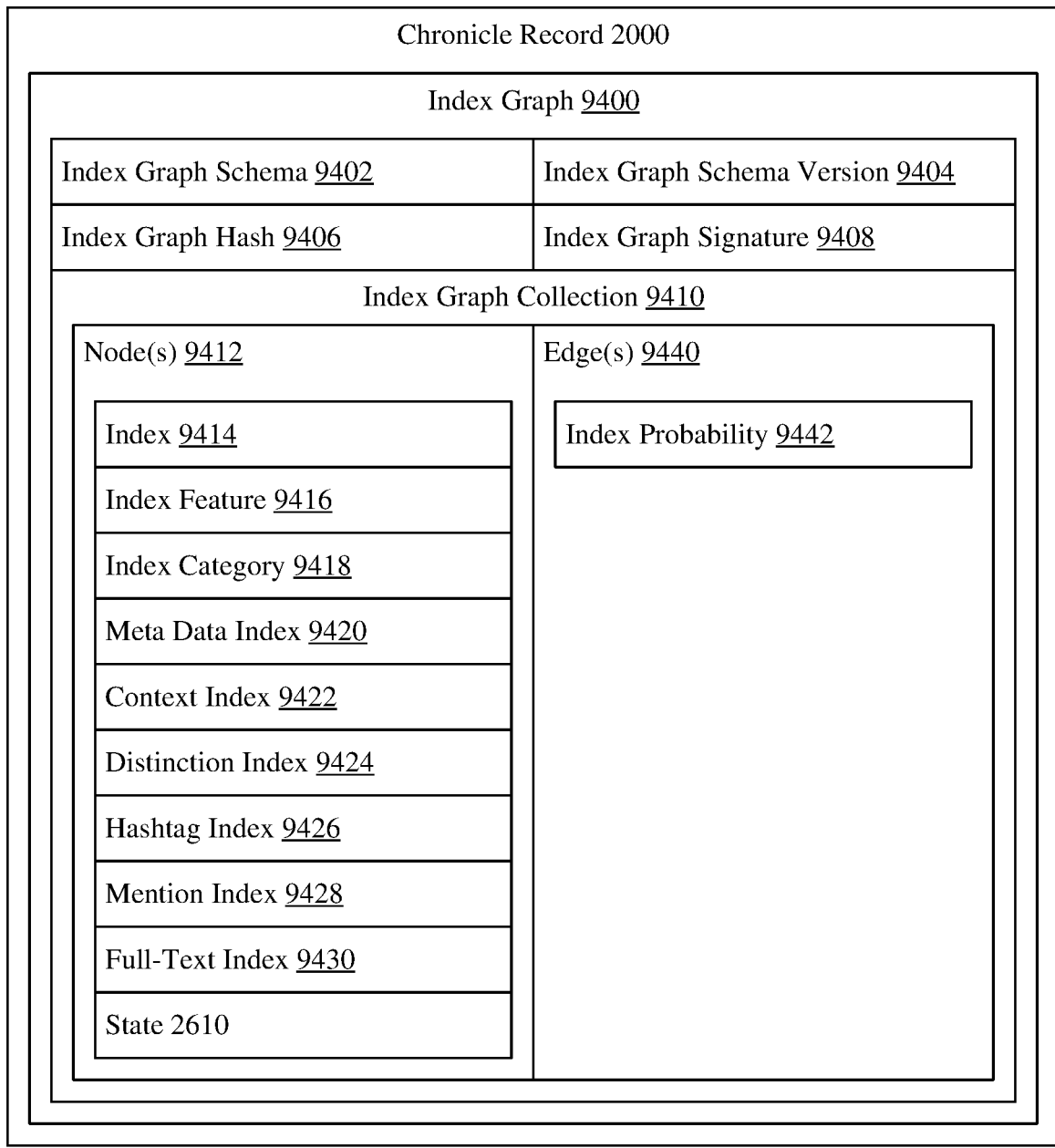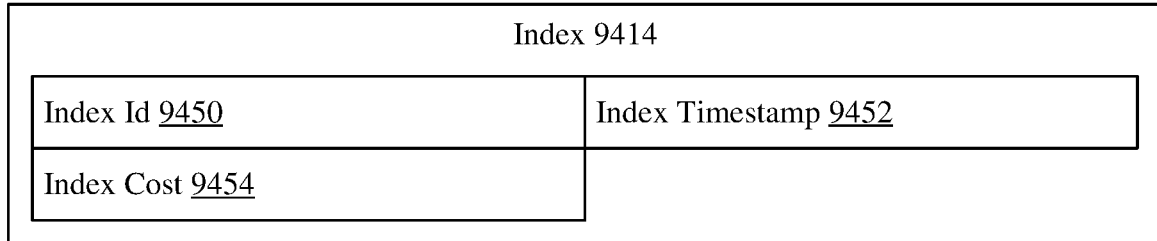
FIGURE 94

| App Menu Items 8830 ||
|---|---|
| Ad App Menu Item 10302 | Search App Menu Item 10340 |
| AI App Menu Item 10304 | Subscription App Menu Item 10342 |
| Analytics App Menu Item 10306 | Third Party App Menu Items 10344 |
| Archive App Menu Item 10308 | Wallet App Menu Item 10346 |
| Audit App Menu Item 10310 | Endorsement App Menu Item 10348 |
| Chronicle App Menu Item 10312 | Compliance App Menu Item 10350 |
| Connection App Menu Item 10314 | Consensus App Menu Item 10352 |
| Content App Menu Item 10316 | Notary App Menu Item 10354 |
| Directory App Menu Item 10318 | Certified Email App Menu Item 10356 |
| Distribution App Menu Item 10320 | Workflow App Menu Item 10358 |
| Identity App Menu Item 10322 | SDK App Menu Item 10360 |
| Ledger App Menu Item 10324 | Copyright App Menu Item 10362 |
| Licensing App Menu Item 10326 | Rhetoric App Menu Item 10364 |
| Machine Learning App Menu Item 10328 | User Verification App Menu Item 10366 |
| Message Board App Menu Item 10330 | Trending App Menu Item 10368 |
| Onboarding App Menu Item 10332 | Account App Menu Item 10370 |
| Payment App Menu Item 10334 | Content Verification App Menu Item 10372 |
| Posting App Menu Item 10336 | Index App Menu Item 10374 |
| Publishing App Menu Item 10338 | |

FIGURE 103

| System Menu Items 8832 ||
|---|---|
| Ad System Menu Item 10402 | Search System Menu Item 10440 |
| AI System Menu Item 10404 | Subscription System Menu Item 10442 |
| Analytics System Menu Item 10406 | Third Party System Menu Item 10444 |
| Archive System Menu Item 10408 | Wallet System Menu Item 10446 |
| Audit System Menu Item 10410 | Endorsement System Menu Item 10448 |
| Chronicle System Menu Item 10412 | Compliance System Menu Item 10450 |
| Connection System Menu Item 10414 | Consensus System Menu Item 10452 |
| Content System Menu Item 10416 | Notary System Menu Item 10454 |
| Directory System Menu Item 1041104 | Certified Email System Menu Item 10456 |
| Distribution System Menu Item 10420 | Workflow System Menu Item 10458 |
| Identity System Menu Item 10422 | SDK System Menu Item 10460 |
| Ledger System Menu Item 10424 | Copyright System Menu Item 10462 |
| Licensing System Menu Item 10426 | Rhetoric System Menu Item 10464 |
| Machine Learning System Menu Item 10428 | User Verification System Menu Item 10466 |
| Message Board System Menu Item 10430 | Trending System Menu Item 10468 |
| Onboarding System Menu Item 10432 | Account System Menu Item 10470 |
| Payment System Menu Item 10434 | Content Verification System Menu Item 10472 |
| Posting System Menu Item 10436 | Index System Menu Item 10474 |
| Publishing System Menu Item 10438 | |

FIGURE 104

| Platform System Menu Items 8834 ||
|---|---|
| API Platform System Menu Item 10502 | User Verification Platform System Menu Item 10530 |
| Archive Platform System Menu Item 10504 | Connection Platform System Menu Item 10532 |
| Audit Platform System Menu Item 10506 | Consensus Platform System Menu Item 10534 |
| Chronicle Platform System Menu Item 10508 | SDK Platform System Menu Item 10536 |
| Directory Platform System Menu Item 10510 | AI Platform System Menu Item 10538 |
| Identity Platform System Menu Item 10512 | Analytics Platform System Menu Item 10540 |
| Ledger Platform System Menu Item 10514 | Machine Learning Platform System Menu Item 10542 |
| Onboarding Platform System Menu Item 10516 | Trending Platform System Menu Item 10544 |
| Payment Platform System Menu Item 10518 | Endorsement Platform System Menu Item 10546 |
| Platform Management System Menu Item 10520 | Ad Platform System Menu Item 10548 |
| Search Platform System Menu Item 10522 | Content Verification Platform System Menu Item 10550 |
| Third Party Platform System Menu Item 10524 | Index Platform System Menu Item 10552 |
| Account Platform System Menu Item 10526 | Content Platform System Menu Item 10554 |
| Telemetry Platform System Menu Item 10528 | |

FIGURE 105

SYSTEMS, METHODS AND MEDIA FOR A DISTRIBUTED SOCIAL MEDIA NETWORK AND SYSTEM OF RECORD

CROSS REFERENCE TO RELATED APPLICATIONS

This application is a continuation of U.S. patent application Ser. No. 16/376,934 filed on Apr. 5, 2019, titled "Systems, Methods and Media for a Distributed Social Media Network and System of Record," which in turn claims the priority benefit of U.S. Provisional Application Ser. No. 62/660,118 filed on Apr. 19, 2018 and titled "Systems, Methods and Media for a Distributed Social Media Network and System of Record," all of which are hereby incorporated by reference in their entireties.

FIELD OF THE TECHNOLOGY

The present technology relates generally to distributed social media networks and systems of records.

SUMMARY OF THE PRESENT TECHNOLOGY

Provided herein are exemplary distributed architectures including a platform system communicatively coupled to a network, a social media system communicatively coupled to the network and configured for interaction by one or more users, and a social media application communicatively coupled to the network and configured for interaction by one or more users.

Further exemplary embodiments include a third party service communicatively coupled to the network, a public auditor communicatively coupled to the network, and a public archivist communicatively coupled to the network. The one or more users may include any of individuals, businesses, charities and non-profit organizations, and government organizations.

The social media system, in certain exemplary embodiments, may be communicatively coupled to system modules, the system modules communicatively coupled to platform modules and core modules, the platform modules and the core modules communicatively coupled to each other and to platform services, the platform services communicatively coupled to a social media system API, the social media system API communicatively coupled to the network, and the network communicatively coupled to the platform systems, the social media application, the third party service, the public auditor and the public archivist.

The distributed architecture may also include the platform system communicatively coupled to platform system modules, the platform system modules, communicatively coupled to system modules, platform modules, and core modules, the system modules, the platform modules and the core modules communicatively coupled to each other and to platform services, the platform services communicatively coupled to platform system APIs, the platform system APIs communicatively coupled to the network and the network communicatively coupled to the social media system, the social media application, the public archivist, the public auditor, and the third party service.

The distributed architecture, in further exemplary embodiments, may further comprise the social media application communicatively coupled to app modules, the app modules communicatively coupled to an App module client proxy and core modules, the core modules communicatively coupled to the App module client proxy, both the App module client proxy and core modules communicatively coupled to the network, and the network communicatively coupled to social media system APIs, platform system APIs, the public archivist, the public auditor, and the third party service.

Provided herein are also exemplary chronicle records including a record header, further comprising Id, version, timestamp, previous record hash, record nonce, record hash, record header graph and record signature, graphs, all of which descend from a base graph, the base graph further comprising base graph schema, base graph hash, base graph signature, base graph estimated work, base graph actual work, a graph collection further comprising a node and an edge, a hash algorithm further comprising a Merkle tree, object graph hash algorithm and a graph schema hash algorithm.

Exemplary chronicle records may further include a chronicle header further comprising Id, timestamp, chronicle nonce, chronicle header graph, version, previous chronicle hash, chronicle hash, chronicle header graph hash, a chain of chronicle records each comprising a chronicle record with a previous record hash and record hash linked to one or more other chronicle records, each chronicle record comprising a set of data for a specific predetermined period of time, one or more record hashes being associated with a previous record hash via a directional acyclic graph, one or more chronicle header graphs and one or more chronicle graph hashes providing traceability and visibility into what happened to data on its way to becoming immutable, the chronicle header being associated with a chronicle hash that is derived from different data being hashed, further comprising a chronicle being a construct that is highly scalable and allows for parallelism across a platform, with all chronicles being worked on simultaneously.

Also provided herein are a plurality of chronicles aggregated into annals, the annals further comprising an annals header including Id, timestamp, annals nonce, annals header graph, version, previous annals hash, annals hash, annals header graph hash, a chain of chronicles each comprising a previous chronicle hash and chronicle hash linked to one or more other chronicles, the annals comprising a set of data for a predetermined period of time, and further comprising one or more chronicle hashes being associated with a previous chronicle hash via a directional acyclic graph.

Further exemplary embodiments include a chronicle collection including a chronicle and annals, the chronicle including a plurality of chronicle records and the annals including a plurality of chronicles, platform system modules communicatively coupled to the chronicle collection, the platform system modules including chronicle platform system modules, a chronicle aggregation platform system module, a chronicle archive platform system module, a chronicle audit platform system module, chronicle management module, and platform systems including a chronicle system and system modules including chronicle system modules communicatively coupled to the platform system modules.

Exemplary methods for making a post on a distributed social media network include a user maintaining ownership and control of content and associated metadata, the user posting a message and content stored on their own social media system, the user using a social media app to compose a post, including using a message board app module to create to create a post, the user using a connection app module to designate who the user is going to share the post with, before sending the post, the user using a signing core module to digitally sign the post, transmitting the post by a posting app module that sends the post to their own social media system via a network, ensuring by a compliance system module that the post conforms to a platform's compliance standards and rules, storing the post inside of the user's chronicle, using a system module to create a URI to data in the user's chronicle, encrypting and passing the user's chronicle to a distribution system module, so the post can be distributed to its designated recipients via the network, one or more users accessing the post on their respective social media apps aided by a message board app module, and the user optionally deleting the post at any time while maintaining control of the post and associated metadata in an external data center.

Also provided herein are exemplary methods for publishing on a distributed social media network, including a user selecting a publisher on a network, the user using a social media app to publish, the user using a message board app module to compose publishable content, the user signing the publishable content using a signing core module, the user paying any fees associated with publishing via a payment app module, the user sending via a publishing app module the publishable content to their own social media system via a network, processing the publishable content with a compliance system module, storing the publishable content as a new chronicle record, sending the new chronicle record to a publisher across the network to a publisher's social media system, upon receipt of payment via payment modules, notifying a workflow system module of pending content item being published for the user, upon the sending of the new chronicle record, either the entire chronicle record with all its bits, including every bit of content is transmitted, or an optimization is sent with URIs to content bits, determining whether the new chronicle record has content and if it does not, obtaining the content via a URI, upon receiving the content and verifying it by a workflow system module, verifying the content meets the publisher's compliance rules, accepting, rejecting or flagging by the workflow system module for next steps of workflow, applying data transformations to a content graph, including copyright, subject headings, subdivisions, classification or catalog, upon completing processing of the content, the new chronicle record is submitted to chronicle system modules, including a chronicle workflow system module for consensus by a consensus algorithm, upon completing the consensus, the new chronicle record is either accepted or rejected, if the new chronicle record is accepted, saving it to a chronicle system module, if the new chronicle record is rejected, sending a rejection notice to the user, upon saving the new chronicle record, sending the new chronicle record to a publishing system module for a final check, sending the new chronicle record to a distribution module and placing it in a distribution event grid module, and distributing the new chronicle record over a network with the distribution event module.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 is a block diagram of Platform Systems.

FIG. 6 is a block diagram of Platform Modules.

FIG. 8 is a block diagram of System Modules.

FIG. 20 is a block diagram of a Chronicle Record.

FIG. 25 is a block diagram of a Chronicle Record.

FIG. 36 is a block diagram of Platform Tenets.

FIG. 37 is a block diagram of Publishable Content Types.

FIG. 63 is a block diagram of a Chronicle Record.
FIG. 64 is a block diagram of the properties of an Ad Campaign.
FIG. 72 is a block diagram of a Chronicle Record.
FIG. 83 is a block diagram of a Chronicle Record.
FIG. 84 is a block diagram of a Chronicle Record.
FIG. 94 is a block diagram of a Chronicle Record.
FIG. 103 is a block diagram of App Menu Items.
FIG. 104 is a block diagram of System Menu Items.
FIG. 105 is a block diagram of Platform System Menu Items.

INTRODUCTION

Figure 1:
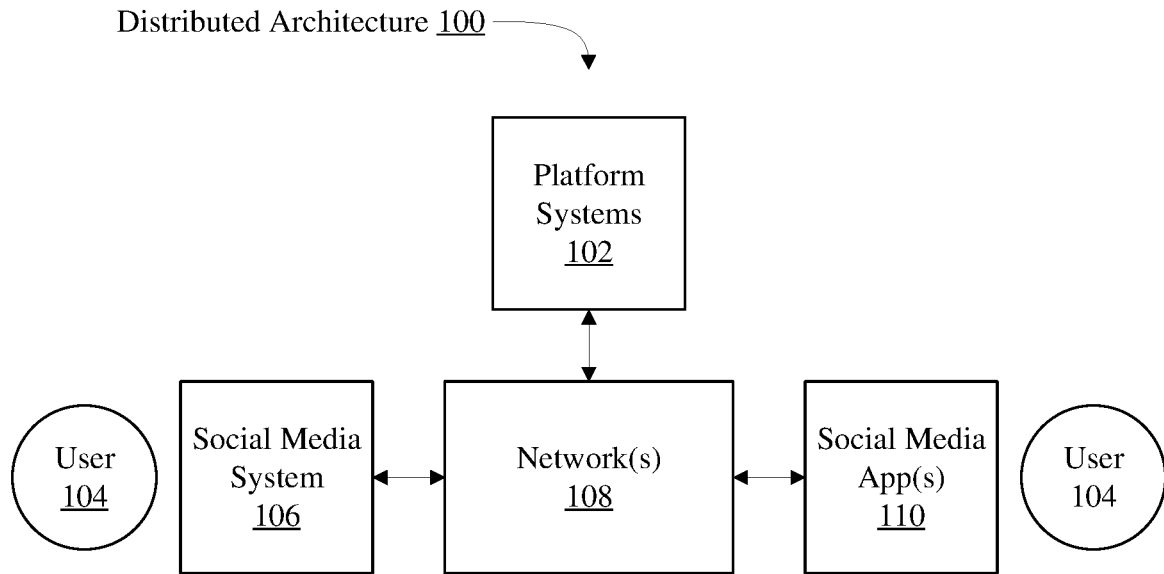
FIG. 1 is a block diagram of Distributed Architecture.

Social media today is highly centralized, controlled by a few huge companies whose primary objective is profit. Their heavy dependence on algorithms and big data to appease shareholder demands as well as their size and market dominance have led to some serious negative consequences. Users have lost privacy and control because they are the product. A small number of biased gatekeepers now decide which ideas and opinions are seen and shared. And bad actors are weaponizing these networks at scale.

Furthermore, users on existing platforms create almost all the content without compensation, while the social media companies capture all the economic value from that content through advertising sales. The news business especially is suffering—not because people don't want news, but because the money generated by online news audiences flows mostly to companies like Facebook, instead of publishers who are at a huge technological disadvantage.

Various embodiments of the present technology utilize a distributed architecture to return social media, including news and content distribution, to the original idea of the internet: a very decentralized and egalitarian system that levels the playing field and balances profit with social good. Furthermore, the platform is highly scalable with multi-dimensional parallelism and inherent sharding.

Users can post content to their connections. Posted content can be deleted at any time because users maintain total ownership and control. This type of sharing is private. Users can also publish content to a permanent public record. Published content can be edited, corrected, retracted or recanted, but never deleted. It is vetted by publishers, audited by auditors, and held in the public trust by archivists outside of the network. This type of sharing is public.

Various embodiments of the present technology also utilize a unique system of record which leverages the foundational technologies of hashes, Merkle trees and blockchain to bring integrity and civility back to social media networking. There are no bots or fake accounts because every user is known and verified. There is no censorship or shadow banning because the distributed network is user directed and filtered. There is no fake news or shit posting because the distributed network maintains a traceable, immutable, permanent public record of all published workflows and content using blockchain. There is no fraud because the distributed network facilitates and verifies all transactions for data integrity and message authenticity using hashing functions and consensus.

The surface area of any potential attack by bad actors is greatly diminished with the distributed architecture. Profit for few becomes profit for many as publishers and content creators are paid for their content, advertising dollars are distributed across a wide range of media properties, and no one intermediary controls the user or the data. Privacy and control are restored as all users are now the authority over their own data as well as what is seen, shared, and monetized on their own social media network.

DETAILED DESCRIPTION

FIG. 1 is a block diagram of Distributed Architecture 100 whereby User 104 integrates with Social Media System 106, Social Media App(s) 110 and Platform Systems 102 via Network(s) 108. What makes this architecture unique is that User 104 has their own Social Media System 106 and their own Social Media App(s) 110. In one embodiment of the invention where User 104 is a business, User 104 might have many Social Media App(s) 110 pointing to their own Social Media System 106. In another embodiment of the invention where User 104 is an individual, User 104 might have an iOS application as their Social Media App(s) 110 and their own Social Media System 106.

By comparison, all existing social media platforms have centralized architectures. (See reference article, "On Distributed Communications Networks" by Paul Baran, published September 1962, for illustration of differences between centralized and distributed networks.) Users of centralized social media networks such as Facebook or Twitter are essentially interacting with a single, monolithic social media system for that specific business. Data is being transferred to and from centralized data centers that users do not own or control. These central authorities use algorithms and big data to determine what is seen and shared based on what will generate them the most profit.

With Distributed Architecture 100, User 104 has total authority over their own data as well as what is seen, shared and monetized on their own social media network. Furthermore, the platform is highly scalable, with multi-dimensional parallelism and inherent sharding, as well as a significantly reduced surface area for attacks.

FIG. 2 is a block diagram of Platform Systems 102 which is comprised of API System 200, Archive System 202, Audit System 204, Chronicle System 206, Directory System 208, Identity System 210, Ledger System 212, Onboarding System 214, Payment System 216, Platform Management System 218, Search System 220, Third Party Systems 222, Account System 224, Telemetry System 226, User Verification System 228, Connection System 230, Consensus System 232, SDK System 234, AI System 236, Analytics System 238, Machine Learning System 240, Trending System 244, Endorsement System 246, Ad System 248, Content Verification System 250, Index System 252. All of these sub-systems affect the entire platform and are cross-cutting in their impact on both Social Media System 106 and Social Media App(s) 110 introduced in FIG. 1.

API System 200 manages APIs for the platform. Archive System 202 manages archiving for the platform. Audit System 204 manages auditing for the platform. Chronicle System 206 manages chronicles for the platform. Directory System 208 manages the directory for the platform. Identity System 210 manages identity for the platform. Ledger System 212 manages ledgers for the platform. Onboarding System 214 manages onboarding for the platform. Payment System 216 manages payments for the platform. Platform Management System 218 is the main system that manages and integrates with all other platform systems on the platform. It composes, deploys, configures, updates, and decommissions Social Media System 106 and Social Media App(s) 110 in FIG. 1 which are both dynamically created to deliver a unique set of features and functionality for User 104 based on user type and requirements.

Search System 220 manages search for the platform. Third Party Systems 222 manages third parties for the platform. Account System 224 manages accounts for the platform. Telemetry System 226 manages telemetry for the platform. User Verification System 228 manages user verification for the platform. Connection System 230 manages connections for the platform. Consensus System 232 manages consensus for the platform. SDK System 234 manages software development kits for the platform. AI System 236 manages AI for the platform. Analytics System 238 manages analytics for the platform. Machine Learning System 240 manages machine learning for the platform. Trending System 244 manages trending for the platform. Endorsement System 246 manages endorsements for the platform. Ad System 248 manages ads for the platform. Content Verification System 250 manages content verification for the platform. Index System 252 manages indexing for the platform.

Figure 3:
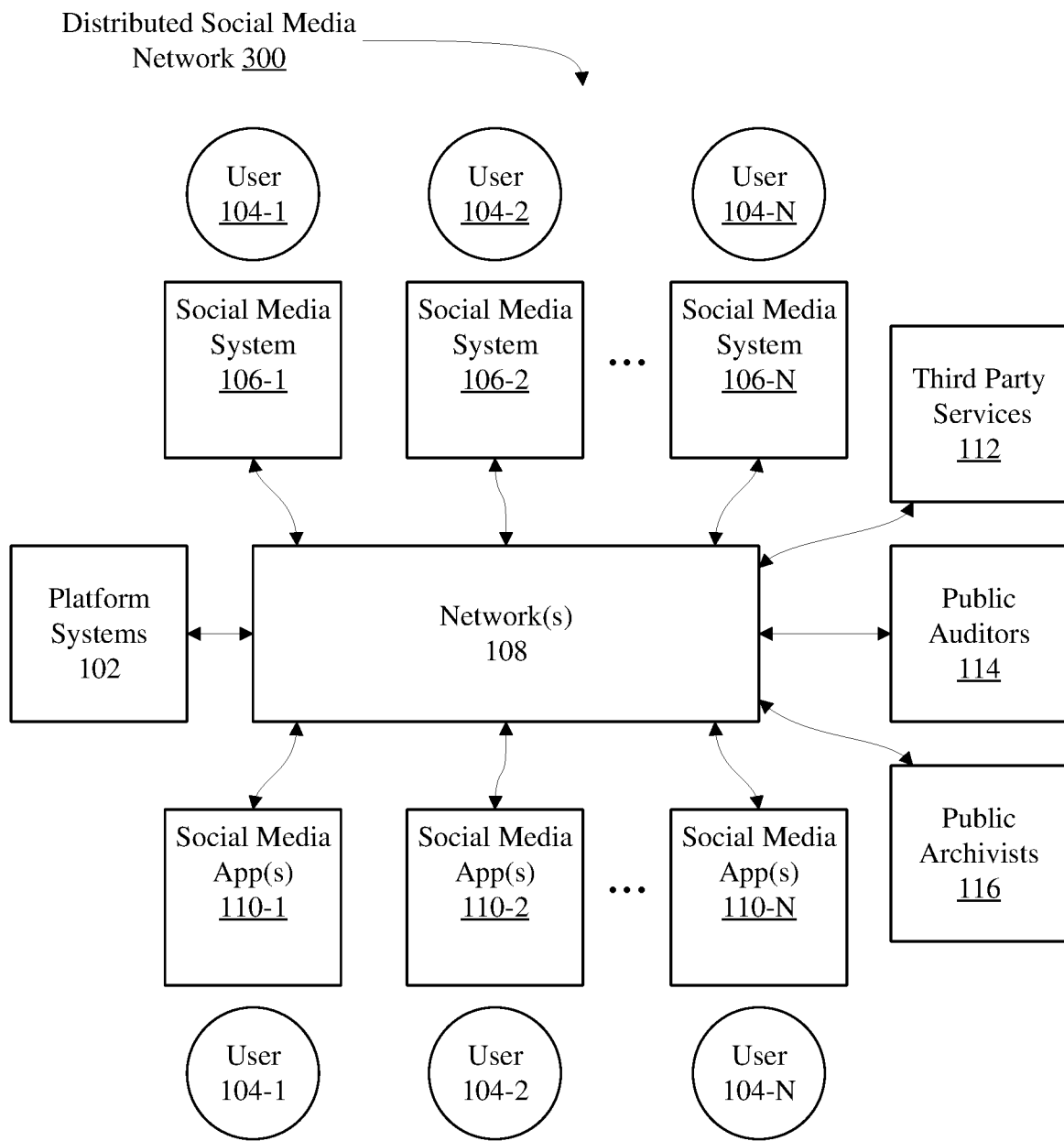
FIG. 3 is a block diagram of A Distributed Social Media Network.

FIG. 3 is a block diagram of Distributed Social Media Network 300 which further illustrates that every User 104 has their own social media system and their own social media app in Distributed Architecture 100 detailed in FIG. 1. User 104-1 has Social Media System 106-1 and Social Media App(s) 110-1. User 104-2 has Social Media System 106-2 and Social Media App(s) 110-2. User 104-N has Social Media System 106-N and Social Media App(s) 110-N. The ellipse between Social Media System 106-2 and Social Media System 106-N illustrates that there are N number of social media systems for every user on the network. The ellipse between Social Media App(s) 110-2 and Social Media App(s) 110-N illustrates that there are N number of social media app(s) for every user on the network. Platform Systems 102 services all social media systems and all social media apps across Network(s) 108. All of the sub-systems available in Platform Systems 102 are available to all social media systems and all social media apps across Network(s) 108. Third Party Services 112 represents third party services available to Platform Systems 102 as well as all social media systems and all social media apps across Network(s) 108. Public Auditors 114 provide auditing services for the platform and interact with Platform Systems 102 as well as all social media systems and all social media apps across Network(s) 108. Public Archivists 116 provides archiving services in the public domain outside of the platform and interact with Platform Systems 102 as well as all social media systems and all social media apps across Network(s) 108.

Figure 4:
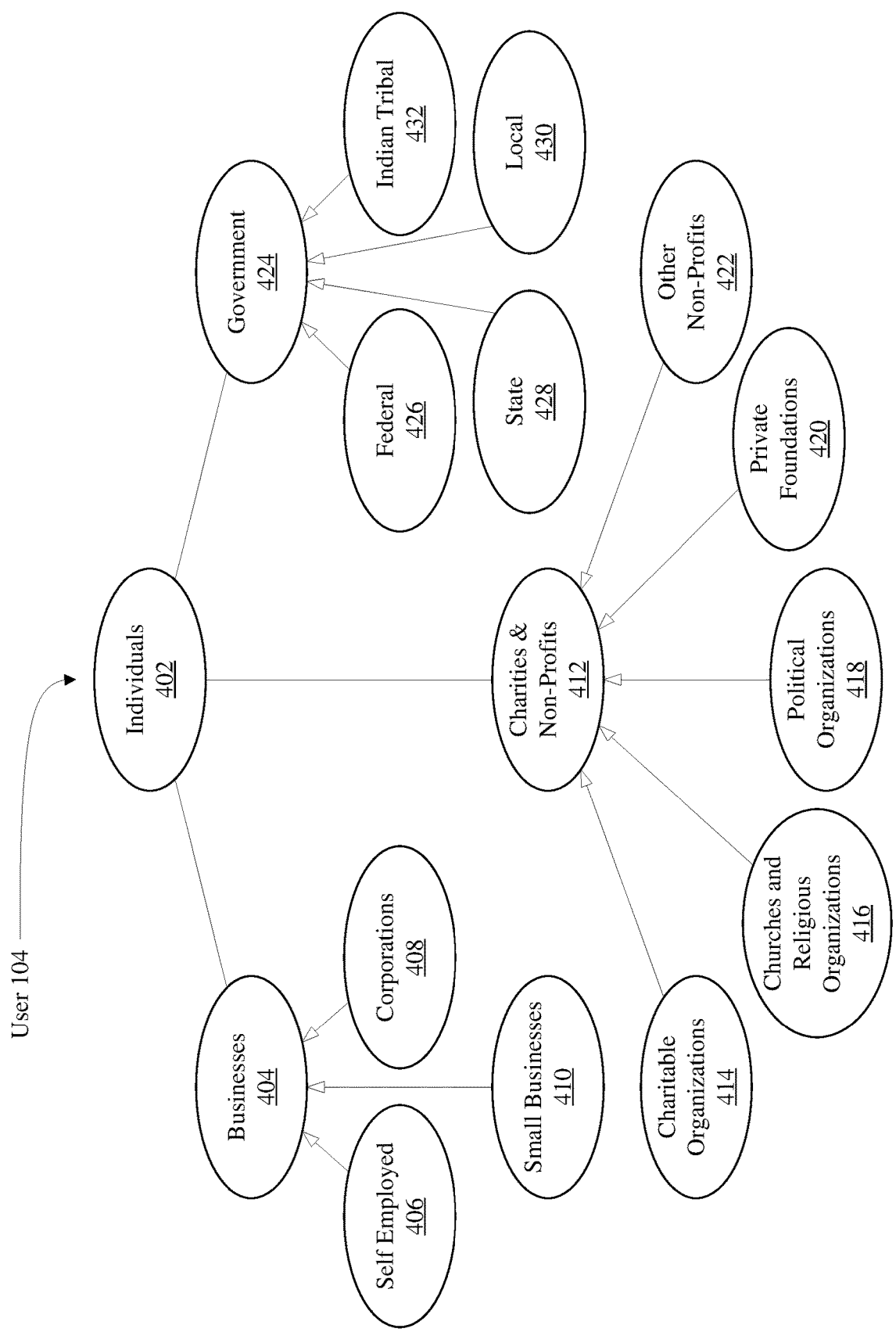
FIG. 4 is a use case diagram that illustrates individuals and entities as they relate to users of A Distributed Social Media Network.

FIG. 4 is a use case diagram that illustrates individuals and entities as they relate to users of Distributed Social Media Network 300 in FIG. 3. It further defines User 104 in FIG. 1 and utilizes the classification system of the United States Internal Revenue Service. In another embodiment of the invention, other classification systems could be used to define User 104. Here User 104 is comprised of Individuals 402 which may be users of Distributed Social Media Network 300 in FIG. 3, and in the case of the IRS classification, are defined as U.S. citizens or residents. Individuals 402 may also have associations with Businesses 404, Charities & Non-Profits 412, and Government 424. Businesses 404 may be users of Distributed Social Media Network 300 in FIG. 3 and include Self Employed 406, Small Businesses 410, and Corporations 408. Charities & Non-Profits 412 may be users of Distributed Social Media Network 300 in FIG. 3 and are comprised of Charitable Organizations 414, Churches & Religious Organizations 416, Political Organizations 418, Private Foundations 420, and Other Non-Profits 422. Government 424 may be users of Distributed Social Media Network 300 in FIG. 3 and are comprised of Federal 426, State 428, Local 430, and Indian Tribal 432.

In one embodiment of the invention, user accounts will be created by Distributed Social Media Network 300 in FIG. 3 for elected and appointed government positions at all levels of Government 424, specifically Federal 426, State 428, Local 430, and Indian Tribal 432. Access will be given to each elected or appointed Individual 402, or their designated appointees, for official government use during their term or appointment. These user accounts are not owned by Individual 402 and are in no way associated to their personal user account. In another embodiment of the invention, user accounts are created for elected and appointed government positions by FIG. 1, Platform Systems 102. In another embodiment of the invention, user accounts are created for elected and appointed government positions by FIG. 1, Social Media System 106.

Figure 5:
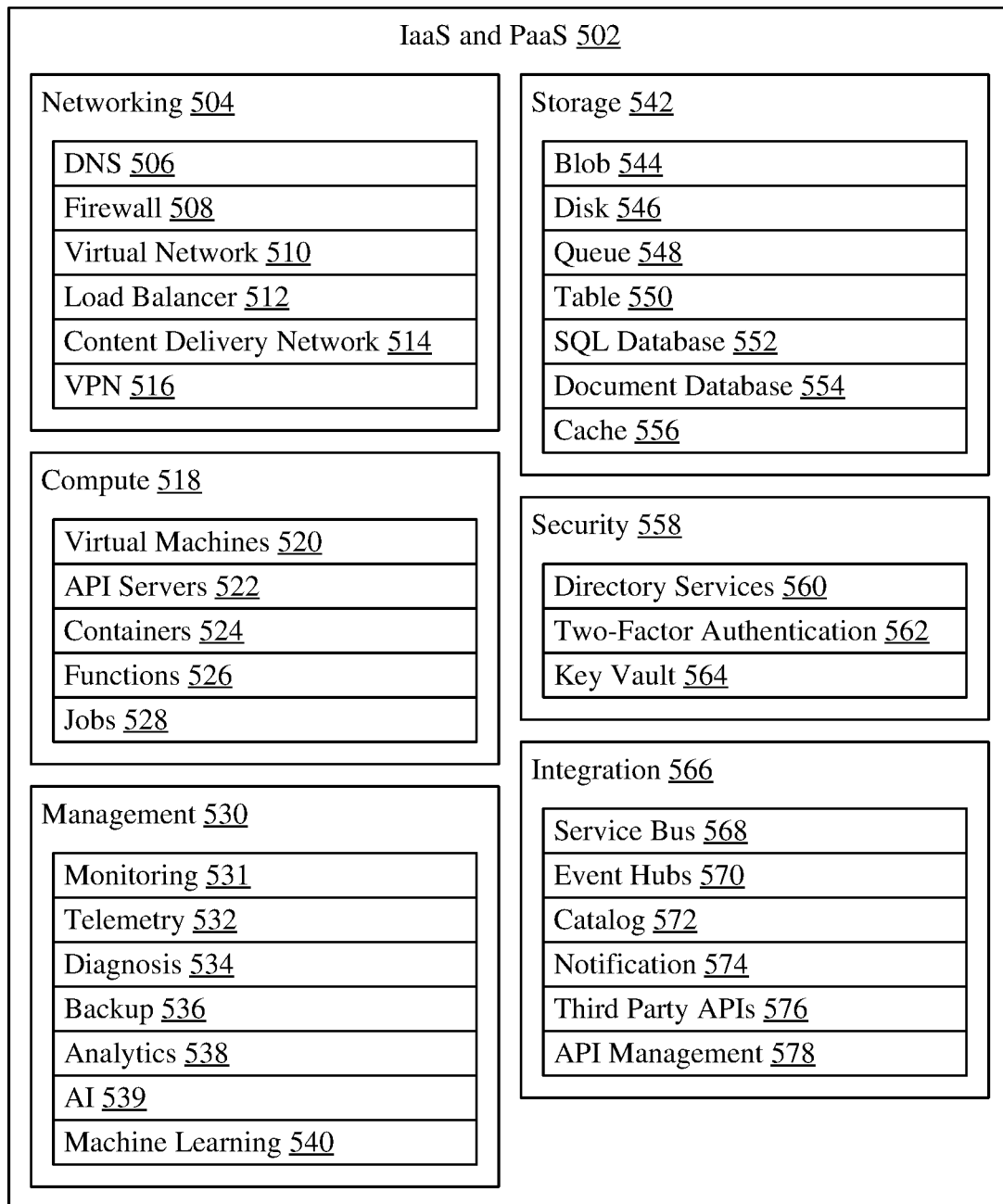
FIG. 5 is a block diagram of Platform Services.

FIG. 5 is a block diagram of Platform Services 500 which is comprised of IaaS and PaaS 502. Infrastructure as a Service (IaaS) and Platform as a Service (PaaS) are used to describe basic cloud computing constructs that include cloud platforms such as Microsoft Azure or AWS Cloud Services. The entire platform is built on top of these foundational services which sit on servers interconnected on networks and all the individual servers comprised of operating systems, memory, and CPU. IaaS and PaaS 502 is comprised of Networking 504, Compute 518, Management 530, Storage 542, Security 558, and Integration 566. Networking 504 consists of DNS 506, Firewall 508, Virtual Network 510, Load Balancer 512, Content Delivery Network 514, and VPN 516. Compute 518 consists of Virtual Machines 520, API Servers 522, Containers 524, Functions 526, and Jobs 528. Management 530 consists of Monitoring 531, Telemetry 532, Diagnosis 534, Backup 536, Analytics 538, AI 539, and Machine Learning 540. Storage 542 consists of Blob 544, Disk 546, Queue 548, Table 550, SQL Database 552, Document Database 554, and Cache 556. Security 558 consists of Directory Services 560, Two-Factor Authentication 562, and Key Vault 564. Integration 566 consists of Service Bus 568, Event Hubs 570, Catalog 572, Notification 574, Third Party APIs 576, and API Management 578.

FIG. 6 is a block diagram of Platform Modules 600 which is comprised of Compute Module 602, Integration Module 604, Management Module 606, Networking Module 608, Security Module 610, and Storage Module 612. Each of these modules represents the high-level cross-cutting programming and configuration needed to manage all of the corresponding services of Platform Services 500 in FIG. 5. Compute Module 602 represents all of the programming and configuration needed to manage Compute 518 in FIG. 5. Integration Module 604 represents all the programming and configuration needed to manage Integration 566 in FIG. 5. Management Module 606 represents all the programming and configuration needed to manage Management 530 in FIG. 5. Networking Module 608 represents all the programming and configuration needed to manage Networking 504 in FIG. 5. Security Module 610 represents all the programming and configuration needed to manage Security 558 in FIG. 5. Storage Module 612 represents all the programming and configuration need to manage Storage 542 in FIG. 5.

Figure 7:
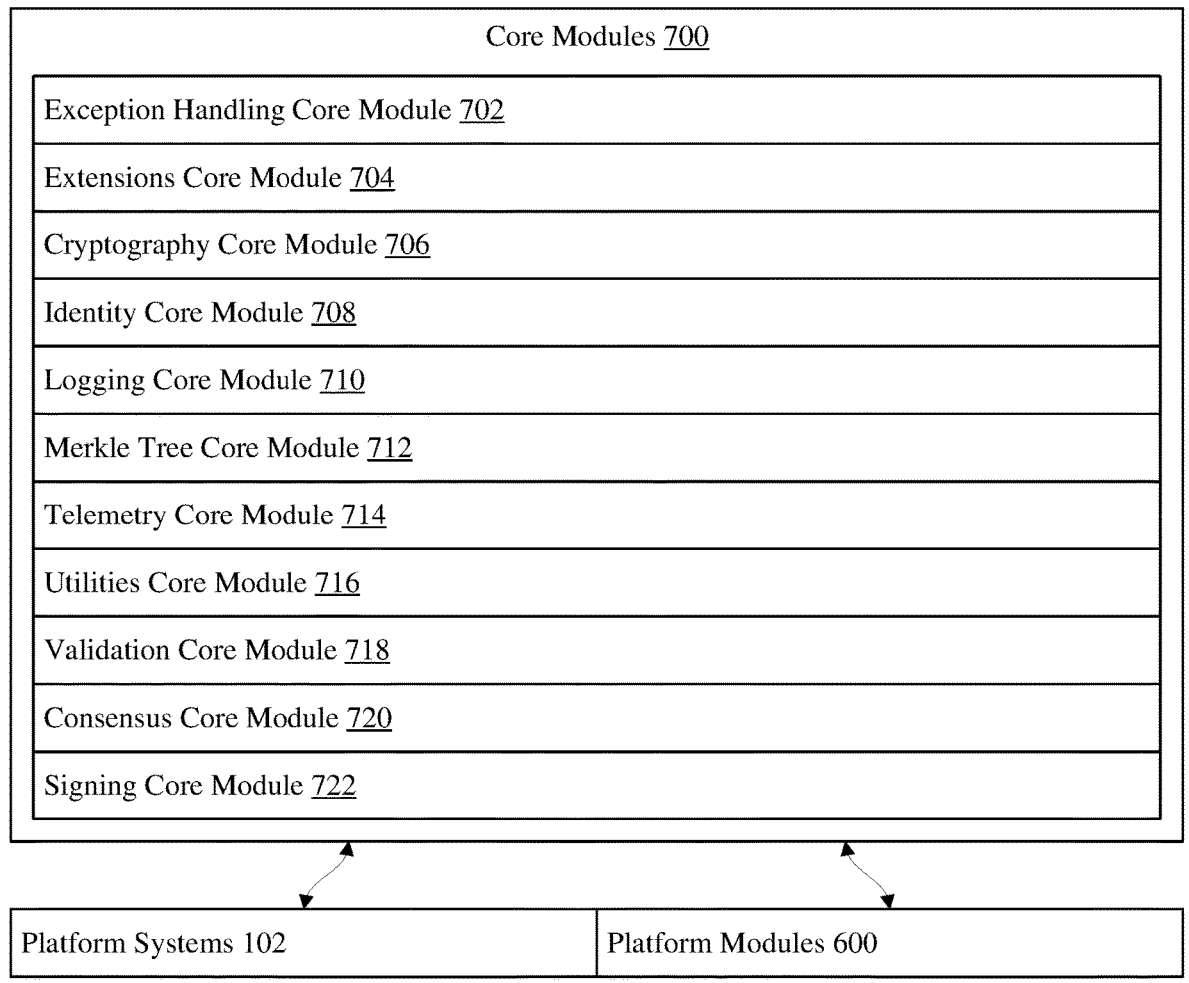
FIG. 7 is a block diagram of Core Modules.

FIG. 7 is a block diagram of Core Modules 700 which is comprised of Exception Handling Core Module 702, Extensions Core Module 704, Cryptography Core Module 706, Identity Core Module 708, Logging Core Module 710, Merkle Tree Core Module 712, Telemetry Core Module 714, Utilities Core Module 716, Validation Core Module 718, Consensus Core Module 720, and Signing Core Module 722. Core Modules 700 interacts with Platform Systems 102 and Platform Modules 600.

Core Modules 700 provides all the cross-cutting functionality for Platform Systems 102 and Platform Modules 600, including but not limited to exception handling, cryptography, identity, logging, telemetry, validation, consensus, and signing. Every Social Media System 106 and every Social Media App(s) 110 on Distributed Social Media Network 300 in FIG. 3 requires these cross-cutting features in terms of application logic, configuration and storage. This low-level code also manages all of the Platform Services 500 in FIG. 5, specifically Networking 504, Compute 518, Management 530, Storage 542, Security 558 and Integration 566.

Exception Handling Core Module 702 captures exception handling and works with the other modules in Platform Modules 600 to ensure exceptions are logged and put into a process to be mitigated. Extensions Core Module 704 represents extensions to core functionality so that there is reuse across the systems and applications. Cryptography Core Module 706 represents cryptography programming, ciphers, and hashing algorithms that are leveraged by both the systems and applications. Identity Core Module 708 manages core identity functions that are used by both the systems and applications. Logging Core Module 710 provides the ability to log debug, error and critical information in the system and application layers. Merkle Tree Core Module 712 enables the ability to work with Merkle trees across the systems and applications. Telemetry Core Module 714 collects telemetry data in both the system and application layers. Utilities Core Module 716 provides utility functionality, programming, and configurations that can be used across both the systems and applications. Validation Core Module 718 provides validation functionality and configurations that can be applied in the system and application layers. Consensus Core Module 720 manages consensus across the systems and applications. Signing Core Module 722 manages signing in the system and application layers.

FIG. 8 is a block diagram of System Modules 800 which is comprised of Ad System Modules 802, AI System Modules 804, Analytics System Modules 806, Archive System Modules 808, Audit System Modules 810, Chronicle System Modules 812, Connection System Modules 814, Content System Modules 816, Directory System Modules 818, Distribution System Modules 820, Identity System Modules 822, Ledger System Modules 824, Licensing System Modules 826, Machine Learning System Modules 828, Message Board System Modules 830, Onboarding System Modules 832, Payment System Modules 834, Posting System Modules 836, Publishing System Modules 838, Search System Modules 840, Subscription System Modules 842, Third Party System Modules 844, Wallet System Modules 846, Endorsement System Modules 848, Compliance System Modules 850, Consensus System Modules 852, Notary System Modules 854, Certified Email System Modules 856, Workflow System Modules 858, SDK System Modules 860, Copyright System Modules 862, Rhetoric System Modules 864, User Verification System Modules 866, Trending System Modules 868, Account System Modules 870, Content Verification System Modules 872, and Index System Modules 874. System Modules 800 interacts with Core Modules 700 which provides all the cross-cutting functionality for System Modules 800.

Each of these system modules represents the high-level cross-cutting programming and configuration needed to manage all of the corresponding services of Social Media System 106 in FIG. 1. Social Media System 106-1 to 106-N on Distributed Social Media Network 300 in FIG. 3 is comprised of one or more or all of these system modules depending on user type and requirements. While generally intended for the system layer, these system modules could also be used by Platform Systems 102 in FIG. 1 across the entire platform or by Social Media App(s) 110 in FIG. 1 in the application layer. These system modules can work alone or be combined. They are combined by either compilation or as separate systems by networks or by sitting in the same operating system and communicating via API or SDK.

Ad System Modules 802 provides the system modules for managing the advertising features and functionality of the platform. AI System Modules 804 provides the system modules for managing the AI features and functionality of the platform. Analytics System Modules 806 provides the system modules for managing the analytics features and functionality of the platform. Archive System Modules 808 provides the system modules for managing the archiving features and functionality of the platform. Audit System Modules 810 provides the system modules for managing the auditing features and functionality of the system. Chronicle System Modules 812 provides the system modules for managing the chronicle features and functionality of the platform. Connection System Modules 814 provides the system modules for managing the connection features and functionality of the platform. Content System Modules 816 provides the system modules for managing the content features and functionality of the platform. Directory System Modules 818 provides the system modules for managing the directory features and functionality of the platform. Distribution System Modules 820 provides the system modules for managing the distribution of posted and published content across Distributed Social Media Network 300 in FIG. 3. Identity System Modules 822 provides the system modules for managing the identity features and functionality of the platform. Ledger System Modules 824 provides the system modules for managing the ledger features and functionality of the platform. Licensing System Modules 826 provides the system modules for managing the licensing features and functionality of the platform. Machine Learning System Modules 828 provides the system modules for managing the machine learning features and functionality of the platform. Message Board System Modules 830 provides the system modules for managing the message board features and functionality of the platform. Onboarding System Modules 832 provides the system modules for managing the onboarding features and functionality of the platform. Payment System Modules 834 provides the system modules for managing the payment features and functionality of the platform. Posting System Modules 836 provides the system modules for managing the posting features and functionality of the platform.

Publishing System Modules 838 provides the system modules for managing the publishing features and functionality of the platform. Search System Modules 840 provides the system modules for managing the search features and functionality of the platform. Subscription System Modules 842 provides the system modules for managing the subscription features and functionality of the platform. Third Party System Modules 844 provides the system modules for managing the third-party features and functionality of the platform. Wallet System Modules 846 provides the system modules for managing the wallet features and functionality of the platform. Endorsement System Modules 848 provides the system modules for managing the endorsement features and functionality of the platform. Compliance System Modules 850 provides the system modules for managing the compliance features and functionality of the platform. Consensus System Modules 852 provides the system modules for managing the consensus features and functionality of the platform. Notary System Modules 854 provides the system modules for managing the notary features and functionality of the platform. Certified Email System Modules 856 provides the system modules for managing the certified email features and functionality of the platform. Workflow System Modules 858 provides the system modules for managing the workflow features and functionality of the platform. SDK System Modules 860 provides the system modules for managing software development kits to build additional features and functionality on the platform. Copyright System Modules 862 provides the system modules for managing the copyright features and functionality of the platform. Rhetoric System Modules 864 provides the system modules for managing the rhetoric features and functionality of the platform. User Verification System Modules 865 provides the system modules for managing the user verification features and functionality of the platform. Trending System Modules 868 provides the system modules for managing the trending features and functionality of the platform. Account System Modules 870 provides the system modules for managing the accounting features and functionality of the platform. Content Verification System Modules 872 provides the system modules for managing the content verification features and functionality of the platform. Index System Modules 874 provides the system modules for managing the index features and functionality of the platform.

Figure 9:
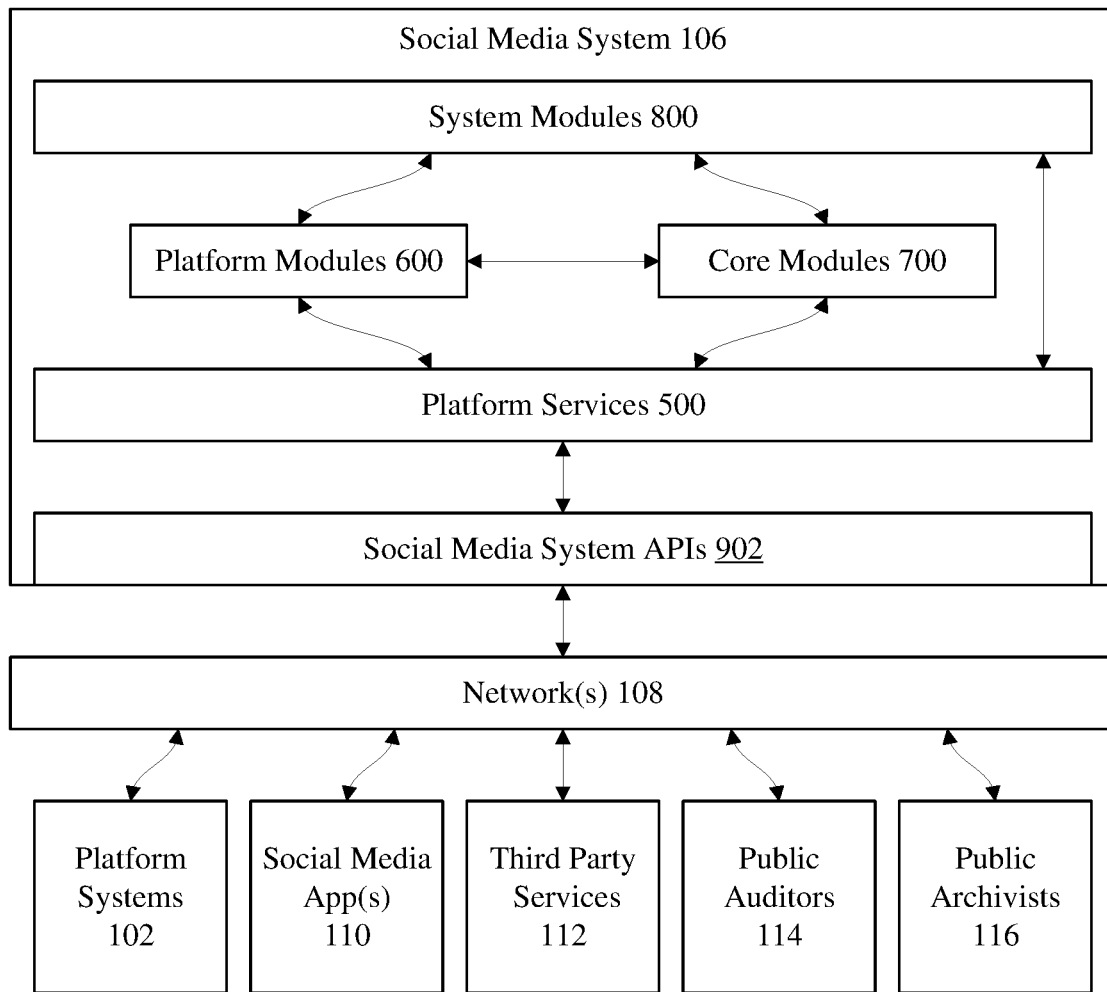
FIG. 9 is a block diagram of Social Media System Layers.

FIG. 9 is a block diagram of Social Media System Layers 900 which is comprised of Social Media System 106 which is integrated with System Modules 800. System Modules 800 is integrated with Platform Modules 600, Core Modules 700, and Platform Services 500. Platform Modules 600 is integrated with Core Modules 700 and Platform Services 500. Core Modules 700 is integrated with Platform Modules 600 and Platform Services 500. Platform Services 500 is integrated with Network(s) 108 via Social Media System APIs 902, which are the sum composite of all the application programming interfaces that are exposed by Social Media System 106. Social Media Systems 106 interfaces with Platform Systems 102, Social Media App(s) 110, Third Party Services 112, Public Auditors 114, and Public Archivists 116 across Network(s) 108. This diagram illustrates the constituent foundational layering of Social Media System 106 that is derived vis-a-vis System Modules 800 in their relationship with Platform Modules 600, Core Modules 700, and Platform Services 500 and as well as the interaction across Network(s) 108 with Platform Systems 102, Social Media App(s) 110, Third Party Services 112, Public Auditors, 114 and Public Archivists 116. In short, one sees the N-tiered architecture from the point of view of System Modules 800 in FIG. 8.

Figure 10:
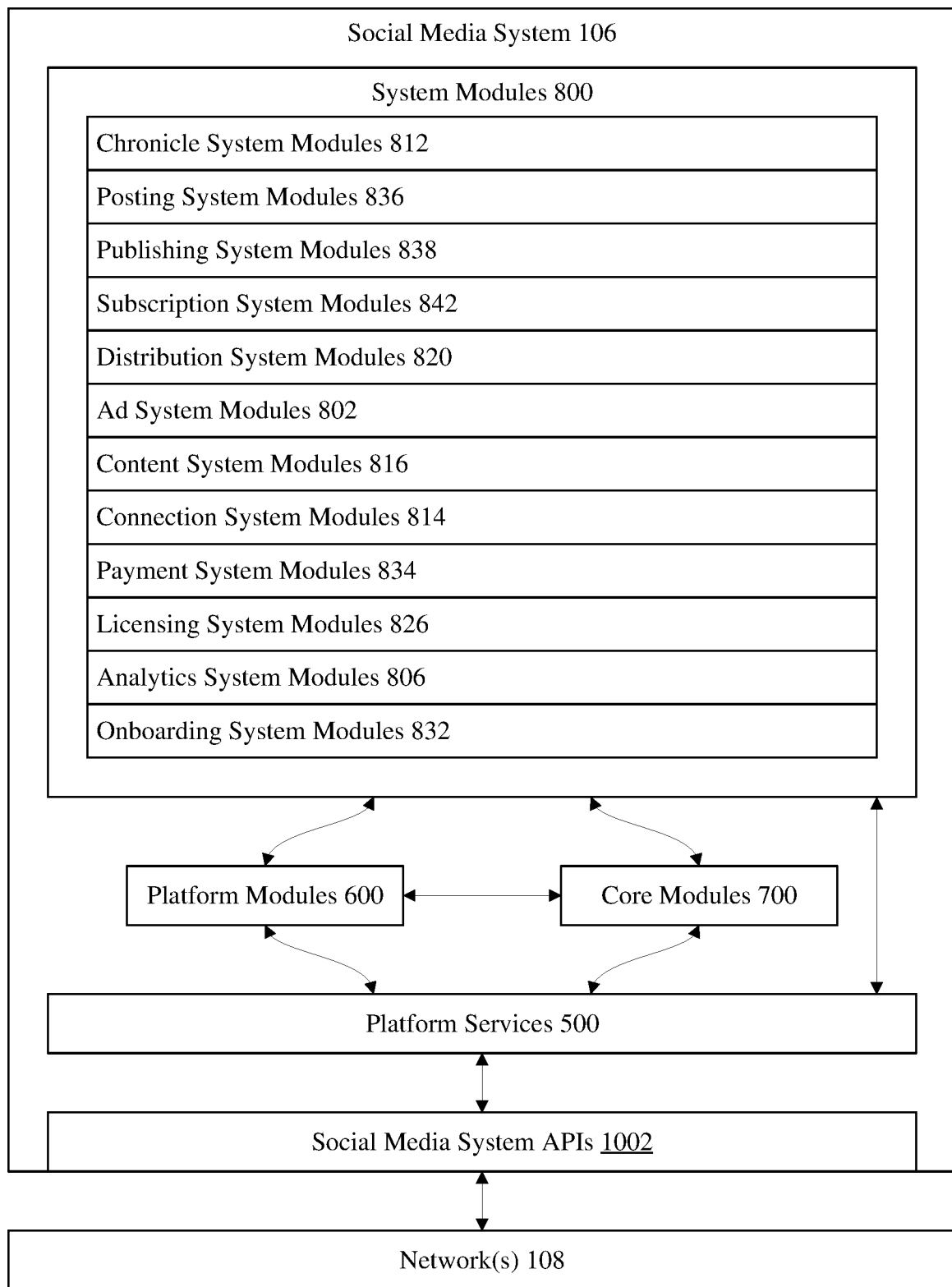
FIG. 10 is a block diagram which illustrates one possible Social Media System.

FIG. 10 is a block diagram which illustrates one possible Social Media System 106 for User 104 in FIG. 1 who is Business 404 in FIG. 4. It is comprised of System Modules 800 which consists of Chronicle System Modules 812, Posting System Modules 836, Publishing System Modules 838, Subscription System Modules 842, Distribution System Modules 820, Ad System Modules 802, Content System Modules 816, Connection System Modules 814, Payment System Modules 834, Licensing System Modules 826, Analytics System Modules 806, and Onboarding System Modules 832. This collection of twelve system modules is a subset of the total possible system modules dynamically created and delivered by Platform Management System 218 in FIG. 2 based on user type and requirements. System Modules 800 interfaces with Platform Modules 600, Core Modules 700 and Platform Services 500. Platform Modules 600 interfaces with Core Modules 700 and Platform Services 500. Core Modules 700 interfaces with Platform Modules 600 and Platform Services 500. Social Media System APIs 1002 represents all the application programming interfaces for interfacing with System Modules 800, Platform Modules 600, Core Modules 700 and any of the specific system modules. All of these comprise the sum total application programming interfaces for this specific version of Social Media System 106. Platform Services 500 is integrated with Network(s) 108 via Social Media System APIs 1002.

Figure 11:
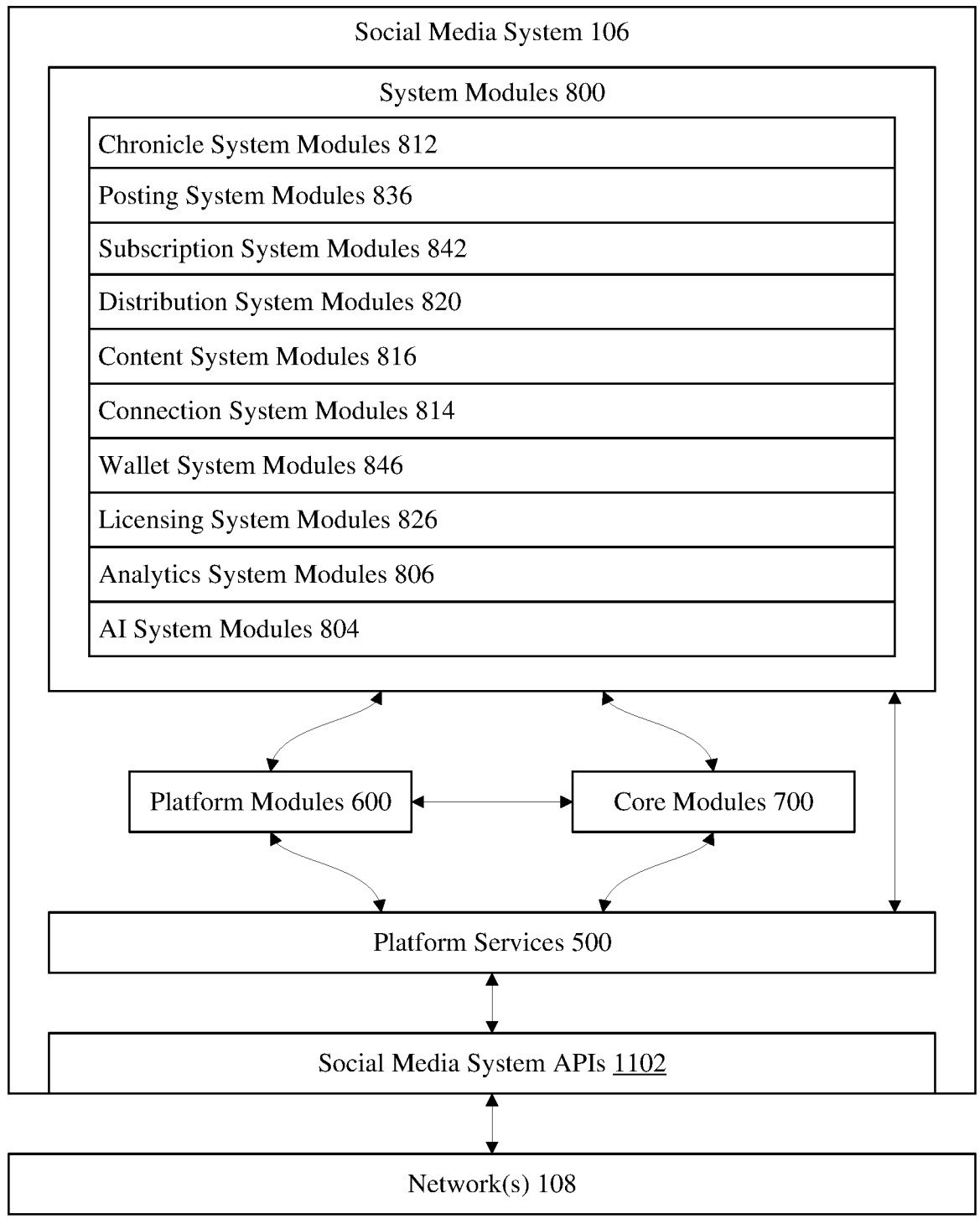
FIG. 11 is a block diagram which illustrates another possible Social Media System.

FIG. 11 is a block diagram which illustrates another possible Social Media System 106 for a User 104 in FIG. 1 who is Individual 402 in FIG. 4. It is comprised of System Modules 800 which consists of Chronicle System Modules 812, Posting System Modules 836, Subscription System Modules 842, Distribution System Modules 820, Content System Modules 816, Connection System Modules 814, Wallet System Modules 846, Licensing System Modules 826, Analytics System Modules 806, and AI System Modules 804. This collection of ten system modules is a subset of the total possible system modules dynamically created and delivered by Platform Management System 218 in FIG. 2 based on user type and requirements. System Modules 800 interfaces with Platform Modules 600, Core Modules 700 and Platform Services 500. Platform Modules 600 interfaces with Core Modules 700 and Platform Services 500. Core Modules 700 interfaces with Platform Modules 600 and Platform Services 500. Social Media System APIs 1102 represents all the application programming interfaces for interfacing with System Modules 800, Platform Modules 600, Core Modules 700 and any of the specific system modules. All of these comprise the sum total application programming interfaces for this specific version of Social Media System 106. Platform Services 500 is integrated with Network(s) 108 via Social Media System APIs 1102.

Figure 12:
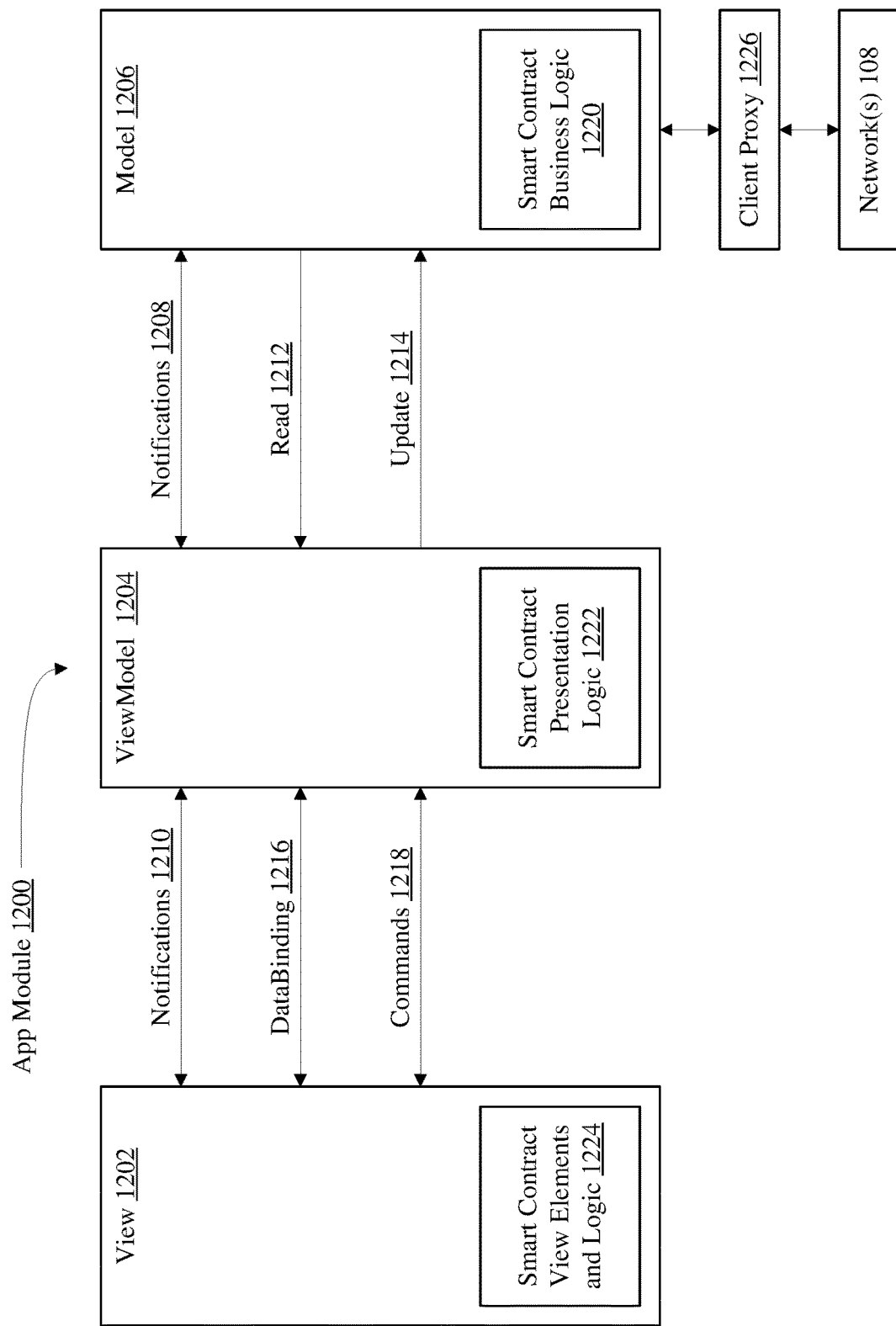
FIG. 12 is a block diagram of an App Module.

FIG. 12 is a block diagram of App Module 1200 which is comprised of View 1202, View Model 1204 and Model 1206. View 1202 is the UI and also comprised of Smart Contract View Elements and Logic 1224. View 1202 interfaces with View Model 1204 which is also comprised of Smart Contract Presentation Logic 1222. View 1202 and View Model 1204 interact via Notifications 1210, DataBinding 1216, and Commands 1218. View Model 1204 integrates with Model 1206 by Notifications 1208, Read 1212, and Update 1214. Model 1206 is also comprised of Smart Contract Business Logic 1220. Client Proxy 1226 represents the application's integration into Network(s) 108. This diagram introduces the concept of an app module, which is designed to be an application whether an iOS or Android app downloaded from an app store or a thick client for Mac OS, Linux or Windows. It represents user interfaces that provide a certain set of features and functionality for users and exemplifies a typical MVVM (Model, View, View Model) software development pattern for UI design.

Figure 13:
FIG. 13 is a block diagram of App Modules.

FIG. 13 is a block diagram of App Modules 1300 which is comprised of Ad App Module 1302, AI App Module 1304, Analytics App Module 1306, Archive App Module 1308, Audit App Module 1310, Chronicle App Module 1312, Connection App Module 1314, Content App Module 1316, Directory App Module 1318, Distribution App Module 1320, Identity App Module 1322, Ledger App Module 1324, Licensing App Module 1326, Machine Learning App Module 1328, Message Board App Module 1330, Onboarding App Module 1332, Payment App Module 1334, Posting App Module 1336, Publishing App Module 1338, Search App Module 1340, Subscription App Module 1342, Third Party App Modules 1344, Wallet App Module 1346, Endorsement App Module 1348, Compliance App Module 1350, Consensus App Module 1352, Notary App Module 1354, Certified Email Module 1356, Workflow App Module 1358, SDK App Module 1360, Copyright App Module 1362, Rhetoric App Module 1364, User Verification App Module 1366, Trending App Module 1368, Account App Module 1370, and Content Verification App Module 1372, and Index App Module 1374. App Modules 1300 interacts with Core Modules 700 which provides all the cross-cutting functionality for App Modules 1300.

Each of these app modules represents the high-level cross-cutting programming and configuration needed to manage all of the corresponding services of Social Media App(s) 110 in FIG. 1. Social Media App(s) 110-1 to 110-N on Distributed Social Media Network 300 in FIG. 3 are comprised of one or more or all of these app modules depending on user type and requirements. While generally intended for the application layer, these app modules could also be used by Platform Systems 102 in FIG. 1 across the entire platform or by Social Media System 106 in FIG. 1 in the system layer. These app modules can work alone or be combined. They also represent the programming and configuration necessary to integrate with Social Media System 106 and Platform Systems 102 in FIG. 1 on the application side.

Ad App Module 1302 manages the advertising features and functionality of the app(s). AI App Module 1304 manages the AI features and functionality of the app(s). Analytics App Module 1306 manages the analytics features and functionality of the app(s). Archive App Module 1308 manages the archive features and functionality of the app(s). Audit App Module 1310 manages the audit features and functionality of the app(s). Chronicle App Module 1312 manages the chronicle features and functionality of the app(s). Connection App Module 1314 manages the connection features and functionality of the app(s). Content App Module 1316 manages the content features and functionality of the app(s). Directory App Module 1318 manages the directory features and functionality of the app(s). Distribution App Module 1320 manages the distribution features and functionality of the app(s). Identity App Module 1322 manages the identity features and functionality of the app(s). Ledger App Module 1324 manages the ledger features and functionality of the app(s). Licensing App Module 1326 manages the licensing features and functionality of the app(s). Machine Learning App Module 1328 manages the machine learning features and functionality of the app(s). Message Board App Module 1330 manages the message board features and functionality of the app(s). Onboarding App Module 1332 manages the onboarding features and functionality of the app(s). Payment App Module 1334 manages the payment features and functionality of the app(s). Posting App Module 1336 manages the posting features and functionality of the app(s).

Publishing App Module 1338 manages the publishing features and functionality of the app(s). Search App Module 1340 manages the search features and functionality of the app(s). Subscription App Module 1342 manages the subscription features and functionality of the app(s). Third Party App Modules 1344 manages the third-party features and functionality of the app(s). Wallet App Module 1346 manages the wallet features and functionality of the app(s). Endorsement App Module 1348 manages the endorsement features and functionality of the app(s). Compliance App Module 1350 manages the compliance features and functionality of the app(s). Consensus App Module 1352 manages the consensus features and functionality of the app(s). Notary App Module 1354 manages the notary features and functionality of the app(s). Certified Email App Module 1356 manages the certified email features and functionality of the app(s). Workflow App Module 1358 manages the workflow features and functionality of the app(s). SDK App Module 1360 manages the software development kit features and functionality of the app(s). Copyright App Module 1362 manages the copyright features and functionality of the app(s). Rhetoric App Module 1364 manages the rhetoric features and functionality of the app(s). User Verification App Module 1366 manages the user verification features and functionality of the app(s). Trending App Module 1368 manages the trending features and functionality of the app(s). Account App Module 1370 manages the accounting features and functionality of the app(s). Content Verification App Module 1372 manages the content verification features and functionality of the app(s). Index App Modules 1374 manages the index features and functionality of the app(s).

Figure 14:
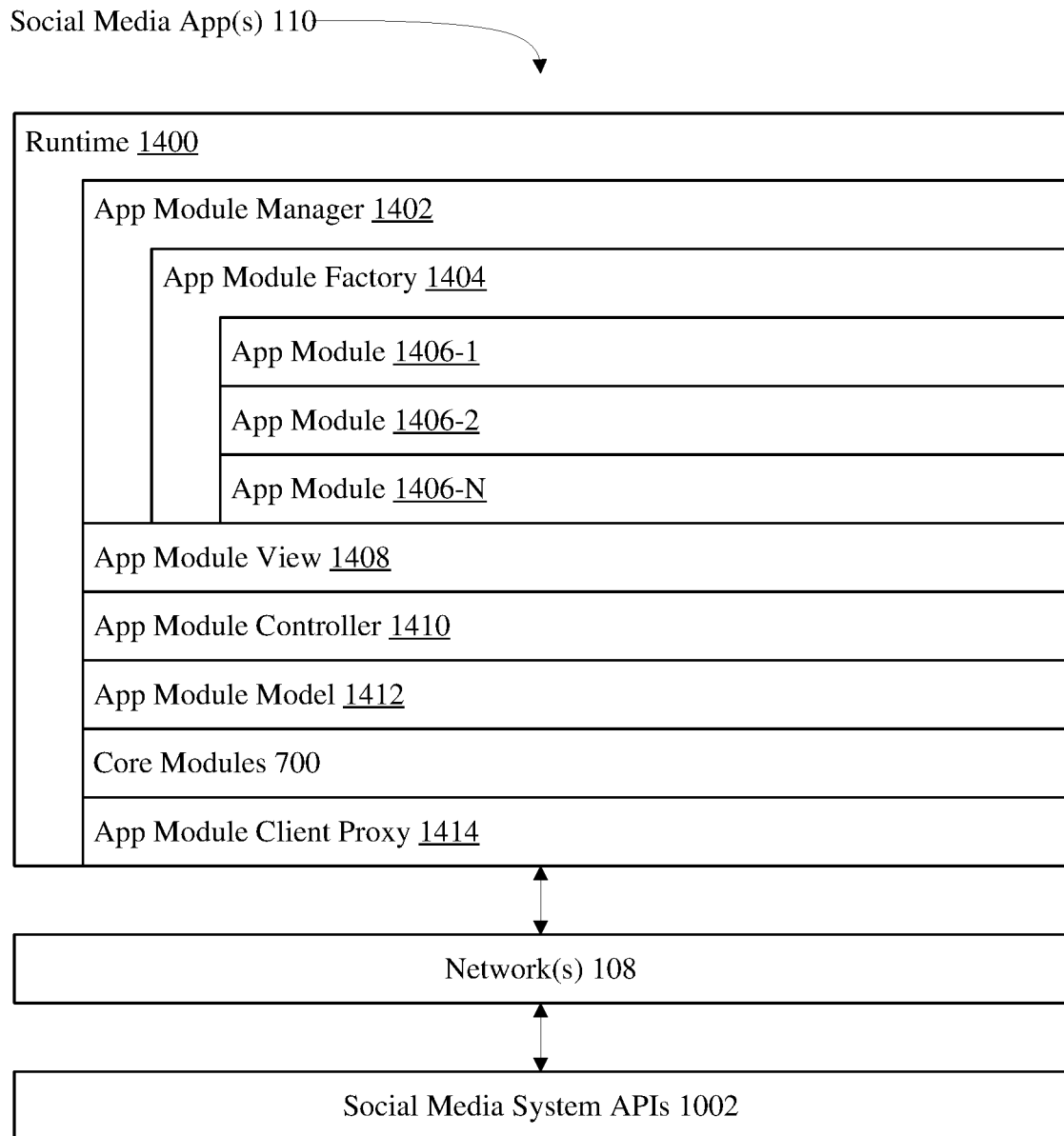
FIG. 14 is a block diagram which illustrates one possible Social Media App(s).

FIG. 14 is a block diagram which illustrates one possible Social Media App(s) 110 for User 104 in FIG. 1 who is Business 404 in FIG. 4. In this embodiment of the invention, Social Media App(s) 110 utilizes Runtime 1400 such as the Java virtual machine (JVM) or .Net Framework Common Language Runtime (CLR). Runtime 1400 is comprised of App Module Manager 1402 which has App Module Factory 1404 which can create N number of app modules (one, more, or all) represented in this case by App Module 1406-1, App Module 1406-2, and App Module 1406-N. App Module Manager 1402 via App Module Factory 1404 can create and run one or more or all of App Modules 1300 dynamically. Runtime 1400 is also comprised of App Module View 1408, App Module Controller 1410, and App Module Model 1412 (an MVC pattern) as well as the cross-cutting Core Modules 700. App Module Client Proxy 1414 interfaces with Network(s) 108 which in turn integrates with Social Media System APIs 1002 introduced in FIG. 10.

Figure 15:
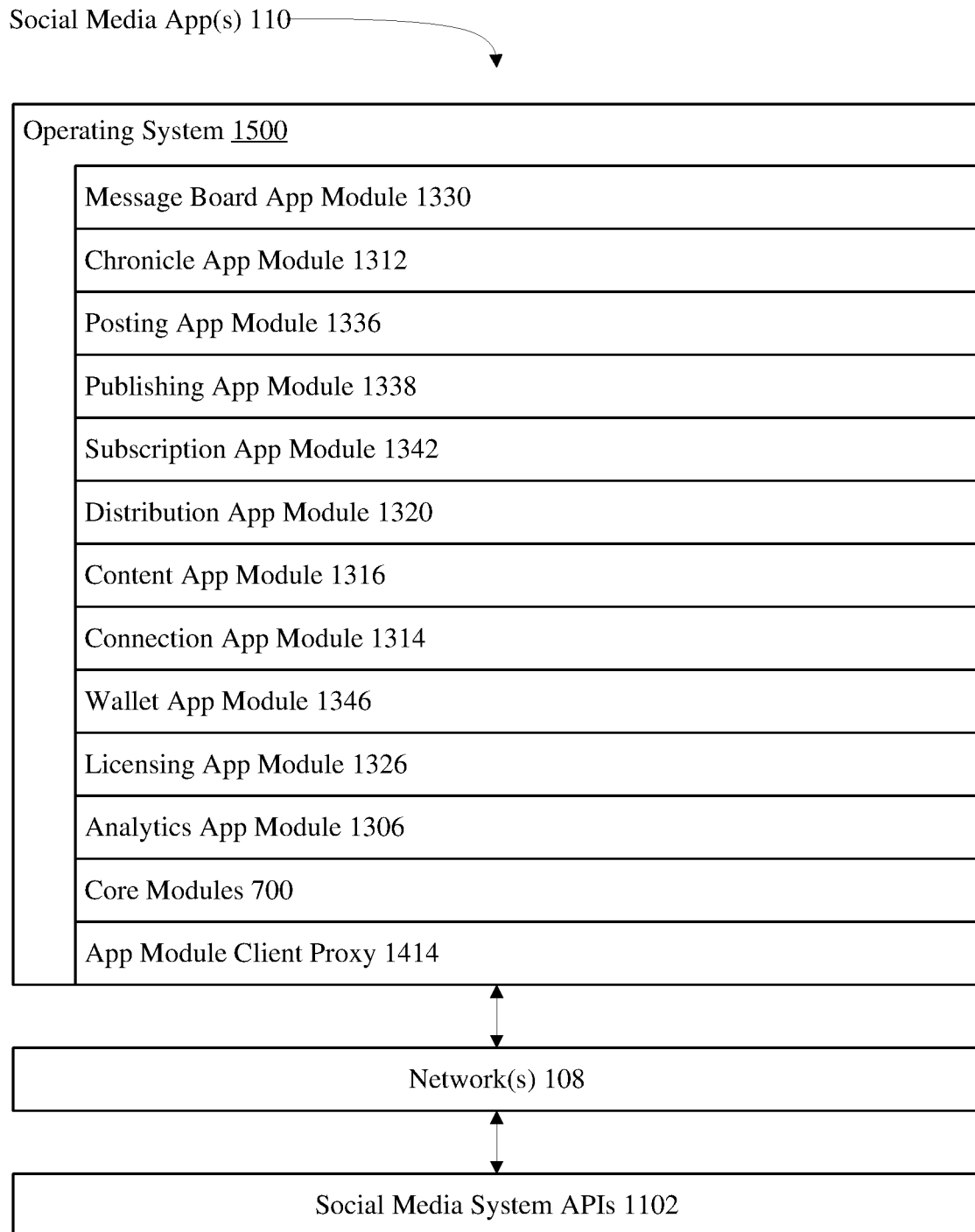
FIG. 15 is a block diagram which illustrates another possible Social Media App(s).

FIG. 15 is a block diagram which illustrates another possible Social Media App(s) 110 for User 104 in FIG. 1 who is Individual 402 in FIG. 4 using an iOS app or Android app. In this embodiment of the invention, Social Media App(s) 110 includes Operating System 1500 which is the basis for all these app modules that get compiled and distributed through an app store. Operating System 1500 is comprised of Message Board App Module 1330, Chronicle App Module 1312, Posting App Module 1336, Publishing App Module 1338, Subscription App Module 1342, Distribution App Module 1320, Content App Module 1316, Connection App Module 1314, Wallet App Module 1346, Licensing App Module 1326, and Analytics App Module 1306, Core Modules 700 and App Module Client Proxy 1414. App Module Client Proxy 1414 interfaces with Network(s) 108 and enables the cross-cutting Core Modules 700 to get to Social Media System APIs 1102 introduced in FIG. 11.

Figure 16:
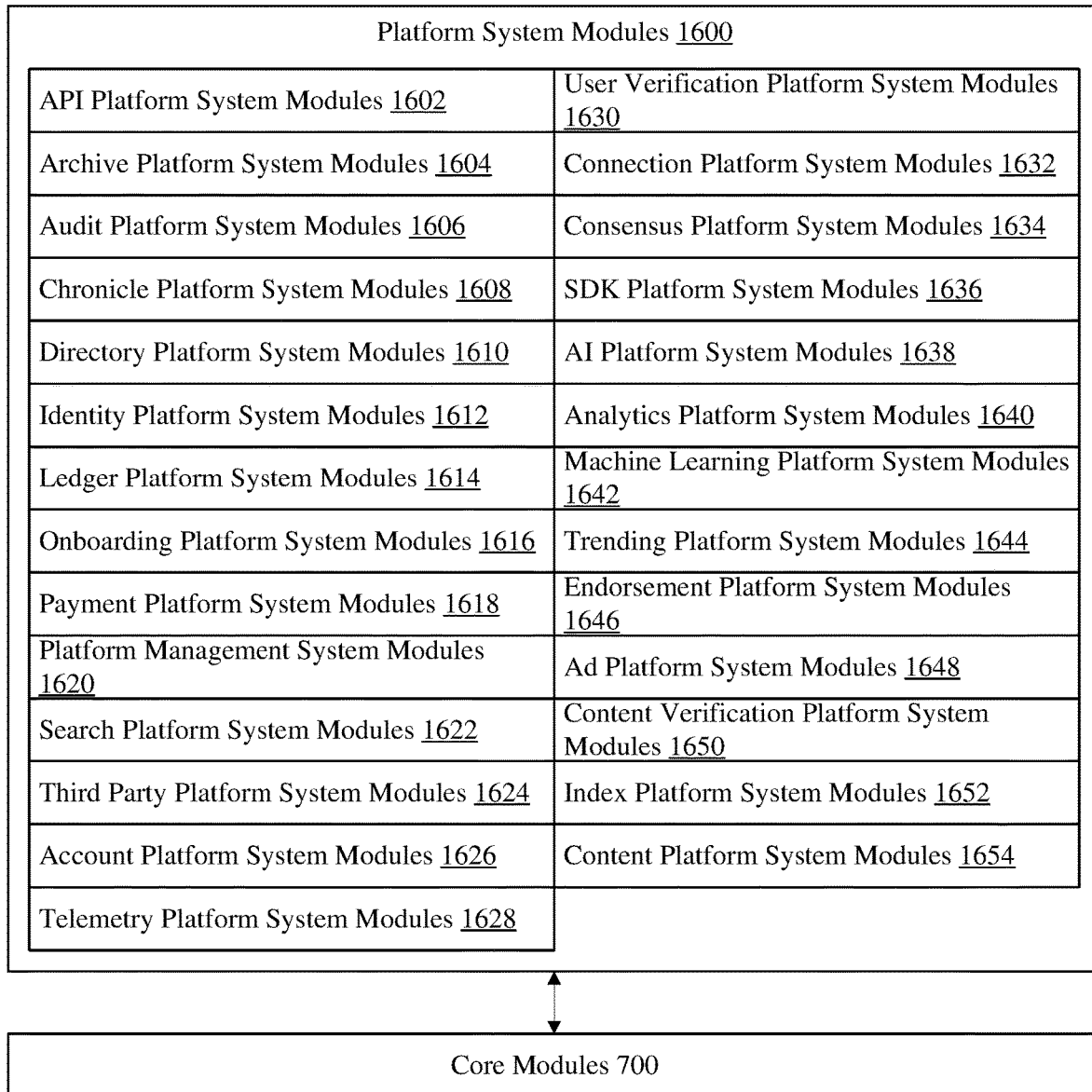
FIG. 16 is a block diagram of Platform System Modules.

FIG. 16 is a block diagram of Platform System Modules 1600, which is comprised of API Platform System Modules 1602, Archive Platform System Modules 1604, Audit Platform System Modules 1606, Chronicle Platform System Modules 1608, Directory Platform System Modules 1610, Identity Platform System Modules 1612, Ledger Platform System Modules 1614, Onboarding Platform System Modules 1616, Payment Platform System Modules 1618, Platform Management System Modules 1620, Search Platform System Modules 1622, Third Party Platform System Modules 1624, Account Platform System Modules 1626, Telemetry Platform System Modules 1628, User Verification Platform System Modules 1630, Connection Platform System Modules 1632, Consensus Platform System Modules 1634, SDK Platform System Modules 1636, AI Platform System Modules 1638, Analytics Platform System Modules 1640, Machine Learning Platform System Modules 1642, Trending Platform System Modules 1644, Endorsement Platform System Modules 1646, Ad Platform System Modules 1648, Content Verification Platform System Modules 1650, Index Platform System Modules 1652, and Content Platform System Modules 1654. Platform System Modules 1600 interfaces with Core Modules 700 which provides all the cross-cutting functionality for Platform System Modules 1600.

Each of these platform system modules represents the high-level cross-cutting programming and configuration needed to manage all of the corresponding services of Platform System 102 in FIG. 1. They can work alone or be combined. They are combined by either compilation or as separate systems by networks or by sitting in the same operating system and communicating via API or SDK. Many of these platform system modules are platform specific implementations of System Modules 800 in FIG. 8, thereby adding platform specific functionality for the platform as opposed to system modules that provide functionality scoped specifically for Social Media System 106 in FIG. 1. These platform system modules are designed primarily for the server side, however could also be used to extend the functionality of App Modules 1300 in FIG. 13 on the client side as part of an N-tiered architecture.

API Platform System Modules 1602 manages API features and functionality across the entire platform. Archive Platform System Modules 1604 manages archive features and functionality across the entire platform. Audit Platform System Modules 1606 manages audit features and functionality across the entire platform. Chronicle Platform System Modules 1608 manages chronicle features and functionality across the entire platform. Directory Platform System Modules 1610 manage directory features and functionality across the entire platform. Identity Platform System Modules 1612 manage identity features and functionality across the entire platform. Ledger Platform System Modules 1614 manage ledger features and functionality across the entire platform. Onboarding Platform System Modules 1616 manages onboarding features and functionality across the entire platform. Payment Platform System Modules 1618 manages payment features and functionality across the entire platform. Platform Management System Modules 1620 represents the main set of system modules that manages and integrates with all other platform system modules on the platform. Search Platform System Modules 1622 manages search features and functionality across the entire platform. Third Party Platform System Modules 1624 manages third-party features and functionality across the entire platform. Account Platform System Modules 1626 manages account features and functionality across the entire platform.

Telemetry Platform System Modules 1628 manages telemetry features and functionality across the entire platform. User Verification Platform System Modules 1630 manages user verification features and functionality across the entire platform. Connection Platform System Modules 1632 manages connection features and functionality across the entire platform. Consensus Platform System Modules 1634 manages consensus features and functionality across the entire platform. SDK Platform System Modules 1636 manages the software development kits used to provide any additional features and functionality across the entire platform. AI Platform System Modules 1638 manages AI features and functionality across the entire platform. Analytics Platform System Modules 1640 manages analytics features and functionality across the entire platform. Machine Learning Platform System Modules 1642 manages machine learning features and functionality across the entire platform. Trending System Modules 1644 manages trending features and functionality across the entire platform. Endorsement Platform System Modules 1646 manages endorsement features and functionality across the entire platform. Ad Platform System Modules 1648 manages ad features and functionality across the entire platform. Content Verification Platform System Modules 1650 manages content verification features and functionality across the entire platform. Index Platform System Modules 1652 manages index features and functionality across the entire platform. Content Platform System Modules 1654 manages content features and functionality across the entire platform.

Note that third parties who offer Software as a Service (SaaS) could provide functionality across the entire platform via Third Party Platform System Modules 1624, or just on Social Media System 106 in FIG. 1 via Third Party System Modules 844 in FIG. 8, or just on Social Media App(s) 110 in FIG. 1 via Third Party App Modules 1344 in FIG. 13. The same can be said for software development kits (SDKs) which could be used to extend platform functionality via SDK Platform System Modules 1636, system functionality via SDK System Modules 860 in FIG. 8, or application functionality via SDK App Module 1360 in FIG. 13.

Figure 17:
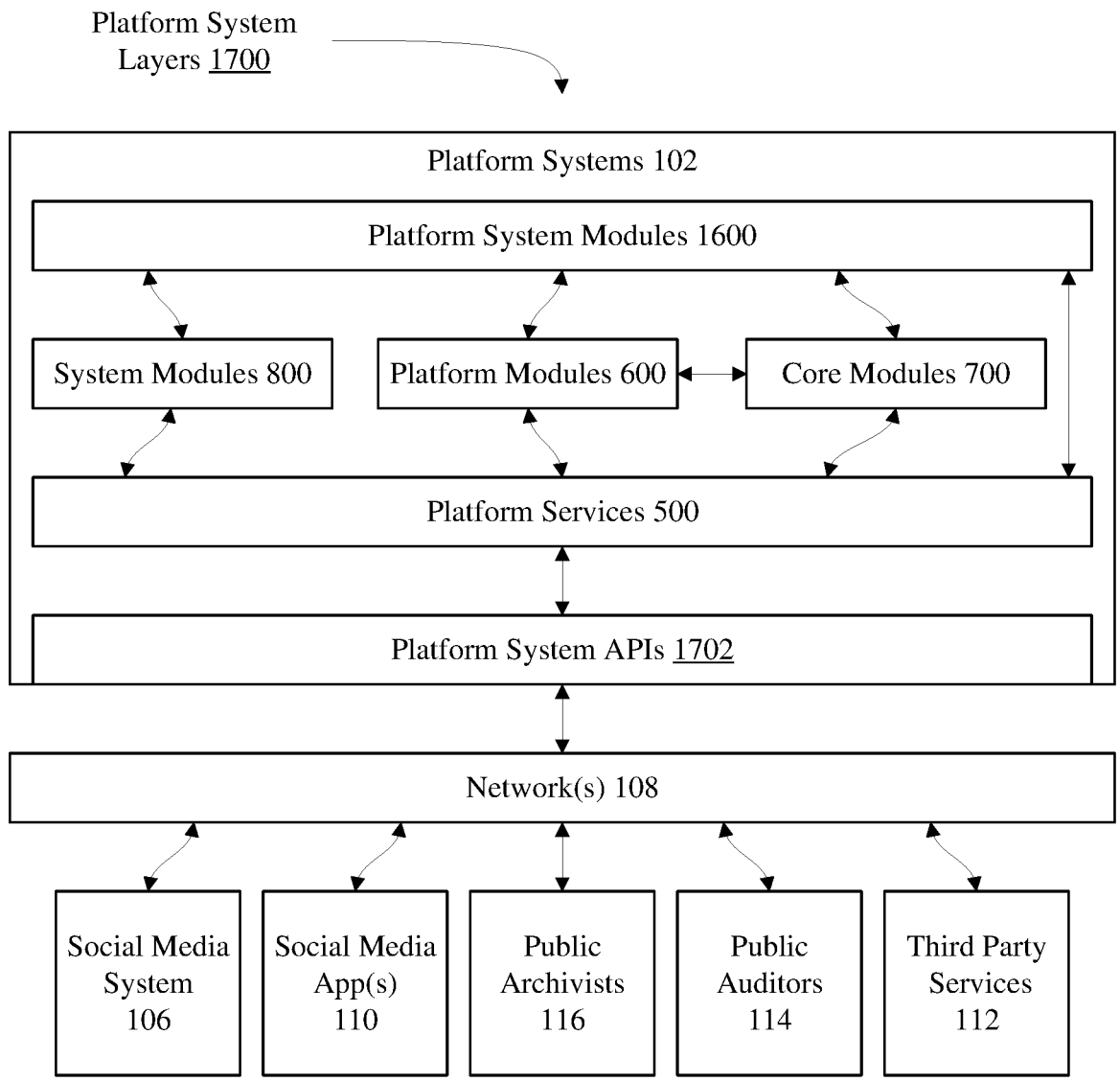
FIG. 17 is a block diagram of Platform System Layers.

FIG. 17 is a block diagram of Platform System Layers 1700 which is comprised of Platform Systems 102 which is integrated with Platform System Modules 1600. Platform System Modules 1600 is integrated with System Modules 800, Platform Modules 600, Core Modules 700, and Platform Services 500. System Modules 800 is integrated with Platform Services 500. Platform Modules 600 is integrated with Core Modules 700 and Platform Services 500. Core Modules 700 is integrated with Platform Modules 600 and Platform Services 500. Platform Services 500 is integrated with the Network(s) 108 via Platform System APIs 1702, which are the sum composite of all the application programming interfaces that are exposed by the Platform Systems 102. Platform Systems 102 interfaces with Social Media Systems 106, Social Media App(s) 110, Public Archivists 116, Public Auditors 114, and Third Party Services 112 across Network(s) 108. This diagram illustrates the constituent foundational layering of Platform Systems 102 that is derived vis-a-vis Platform System Modules 1600 in their relationship with System Modules 800, Platform Modules 600, Core Modules 700, and Platform Services 500 and as well as the interaction across Network(s) 108 with Social Media System 106, Social Media App(s) 110, Public Archivists 116, Public Auditors 114, and Third Party Services 112. In short, one sees the N-tiered architecture from the point of view of Platform System Modules 1600 in FIG. 16.

Figure 18:
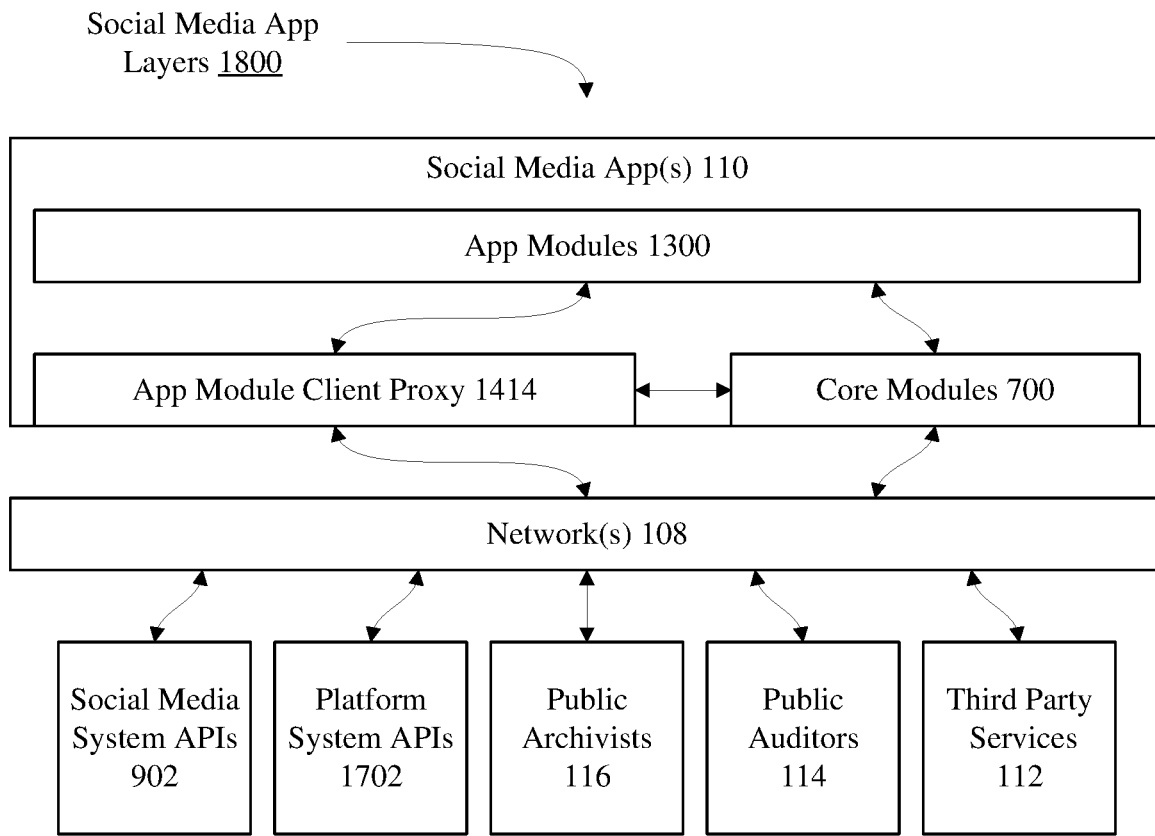
FIG. 18 is a block diagram of Social Media App Layers.

FIG. 18 is a block diagram of Social Media App Layers 1800 which is comprised of Social Media App(s) 110 which is integrated with App Modules 1300. App Modules 1300 is integrated with App Module Client Proxy 1414 and Core Modules 700. App Modules Client Proxy 1414 is integrated with Core Modules 700 and Network(s) 108. Core Modules is integrated with App Module Client Proxy 1414 and Network(s) 108. Social Media App(s) 110 interfaces with Social Media System APIs 902, Platform System APIs 1702, Public Archivists 116, Public Auditors 114, and Third Party Services 112 across Network(s) 108. This diagram illustrates the constituent foundational layering of Social Media App(s) 110 that is derived vis-a-vis App Modules 1300 in their relationship with App Module Client Proxy 1414 and Core Modules 700 as well as the interaction across Network(s) 108 with Social Media System APIs 902, Platform System APIs 1702, Public Archivists 116, Public Auditors 114, and Third Party Services 112. In short, this diagram illustrates the N-tiered architecture from the point of view of App Modules 1300 in FIG. 13.

Figure 19:
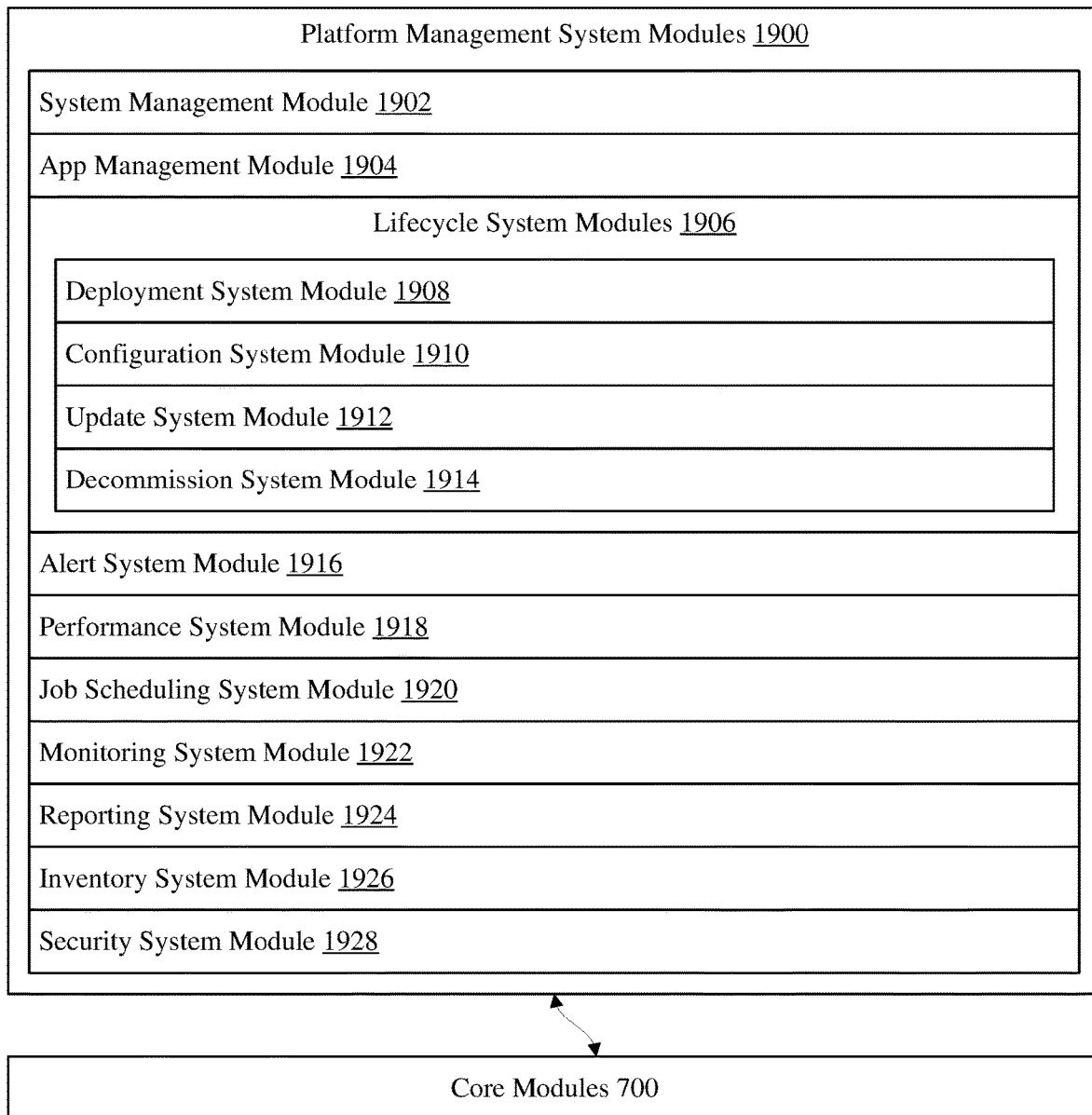
FIG. 19 is a block diagram of Platform Management System Modules.

FIG. 19 is a block diagram of Platform Management System Modules 1900 which is comprised of System Management Module 1902, App Management Module 1904, Lifecycle System Modules 1906, Alert System Module 1916, Performance System Module 1918, Job Scheduling System Module 1920, Monitoring System Module 1922, Reporting System Module 1924, Inventory System Module 1926, and Security System Module 1928. Lifecycle System Modules 1906 consists of Deployment System Module 1908, Configuration System Module 1910, Update System Module 1912, and Decommission System Module 1914. Platform Management System Modules 1900 interacts with Core Modules 700 which provides all the cross-cutting functionality for Platform Management System Modules 1900. This diagram illustrates the functionality required for managing all Platform System Modules 1600 in FIG. 16, all System Modules 800 in FIG. 8, and all App Modules 1300 in FIG. 13. Platform Management System Modules 1900 provides the cross-cutting services, such as alerts, performance, job scheduling, monitoring, security and lifecycle management, that one would expect in any complex N-tiered architecture across all layers. This functionality is critical given that the platform will ultimately support a multitude of users, systems, and apps across Distributed Social Media Network 300 in FIG. 3.

FIG. 20 is a block diagram of Chronicle Record 2000 which is comprised of Record Header 2002. Record Headers 2002 consists of Id 2004, Version 2006, Timestamp 2008, Previous Record Hash 2010, Record Nonce 2012, Record Hash 2014, Record Header Graph 2016, and Record Signature 2018. Chronicle Record 2000 is further comprised of a number of additional graphs, all of which descend from Base Graph 2050. Base Graph 2050 consists of Base Graph Schema 2052, Base Graph Schema Version 2054, Base Graph Hash 2056, Base Graph Signature 2058, Base Graph Estimated Work 2060, and Base Graph Actual Work 2062 as well as Graph Collection 2070 which consists of Node(s) 2072 and Edge(s) 2074.

Source Graph 2020, Contracts Graph 2022, Content Graph 2024, Workflow Graph 2026, Index Graph 2028, State Graph 2030, Audit Graph 2032, Directory Graph 2034, Conference Graph 2036, and Other Graph 2038 all inherit the properties and graph collection of Base Graph 2050.

Source Graph 2020 documents any individuals or entities associated with Chronicle Record 2000. Contracts Graph 2022 contains smart contracts data associated with Chronicle Record 2000. Content Graph 2024 contains the content for Chronicle Record 2000 as well as individuals, entities or other data associated with the content. Workflow Graph 2026 contains the workflow data associated with Chronicle Record 2000. Index Graph 2028 contains data used for indexing Chronicle Record 2000. State Graph 2030 contains state information about Chronicle Record 2000. Audit Graph 2032 contains data pertaining to auditing Chronicle Record 2000. Directory Graph 2034 contains directory data associated with Chronicle Record 2000. Conference Graph 2036 contains conference data associated with Chronicle Record 2000. Other Graph 2038 contains any other data associated with Chronicle Record 2000.

These graphs may contain programming logic in addition to the data. In one embodiment of the invention, the data and programming logic is encrypted. In another embodiment of the invention, the data and programming logic is not encrypted. These graphs may be used in conjunction with one another and by other workflows outside of Chronicle Record 2000. In one embodiment of the invention, Record Signature 2018 and Base Graph Signature 2058 are required. In another embodiment of the invention, these signatures are not required for Record Header 2002 and Base Graph 2050. Also note that Node(s) 2072 and Edge(s) 2074 can be a part of multiple schemas.

Hash Algorithms 2080 are used to determine hashes for Chronicle Record 2000 as well as Previous Record Hash 2010, Record Hash 2014, and Base Graph Hash 2056 for each graph included in the record. Merkle Tree 2082 is used for Previous Record Hash 2010 and Record Hash 2014. The data included in the Merkle tree includes all the base graph hashes and is used in combination with the header fields to determine the Merkle root. Base Graph Hash 2056 for all graphs in Chronicle Record 2000 uses either Object Graph Hash Algorithm 2084 or Graph Schema Hash Algorithm 2086. Object Graph Hash Algorithm 2084 dynamically analyzes nodes and edges in the object data base, sorts them alphanumerically, and generates a schema which is then used to calculate a root hash. Graph Schema Hash Algorithm 2086 uses the predetermined Base Graph Schema 2052 for each graph to determine the hashes.

In sum, Chronicle Record 2000 is a unique collection of data and programming which provides complete traceability and visibility into what's in the record, how it came to be, every individual or entity that touches it, and every change that is made to it.

Figure 21:
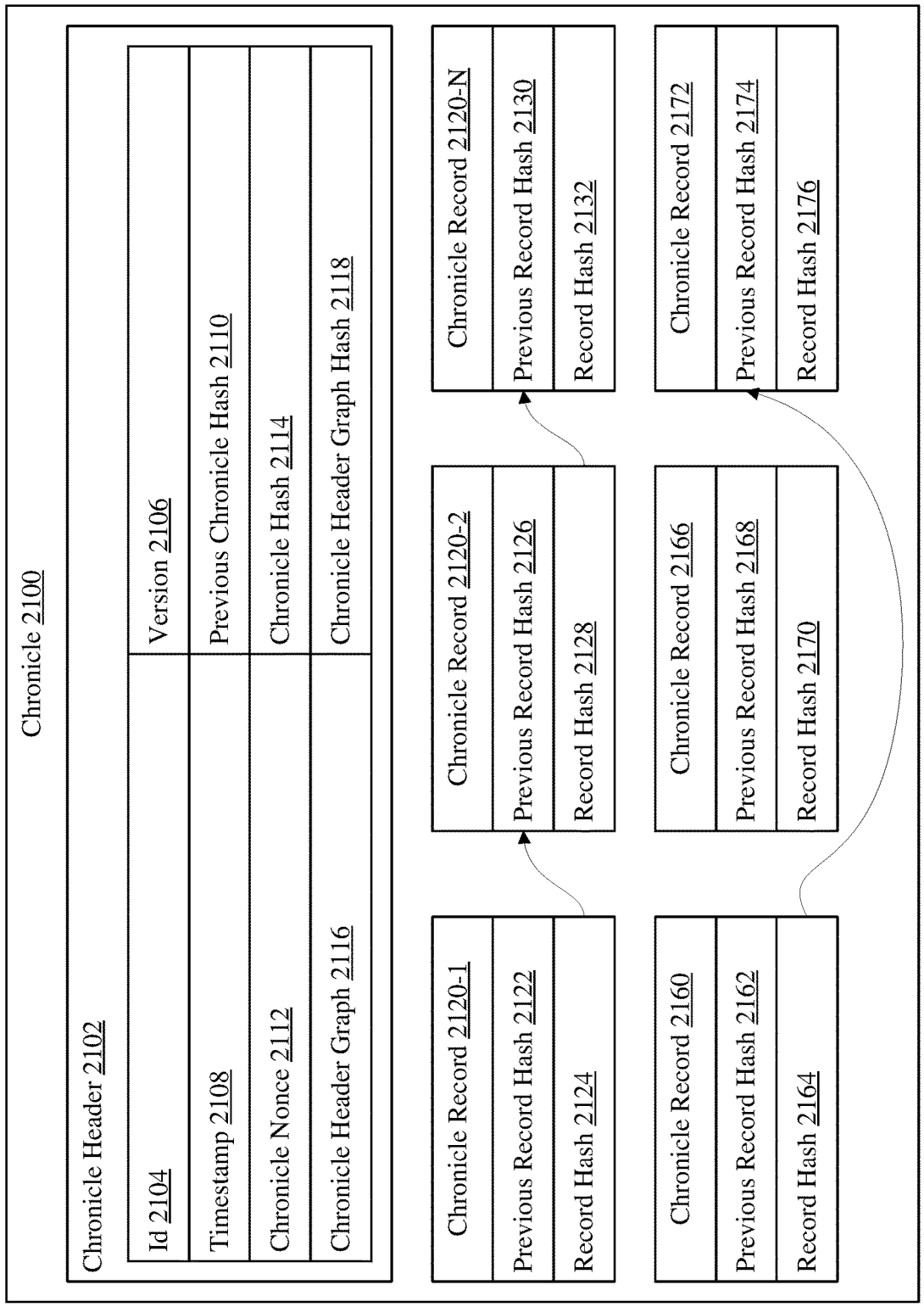
FIG. 21 is a block diagram of a Chronicle.

FIG. 21 is a block diagram of Chronicle 2100 which is comprised of Chronicle Header 2102 as well as chains of chronicles records. Chronicle Header 2102 consists of Id 2104, Version 2106, Timestamp 2108, Previous Chronicle Hash 2110, Chronicle Nonce 2112, Chronicle Hash 2114, Chronicle Header Graph 2116, and Chronicle Header Graph Hash 2118. Chronicle Header 2102 is analogous to a blockchain header, but different because it contains Chronicle Header Graph 2116 and Chronicle Header Graph Hash 2118 which provides complete traceability and visibility into what happened to the data (and how it came to be) on its way to becoming immutable. The other distinguishing aspect of Chronicle Header 2101 is that Chronicle Hash 2114 is derived from different data being hashed.

The chaining of chronicle records in Chronicle 2100 is represented by Chronicle Record 2120-1 with Previous Record Hash 2122 and Record Hash 2124 linked to Chronicle Record 2120-2 with Previous Record Hash 2126 and Record Hash 2128 linked to Chronicle Record 2120-N with Previous Record Hash 2130 and Record Hash 2132. This chain is analogous to a blockchain, but different in two ways. First, it comprises a set of data for a specific 24-hour time period. It is not a never-ending chain of blocks. Second, each block contains exactly one Chronicle Record 2000 from FIG. 20. It is not a block of multiple transactions.

Each Chronicle Record 2000 is also chained via a directional acyclic graph. The chaining of Chronicle Record 2160 with Previous Record Hash 2162 and Record Hash 2164, Chronicle Record 2166 with Previous Record Hash 2168 and Record Hash 2170, and Chronicle Record 2172 with Previous Record Hash 2174 and Record Hash 2176 is designed specifically with state changes in mind. This directional acyclic graph chain enables Chronicle 2100 to record state changes of chronicle records and provide quick access to a complete history of all changes to a Chronicle Record 2000 in FIG. 20.

Chronicle 2100 as a construct is highly scalable and allows for parallelism across the platform. Every Social Media System 106 in FIG. 1 has its own Chronicle 2100, and all chronicles are being worked on simultaneously. Every 24 hours, the platform is designed to generate a new genesis block and start a new Chronicle 2100 for that day. Every Social Media System 106 does the same thing with its primary Chronicle 2100. Social Media System 106 may or may not have a Chronicle 2100 for every other Social Media System 106. Social Media System 106 and Platform System 102 in FIG. 1 may choose to aggregate chronicles. Chronicles are made available to Public Auditors 114, Public Archivists 116 and Third Parties 112 within Distributed Social Media Network 300 in FIG. 3.

This construct also greatly reduces the surface area for attacks. If something bad happens to Social Media System 106 in FIG. 1, such as a catastrophic event, hack, or denial of service attack, it does not impact the whole system or all chronicles. Additionally, there is inherent sharding in this approach, solving the problem of large scale data across a really complex ecosystem and its ability to be quickly saved, retrieved and updated. With a multitude of separate chronicles, created every 24 hours, one only needs a point in time and source to get to a much smaller data set very quickly. Sharding also alleviates the problem of hotspots. If there is a lot of activity on a centralized social media network (e.g. something is trending), it creates a hot spot in the monolithic social media system which consumes lots of resources and requires triage. Various embodiments of the present technology address hot spots because data is massively distributed with multiple chronicles stored across Distributed Social Media Network 300 in FIG. 3. If something starts trending for a specific Social Media System 106 in FIG. 1, the social media system is already set up for handling increased demand at any moment because 1) it is geo-redundant, 2) Platform Management System 218 in FIG. 2 will auto-scale to meet demand, and 3) much of the Chronicle 2100 associated with that social media system can actually be cached for the day.

In sum, Chronicle 2100 is a system of record that stores chronicle records in chronological order with specific details. In one embodiment of the invention, Chronicle 2100 stores data or URIs as part of its system. In another embodiment of the invention, Chronicle 2100 stores data in traditional data storage like SQL, NoSQL, files, object databases, document databases, etc. By using the foundational technologies of hashes, Merkle trees and blockchain, whether it is straight chaining or done inside of a directional acyclic graph, Chronicle 2100 brings integrity back to social media networking with full, complete, and accurate data and information sharing that is highly scalable, searchable, and secure.

Figure 22:
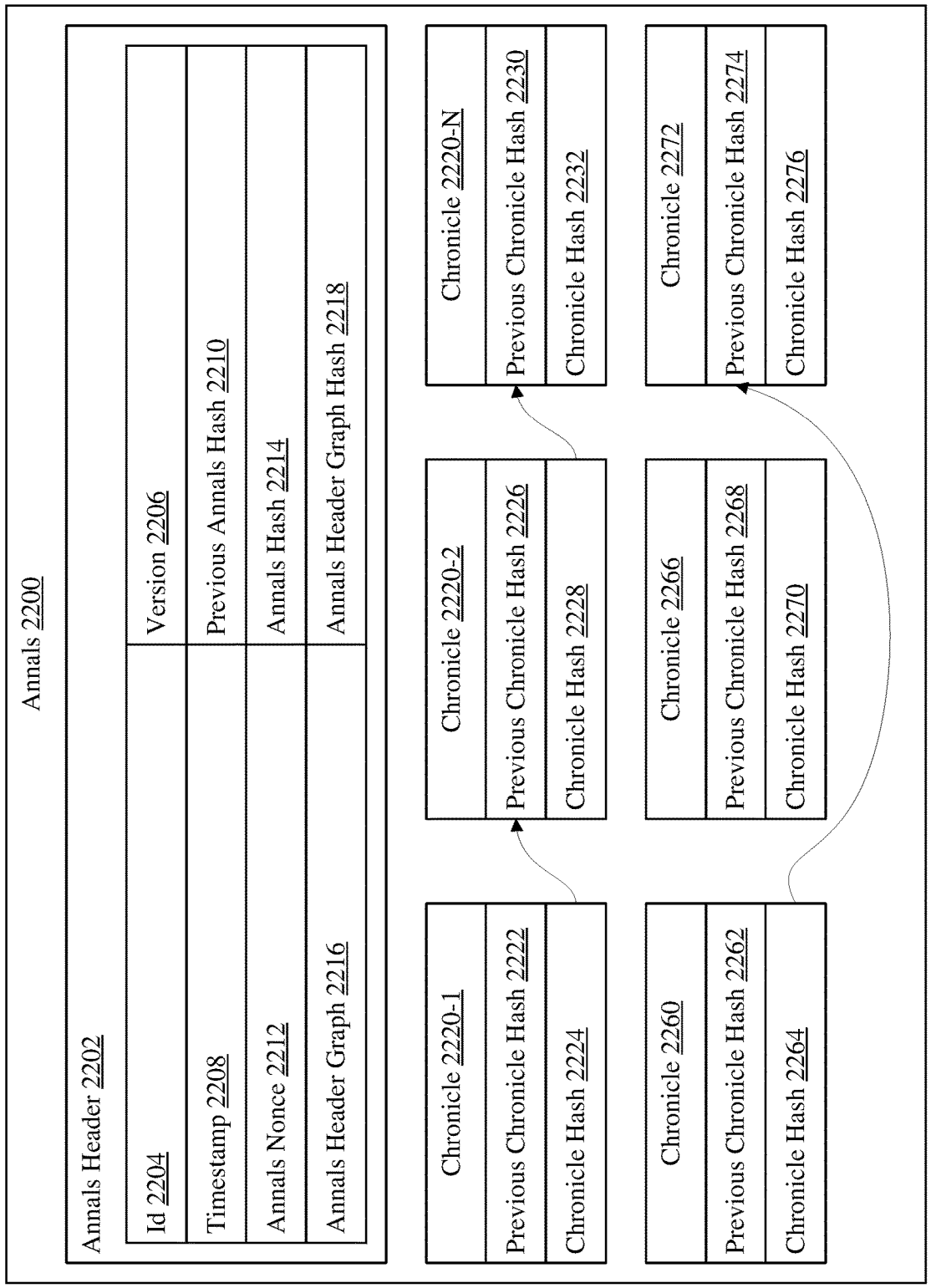
FIG. 22 is a block diagram of Annals.

FIG. 22 is a block diagram of Annals 2200 which is comprised of Annals Header 2202 as well as chains of chronicles. Annals Headers 2202 consists of Id 2204, Version 2206, Timestamp 2208, Previous Annals Hash 2210, Annals Nonce 2212, Annals Hash 2214, Annals Header Graph 2216, and Annals Header Graph Hash 2218.

The chaining of chronicles in Annals 2200 into a blockchain is represented by Chronicle 2220-1 with Previous Chronicle Hash 2222 and Chronicle Hash 2224 linked to Chronicle 2220-2 with Previous Chronicle Hash 2226 and Chronicle Hash 2228 linked to Chronicle 2220-N with Previous Chronicle Hash 2230 and Chronicle Hash 2232. Additionally, Annals 2200 includes the chaining of Chronicle 2260 with Previous Chronicle Hash 2262 and Chronicle Hash 2264 to Chronicle 2266 with Previous Chronicle Hash 2268 and Chronicle Hash 2270 to Chronicle 2272 with Previous Chronicle Hash 2274 and Chronicle Hash 2276 via a directional acyclic graph to record state changes.

This diagram illustrates that chronicles can be aggregated into Annals 2200, which is a record of events for a whole year. Annals 2200 has basically the same composition as Chronicle 2100 in FIG. 21, but chronicles are now being chained instead of chronicle records. As data moves from hot storage in the form of Chronicle 2100 per day(s), it is placed in cold storage in the form of Annals 2200. This makes searching, organizing, and locating records and state changes very easy, again reinforcing the traceability and visibility of data as well as the transparency of activity on Distributed Social Media Network 300 in FIG. 3.

Figure 23:
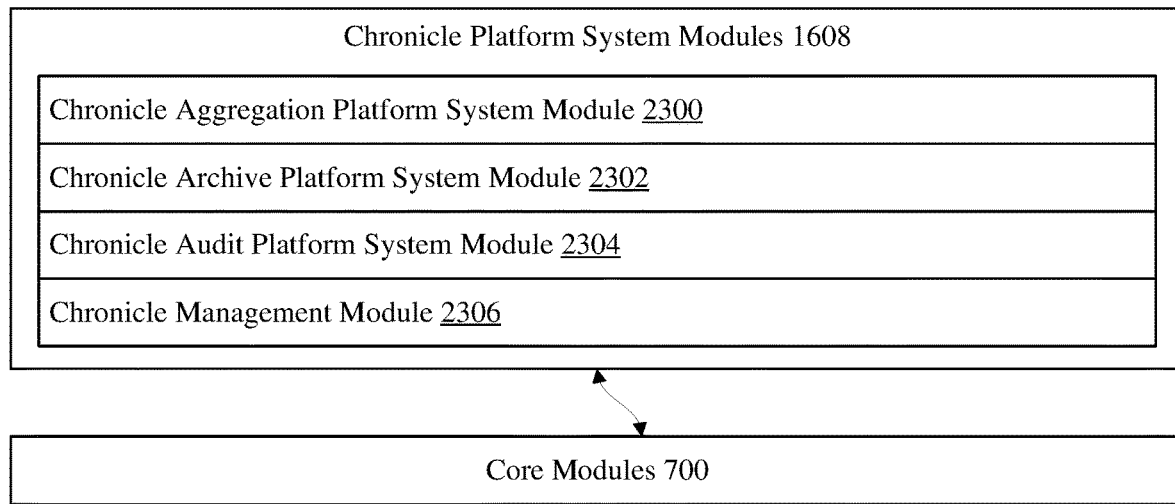
FIG. 23 is a block diagram of Chronicle Platform System Modules.

FIG. 23 is a block diagram of Chronicle Platform System Modules 1608 which is comprised of Chronicle Aggregation Platform System Module 2300, Chronicle Archive Platform System Module 2302, Chronicle Audit Platform System Module 2304, and Chronicle Management Module 2306. Chronicle Platform System Modules 1608 interacts with Core Modules 700 which provides all the cross-cutting functionality for Chronicle Platform System Modules 1608. These modules represent the different functional sets that make up the Chronicle Platform System Modules 1608 which work across the entire platform. The platform uses one, many or all of these modules to work with Chronicle 2100 in FIG. 21. Chronicle Aggregation Platform System Module 2300 manages the functionality required for aggregating chronicles and creating annals. Chronicle Archive Platform System Module 2302 manages the functionality required for facilitating archiving as a service with third parties or actually archiving chronicles outside the platform with entities such as the Library of Congress. Chronicle Audit Platform System Module 2304 manages the functionality required to facilitate auditing in the public domain. Chronicle Management Module 2306 manages a general set of functions required for managing chronicles on the platform.

Figure 24:
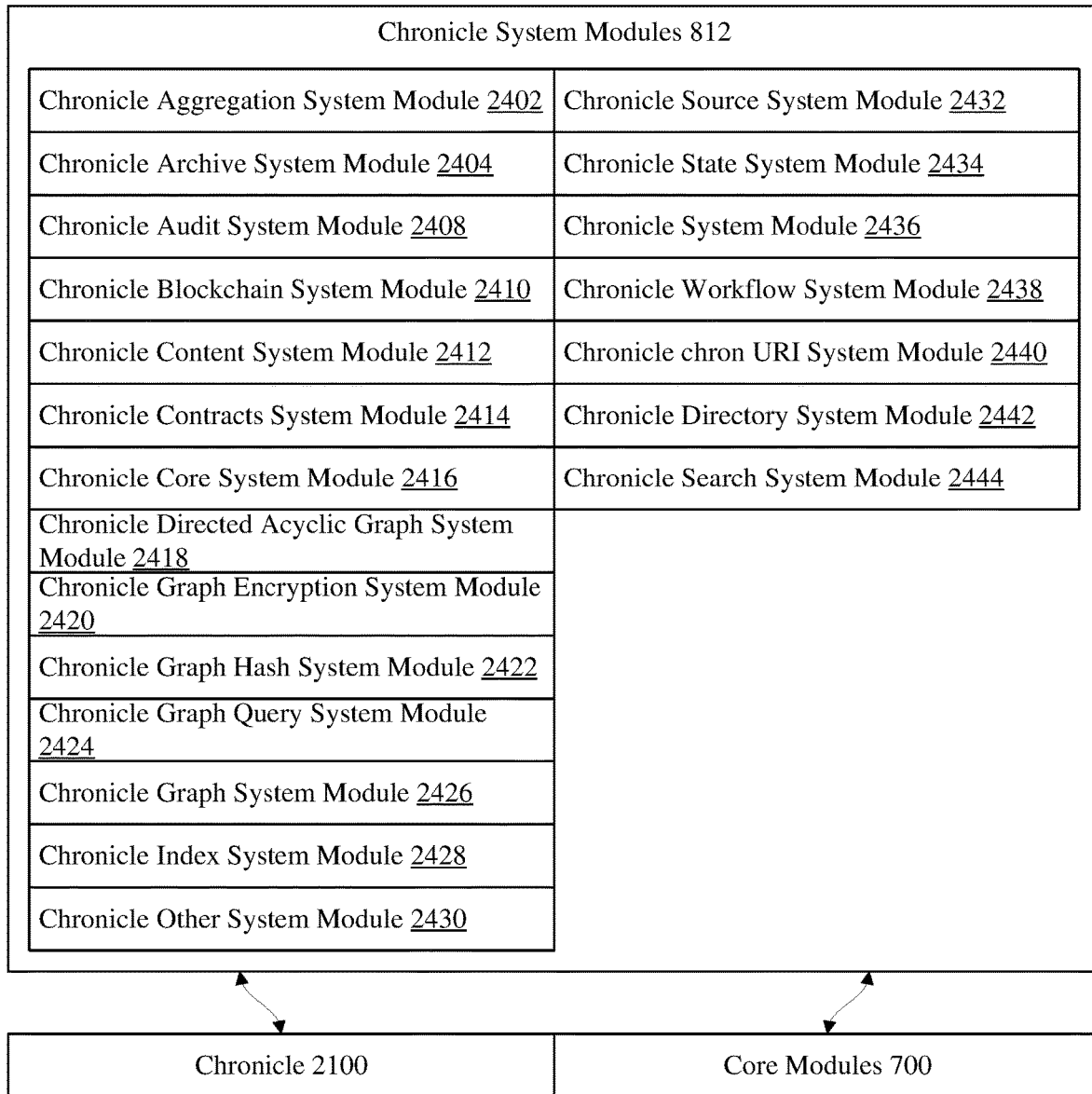
FIG. 24 is a block diagram of Chronicle System Modules.

FIG. 24 is a block diagram of Chronicle System Modules 812 which is comprised of Chronicle Aggregation System Module 2402, Chronicle Archive System Module 2404, Chronicle Audit System Module 2408, Chronicle Blockchain System Module 2410, Chronicle Content System Module 2412, Chronicle Contracts System Module 2414, Chronicle Core System Module 2416, Chronicle Directed Acyclic Graph System Module 2418, Chronicle Graph Encryption System Module 2420, Chronicle Graph Hash System Module 2422, Chronicle Graph Query System Module 2424, Chronicle Graph System Module 2426, Chronicle Index System Module 2428, Chronicle Other System Module 2430, Chronicle Source System Module 2432, Chronicle State System Module 2434, Chronicle System Module 2436, Chronicle Workflow System Module 2438, Chronicle chron URI System Module 2440, Chronicle Directory System Module 2442, and Chronicle Search System Module 2444. Chronicle System Modules 812 interfaces with Chronicle 2100 as well as Core Modules 700 which provides all the cross-cutting functionality for Chronicle System Modules 812. These modules represent the different functional sets that make up Chronicle System Modules 812 that serve Social Media System 106 in FIG. 1. Every Social Media System 106 uses one, many or all of these system modules to work with their local chronicle(s) represented by Chronicle 2100 in FIG. 21.

Chronicle Aggregation System Module 2402 manages the aggregation features and functionality required for chronicles. Chronicle Archive System Module 2404 manages the archive features and functionality required for chronicles. Chronicle Audit System Module 2408 manages the audit features and functionality required for chronicles. Chronicle Blockchain System Module 2410 manages the blockchain features and functionality required for chronicles. Chronicle Content System Module 2412 manages the content features and functionality required for chronicles. Chronicle Contracts System Module 2414 manages the contracts features and functionality required for chronicles. Chronicle Core System Module 2416 manages the core features and functionality required for chronicles. Chronicle Directed Acyclic Graph System Module 2418 manages the directed acyclic graph features and functionality required for chronicles. Chronicle Graph Encryption System Module 2420 manages the graph encryption features and functionality required for chronicles. Chronicle Graph Hash System Module 2422 manages the graph hash features and functionality required for chronicles. Chronicle Graph Query System Module 2424 manages the graph query features and functionality required for chronicles. Chronicle Graph System Module 2426 manages the graph features and functionality required for chronicles. Chronicle Index System Module 2428 manages the indexing features and functionality required for chronicles. Chronicle Other System Module 2430 manages other features and functionality required for chronicles. Chronicle Source System Module 2432 manages source features and functionality required for chronicles, Chronicle State System Module 2434 manages state features and functionality required for chronicles. Chronicle System Module 2436 is the top-level module that contains all the functionality required for managing all chronicle system modules. Chronicle Workflow System Module 2438 manages the workflow features and functionality required for chronicles. Chronicle chron URI System Module 2440 manages the chron URI features and functionality required for chronicles. Chronicle Directory System Module 2442 manages the directory features and functionality required for chronicles. Chronicle Search System Module 2444 manages the search features and functionality required for chronicles.

FIG. 25 is a block diagram of Chronicle Record 2000 which is comprised of Directory Graph 2034. Directory Graph 2034, which descends from Base Graph 2050 in FIG. 20, consists of Directory Graph Schema 2502, Directory Graph Schema Version 2504, Directory Graph Hash 2506, and Directory Graph Signature 2507. Directory Graph 2034 also consists of Directory Graph Collection 2508 which contains Node(s) 2510 and Edge(s) 2540. Node(s) 2510 consists of Person 2512, Location 2514, Profile 2516, Reputation 2518, and Group 2520. Edge(s) 2540 consists of Lives At 2542, Related To 2544 and Member Of 2546. Person 2512 may contain the properties Full Name 2560, Claimed Timestamp 2562, Verified Timestamp 2564, and Public Key 2566; there may be other properties as well. Distributed Social Media Network 300 in FIG. 3 utilizes a directory which is a phone book type listing of each and every User 104 in FIG. 1, namely Individuals 402, Businesses 404, Charities & Non-Profits 412, and Government 424 in FIG. 4. In one embodiment of the invention, User 104's listing could include name, contact details, profile information, reputation, group affiliations, etc. In another embodiment of the invention, User 104 could elect to just have their name listed and additional details unlisted. This diagram illustrates that each directory listing exists in Chronicle Record 2000, making the information easily accessible and searchable as well as any state changes visible and traceable. Unlike existing social media platforms, User 104 in FIG. 1 owns and controls their listing details, not the network. All the functionality needed to work with the directory, which is put into Chronicle 2100 from FIG. 21, is encapsulated by various platform, system and app modules.

Figure 26:
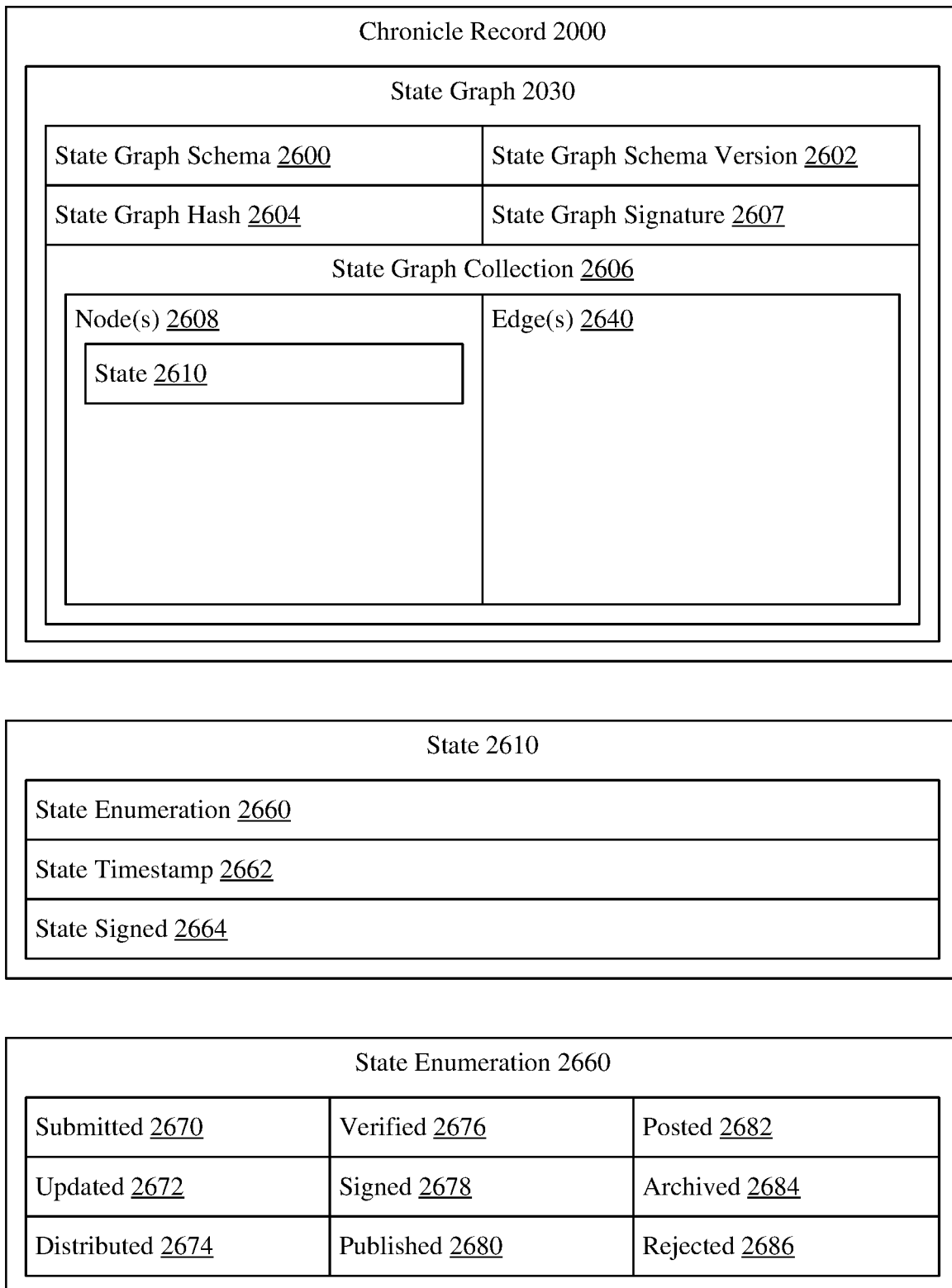
FIG. 26 is a block diagram of a Chronicle Record.

FIG. 26 is a block diagram of Chronicle Record 2000 which is comprised of State Graph 2030. State Graph 2030, which descends from Base Graph 2050 in FIG. 20, consists of State Graph Schema 2600, State Graph Schema Version 2602, State Graph Hash 2604, and State Graph Signature 2607. State Graph 2030 also consists of State Graph Collection 2606 which contains Node(s) 2608 and Edge(s) 2640. Node(s) 2608 consists of State 2610. State 2610 has the properties State Enumeration 2660, State Timestamp 2662, and State Signed 2664. State Graph Signature 2607 is used to do the signing at State Signed 2664. State Enumeration 2660 consists of Submitted 2670, Updated 2672, Distributed 2674, Verified 2676, Signed 2678, Published 2680, Posted 2682, Archived 2684, and Rejected 2686. This diagram provides another example of how the platform is using chronicle records as a construct to manage and run the platform. State Graph 2030 is used everywhere on the platform that state is needed. It tracks the state changes of data, workflows, and transformations and saves them in Chronicle Record 2000. However, State Graph 2030 may or may not be in any given Chronicle Record 2000. Unlike blockchain transactions, chronicle records are dynamic and do not always have the same composition.

Figure 27:
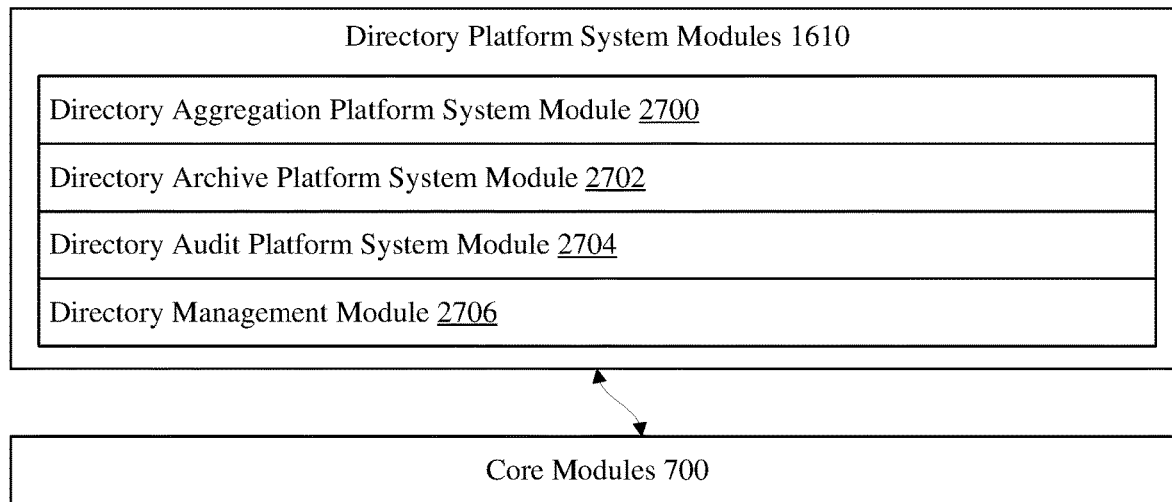
FIG. 27 is a block diagram of Directory Platform System Modules.

FIG. 27 is a block diagram of Directory Platform System Modules 1610 which is comprised of Directory Aggregation Platform System Module 2700, Directory Archive Platform System Module 2702, Directory Audit Platform System Module 2704, and Directory Management Module 2706. Directory Platform System Modules 1610 interacts with Core Modules 700 which provides all the cross-cutting functionality for Directory Platform System Modules 1610. This diagram illustrates the required functionality for working with directories, including aggregation, archiving, auditing, and overall directory management across the platform. Every Social Media System 106 in FIG. 1 has its own directory which contains listings of individuals or entities that User 104 is connected to, either by extending an invitation or accepting an invitation. Directories can also be aggregated across Distributed Social Media Network 300 in FIG. 3, whereby the data may or may not be replicated to every other Social Media System 106 in FIG. 1.

Figure 28:
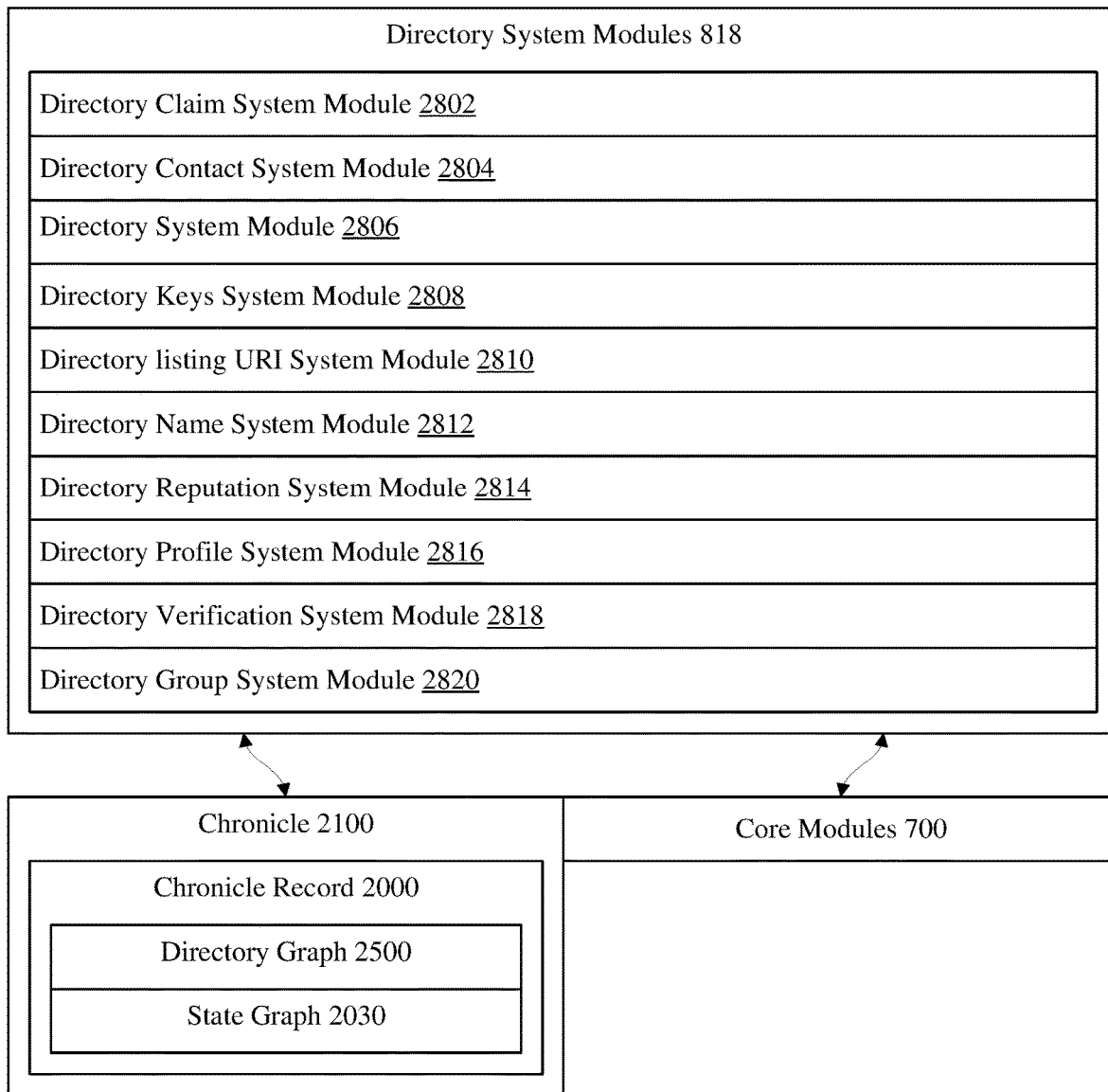
FIG. 28 is a block diagram of Directory System Modules.

FIG. 28 is a block diagram of Directory System Modules 818 which is comprised of Directory Claim System Module 2802, Contact Directory System Module 2804, Directory System Module 2806, Directory Keys System Module 2808, Directory listing URI System Module 2810, Directory Name System Module 2812, Directory Reputation System Module 2814, Directory Profile System Module 2816, Directory Verification System Module 2818, and Group Directory System Module 2820. These system modules represent the functionality required for Social Media System 106 in FIG. 1 to work with a directory data set which consists of Chronicle Record 2000 along with Directory Graph 2500 and State Graph 2030 inside Chronicle 2100. Given the platform's Distributed Architecture 100 in FIG. 1, every User 104 via its own Social Media System 106 is potentially contributing to the directory. All new listings are stored in Chronicle Record 2000, specifically in Directory Graph 2500, which is able to track state via State Graph 2030. Any additions or changes to listings in the directory results in additional chronicle records. Directory System Modules 818 also interacts with Core Modules 700 which provides all the cross-cutting functionality for Directory System Modules 818.

Directory Claim System Module 2802 provides the system modules for managing the claiming of listings in the directory. Directory Contact System Module 2804 provides the system modules for managing the contacting of listings in the directory. Directory System Module 2806 provides the system modules for managing the general features and functionality of the directory. Directory Keys System Module 2808 provides the system modules for managing keys in the directory. Directory listing URI System Module 2810 provides the system modules for managing listing URIs in the directory. Directory Name System Module 2812 provides the system modules for managing names in the directory. Directory Reputation System Module 2814 provides the system modules for managing reputation in the directory. Directory Profile System Module 2816 provides the system modules for managing profiles in the directory. Directory Verification System Module 2818 provides the system modules for managing verification in the directory. Directory Group System Module 2820 provides the system modules for managing groups of listings in the directory.

Figure 29:
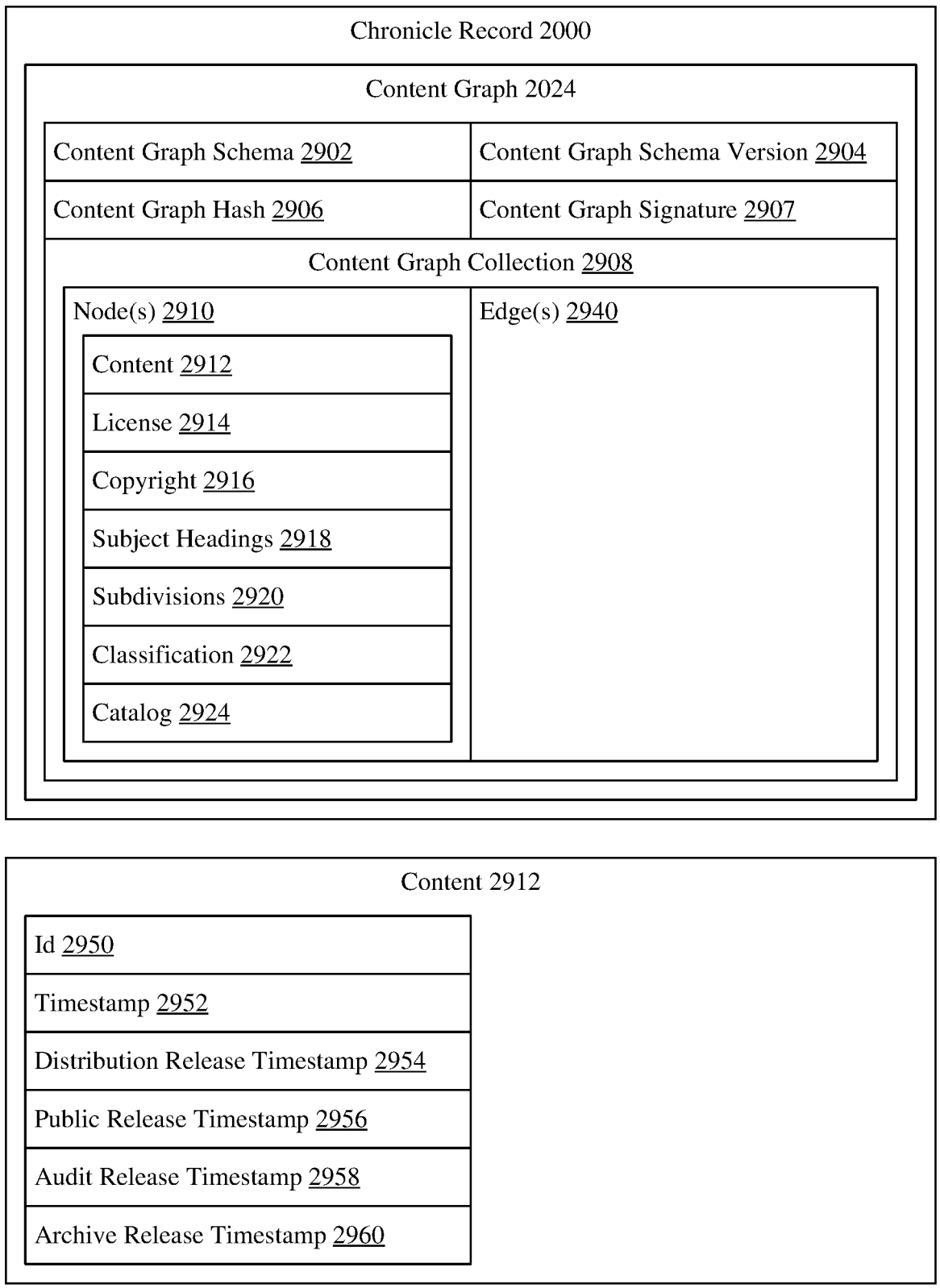
FIG. 29 is a block diagram of a Chronicle Record.

FIG. 29 is a block diagram of Chronicle Record 2000 which is comprised of Content Graph 2024. Content Graph 2024 descends from Base Graph 2050 in FIG. 20 and consists of Content Graph Schema 2902, Content Graph Schema Version 2904, Content Graph Hash 2906 and Content Graph Signature 2907. Content Graph 2024 also consists of Content Graph Collection 2908 which is comprised of Node(s) 2910 and Edge(s) 2940. Node(s) 2910 consists of Content 2912, License 2914, Copyright 2916, Subject Headings 2918, Subdivisions 2920, Classification 2922, and Catalog 2924. Content 2912 consists of Id 2950, Timestamp 2952, Distribution Release Timestamp 2954, Public Release Timestamp 2956, Audit Release Timestamp 2958, and Archive Release Timestamp 2960. This diagram illustrates that Content System Modules 816 in FIG. 8 uses Chronicle 2100 in FIG. 21 for data storage, access and search. In essence, all content is stored in Chronicle Record 2000 with Content Graph 2024 and Content Graph Collection 2908, which in addition to the content, provides critical properties such as license and copyright as well as ways to search the content. The various content timestamps are used by workflows to determine what to do with the content and when.

Figure 30:
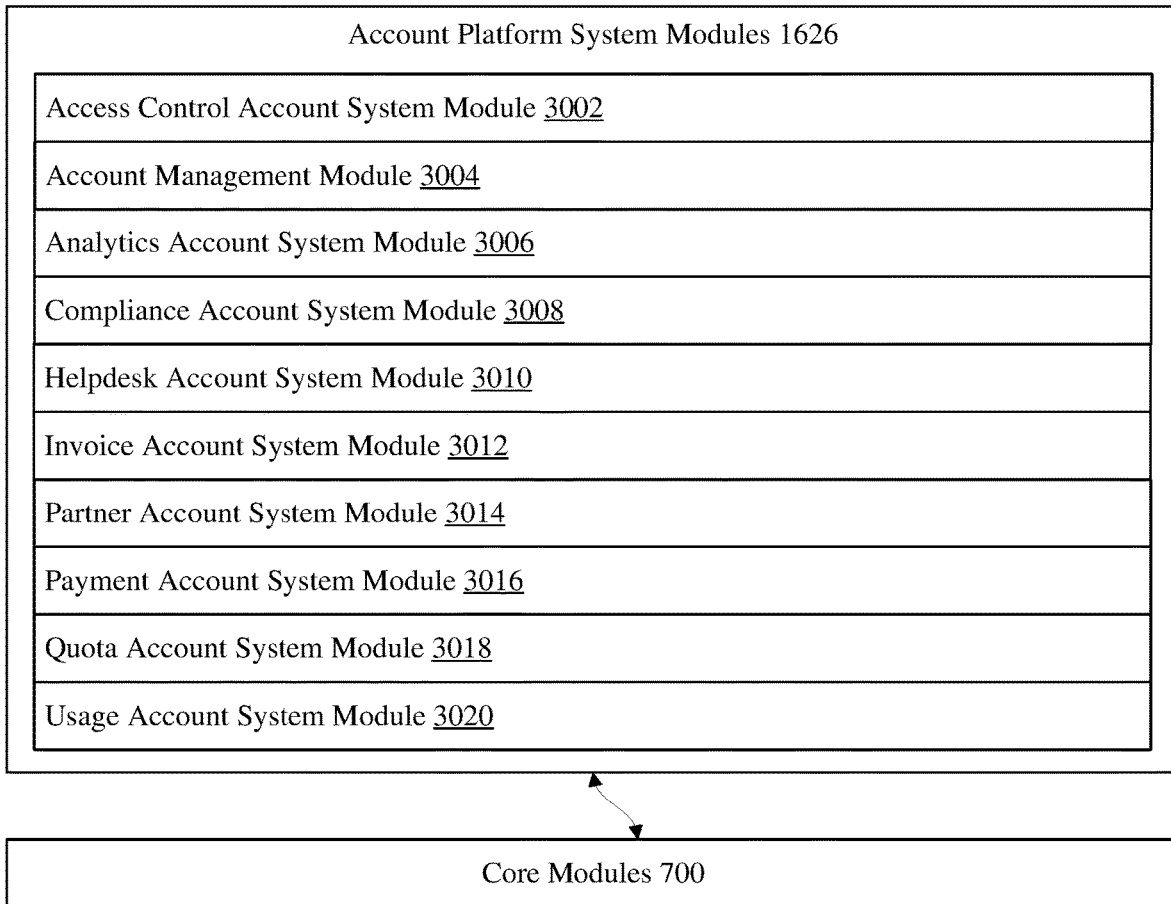
FIG. 30 is a block diagram of Account Platform System Modules.

FIG. 30 is a block diagram of Account Platform System Modules 1626 which is comprised of Access Control Account System Module 3002, Account Management Module 3004, Analytics Account System Module 3006, Compliance Account System Module 3008, Helpdesk Account System Module 3010, Invoice Account System Module 3012, Partner Account System Module 3014, Payment Account System Module 3016, Quota Account System Module 3018, and Usage Account System Module 3020. Account Platform System Modules 1626 interacts with Core Modules 700 which provides all the cross-cutting functionality for Account Platform System Modules 1626. This diagram details the platform system modules that enable all the functionality required for accounting on the platform.

Figure 31:
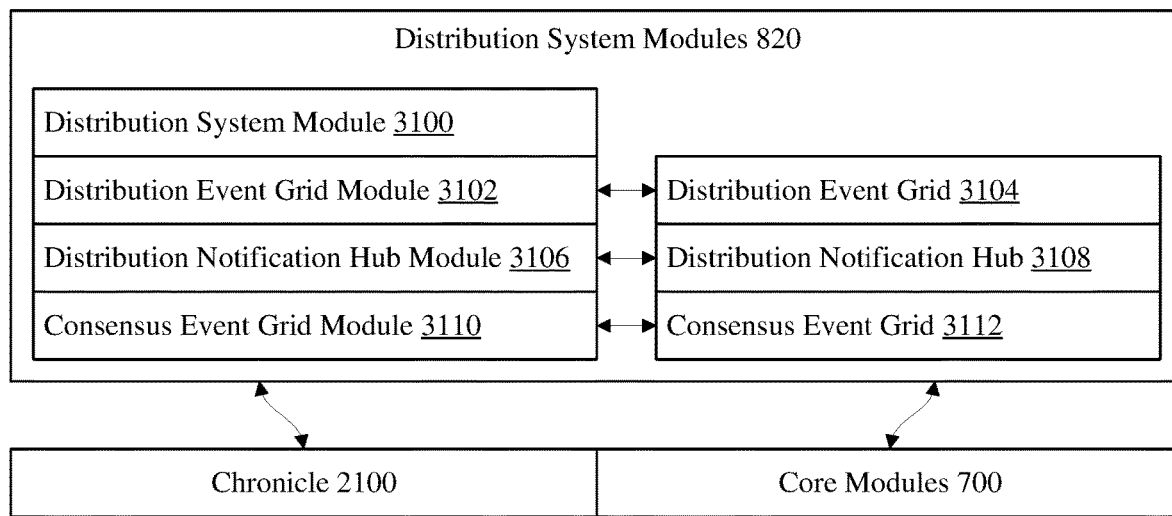
FIG. 31 is a block diagram of Distribution System Modules.

FIG. 31 is a block diagram of Distribution System Modules 820 which is comprised of the Distribution System Module 3100, Distribution Event Grid Module 3102, Distribution Notification Hub Module 3106, and Consensus Event Grid Module 3110. Distribution Event Grid Module 3102 is connected to Distribution Event Grid 3104. Distribution Notification Hub Module 3106 is connected to Distribution Notification Hub 3108. Consensus Event Grid Module 3110 is connected to Consensus Event Grid 3112. Distribution System Modules 820 interacts with Chronicle 2100 as well as Core Modules 700 which provides all the cross-cutting functionality for Distribution System Modules 820. This diagram details that information is distributed across Distributed Social Media Network 300 in FIG. 3 using both pull and push techniques.

In one embodiment of the invention, Distribution Event Grid 3104 managed by Distribution Event Grid Module 3102 is used for information distribution on the platform. Here User 104 tells its Social Media System 106 in FIG. 1, "Hey, I want to know about certain things. Let me know when you have new data for a specific topic, and I'm going to give you an address for you to use. I'm going to go do other things while I wait. You can always use this address whenever you have something for me." Social Media System 106 fulfills on its promise to User 104 by returning with the requested data. Using event grids on Distributed Social Media Network 300 in FIG. 3 allows the social media systems to communicate in parallel on a massive scale, thereby creating tremendous efficiencies.

In another embodiment of the invention, Distribution Notification Hub 3108 managed by Distribution Notification Hub Module 3106 is used. Here Social Media App(s) 110-1 to N and Social Media Systems 106-1 to N from FIG. 3 who are all waiting for the same data can now efficiently distribute that data to Users 104-1 to N at the same time. Again, embodiments of the present technology leverage parallelism for distributed communication without a centralized server managing information flow on the network.

In another embodiment of the invention, Consensus Event Grid 3112 managed by Consensus Event Grid Module 3110 uses an event grid for consensus.

Figure 32:
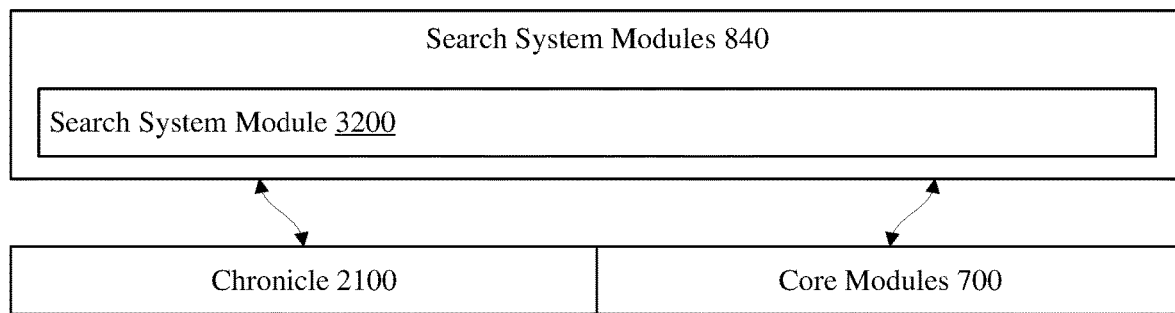
FIG. 32 is a block diagram of Search System Modules.

FIG. 32 is a block diagram of Search System Modules 840 which is comprised of Search System Module 3200 (there could be others) and interacts with Chronicle 2100 as well as Core Modules 700 which provides all the cross-cutting functionality for Search System Modules 840. This diagram details the system module(s) that enable all the functionality required for User 104 in FIG. 1 to do searches of Chronicle 2100 in FIG. 21.

Figure 33:
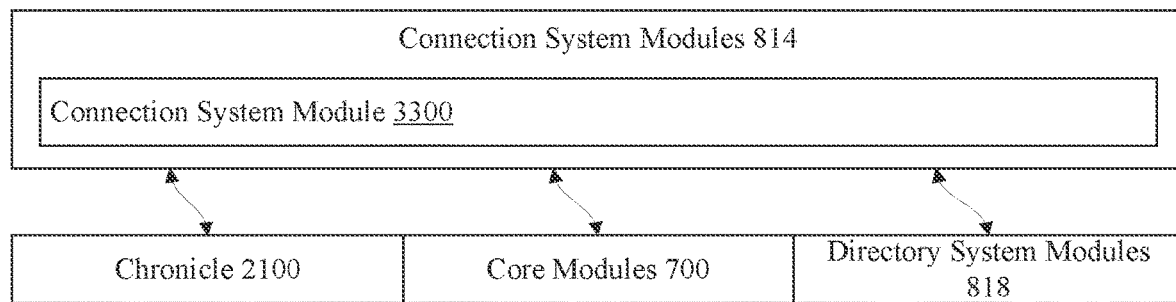
FIG. 33 is a block diagram of Connection System Modules.

FIG. 33 is a block diagram of Connection System Modules 814 which is comprised of Connection System Module 3300 (there could be others) and interacts with Chronicle 2100, Directory System Modules 818, and Core Modules 700 which provides all the cross-cutting functionality for Connection System Modules 814. Social Media System 106 in FIG. 1 uses Connection System Module 3300 to store directory listings of connections via Directory System Modules 818 into their Chronicle 2100. This diagram demonstrates how various system modules can interact with each other. For example, it would also be possible to layer in Search System Module 3200 in FIG. 32 to quickly find the directory listings User 104 in FIG. 1 wants to add to their Chronicle 2100.

Figure 34:
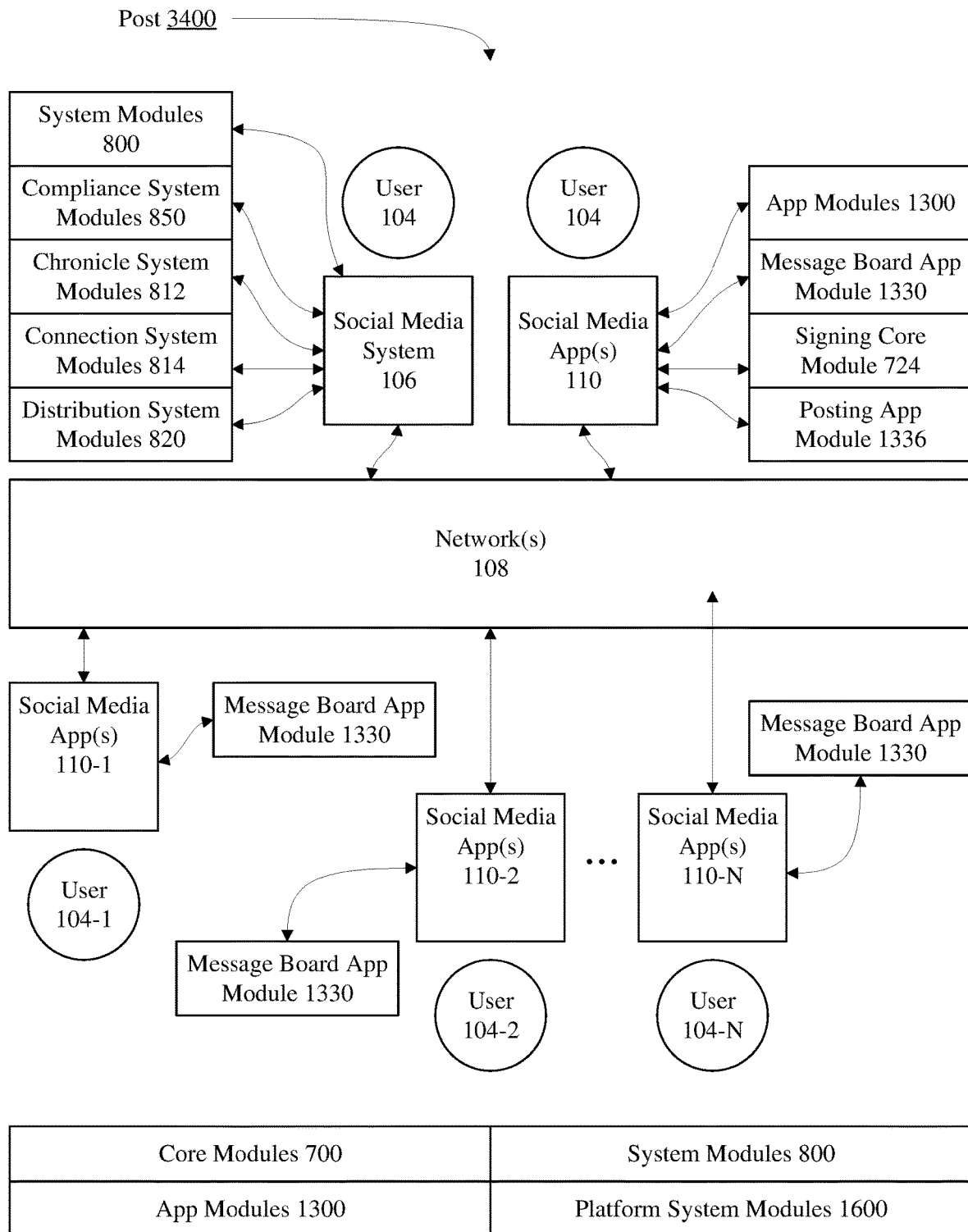
FIG. 34 is a block diagram that illustrates how a Post is made.

FIG. 34 is a block diagram that illustrates how Post 3400 is made on Distributed Social Media Network 300 in FIG. 3. Posts can be deleted at any time. User 104 maintains total ownership and control of the content and associated metadata. This type of sharing is private. User 104 can post messages plus content that is stored on their Social Media System 106, such as photos, videos, PDFs, etc., provided it meets the terms of service (and video time limits) of the network. User 104 uses Social Media App(s) 110 to compose a post. They have at their ability all App Modules 1300. They use Message Board App Module 1330 to create a post and may also use other app modules in the creation of the post, such as Connection App Module 1314 in FIG. 13 to designate who they are going to share it with. Before they send the post, User 104 uses Signing Core Module 724 to digitally sign the post. The post now goes into Posting App Module 1336 which sends the post to Social Media System 106 via Network(s) 108.

Social Media System 106 is composed of all System Modules 800. These system modules can all work together or stand on their own to provide functionality for Social Media System 106. First the post goes into Compliance System Modules 850 to ensure the message conforms to the platform's compliance standards and rules. This may or may not include scanning the message, sending an image to a learning machine to determine its contents, or opening up the message for third party analysis with functionality represented by AI System Modules 804, Machine Learning System Modules 828, and Third Party System Modules 844 in FIG. 8. While data scraping is a possibility, it is not the intent. Ideally the message is read for analysis, but never stored off. Next the post is stored inside User 104's own Chronicle 2100 in FIG. 21 via Chronicle System Modules 812. Because posting allows User 104 to own, control, and delete content, the actual content does not leave their Social Media System 106. Connection System Modules 814 creates a URI to the data in Users 104's Chronicle 2100 which is then encrypted and passed onto Distribution System Modules 820, so the post can be distributed to its designated recipients via Network(s) 108.

User 104-1 accesses the post on their Social Media App(s) 110-1 aided by Message Board App Module 1330. User 104-2 accesses the post on their Social Media App(s) 110-2 aided by Message Board App Module 1330. User 104-N accesses the post on their Social Media App(s) 110-N aided by Message Board App Module 1330. The ellipse between Social Media App(s) 110-2 and Social Media App(s) 110-N illustrates that there are N number of social media app(s) for every user on the network that could potentially receive User 104's post. Core Modules 700 provides all the cross-cutting functionality for Social Media App(s) 110 and Social Media System 106 and their associated App Modules 1300, System Modules 800, Platform System Modules 1600 required to Post 3400.

In sum, Distributed Social Media Network 300 in FIG. 3 facilitates a truly unique form of posting not possible with existing centralized social media networks. User 104 creates their own specific instance of a social media network where they have total ownership and control of the content they post as well as the connections they send it to. All intended connections receive all intended posts. There is no algorithm or centralized authority filtering the posts or the recipients, and User 104 can delete a post at any time without fearing the content and associated metadata remains stored off in an external data center, vulnerable to malicious misuse.

Figure 35:
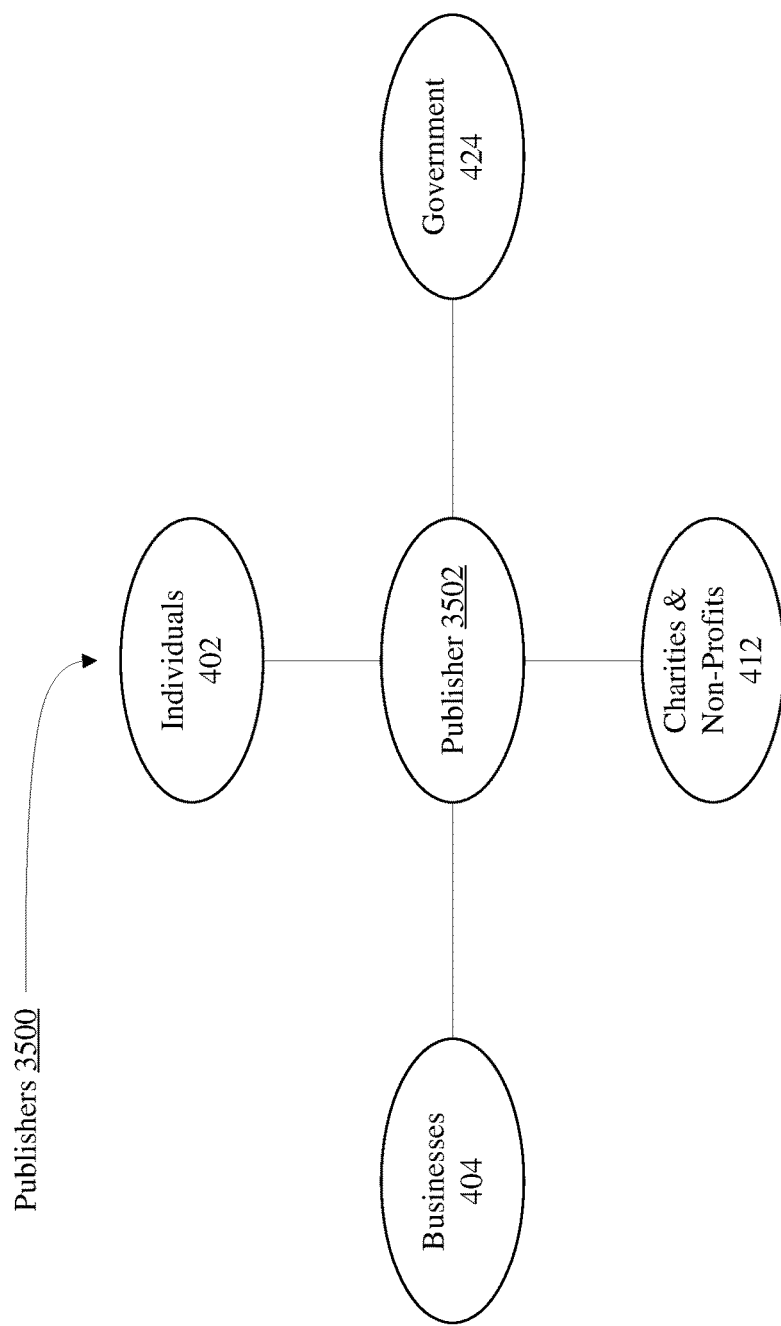
FIG. 35 is a use case diagram of Publishers.

FIG. 35 is a use case diagram of Publishers 3500. It introduces a new subset to the superset User 104 in FIG. 1 and illustrates that Individuals 402, Businesses 404, Charities & Non-Profits 412, and Government 424 can all be Publisher 3502 on Distributed Social Media Network 300 in FIG. 3.

FIG. 36 is a block diagram of Platform Tenets 3600 which is comprised of Complete Traceability 3602, Complete Transparency 3604, Fair Intrinsic Value 3606, Integrity is the Currency 3608, Level Playing Field 3610, Permanent Public Record 3612, Platform Anti-Counterfeiting Measures 3614, Public Archiving 3616, Public Auditing 3618, Records are Signed 3620, Right of First Refusal 3622, Users are Known 3624, Users are Verified 3626, Users Get Paid for their Content 3628, and Content is Verified 3630. This diagram details the main tenets of the platform that are essential to addressing the problems with existing social media options and delivering a transformed social media experience based on integrity, civility and fairness.

FIG. 37 is a block diagram of Publishable Content Types 3700 which is comprised of Announcements 3702, Broadcast 3704, Business 3706, Calendar of Events 3708, Circular Ads 3710, Comics 3712, Crossword Puzzles 3714, Classified Ads 3716, Display Ads 3718, Editorial/Opinion 3720, Features 3722, Medium Based 3724, News 3726, Notifications 3728, IANA Media Type Based 3730, Recantation 3732, Retraction 3734, Rhetoric 3736, Streaming 3738, Sports 3740, Subject Based 3742, Other 3744, This Day in History 3746, and Advice 3748. This diagram illustrates that many of Publishable Content Types 3700 follow the lexicon of a traditional newspaper, transformed for the digital age: News 3726, Business 3706, Sports 3740, Features 3722 (such as home and garden, cars, travel, cooking, technology, special focused reports), Editorial/Opinion 3720, Announcements 3702, Notifications 3728, Calendar of Events 3708, Classified Ads 3716, Display Ads 3718, Circular Ads 3710, Comics 3712, Crossword Puzzles 3714, and Advice 3748. Publishable content can also be Subject Based 3742 (such as faith/inspiration or comedy/satire), Medium Based 3724 (such as magazines, books, music, movies, or art), IANA Media Type Based 3730 (such as text, photo, etc.), Broadcast 3704 (includes live curation), Streaming 3738 (includes self-curation), Other 3744 (such as a daily diary), or This Day in History 3746 (a summary of key events from each daily Chronicle 2100 in FIG. 21). Publishable content cannot be deleted once published, but User 104 in FIG. 1 can publish a Recantation 3732 or Retraction 3734.

Figure 38:
FIG. 38 is a block diagram of Consensus by Conference.

FIG. 38 is a block diagram of Consensus by Conference 3800 which is required for publishing on the platform. It is comprised of Conference Consensus Categories 3802, Conference Consensus Preconditions 3810, Conference Consensus Settings 3822, and Consensus by Conference Proof of Stake 3850. Consensus by Conference 3800 is used to generate protected consensus within a protected network as every User 104, Social Media System 106 and Social Media App(s) 110 in Distributed Social Media Network 300 in FIG. 3 is known, authenticated and authorized.

Conference Consensus Categories 3802 consists of Conference Consensus Machine Learning 3804 which is based on a training set of data containing instances whose features and assigned category membership is known, Conference Consensus Features 3806 which are derived from system composition profiles and their resulting performance metrics from telemetry data managed by Telemetry System 226 in FIG. 2, and Conference Consensus Classifier 3808 which is a classification algorithm that maps a new instance's system profile data to a category.

Conference Consensus Preconditions 3810 consists of Platform System Category Conference Topics 3812, Platform System Category Attendee Topics 3814, Publisher Consensus System Category Classification 3816, Publisher Consensus System Category Conference Event Subscription 3818, and Publisher Consensus System Category Attendee Event Subscription 3820.

Platform System Category Conference Topics 3812 and Platform System Category Attendee Topics 3814, along with other Conference Consensus Preconditions 3810, utilize Consensus Event Grid 3112 in FIG. 31 which is managed by Consensus Event Grid Module 3110 in FIG. 31. Event grids are incredibly efficient in terms of a Publish-Subscribe model and massively scalable. To use this as a basis for triggering consensus requests adds to the scalability and parallelism of Consensus by Conference 3800.

Each Publisher 3502 in FIG. 35 has their own Social Media System 106 in FIG. 1 which placed into a specific Publisher Consensus System Category Classification 3816 by Consensus by Conference Machine Learning 3804, Consensus by Conference Features 3806, and Consensus by Conference Classifier 3808. Category classifications are used to implement the platform tenets Level Playing Field 3610 and Fair Intrinsic Value 3606 in FIG. 36 because not every Publisher 3502's Social Media System 106 in FIG. 1 has the same composition or workload. For example, it is not level or fair to expect a small publisher with a small system footprint that generates four pieces of content a week to be able to meet the consensus requirements of a really large publisher with a really large system footprint that generates thousands of pieces of content a day. As a result, Publisher 3502 in FIG. 35 is put into a population with other publishers that have similar performance capabilities and workload capacities. Publisher Consensus System Category Classification 3816 also uses machine learning to dynamically self-tune itself so when Publisher 3502 in FIG. 35 changes their system footprint and/or produces more or less content, they actually shift though different classifications on the network.

The use of Consensus by Conference Categories 3802, Consensus by Conference Preconditions 3810, and specifically Publisher Consensus System Category Classification 3816, enables the platform to create a multitude of consensus networks based on classification which in turn allows the platform to scale and process consensus requests in parallel. Additionally, each Social Media System 106 in FIG. 1 within their Publisher Consensus System Category Classification 3816 is configured to utilize thread pools to individually handle multiple consensus requests resulting in multiple dimensions of scalability and parallelism as well as incredibly low latency.

Conference Consensus Settings 3822 consists of Category Conference Attendee Count 3824, Category Conference Session Count 3826, and Category Conference Attendees Per Session Count 3828. Each category conference has an attendee count, session count, and attendees per session count which enable degrees of parallelism. These settings are dynamically generated by each Publisher Consensus System Category Classification 3816 and used by Consensus by Conference Categories 3802 to fine tune scalability.

Consensus by Conference Proof of Stake 3850 is at the heart of Consensus by Conference 3800 and based on the platform tenet Integrity is the Currency 3608 in FIG. 36. A hash is a pure mathematical equation, and it is in every publisher's best interest to do the calculation right. If they don't, it is reported in Conference Graph 2036 in FIG. 20 which provides Complete Traceability 3602 and Complete Transparency 3604 within Permanent Public Record 3612 in FIG. 36. Bad actors can be called out and held accountable, so there's really no upside to being a notorious Publisher 3502 in FIG. 35 on the network. This is why Consensus by Conference Proof of Stake 3850 works within a protected consensus requirement.

In short, Consensus by Conference 3800 represents a really efficient, highly scalable, massively distributed communication protocol designed to bring integrity back to social media networking.

Figure 39:
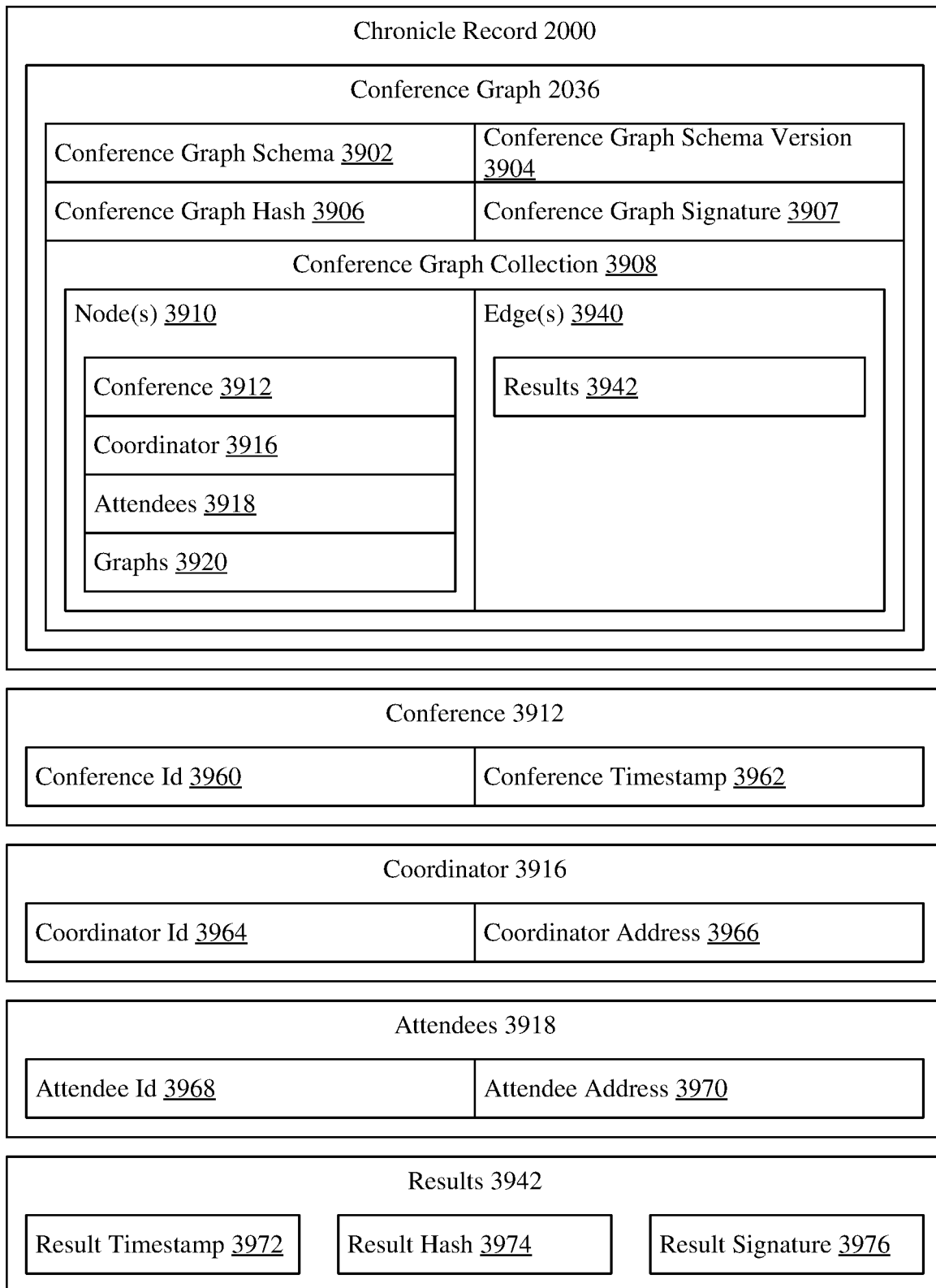
FIG. 39 is a block diagram of a Chronicle Record.

FIG. 39 is a block diagram Chronicle Record 2000 which is comprised of Conference Graph 2036. Conference Graph 2036 descends from Base Graph 2050 in FIG. 20 and consists of Conference Graph Schema 3902, Conference Graph Schema Version 3904, Conference Graph Hash 3906, and Conference Graph Signature 3907. Conference Graph 2036 also consists of Conference Graph Collection 3908 which contains Node(s) 3910 and Edge(s) 3940. Node(s) 3910 include Conference 3912, Coordinator 3916, Attendees 3918 and Graphs 3920. Edge(s) 3940 include Results 3942. There could also be other nodes and edges. Conference 3912 has the properties Conference Id 3960 and Conference Timestamp 3962. Coordinator 3916 has the properties Coordinator Id 3964 and Coordinator Address 3966. Attendees 3918 has the properties Attendee Id 3968 and Attendee Address 3970. Results 3942 has the properties Result Timestamp 3972, Result Hash 3974, and Result Signature 3976. This diagram illustrates that when consensus is requested, a conference is created, and the result of that conference is basically a binary whereby consensus is affirmed or not affirmed. The whole consensus process is captured in Chronicle Record 2000. All Users are Known 3624 and all Users are Verified 3626 as detailed in FIG. 36. Conference Graph 2036 stores off all the information about the conference including when it is set up, who the coordinator is, who the attendees are, and the result. Because Chronicle 2100 is a system of record, at the end of Consensus by Conference 3800 in FIG. 38, there is an immutable record of that consensus which provides Complete Traceability 3602 and Complete Transparency 3604 as detailed in FIG. 36.

Figure 40:
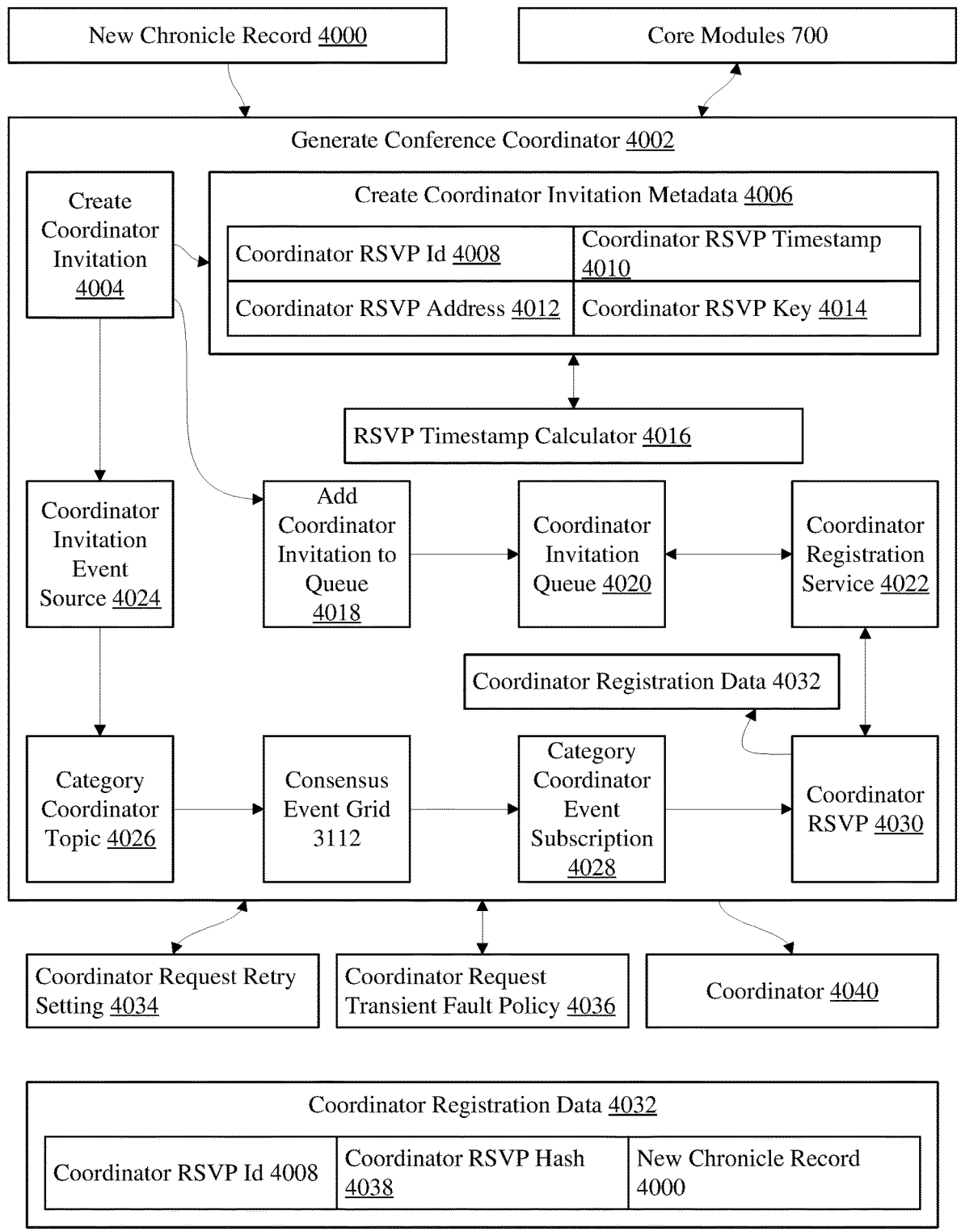
FIG. 40 is a block diagram detailing the workflow for Generate Conference Coordinator.

FIG. 40 is block diagram detailing the workflow for Generate Conference Coordinator 4002 which is triggered by New Chronicle Record 4000 submitted by Publisher 3502 in FIG. 35 for Consensus by Conference 3800 in FIG. 38. Conference creation starts with the designation of a conference coordinator who is responsible for setting up and coordinating the conference. Core Modules 700 connected to Generate Conference Coordinator 4002 provide all the cross-cutting functionality for the workflow.

The first step of Generate Conference Coordinator 4002 is Create Coordinator Invitation 4004 which requires Create Coordinator Invitation Metadata 4006 comprised of Coordinator RSVP Id 4008, Coordinator RSVP Timestamp 4010, Coordinator RSVP Address 4012, and Coordinator RSVP Key 4014. Create Coordinator Invitation Metadata 4006 also interfaces with RSVP Timestamp Calculator 4016. Coordinator RSVP Timestamp 4010 represents the window for possible coordinators to respond to the request and generates efficiencies for responding. The conference only needs one coordinator who is selected randomly and in a timely fashion. This workflow doesn't wait for all potential coordinators to respond, nor do they have to respond if they are busy working on consensus for other requests and don't see this request until after the specified date/time. RSVP Timestamp Calculator 4016 represents the functionality needed to determine the RSVP window to respond. This setting is dynamic and adjustable for maximum efficiency. Coordinator RSVP Address 4012 is the address that potential coordinators have to respond to with their RSVP. Coordinator RSVP Key 4014 is used to validate that a respondent is responding to the correct request, which eliminates potential mischief and hacking.

The next step is Add Coordinator Invitation to Queue 4018, which links to Coordinator Invitation Queue 4020 and Coordinator Registration Service 4022 which is listening on the address that was specified in Coordinator RSVP Address 4012 for respondents who want to be the coordinator. Then it is time to determine Coordinator Invitation Event Source 4024. The correct Category Coordinator Topic 4026 is selected, and then the invitation is added to Consensus Event Grid 3112. Category Coordinator Event Subscription 4028 represents all the other publishers in that category who received that event. Any publisher who has a subscription to that topic and has a thread available to service the request submits Coordinator RSVP 4030. Coordinator RSVP 4030 has a relationship to Coordinator Registration Data 4032. A publisher on submitting their RSVP is going to submit Coordinator RSVP Id 4008 plus Coordinator RSVP Hash 4038 of Coordinator Registration Data 4032 by using Coordinator RSVP Key 4014. If they are the first to respond where everything checks out (no hackers or bad actors), Coordinator RSVP 4030 presents them to Coordinator Registration Service 4022.

Finally, Coordinator Registration Service 4022 responds back to Coordinator RSVP 4030 with New Chronicle Record 4000. In one embodiment of the invention, the entire chronicle record is passed to the coordinator. In another embodiment of the invention, a URI to the chronicle record in the chronicle that resides in Publisher 3502's Social Media System 106 in FIG. 1 is passed to the coordinator using Chronicle System Modules 812 in FIG. 8. Because only one coordinator is selected for each conference, if anyone else talks to Coordinator Registration Service 4022 within Coordinator RSVP Timestamp 4010, no record or URI is passed to them. Coordinator 4040 is then returned to Publisher 3502 in FIG. 35 who initiated the consensus. This workflow also consists of Coordinator Request Retry Setting 4034 which is responsible for determining the number of retry attempts to enlist a coordinator for the conference and Coordinator Request Transient Fault Policy 4036 which is used to mitigate technical exceptions that happen during the workflow. Both generate additional efficiencies in the distributed parallel communications and help ensure the coordinator position is filled in a timely manner.

Figure 41:
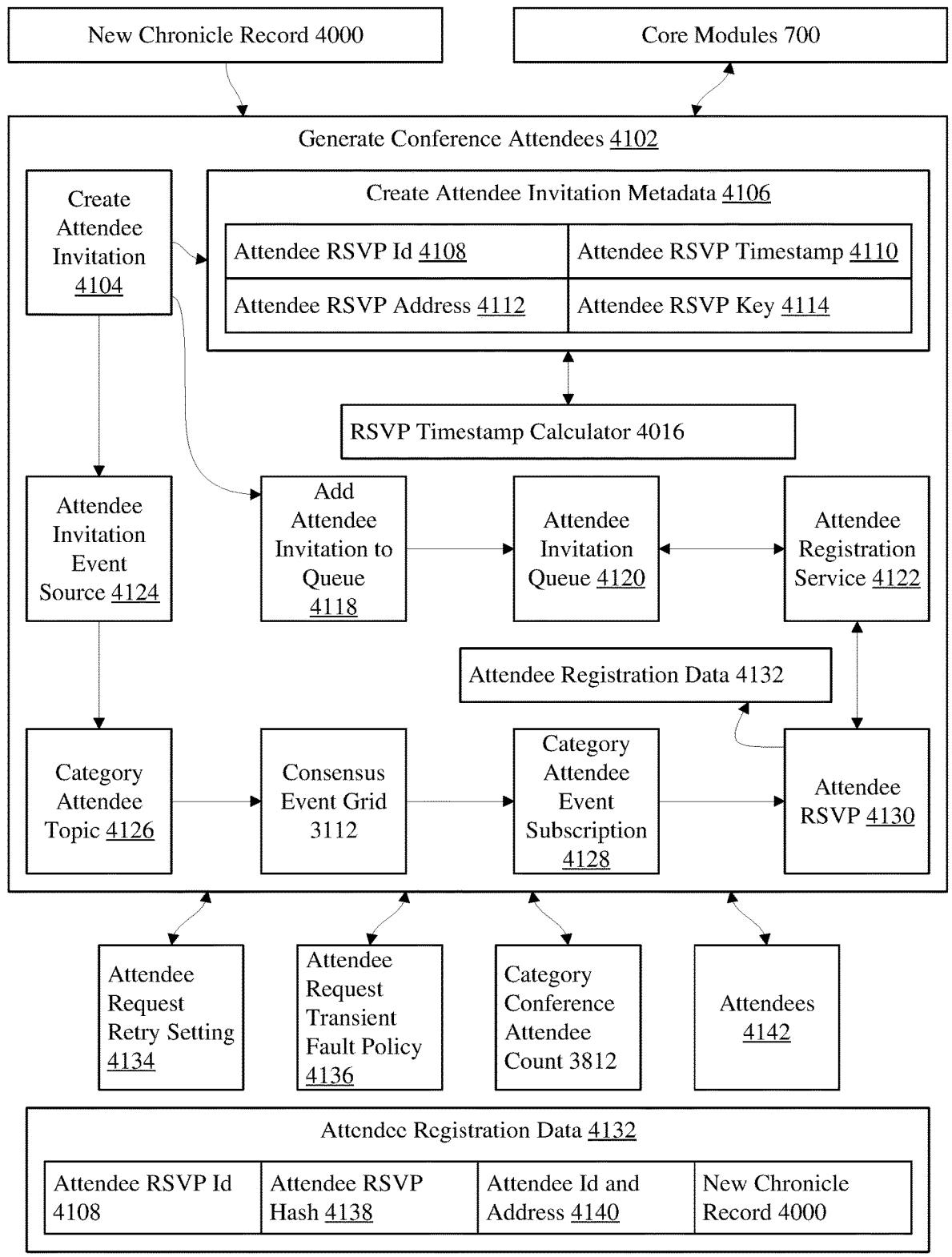
FIG. 41 is a block diagram detailing the workflow for Generate Conference Attendees.

FIG. 41 is a block diagram detailing the workflow for Generate Conference Attendees 4102 which is triggered by New Chronicle Record 4000 submitted by Publisher 3502 in FIG. 35 for consensus. After Generate Conference Coordinator 4002 in FIG. 40 is complete, it is the job of Coordinator 4040 in FIG. 40 to gather attendees for the conference to determine consensus utilizing Category Conference Attendee Count 3824 in FIG. 38. In another embodiment of the invention, Coordinator 4040 can generate sessions as well utilizing Category Conference Session Count 3826 in FIG. 38. Core Modules 700 connected to Generate Conference Attendees 4102 provide all the cross-cutting functionality for the workflow.

The first step of Generate Conference Attendees 4102 is Create Attendee Invitation 4104 which requires Create Attendee Invitation Metadata 4106 comprised of Attendee RSVP Id 4108, Attendee RSVP Timestamp 4110, Attendee RSVP Address 4112, and Attendee RSVP Key 4114. Create Attendee Invitation Metadata 4106 also interfaces with RSVP Timestamp Calculator 4016. Attendee RSVP Timestamp 4110 represents the window for possible attendees to respond to the request and generates efficiencies for responding. This workflow doesn't wait for all potential attendees to respond, nor do they have to respond if they are busy working on consensus for other requests and don't see this request until after the specified timestamp. RSVP Timestamp Calculator 4016 represents the functionality needed to determine the RSVP window to respond. This setting is dynamic and adjustable for maximum efficiency. Attendee RSVP Address 4112 is the address that potential attendees have to respond to with their RSVP, and Attendee RSVP Key 4114 is used to validate that a respondent is responding to the correct request, which eliminates potential mischief and hacking.

The next step is Add Attendee Invitation to Queue 4118, which links to Attendee Invitation Queue 4120 and Attendee Registration Service 4122 which is listening for and accepting invitations to be an attendee for the conference up to Category Conference Attendee Count 3824. Then it is time to determine Attendee Invitation Event Source 4124. The correct Category Attendee Topic 4126 is selected, and then the invitation is added to Consensus Event Grid 3112. Category Attendee Event Subscription 4128 represents all the other publishers in that category who received that event. Any publisher who has a subscription to that topic and has a thread available to service the request submits Attendee RSVP 4130. Attendee RSVP 4130 has a relationship to Attendee Registration Data 4132. Attendee Registration Data 4132 consists of Attendee RSVP Id 4108, Attendee RSVP Hash 4138, Attendee Id and Address 4140, and New Chronicle Record 4000. A publisher on submitting their RSVP is going to submit Attendee RSVP Id 4108 plus Attendee RSVP Hash 4138 of Attendee Registration Data 4132 by using Attendee RSVP Key 4114. If they respond before Category Conference Attendee Count 3824 has been met and everything checks out (no hackers or bad actors), Attendee RSVP 4130 presents them to Attendee Registration Service 4122.

Finally, Attendee Registration Service 4122 responds back to Attendee RSVP 4130 with New Chronicle Record 4000. In one embodiment of the invention, the entire chronicle record is passed to the attendees. In another embodiment of the invention, a URI to the chronicle record in the chronicle that resides in Publisher 3502's Social Media System 106 in FIG. 1 is passed to the attendees using Chronicle System Modules 812 in FIG. 8. If anyone else talks to Attendee Registration Service 4122 after Attendee RSVP Timestamp 4110 or after Category Conference Attendee Count 3824 has been met, no record or URI is passed to them. Attendees 4142 is then returned to Publisher 3502 in FIG. 35 who initiated the consensus. Coordinator 4040 in FIG. 40 and Attendees 4142 are both needed to determine consensus for New Chronicle Record 4000. This workflow also consists of Attendee Request Retry Setting 4134 which is responsible for determining the number of retry attempts to enlist attendees for the conference and Attendee Request Transient Fault Policy 4136 which is used to mitigate technical exceptions that happen during the workflow. Both generate additional efficiencies in the distributed parallel communications and help ensure the attendee positions are filled in a timely manner.

Figure 42:
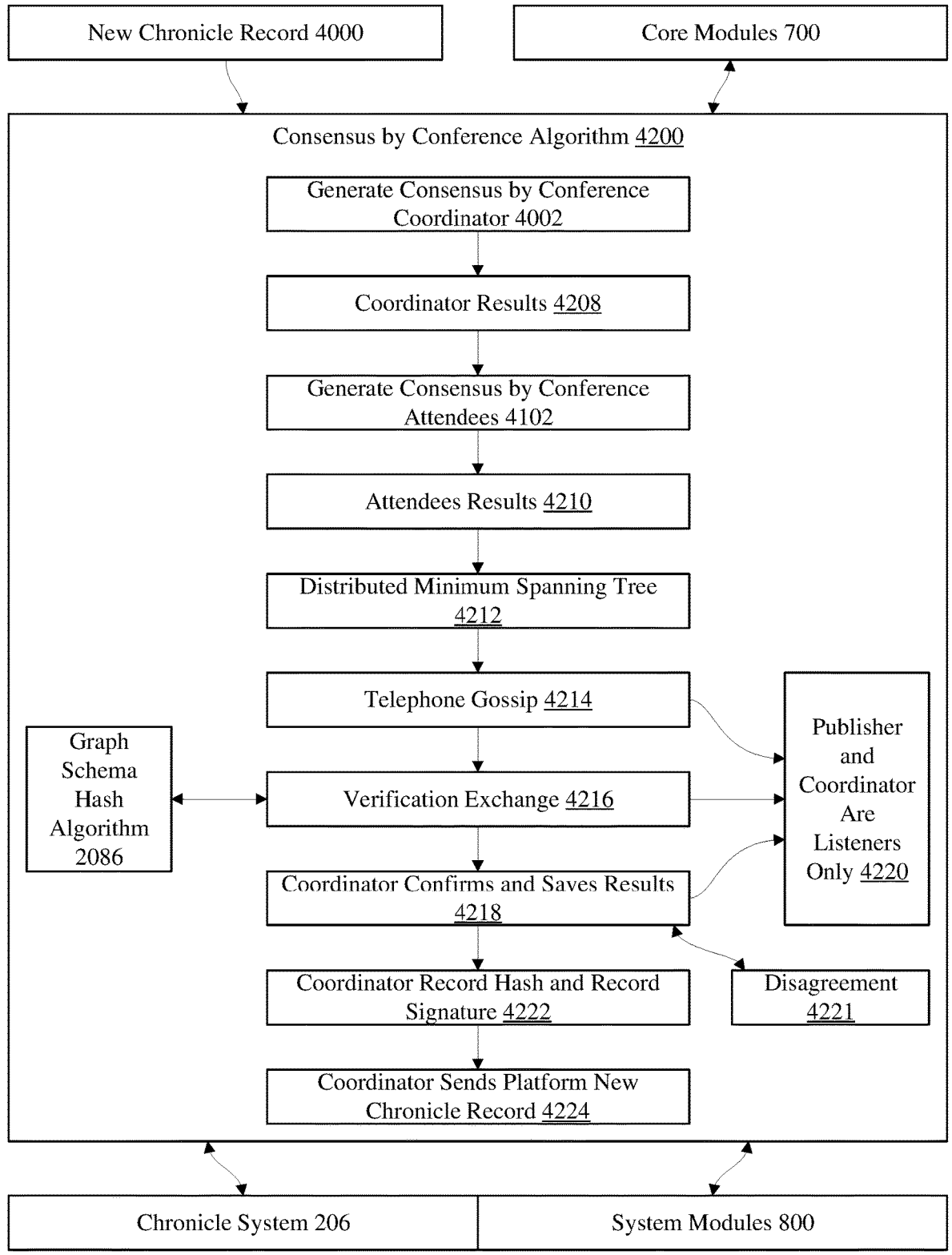
FIG. 42 is a block diagram of Consensus by Conference Algorithm.

FIG. 42 is a block diagram of Consensus by Conference Algorithm 4200 which illustrates a workflow for consensus. Consensus by Conference Algorithm 4200 is associated with New Chronicle Record 4000, Chronicle System 206, System Modules 800, and Core Modules 700 which provide all the cross-cutting functionality required for the consensus workflow.

The first step is Generate Consensus by Conference Coordinator 4002 which yields Coordinator Results 4208. The second step is Generate Consensus by Conference Attendees 4102 yields Attendees Results 4210. The third step is Distributed Minimum Spanning Tree 4212 which represents the processes associated with setting up a communications network for the publisher, coordinator and attendees where nodes communicate by message passing. The fourth step is Telephone Gossip 4214 which represents the gossiping protocol utilized for consensus. It is initiated between publisher, coordinator and attendees. Telephone Gossip 4214 is associated with Publisher and Coordinator Are Listeners Only 4220. During the process of gossip, the publisher and coordinator listen only. Graph Schema Hash Algorithm 2086 illustrates the algorithm by which the coordinator and the attendees calculate the graph hashes for New Chronicle Record 4000. In another embodiment, the coordinator and attendees utilize Object Graph Hash Algorithm 2084 in FIG. 20 to calculate the hashes for New Chronicle Record 4000. Graph Schema Hash Algorithm 2086 is associated with Verification Exchange 4216.

The fifth step is Verification Exchange 4216 which illustrates that as each attendee calculates a hash for a graph in New Chronicle Record 4000, they exchange that information utilizing Telephone Gossip 4214. Verification Exchange 4216 is also associated with Publisher and Coordinator Are Listeners Only 4220. The sixth step is Coordinator Confirms and Saves Results 4218 which illustrates that all of the attendees' results used to confirm the hash for each graph in New Chronicle Record 4000 are saved by the coordinator into their copy of New Chronicle Record 4000. As Coordinator Confirms and Saves Results 4218, if any of the calculations do not match then Disagreement 4221 is reached, and Consensus by Conference Algorithm 4200 terminates with no consensus. Coordinator Confirms and Saves Results 4218 is also associated with Publisher and Coordinator Are Listeners Only 4220. The seventh step is Coordinator Record Hash and Record Signature 4222 which represents the steps to calculate Record Hash 2014 in FIG. 20. The coordinator sorts the hashing results by graph name alphanumerically and then applies Merkle Tree 2082 in FIG. 20 to determine Record Hash 2014 for New Chronicle Record 4000. In another embodiment of the invention, the coordinator also determines Record Signature 2018 which is added to New Chronicle Record 4000. Additionally, each Base Graph Signature 2058 on FIG. 20 is also determined and added to New Chronicle Record 4000.

At this point in the workflow process, New Chronicle Record 4000 is committed to the publisher, coordinator and attendees' Chronicle 2100 in FIG. 21. In another embodiment of the invention, New Chronicle Record 4000 is propagated to every Social Media System 106 on Distributed Social Media Network 300 in FIG. 3. The final step is Coordinator Sends Platform New Chronicle Record 4224 whereby the coordinator sends the platform New Chronicle Record 4000.

Figure 43:
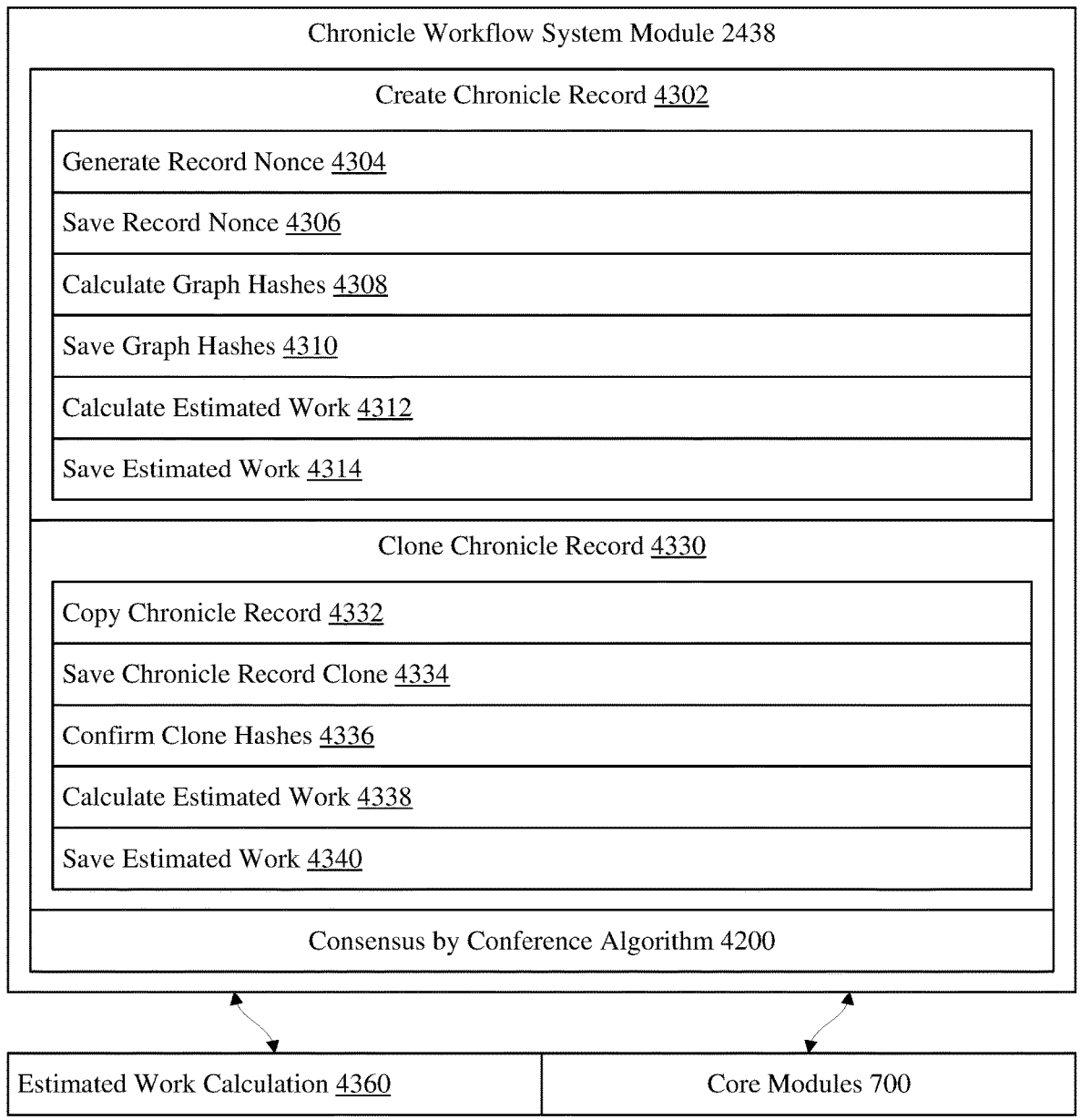
FIG. 43 is a block diagram of a Chronicle Workflow System Module.

FIG. 43 is a block diagram of Chronicle Workflow System Module 2438 which is comprised of Create Chronicle Record 4302, Clone Chronicle Record 4330, and Consensus by Conference Algorithm 4200. Create Chronicle Record 4302 consists of Generate Record Nonce 4304, Save Record Nonce 4306, Calculate Graph Hashes 4308, Save Graph Hashes 4310, Calculate Estimated Work 4312, and Save Estimated Work 4314. Clone Chronicle Record 4330 consists of Copy Chronicle Record 4332, Save Chronicle Record Clone 4334, Confirm Clone Hashes 4336, Calculate Estimated Work 4338, and Save Estimated Work 4340. Both Create Chronicle Record 4302 and Clone Chronicle Record 4330 require Estimated Work Calculation 4360 which is an algorithm to estimate the amount of work required to complete the hashing algorithms for a Chronicle Record 2000 in FIG. 20. Chronicle Workflow System Module 2348 interacts with Core Modules 700 which provides all the cross-cutting functionality for Chronicle Workflow System Module 2348.

Figure 44:
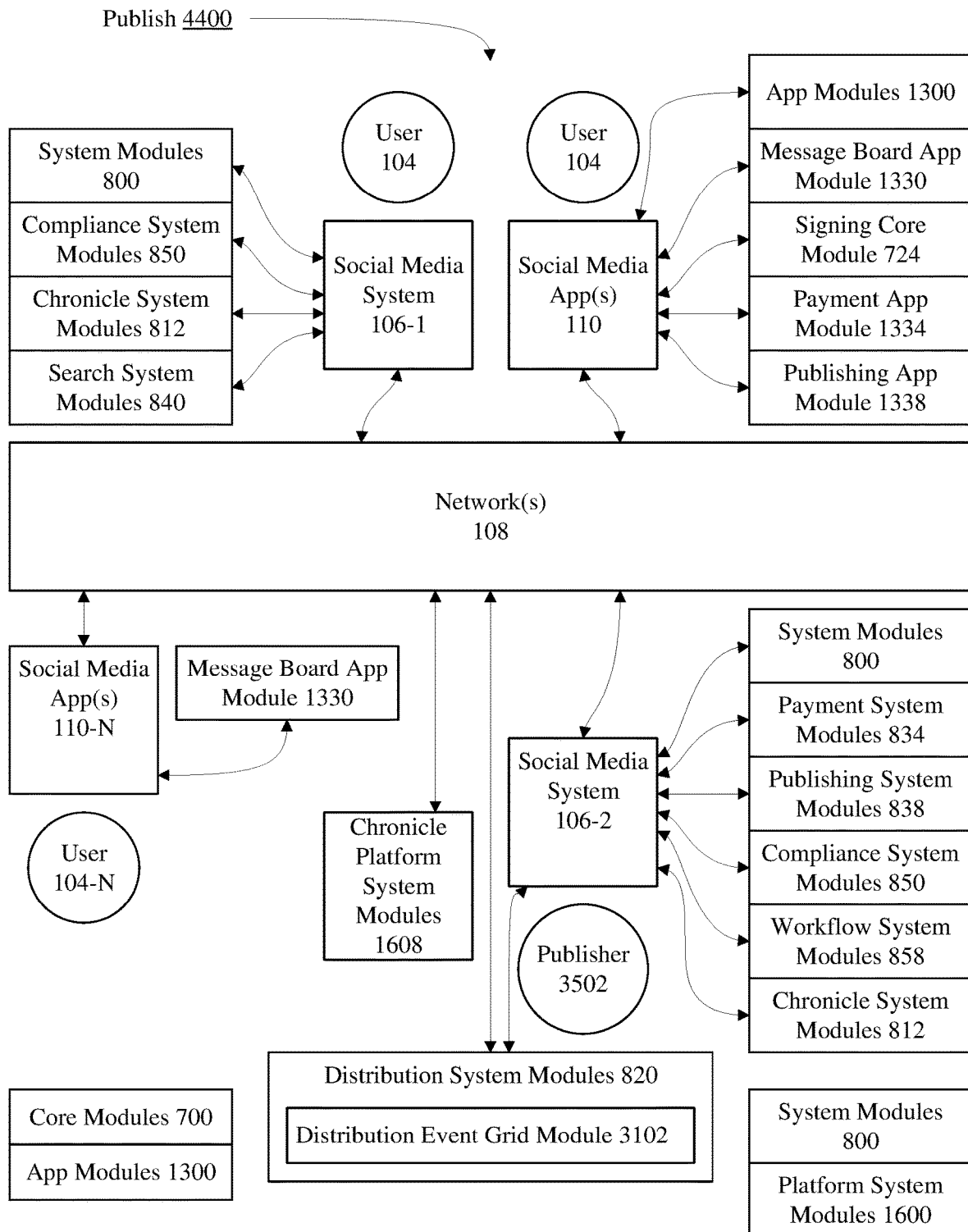
FIG. 44 is a block diagram which illustrates how a user can Publish.

FIG. 44 is a block diagram which illustrates how User 104 can Publish 4400 on Distributed Social Media Network 300 in FIG. 3. This process differs from Post 3400 in FIG. 34. Published content can be edited, corrected, retracted or recanted, but never deleted. It becomes part of Permanent Public Record 3612 in FIG. 36, audited by Public Auditors 114 and held by Public Archivists 116 in FIG. 3 outside of the network. Past versions are always visible. This type of sharing is public. While User 104 may retain ownership and all the rights associated with ownership including copyright and licensing, the content and associated metadata does not reside exclusively in their Social Media System 106 in FIG. 1. It is published out to the distributed system and released to the public. When crafting a message to Publish 4400, User 104 must go through a publisher they select on the network or be a publisher (see Publisher 3502 in FIG. 35). In one embodiment of the invention, Distributed Social Media Network 300 in FIG. 3 sets limits on the number of connections User 104 can post to before User 104 must go through a publisher or become a publisher to reach a larger group of connections.

User 104 uses Social Media App(s) 110 to Publish 4400. They have at their ability all of the App Modules 1300 and may use one, some or all of the modules in their Social Media App(s) 110. In this example they use Message Board App Module 1330 to compose the publishable content. Once the publishable content is ready, User 104 must sign the content using Signing Core Module 724, select Publisher 3502, and pay any fees associated with publishing via Payment App Module 1334. In another embodiment of the invention, Payment App Module 1334 may pull from funds already held in an account between User 104 and Publisher 3502. Then the publishable content is sent to Social Media System 106-1 across Network(s) 108 via Publishing App Module 1338.

Social Media System 106-1 is composed of all System Modules 800. These system modules can all work together or stand on their own to provide functionality for Social Media System 106-1. First the publishable content goes into Compliance System Modules 850 to ensure it conforms to the compliance rules for Publisher 3502 and the platform. Next the publishable content is stored as New Chronicle Record 4000 in FIG. 40 via Chronicle System Modules 812. Search System Modules 840 is also associated with Social Media System 106-1.

New Chronicle Record 4000 in FIG. 40 is then sent to Publisher 3502 across Network(s) 108 to their Social Media System 106-2 which is comprised of all System Modules 800 or some subset of system modules. When payment is received via Payment System Modules 834, Workflow System Modules 858 is notified of the pending content item being published for User 104. When New Chronicle Record 4000 in FIG. 40 is sent, either the entire record with all its bits, including every bit of content is transmitted, or an optimization is sent with URIs to content bits. The workflow upon receiving New Chronicle Record 4000 in FIG. 40 determines if it has the content, and if it doesn't, it goes and gets the content via the URIs. Once the content is received and verified by Workflow System Modules 858, Compliance System Modules 850 verifies that the content meets Publisher 3502's compliance rules. Workflow System Modules 858 then either accepts the content for the next steps of the workflow or rejects the content. Alternately content may be flagged for review. In some cases, the content will need to be manually inspected by Publisher 3502.

Workflow System Modules 858 may also invoke other system modules as part of the workflow to publish the content. Content may be submitted to AI System Modules 804 or Machine Learning System Modules 828 in FIG. 8 for analysis. Content may be submitted to Licensing System Modules 826 in FIG. 8 for content that is determined to be licensed. Content may be submitted to Third Party System Modules 844 in FIG. 8 where additional attribution or data transformations can be applied to Content Graph 2024, such as Copyright 2916, Subject Headings 2918, Subdivisions 2920, Classification 2922, and Catalog 2924 in FIG. 29. Additionally, other content properties may be set by Workflow System Modules 858, including Distribution Release Timestamp 2954, Public Release Timestamp 2956, Audit Release Timestamp 2958, and Archive Release Timestamp 2960 in FIG. 29. When the content is complete, New Chronicle Record 4000 in FIG. 40 is then submitted to Chronicle System Modules 812 and specifically Chronicle Workflow System Module 2438 in FIG. 24 for consensus using Consensus by Conference Algorithm 4200 in FIG. 42.

When consensus is complete, New Chronicle Record 4000 in FIG. 40 is either accepted or rejected. If accepted, it is saved to Chronicle System Module 812. If rejected, a rejection notice is sent back to User 104. Once saved, New Chronicle Record 4000 in FIG. 40 goes to Publishing System Modules 838 for final checks. Then it goes to Distribution System Modules 820 and is placed in Distribution Event Grid Module 3102. Distribution occurs over Network(s) 108 with Distribution Event Grid 3104 in FIG. 31. In another embodiment of the invention, User 104-N can request chronicle records from Publisher 3502 automatically through their Social Media App(s) 110-N as a refresh via a setting within Message Board App Module 1330. When published content gets committed to Chronicle 2100 in FIG. 21, it is distributed out to Distributed Social Media Network 300 in FIG. 3. Chronicle Platform System Modules 1608 stores New Chronicle Record 4000 from FIG. 40 in the platform chronicle. It also monitors Audit Release Timestamp 2958 and Archive Release Timestamp 2960 in FIG. 29, so that when Publisher 3502 says New Chronicle Record 4000 in FIG. 40 can be released to audit or archive, it can either be sent or picked up via the Audit System Modules 810 and the Archive System Modules 808 in FIG. 8. Core Modules 700 provide all the cross-cutting functionality for all Social Media App(s) 110 and all Social Media Systems 106 and their associated App Modules 1300, System Modules 800, Platform System Modules 1600 required to Publish 4400.

Distributed Architecture 100 in FIG. 1 and these unique publishing features provide the opportunity to address the problem of fake news in ways that centralized social media networks cannot. User 104 does not have the ability to publish to the public network without the content being vetted. Every Publisher 3502 is responsible for the content that is published through their Social Media System 106. There is an inherent financial incentive for the publisher to vet the content, because if the content is incorrect, has some negative social impact, or does not meet community or journalistic standards, then the publisher incurs the cost by association. Because Distributed Social Media Network 300 in FIG. 3 is made up of a multitude of independent publishers, vetting can be done efficiently and effectively at scale. Because all Users are Known 3624, all Users are Verified 3626, and all published content becomes part of Permanent Public Record 3612 in FIG. 36, there is no wondering where it came from, what happened during the publishing workflow, plus any state changes, which provides Complete Traceability 3602 and Complete Transparency 3604 in FIG. 36. The net result is a level of transparency and accountability about published content that is not possible in the existing paradigm. Publishers provide a valuable service to the platform and its tenet that Integrity is the Currency 3608 in FIG. 36. They also help ensure the primacy of Chronicle 2100 in FIG. 21 as an institution.

Distributed Social Media Network 300 in FIG. 3 allows for many different publishing use cases, many of which involve financial transactions. Any number of financial clearing types can be used to clear these transactions, including credit cards, ACH, PayPal, public cryptocurrencies like Bitcoin, or a private cryptocurrency created by the network. In one embodiment of the invention, Publisher 3502 publishes content they have designated premium. Money is paid to the publisher by User 104 if they are connected and want to receive the premium content.

In another embodiment of the invention, User 104 publishes Notifications 3728 or Announcements 3702 in FIG. 37. Money is paid to the selected publisher, unless User 104 is a government agency or elected official. With various embodiments of the present technology, government data can now be recorded with decentralized authorities at the local, state and national level. Distributed Social Media Network 300 in FIG. 3 will be able to describe what government is outside of government itself and save the data out for public consumption within the context of social media. This makes government more accessible and accountable as Announcements 3702 and Notifications 3728 are now part of Permanent Public Record 3612 in FIG. 36.

In another embodiment of the invention, User 104 publishes Rhetoric 3736 in FIG. 37 in response to published content, and money is paid to the selected publisher. Publisher 3502 (and AI) moderates this content, following established ground rules for constructive and civil dialog.

In another embodiment of the invention, User 104 submits content such as News 3726 or Features 3722 in FIG. 37 for publication by a selected publisher. If accepted, money is paid to User 104 by Publisher 3502.

In another embodiment of the invention, User 104 places Classified Ads 3716 in FIG. 37 by selecting a publisher based on location or subject who vets the ad and facilitates the placement. Distributed Social Media Network 300 in FIG. 3 makes the transaction possible with financial clearing touchpoints via email and a workflow that will not distribute the ad until confirmation of payment. It also facilitates the use of smart contracts to initialize a transaction between two users on the network within the ad itself.

In another embodiment of the invention, User 104 and Publisher 3502 go back and forth about denials, edits, etc. to content submitted for publishing. There is no exchange of money during these transactions, but there is a protocol where both sides track the data. Validation and agreement is required at every step, and if both parties agree, the contract is good.

In another embodiment of the invention, User 104 purchases video or music (Medium Based 3724 in FIG. 37) from Publisher 3502. A transaction ID, plus copyright and owner, is injected into the content, and a hash is used to create dynamic encryption. Digital rights become public, instead of stored in a centralized database, and form a searchable repository of who owns what hashes. User 104 must own the rights to a song or a movie to be able to play it. No one else will be able to access (or hack) the file.

In another embodiment of the invention, User 104 publishes an academic paper (Other 3744 in FIG. 37) and makes it available for peer review with specified rules, thereby providing accountability and accelerating an oftentimes lengthy review process.

Consistent with creating a Level Playing Field 3610 in FIG. 36, Publisher 3502 keeps any subscription, publishing or advertising fees generated from these publishing use cases. The platform takes a small transaction fee for facilitating the financial transactions with User 104. Profit for few in the existing centralized social media paradigm become profit for many on Distributed Social Media Network 300 in FIG. 3 as publishers are paid for their content and advertising dollars are distributed across a wide range of media properties.

Note that published content is read only by default. User 104 and Publisher 3502 can then determine additional user rights, such as post comment to connections, publish rhetoric to permanent public record, re-share as a post to connections, download, or print. Distributed Social Media Network 300 in FIG. 3 allows for ways to maintain publisher exclusivity and may also have different rights for publishers or businesses that want to group or share content for publication on the network.

Figure 45:
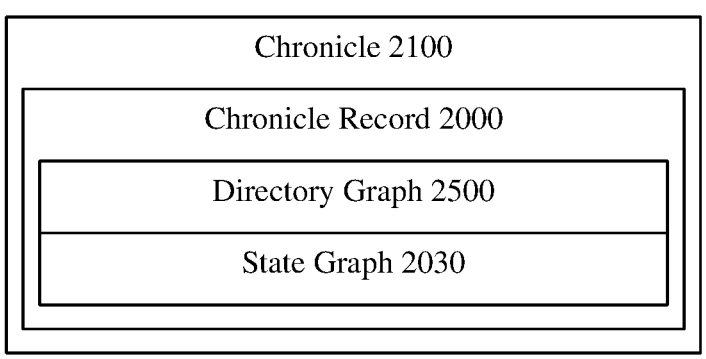
FIG. 45 is a block diagram of Connections and Groups.

FIG. 45 is a block diagram of Connections and Groups 4500 which illustrates the connections and groups functionality of the platform. User 104 uses Social Media App(s) 110 to work with Message Board App Module 1330, Directory App Module 1318, and Chronicle App Module 1312. Social Media App(s) 110 connects to Social Media System 106 via Network(s) 108. Social Media System 106 for User 104 connects to Chronicle System Modules 812 and Directory System Modules 818. Directory System Modules 818 interfaces with Contact Directory System Modules 2804 and Group Directory System Module 2820. Social Media App(s) 110 and Social Media System 106 also connect via Network(s) 108 to Directory System 208 and Chronicle System 206 as well as any Platform Systems 102. Directory System 208 utilizes Directory Platform System Modules 1610. Chronicle System 206 utilizes Chronicle Platform System Modules 1608. Chronicle 2100 represents the use of the chronicle and any Chronicle Record 2000, Directory Graph 2500, and State Graph 2030 that Social Media System 106, Social Media App(s) 110, and Platform Systems 102 may interact with. Group Directory System Module 2820 enables User 104 to work with Directory Graph 2034 and Group 2520 node in FIG. 25. Using Group Directory System Module 2820, User 104 can create groups in Group 2520 node in FIG. 25. User 104 may also use Contact Directory System Module 2804 to establish contact with other users in Directory System 208. Contact Directory System Module 2804 can also be used to facilitate connection requests that other users may have for User 104. Core Modules 700 are used for any cross-cutting concerns across Social Media App(s) 110, Social Media System 106, Platform Systems 102, App Modules 1300, System Modules 800, and Platform System Modules 1600 as well as all functionality specific to Connections and Groups 4500.

This diagram illustrates how User 104 works with the directory to make connections and create groups. User 104 makes connections with other users that they want to interact with on Distributed Social Media Network 300 in FIG. 3, either by extending or accepting an invitation to connect. User 104 can place these connections in groups that may include one, few, many or all of their connections, such as spouse group, family group, best friends group, church group, co-worker group, customer group, subscriber group, etc. These groups are then used to designate recipients of a message when User 104 wants to Post 3400 in FIG. 34 or Publish 4400 in FIG. 44.

Figure 46:
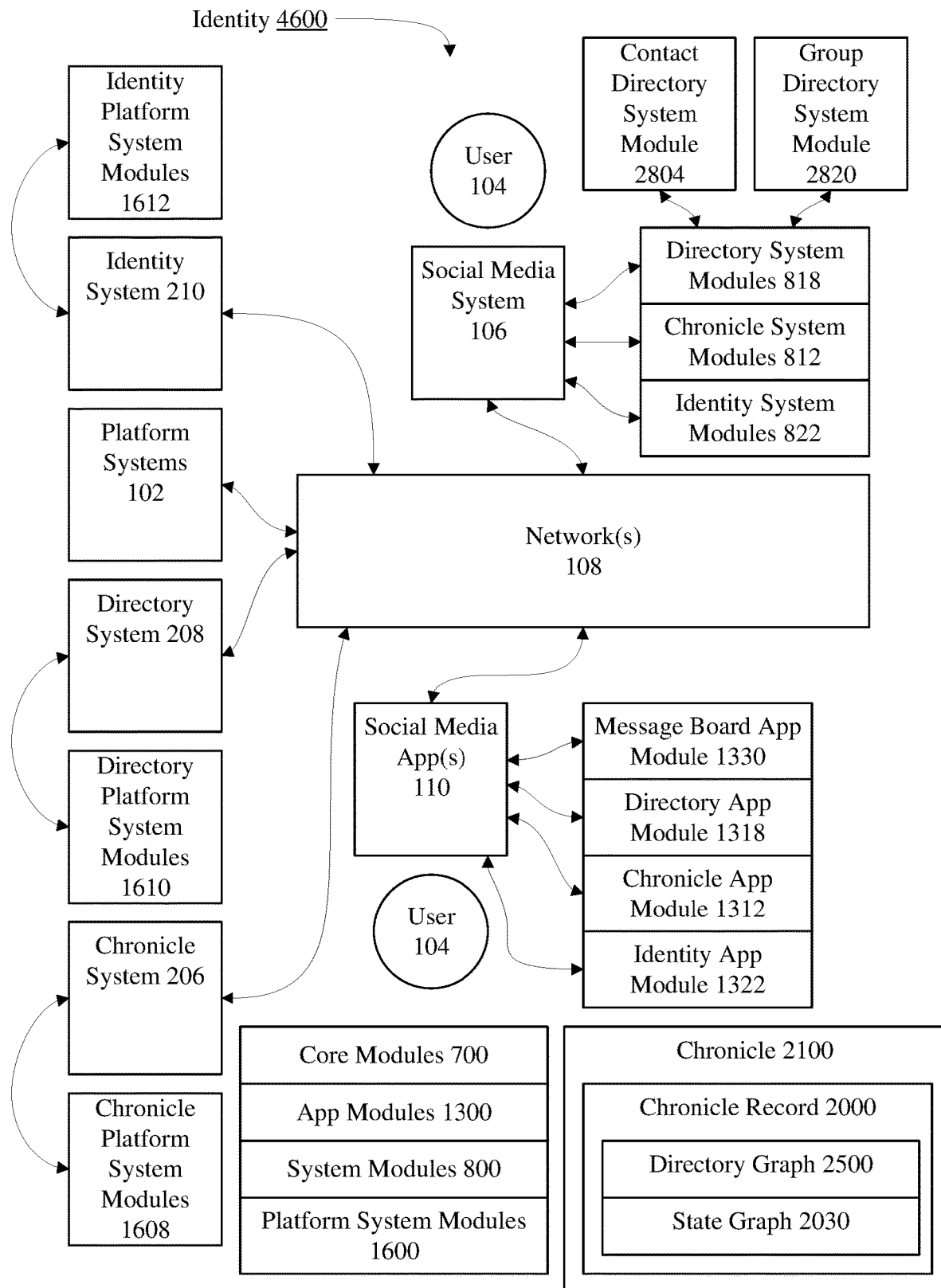
FIG. 46 is a block diagram of Identity.

FIG. 46 is a block diagram of Identity 4600 which illustrates the identity functionality of the platform. User 104 uses Social Media App(s) 110 to work with Message Board App Modules 1330, Directory App Module 1318, Chronicle App Module 1312, and Identity App Module 1322. Social Media App(s) 110 connects to Social Media System 106 via Network(s) 108. Social Media System 106 for User 104 utilizes Identity System Modules 822, Chronicle System Modules 812, and Directory System Modules 818. Directory System Modules 818 interfaces with Contact Directory System Module 2804 and Group Directory System Module 2820. Social Media App(s) 110 and Social Media System 106 also connect via Network(s) 108 to Identity System 210, Directory System 208, and Chronicle System 206 as well as any Platform Systems 102. Identity System 210 utilizes Identity Platform System Modules 1612. Directory System 208 utilizes Directory Platform System Modules 1610. Chronicle System 206 utilizes Chronicle Platform System Modules 1608. Chronicle 2100 represents the use of the chronicle and any Chronicle Record 2000, Directory Graph 2500, and State Graph 2030 that Social Media System 106, Social Media App(s) 110, and Platform Systems 102 may interact with. Core Modules 700 are used for any cross-cutting concerns across Social Media App(s) 110, Social Media System 106, Platform Systems 102, App Modules 1300, System Modules 800, and Platform System Modules 1600 as well as all functionality specific to Identity 4600.

This diagram illustrates that Identity System 210 and its utilization of Identity Platform System Modules 1612 is distinct and separate from Directory System 208 and its utilization of Directory Platform System Modules 1610. Identity System 210 and Identity Platform System Modules 1612 are responsible for authentication and authorization of all users, systems, and apps as well as the interconnections of Platform Systems 102, App Modules 1300, System Modules 800, and Platform System Modules 1600.

Figure 47:
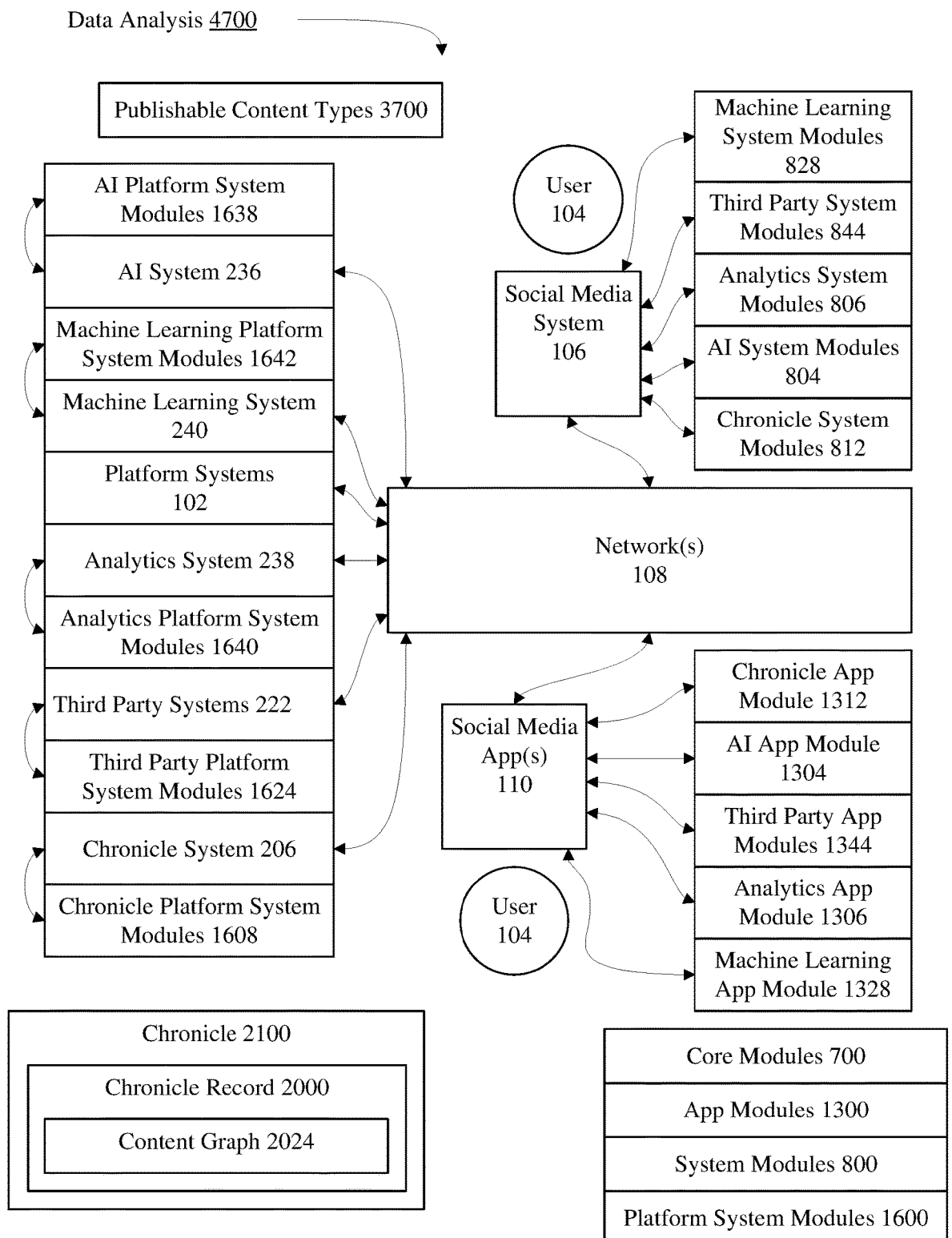
FIG. 47 is a block diagram of Data Analysis.

FIG. 47 is a block diagram of Data Analysis 4700 which illustrates the data analysis functionality of the platform. User 104 utilizes Social Media App(s) 110 to work with Chronicle App Module 1312, AI App Module 1304, Third Party App Modules 1344, Analytics App Module 1306, and Machine Learning App Module 1328. Social Media App(s) 110 connects to Social Media System 106 via Network(s) 108. Social Media System 106 for User 104 utilizes Machine Learning System Modules 828, Third Party System Modules 844, Analytics System Modules 806, AI System Modules 804, and Chronicle System Modules 812. Social Media System 106 and Social Media App(s) 110 also connect via Network(s) 108 to AI System 236, Machine Learning System 240, Analytics System 238, Third Party Systems 222, and Chronicle Systems 206 as well as any Platform Systems 102. AI System 236 utilizes AI Platform System Modules 1638. Machine Learning System 240 utilizes Machine Learning Platform System Modules 1642. Analytics System 238 utilizes Analytics Platform System Modules 1640. Third Party Systems 222 utilizes Third Party Platform System Modules 1624. Chronicle System 206 utilizes Chronicle Platform System Modules 1608. Social Media System 106, Social Media App(s) 110, and Platform Systems 102 may interact with Chronicle 2100, Chronicle Record 2000, Content Graph 2024, and Publishable Content Types 3700 for data analysis. Additionally, Content Graph 2024 illustrates that Content 2912, License 2914, Copyright 2916, Subject Headings 2918, Subdivisions 2920, Classification 2922 and Catalog 2924 nodes in FIG. 29 can also be included in data analysis. Core Modules 700 are used for any cross-cutting concerns across Social Media App(s) 110, Social Media System 106, Platform Systems 102, App Modules 1300, System Modules 800, Platform System Modules 1600, as well as all functionality specific to Data Analysis 4700.

Figure 48:
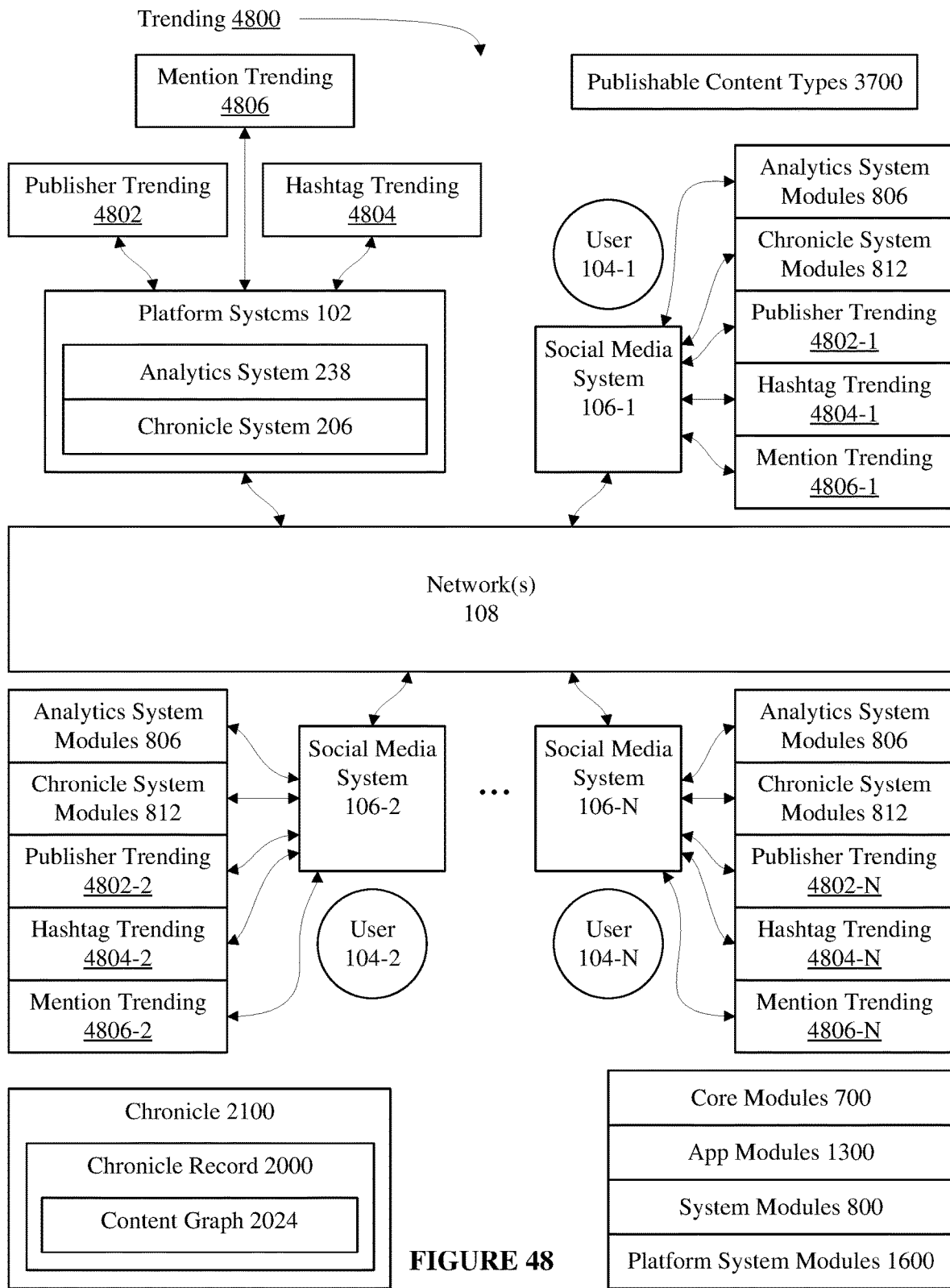
FIG. 48 is a block diagram of Trending.

FIG. 48 is a block diagram of Trending 4800 which illustrates the trending functionality of the platform. Social Media System 106-1 for User 104-1 utilizes Analytics System Modules 806 and Chronicle System Modules 812 to generate Publisher Trending 4802-1, Hashtag Trending 4804-1, and Mention Trending 4806-1. Social Media System 106-2 for User 104-2 utilizes Analytics System Modules 806 and Chronicle System Modules 812 to generate Publisher Trending 4802-2, Hashtag Trending 4804-2, and Mention Trending 4806-2. Social Media System 106-N for User 104-N utilizes Analytics System Modules 806 and Chronicle System Modules 812 to generate Publisher Trending 4802-N, Hashtag Trending 4804-N, and Mention Trending 4806-N. The ellipse between Social Media System 106-2 and Social Media System 106-N illustrates that there are N number of social media systems for every user on the network. Social Media System 106-1 to Social Media System 106-N connects to Platform Systems 102 via Network(s) 108. Platform Systems 102 utilizes Analytics System 238 and Chronicle System 206 to generate Publisher Trending 4802, Hashtag Trending 4804, and Mention Trending 4806. Social Media System 106-1 to Social Media System 106-N and Platform Systems 102 may interact with Chronicle 2100, Chronicle Record 2000, Content Graph 2024 and Publishable Content Types 3700 for trending. Additionally, Content Graph 2024 illustrates that Content 2912, License 2914, Copyright 2916, Subject Headings 2918, Subdivisions 2920, Classification 2922 and Catalog 2924 nodes in FIG. 29 can also be included in trending. Core Modules 700 are used for any cross-cutting concerns for Social Media System 106-1 to Social Media System 106-N, Platform Systems 102, App Modules 1300, System Modules 800, and Platform System Modules 1600 as well as all trending functionality.

Given the distributed nature of the platform, every Social Media System 106 in FIG. 1 is able to generate its own trending data, allowing for unique trending that is bottom up. All published content and their related Publishable Content Types 3700 can be used for trending analysis as well as the location of Social Media System 106 and any relevant metadata about Social Media System 106's content. This approach is superior to current approaches because the algorithms that centralized social media networks utilize to determine content distribution skew the user's knowledge of and interaction with the content that the algorithms display to them as well as the content that is not displayed to them. Distributed Social Media Network 300 in FIG. 3 enables users to view all of the content from all social media systems that they have a connection with, therefore users see all the content and have a choice about what content they want to interact with. This provides for a much more accurate trending analysis. Furthermore, since trending can be aggregated by combining trends from all social media systems in Distributed Social Media Network 300 in FIG. 3, the inherent flaw of trending feedback loop in existing trending technologies is mitigated. Current social media networks have demonstrated a bias in promoting trends that propagate "right" think and punish "wrong" think. They also use trending to suppress freedom of speech. With Trending 4800, a true representation of user interaction with content is captured, and Chronicle 2100 in FIG. 21 ensures Complete Transparency 3604 in FIG. 36.

Figure 49:
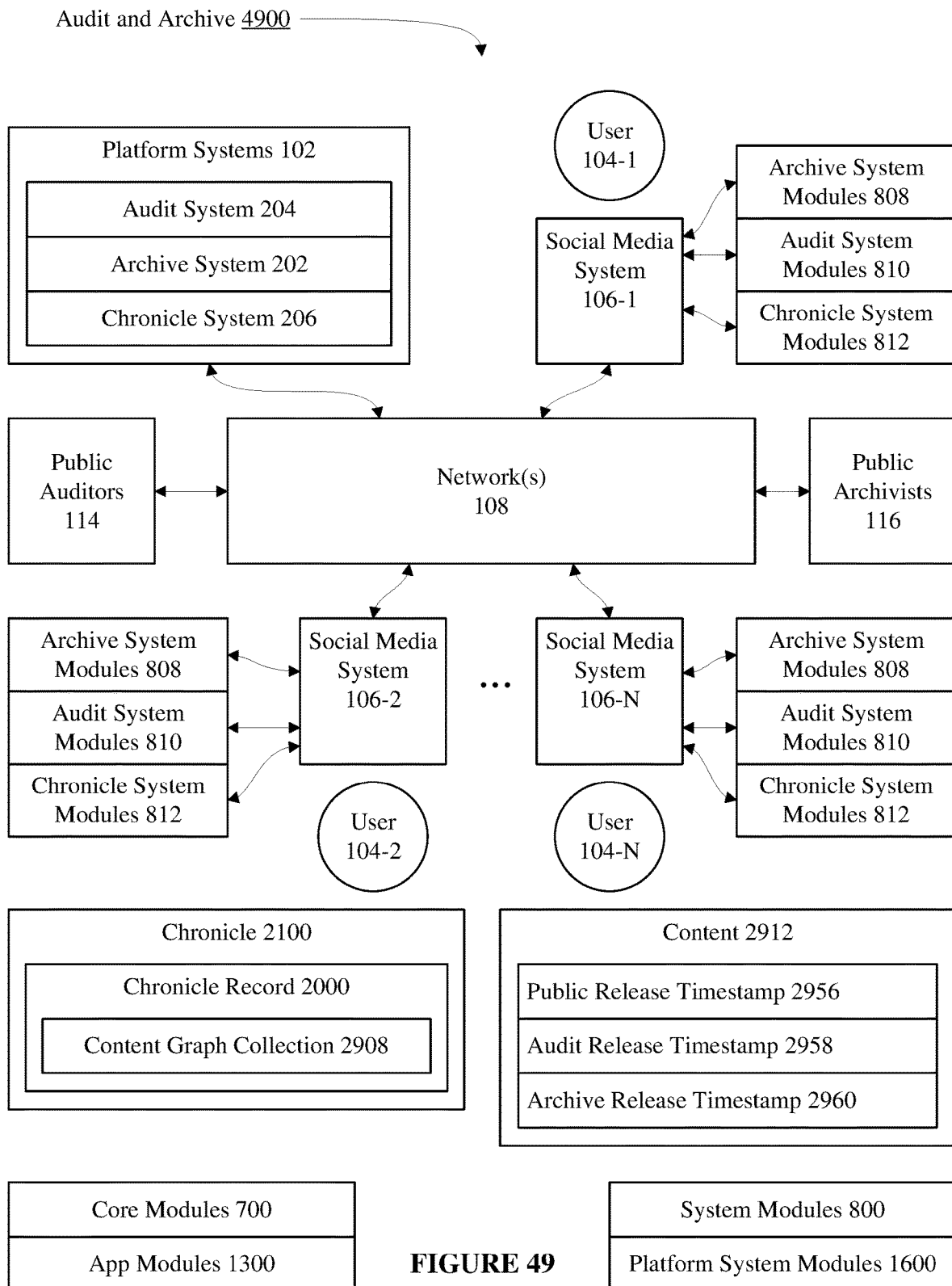
FIG. 49 is a block diagram of Audit and Archive.

FIG. 49 is a block diagram of Audit and Archive 4900 which illustrates the audit and archive functionality of the platform. Social Media System 106-1 for User 104-1 utilizes Archive System Modules 808, Audit System Modules 810, and Chronicle System Modules 812. Social Media System 106-2 for User 104-2 utilizes Archive System Modules 808, Audit System Modules 810, and Chronicle System Modules 812. Social Media System 106-N for User 104-N utilizes Archive System Modules 808, Audit System Modules 810, and Chronicle System Modules 812. The ellipse between Social Media System 106-2 and Social Media System 106-N illustrates that there are N number of social media systems for every user on the network which connect via Network(s) 108. Social Media System 106-1 to Social Media System 106-N also connect to Platform Systems 102, Public Auditors 114, and Public Archivists 116 via Network(s) 108. Platform Systems 102 utilizes Audit System 204, Archive System 202, and Chronicle System 206. Social Media System 106-1 to Social Media System 106-N and Platform Systems 102 may interact with Chronicle 2100 which contains Chronicle Record 2000 and Content Graph Collection 2908 for auditing and archiving. They also interact with Content 2912 which contains the properties Public Release Timestamp 2956, Audit Release Timestamp 2958, and Archive Release Timestamp 2960. Core Modules 700 are used for any cross-cutting concerns for Social Media System 106-1 to Social Media System 106-N, Platform Systems 102, App Modules 1300, System Modules 800, and Platform System Modules 1600, as well as all interactions and functionality with Public Auditors 114 and Public Archivists 116.

Public Release Timestamp 2956, Audit Release Timestamp 2958, and Archive Release Timestamp 2960 are critical to this workflow because they are used to determine when content is released to public, released for auditing, and released for archiving by Platform Systems 102 via Audit System 204 and Archive System 202 as well as by Social Media System 106-1 to Social Media System 106-N via Audit System Modules 810 and Archive System Modules 808. When content is released to public, all social media systems on Distributed Social Media Network 300 in FIG. 3 have access to the content. When content is released for audit, Public Auditors 114 can audit the content. When content is released for archive, Public Archivists 116 can archive the content.

During a public audit, each Chronicle Record 2000 and its Content Graph Collection 2908 are inspected and hashing calculations are verified. Since each Chronicle Record 2000 is fully traceable, all users associated with the content plus all additions and changes to the content are known. The calculated hashes contained therein lend immutability to each of the graphs and each property of the record. Published content is also released to Public Archivists 116, such as governments, libraries, and religious organizations that used to be the keepers of important public information before the digital revolution. This creates a permanency to all content that is published on Distributed Social Media Network 300 in FIG. 3.

These unique features of embodiments of the present technology illustrate how Chronicle 2100 in FIG. 21 is a source of record which can be used to instill integrity of data within the public trust. Published content that is traceable and immutable, confirmed by Public Auditors 114 and stored permanently with Public Archivists 116 outside of the platform, creates a level of transparency and accountability that is not possible with current social media networks.

Figure 50:
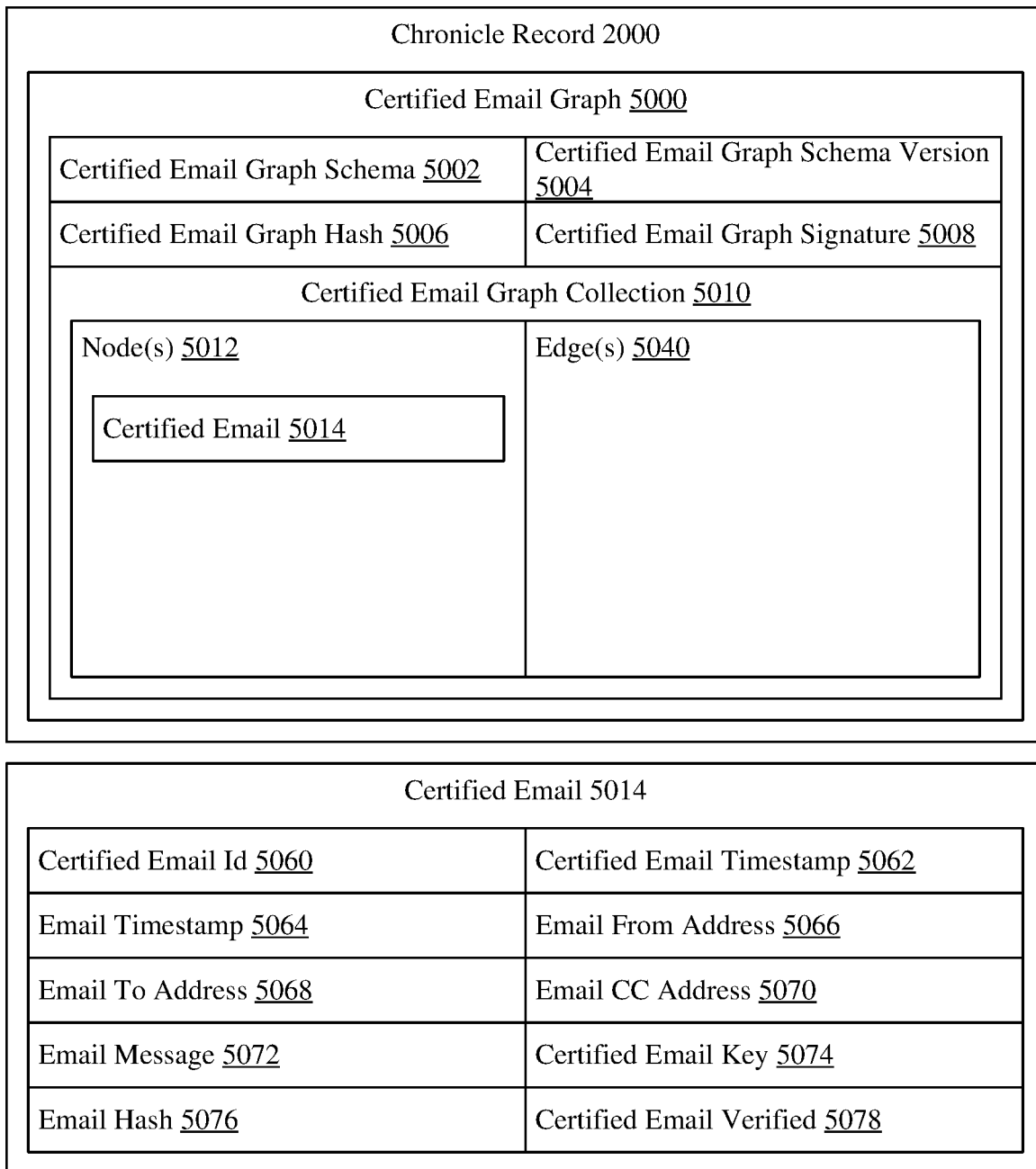
FIG. 50 is a block diagram of a Chronicle Record.

FIG. 50 is a block diagram of Chronicle Record 2000 which is comprised of Certified Email Graph 5000. Certified Email Graph 5000, which descends from Base Graph 2050 in FIG. 20, consists of Certified Email Graph Schema 5002, Certified Email Graph Schema Version 5004, Certified Email Graph Hash 5006, and Certified Email Graph Signature 5008. It also consists of Certified Email Graph Collection 5010 which contains Node(s) 5012 and Edge(s) 5040. Node(s) 5012 consists of Certified Email 5014. Certified Email 5014 has the properties Certified Email Id 5060, Certified Email Timestamp 5062, Email Timestamp 5064, Email From Address 5066, Email To Address 5068, Email CC Address 5070, Email Message 5072, Certified Email Key 5074, Email Hash 5076, and Certified Email Verified 5078. This diagram illustrates that email certification exists within Chronicle Record 2000.

Figure 51:
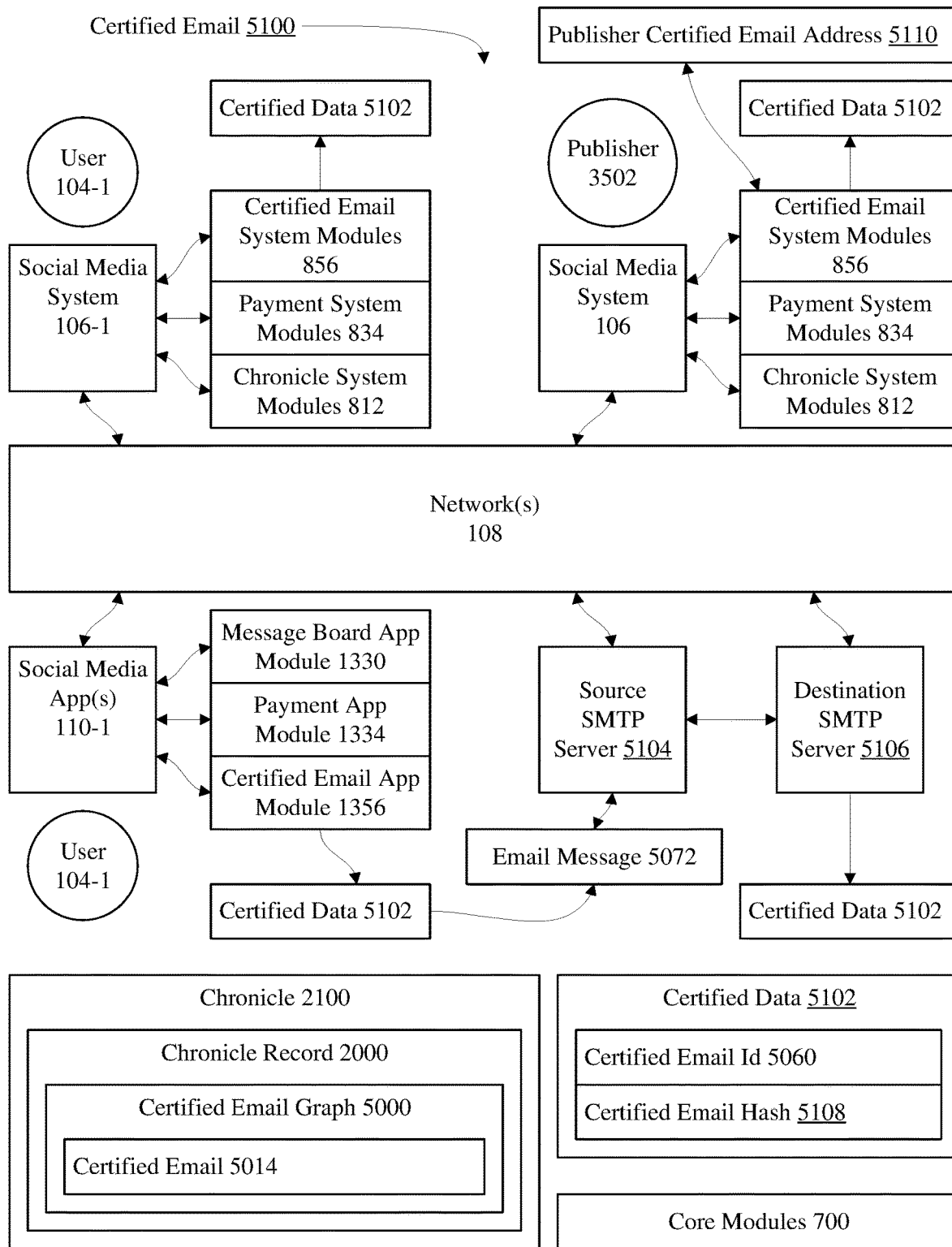
FIG. 51 is a block diagram of a Certified Email.

FIG. 51 is a block diagram of Certified Email 5100 which illustrates the certified email functionality of the platform, specifically certifying the authenticity of an email from one user to another. Certified Email 5100 is comprised of Chronicle 2100 which contains Chronicle Record 2000 which consists of Certified Email Graph 5000 which contains Certified Email 5014. It is also comprised of Certified Data 5102 which contains Certified Email Id 5060 and Certified Email Hash 5108 as well as Core Modules 700 which provides all the cross-cutting functionality for Certified Email 5100. Social Media App(s) 110-1 for User 104-1 utilizes Message Board App Module 1330, Payment App Module 1334, and Certified Email App Module 1356. Certified Email App Module 1356 utilizes Certified Data 5102 and Email Message 5072. Email Message 5072 is associated to Source SMTP Server 5104 which is connected to Destination SMTP Server 5106 which is associated to Certified Data 5102. Social Media System 106-1 for User 104-1 utilizes Chronicle System Modules 812, Payment System Modules 834, and Certified Email System Modules 856. Certified Email System Modules 856 utilizes Certified Data 5102. Social Media System 106 for Publisher 3502 utilizes Chronicle System Modules 812, Payment System Modules 834, and Certified Email System Modules 856. Certified Email System Modules 856 utilizes Certified Data 5102 and Publisher Certified Email Address 5110. User 104-1's Social Media App(s) 110-1 and Social Media System 106-1 interface with Publisher 3502's Social Media System 106, Source SMTP Server 5104, and Destination SMTP Server 5106 via Network(s) 108.

User 104-1 uses their Social Media App(s) 110-1 and its connected Payment App Module 1334 and Certified Email App Module 1356 to arrange payment via Publisher 3502's Social Media System 106 and its connected Payment System Modules 834 and Certified Email System Modules 856. Once payment is arranged, Certified Email System Modules 856 generates Certified Email 5014 containing Certified Email Id 5060 in FIG. 50, Certified Email Timestamp 5062 in FIG. 50, and Email Timestamp 5064 in FIG. 50. Then it creates Certified Data 5102 with Certified Email Id 5060 in FIG. 50 and calculates Certified Email Hash 5108 of Certified Email Id 5060 in FIG. 50, Certified Email Timestamp 5062 in FIG. 50, and Email Timestamp 5064 in FIG. 50. Certified Email System Modules 856 then sends Certified Email 5014 back to User 104-1 with Publisher Certified Email Address 5110. User 104-1 then takes Certified Data 5102 and appends it to Email Message 5072. User 104-1 adds Publisher Certified Email Address 5110 to the cc: or bcc: address of Email Message 5072 which is then sent to the destination email address(es) via the associated Source SMTP Server 5104 to Destination SMTP Server 5106. Publisher 3502's Certified Email System Modules 856 upon receiving the email, adds the email timestamp to Email Timestamp 5064 in FIG. 50, any email to addresses to Email To Address 5068 in FIG. 50, the email from address to Email From Address 5066 in FIG. 50, and any email cc: addresses to Email CC Address 5070 in FIG. 50. The email message data is added to Email Message 5072. Certified Email Graph 5000 and its associated Chronicle Record 2000 on FIG. 50 are then submitted for Consensus by Conference 3800 in FIG. 38 and added to Chronicle 2100.

Figure 52:
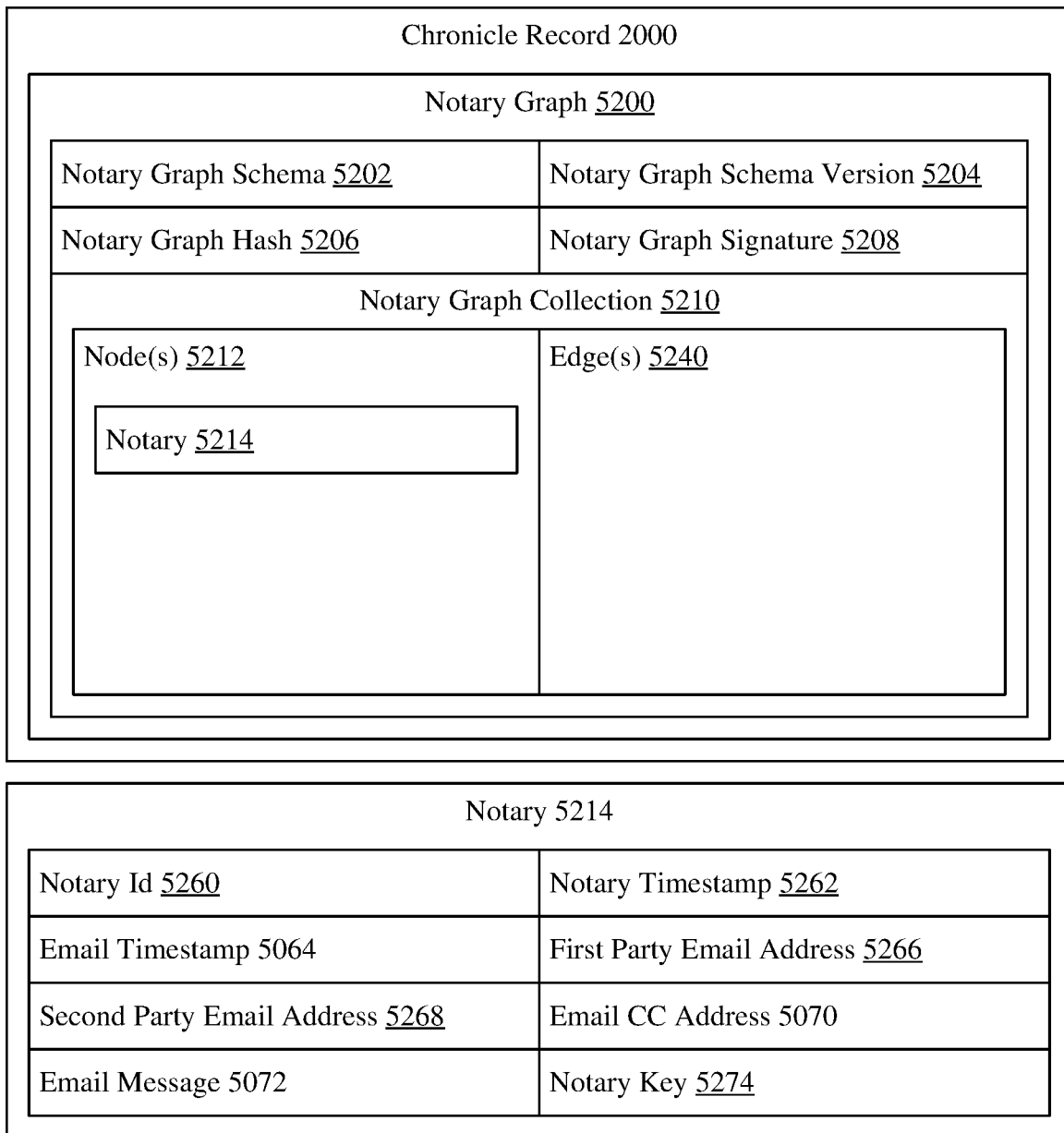
FIG. 52 is a block diagram of a Chronicle Record.

FIG. 52 is a block diagram of Chronicle Record 2000 which is comprised of Notary Graph 5200. Notary Graph 5200, which descends from Base Graph 2050 in FIG. 20, consists of Notary Graph Schema 5202, Notary Graph Schema Version 5204, Notary Graph Hash 5206, and Notary Graph Signature 5208. Notary Graph 5200 also consists of Notary Graph Collection 5210 which contains Node(s) 5212 and Edge(s) 5240. Node(s) 5212 consists of Notary 5214. Notary 5214 has the properties Notary Id 5260, Notary Timestamp 5262, Email Timestamp 5064, First Party Email Address 5266, Second Party Email Address 5268, Email CC Address 5070, Email Message 5072, and Notary Key 5274. This diagram illustrates that a notarized transaction exists within Chronicle Record 2000.

Figure 53:
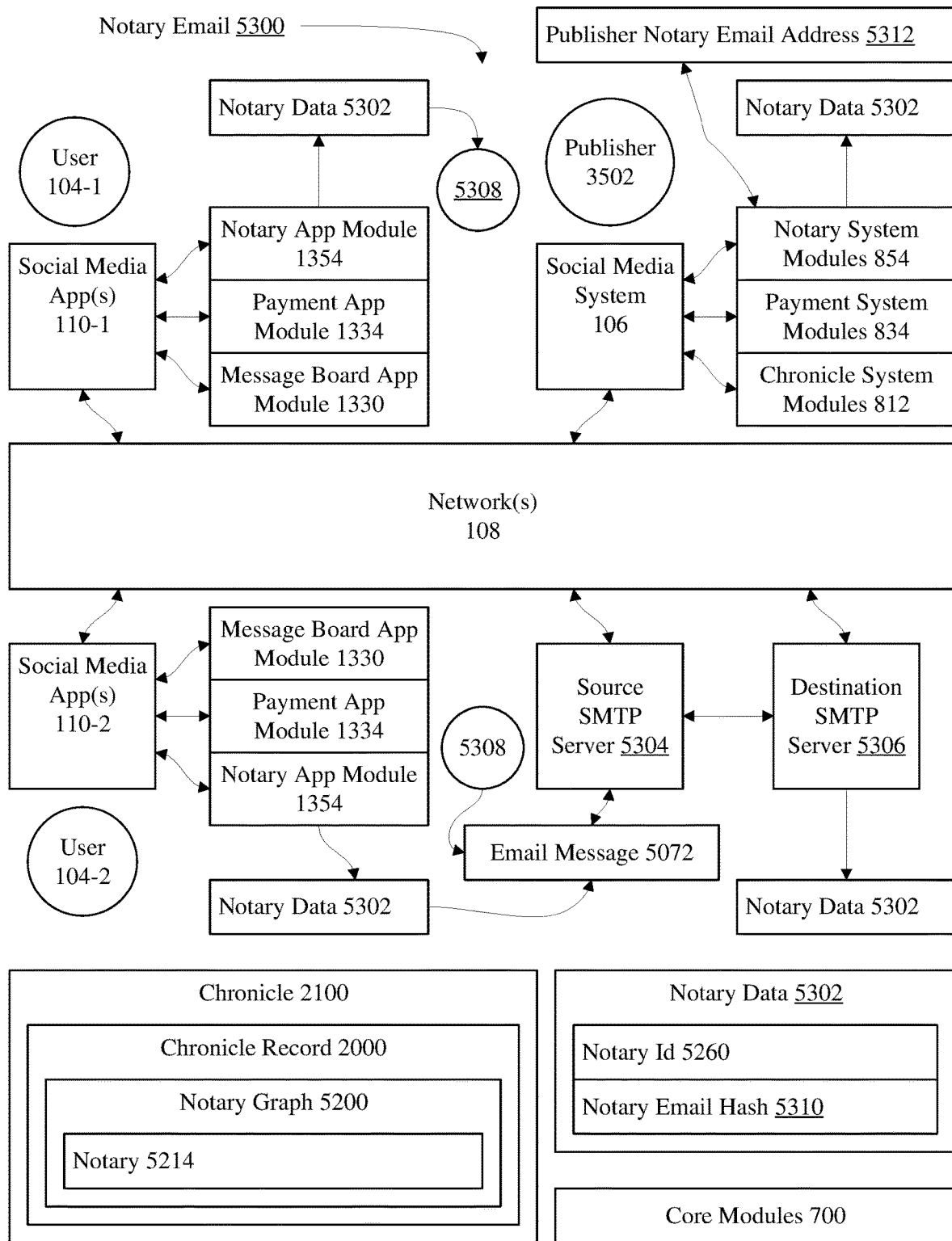
FIG. 53 is a block diagram of a Notary Email.

FIG. 53 is a block diagram of Notary Email 5300 which illustrates the notary services functionality of the platform. User 104-1 and User 104-2 are entering into an agreement and need the use of a notary service. Because chronicle records are immutable, traceable and part of the permanent public record, publishers can perform notary services over email. In one embodiment of the invention, the data is encrypted and not available for public access. In another embodiment of the invention, the data is not encrypted and available for public auditing and archiving.

Notary Email 5300 is comprised of Chronicle 2100 which contains Chronicle Record 2000 which consists of Notary Graph 5200 which contains the node Notary 5214. Notary Email 5300 is also comprised of Notary Data 5302 which contains Notary Id 5260 and Notary Email Hash 5310 as well as Core Modules 700 which provides all the cross-cutting functionality for Notary Email 5300. Social Media App(s) 110-1 for User 104-1 utilizes Message Board App Module 1330, Payment App Module 1334, and Notary App Module 1354. Notary App Module 1354 utilizes Notary Data 5302 which is associated to transitional element 5308 which is associated to Email Message 5072. Email Message 5072 is associated to Source SMTP Server 5304 which is connected to Destination SMTP Server 5306 which is associated to Notary Data 5302. Social Media App(s) 110-2 for User 104-2 utilizes Message Board App Module 1330, Payment App Module 1334, and Notary App Module 1354. Notary App Module 1354 utilizes Notary Data 5302 which is associated to Email Message 5072. Email Message 5072 is associated to Source SMTP Server 5304 which is connected to Destination SMTP Server 5306 which is associated to Notary Data 5302. Social Media System 106 for Publisher 3502 utilizes Chronicle System Modules 812, Payment System Modules 834, and Notary System Modules 854. Notary System Modules 854 utilizes Notary Data 5302 and Publisher Notary Email Address 5312. User 104-1's Social Media App(s) 110-1 and User 104-2's Social Media App(s) 110-2 interface with Publisher 3502's Social Media System 106, Source SMTP Server 5104, and Destination SMTP Server 5106 via Network(s) 108.

User 104-1 utilizes Payment App Module 1334 and Notary App Module 1354 to arrange payment with Publisher 3502 which utilizes Payment System Modules 834 and Notary System Modules 854. After payment is made, User 104-1 uses Notary App Module 1354 to submit First Party Email Address 5266 in FIG. 52 and Second Party Email Address 5268 in FIG. 52 to Publisher 3502 via Notary System Modules 854. Notary System Modules 854 then generates Chronicle Record 2000, Notary Graph 5200, and Notary 5214 consisting of Notary Id 5260 in FIG. 52, Notary Timestamp 5262 in FIG. 52, and Notary Key 5274 in FIG. 52. It also generates Notary Email Hash 5310. Notary Data 5302 containing Notary Id 5260 and Notary Email Hash 5310 along with Publisher Notary Email Address 5312 is sent back to User 104-1's Notary App Module 1354. User 104-1 then takes Notary Data 5302 and appends Email Message 5072 via transitional element 5308. Email Message 5072 contains the content of the email and any associated attachments such as executed documents. User 104-1 ensures that the "from" address on the email message is First Party Email Address 5266 in FIG. 52. User 104-1 puts Second Party Email Address 5268 in FIG. 52 into the "to" address on the email message and Publisher Notary Email Address 5312 into Email CC Address 5070 in FIG. 50. The email is then sent via Source SMTP Server 5304 to Destination Server 5306 along with Notary Data 5302 appended to Email Message 5072. Publisher 3502 upon receiving Email Message 5072 then appends the email message data and attachments to Email Message 5072.

Publisher 3502 then submits Chronicle Record 2000 containing Notary Graph 5200 with the completed Notary 5214 node to Consensus by Conference 3800 in FIG. 38. Upon consensus, the first party and second party are both notified of the first party's notarization via Notary App Module 1354 or by email. Upon receiving the email confirming the notarization of the first party's content from Publisher 3502, the second party arranges payment and proceeds to notarize their executed documents through the same process utilized by User 104-1 for notarization. After consensus is reached for User 104-2's Chronicle Record 2000, then the first party and second party are sent confirmation of notarization by Publisher 3502 and the process is complete. Chronicle 2100 contains two Chronicle Record 2000, one for the first party and one for the second party as evidence of the notarization.

Figure 54:
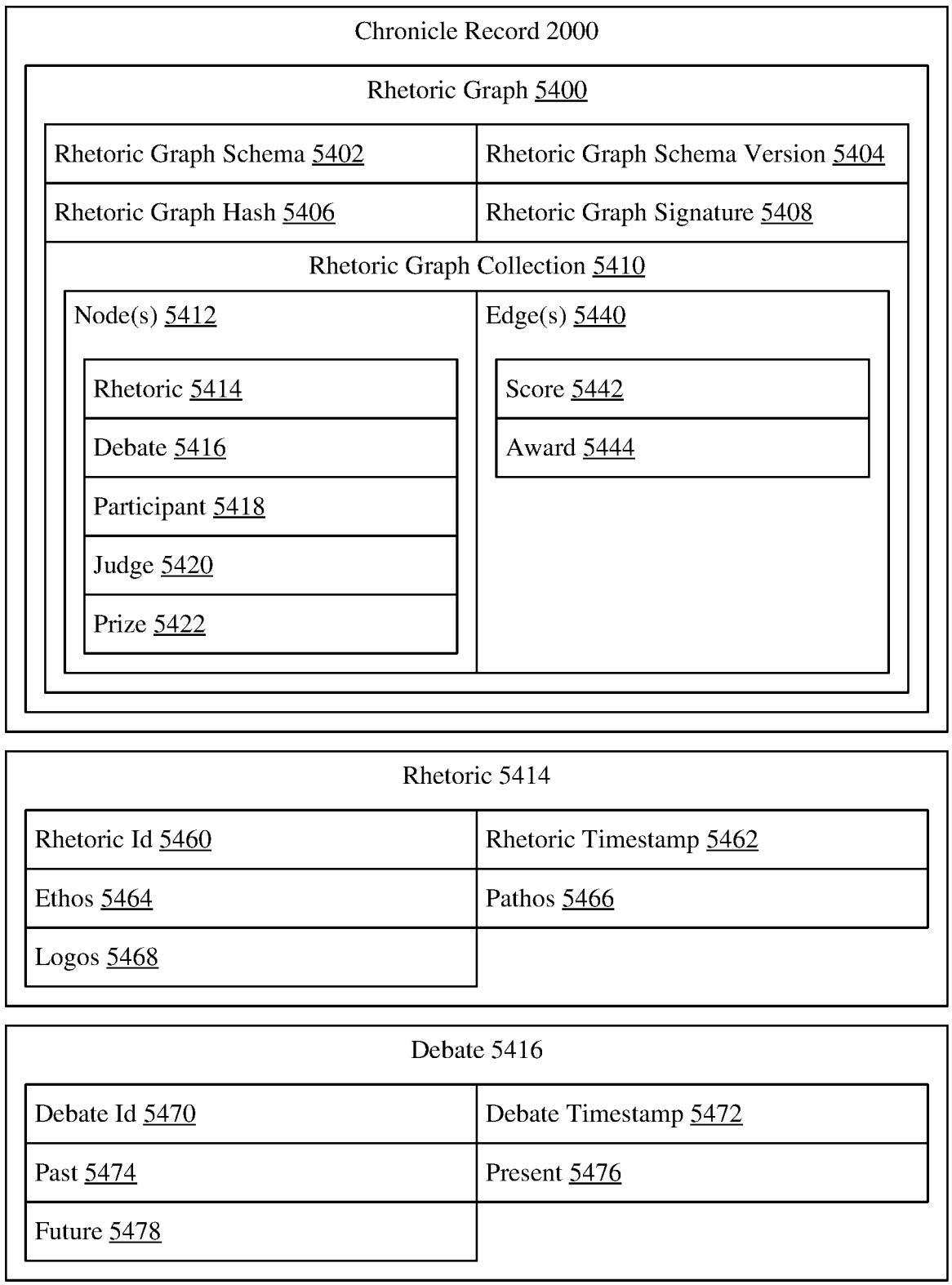
FIG. 54 is a block diagram of a Chronicle Record.

FIG. 54 is a block diagram of Chronicle Record 2000 which is comprised of Rhetoric Graph 5400. Rhetoric Graph 5400, which descends from Base Graph 2050 in FIG. 20, consists of Rhetoric Graph Schema 5402, Rhetoric Graph Schema Version 5404, Rhetoric Graph Hash 5406, and Rhetoric Graph Signature 5408. It also consists of Rhetoric Graph Collection 5410 which contains Node(s) 5412 and Edge(s) 5440. Node(s) 5412 consists of Rhetoric 5414, Debate 5416, Participant 5418, Judge 5420, and Prize 5422. Edge(s) 5440 consists of Score 5442 and Award 5444. Rhetoric 5414 consists of Rhetoric Id 5460, Rhetoric Timestamp 5462, Ethos 5464, Pathos 5466, and Logos 5468. Debate 5416 consists of Debate Id 5470, Debate Timestamp 5472, Past 5474, Present 5476, and Future 5478. This diagram illustrates that rhetoric exists within Chronicle Record 2000.

Figure 55:
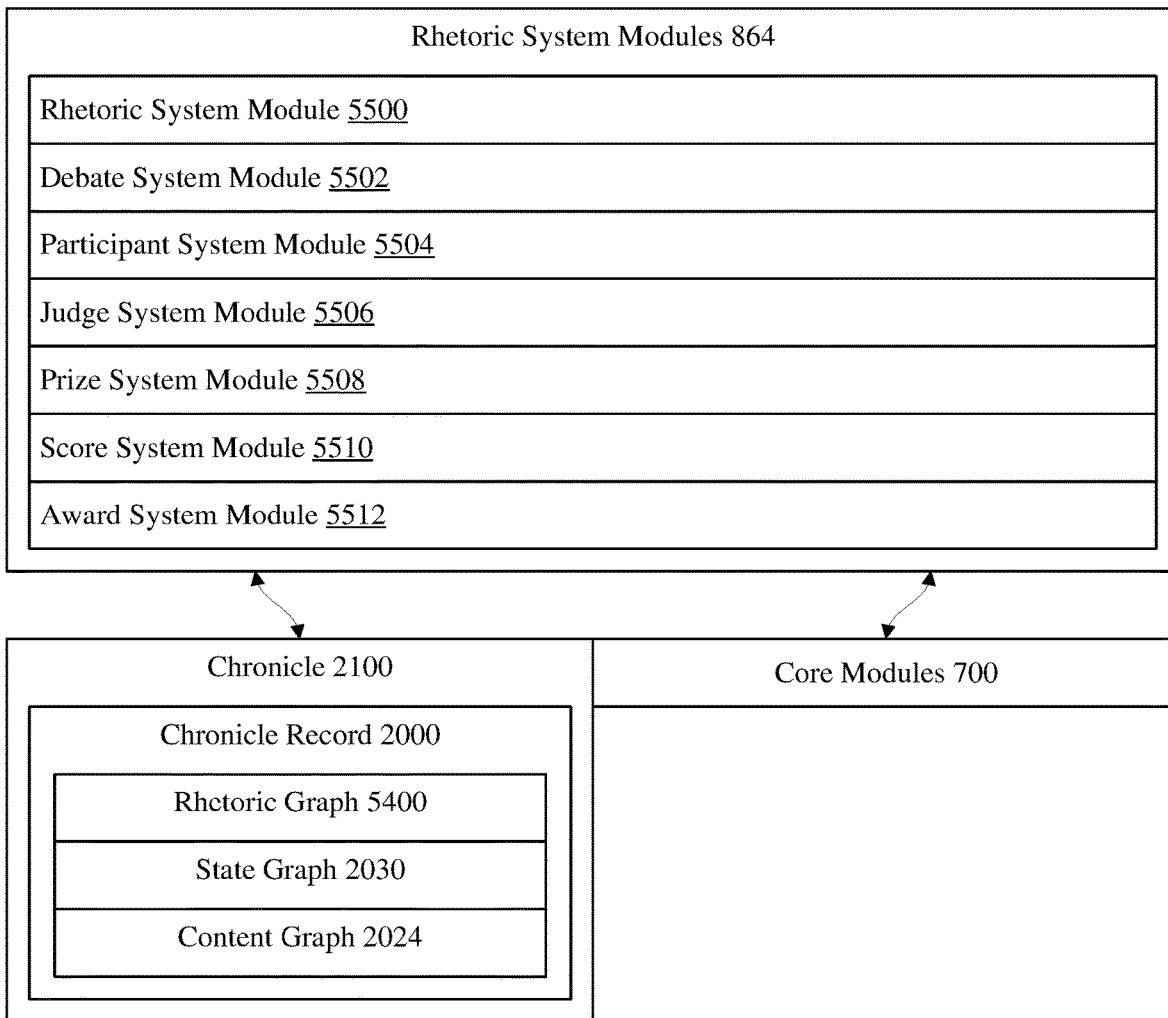
FIG. 55 is a block diagram of Rhetoric System Modules.

FIG. 55 is a block diagram of Rhetoric System Modules 864 which is comprised of Rhetoric System Module 5500, Debate System Module 5502, Participant System Module 5504, Judge System Module 5506, Prize System Module 5508, Score System Module 5510, and Award System Module 5512. These system modules represent the functionality required for Social Media System 106 in FIG. 1 to work with a rhetoric data set which consists of Chronicle Record 2000 along with Rhetoric Graph 5400, State Graph 2030 and Content Graph 2024 inside Chronicle 2100. All new rhetoric is stored in Chronicle Record 2000, specifically in Rhetoric Graph 5400, which is able to track state via State Graph 2030 and is associated to Content Graph 2024. Rhetoric System Modules 864 also interacts with Core Modules 700 which provides all the cross-cutting functionality for Rhetoric System Modules 864.

Figure 56:
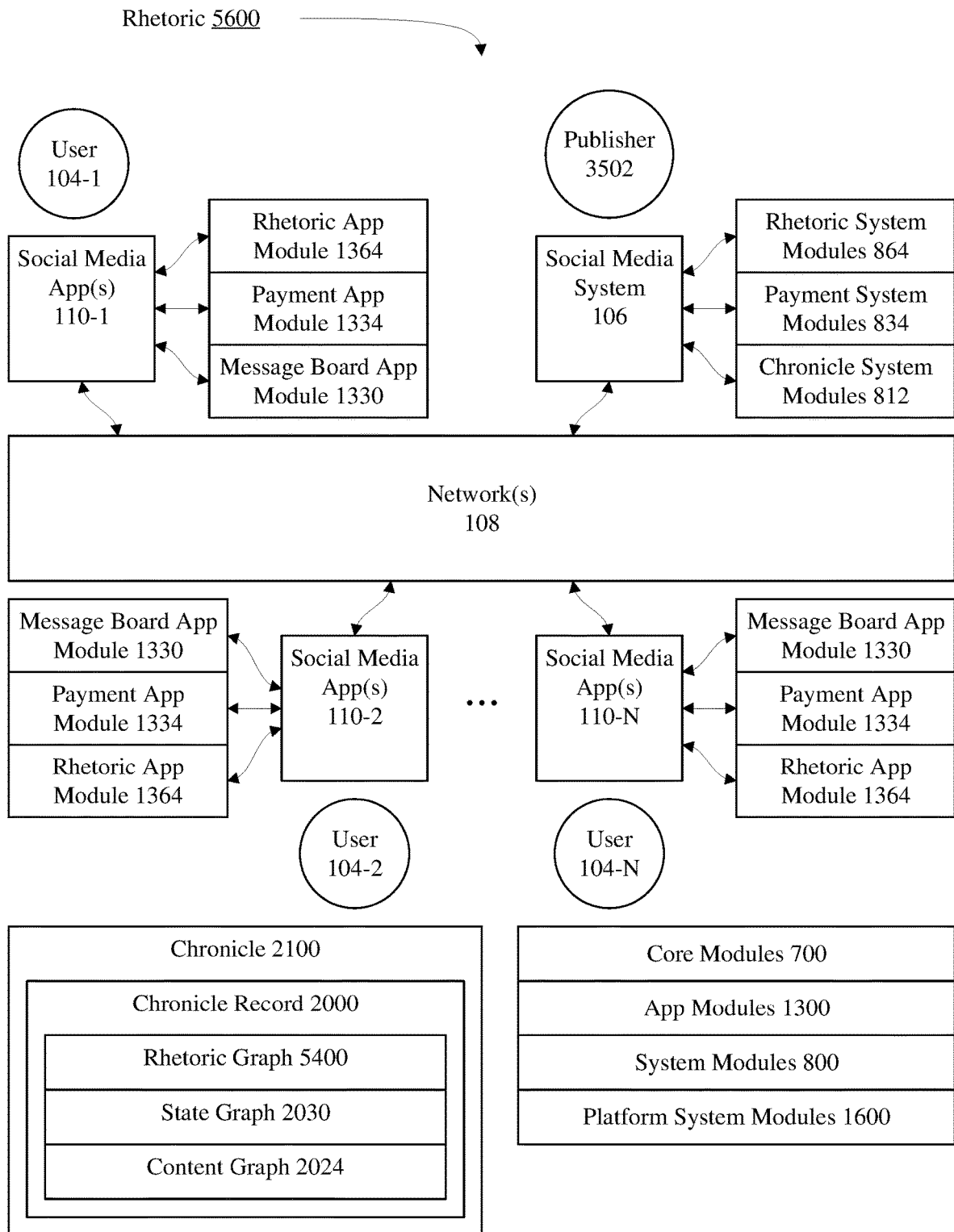
FIG. 56 is a block diagram of Rhetoric.

FIG. 56 is a block diagram of Rhetoric 5600 which illustrates the rhetoric functionality of the platform. User 104 in FIG. 1 has two options for responding to published content on Distributed Social Media Network 300 in FIG. 3. They can post comments to their connections and groups via Post 3400 in FIG. 34. This type of response is informal and can be deleted since the comments reside exclusively on User 104's Social Media System 106 in FIG. 1. User 104 can also respond to published content by publishing Rhetoric 3736 in FIG. 37. This type of response is formal and can be recanted, but not deleted, as it becomes part of the permanent public record. Rhetoric must inform, persuade or motivate in a civil manner. No shit posting or trolling is allowed. Rhetoric is managed by publishers, which creates economies of scale and distributed monitoring at the micro level. This stands in stark contrast to what exists with centralized social media networks, namely ineffective use of AI, bots and cubicles full of millennials trying to monitor speech at the macro level.

Rhetoric 5600 is comprised of Chronicle 2100 which consists of Chronicle Record 2000 which contains Rhetoric Graph 5400, State Graph 2030 and Content Graph 2024. User 104-1 has Social Media App(s) 110-1 which utilizes Message Board App Module 1330, Payment App Module 1334, and Rhetoric App Module 1364. User 104-2 has Social Media App(s) 110-2 which utilizes Message Board App Module 1330, Payment App Module 1334, and Rhetoric App Module 1364. User 104-N has Social Media App(s) 110-N which utilizes Message Board App Module 1330, Payment App Module 1334, and Rhetoric App Module 1364. The ellipse Social Media App(s) 110-2 and Social Media App(s) 110-N illustrates that there are N number of social media apps for every user on the network. Social Media App(s) 110-1, Social Media App(s) 110-2, and Social Media App(s) 110-N connect to Social Media System 106 for Publisher 3502 via Network(s) 108. Social Media System 106 utilizes Chronicle System Modules 812, Payment System Modules 834, and Rhetoric System Modules 864. Rhetoric 5600 is also comprised of Core Modules 700 which is used for any cross-cutting concerns across for Social Media App(s) 110-1 to Social Media App(s) 110-N, Social Media System 106, App Modules 1300, System Modules 800, and Platform System Modules 1600 as well as all rhetoric functionality.

This diagram illustrates how User 104-1 to User 104-N to can connect to Publisher 3502's Social Media System 106 to engage in rhetoric or debate that becomes part of the permanent public record via Chronicle 2100. Publisher 3502 may or may not charge users to participate. The intention is to create a structure for civil discourse and further solve the problem of fake news in a unique way. Users have the opportunity to express points and counterpoints as well as actually document their points and counterpoints as part of their participation. All rhetoric is vetted by Publisher 3502 as part of Publish 4400 in FIG. 44, so sources matter. Users are not able to just throw out unsupported or unsubstantiated information. In another embodiment of the invention, Publisher 3502 can utilize gamification features and introduce Judge 5420, Prize 5422, Scoring 5442 and Awards 5444 in FIG. 54.

Figure 57:
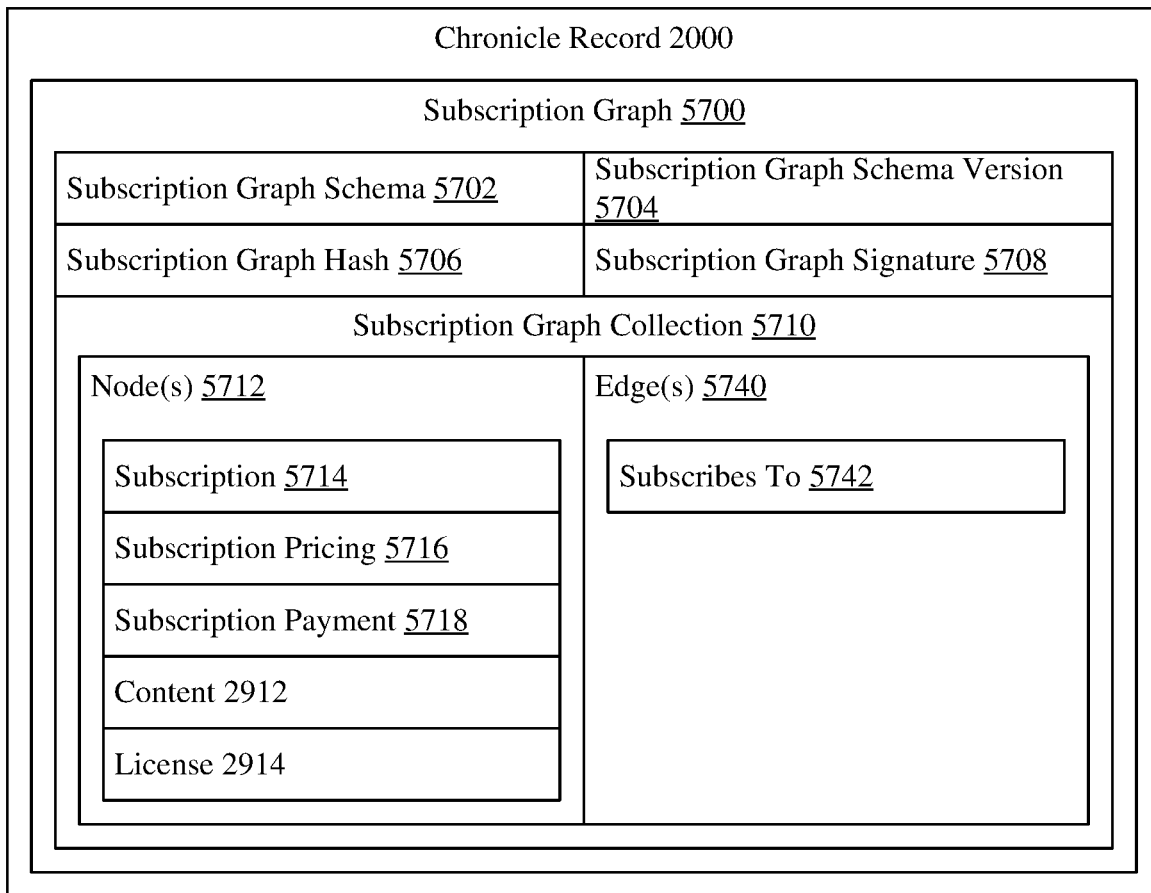
FIG. 57 is a block diagram of a Chronicle Record.

FIG. 57 is a block diagram of Chronicle Record 2000 which is comprised of Subscription Graph 5700. Subscription Graph 5700, which descends from Base Graph 2050 in FIG. 20, consists of Subscription Graph Schema 5702, Subscription Graph Schema Version 5704, Subscription Graph Hash 5706, and Subscription Graph Signature 5708. It also consists of Subscription Graph Collection 5710 which contains Node(s) 5712 and Edge(s) 5740. Node(s) 5712 consists of Subscription 5714, Subscription Pricing 5716, Subscription Payment 5718, Content 2912, and License 2914. Edge(s) 5740 consists of Subscribes To 5742. This diagram illustrates that subscriptions exist within Chronicle Record 2000.

Figure 58:
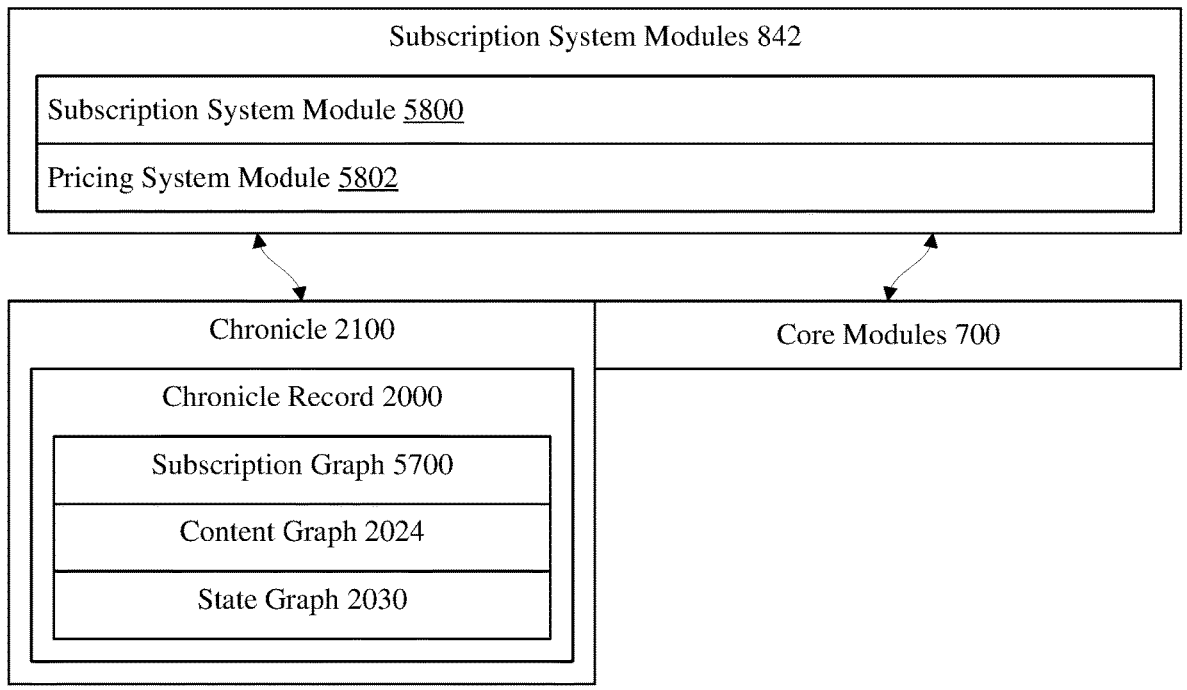
FIG. 58 is a block diagram of Subscription System Modules.

FIG. 58 is a block diagram of Subscription System Modules 842 which is comprised of Subscription System Module 5800 and Pricing System Module 5802. These system modules represent the functionality required for Social Media System 106 in FIG. 1 to work with a subscription data set which consists of Chronicle Record 2000 along with Subscription Graph 5700, Content Graph 2024, and State Graph 2030 inside Chronicle 2100. All new subscriptions are stored in Chronicle Record 2000, specifically in Subscription Graph 5700, which is able to track state via State Graph 2030 and is associated to Content Graph 2024. Subscription System Modules 842 also interacts with Core Modules 700 which provides all the cross-cutting functionality for Subscription System Modules 842.

Figure 59:
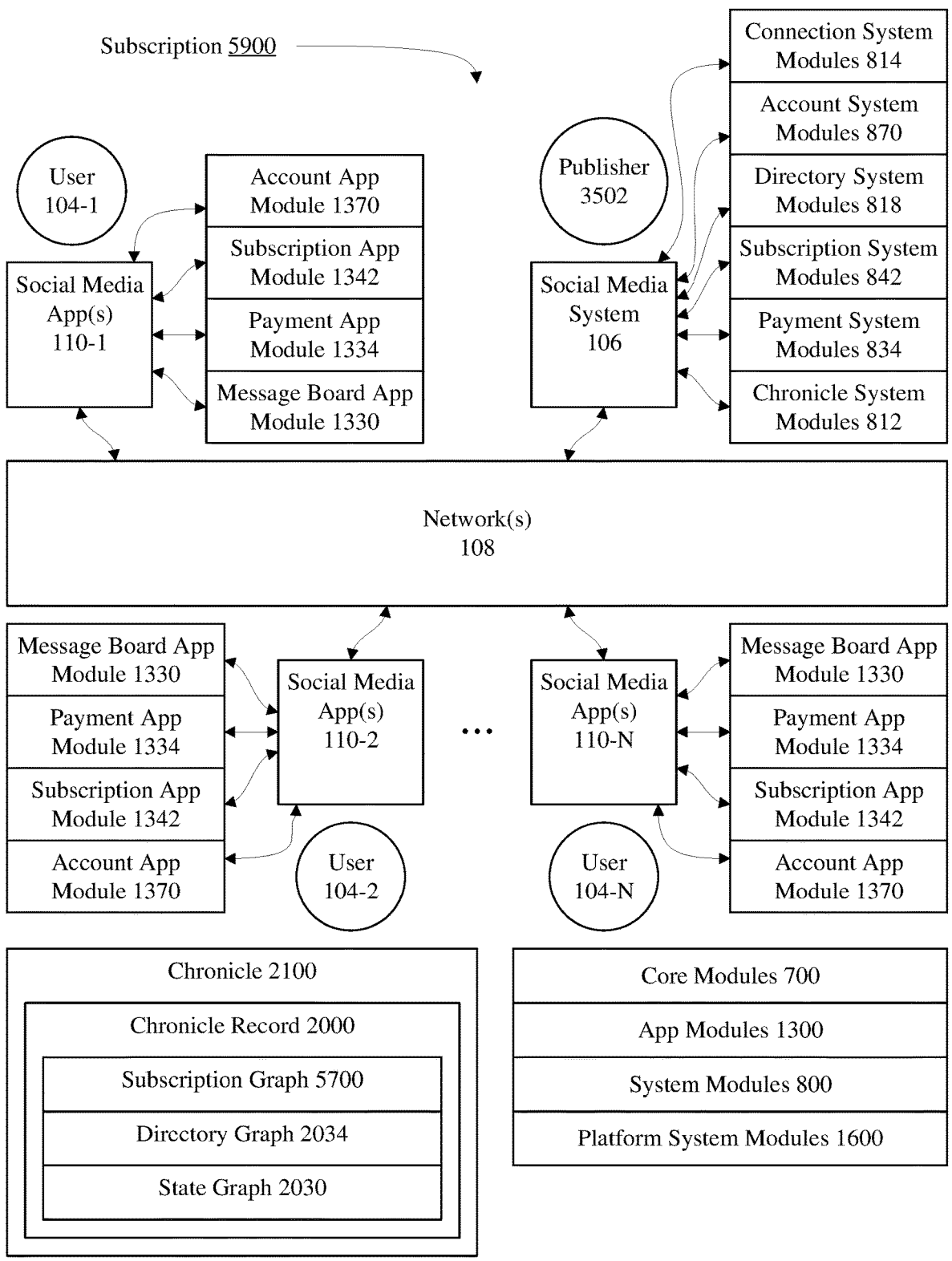
FIG. 59 is a block diagram of Subscription.

FIG. 59 is a block diagram of Subscription 5900 which illustrates the subscription functionality of the platform. Subscription 5900 is comprised of Chronicle 2100 which consists of Chronicle Record 2000 which contains Subscription Graph 5700, Directory Graph 2034, and State Graph 2030. User 104-1 has Social Media App(s) 110-1 which utilizes Message Board App Module 1330, Payment App Module 1334, Subscription App Module 1342, and Account App Module 1370. User 104-2 has Social Media App(s) 110-2 which utilizes Message Board App Module 1330, Payment App Module 1334, Subscription App Module 1342, and Account App Module 1370. User 104-N has Social Media App(s) 110-N which utilizes Message Board App Module 1330, Payment App Module 1334, Subscription App Module 1342, and Account App Module 1370. The ellipse between Social Media App(s) 110-2 and Social Media App(s) 110-N illustrates that there are N number of social media apps for every user on the network. Social Media App(s) 110-1, Social Media App(s) 110-2, and Social Media App(s) 110-N connect to Social Media System 106 for Publisher 3502 via Network(s) 108. Social Media System 106 utilizes Chronicle System Modules 812, Payment System Modules 834, Subscriptions System Modules 842, Directory System Modules 818, Account System Modules 870, and Connection System Modules 814. Subscription 5900 is also comprised of Core Modules 700 which are used for any cross-cutting concerns across Social Media App(s) 110-1 to Social Media App(s) 110-N, Social Media System 106, App Modules 1300, System Modules 800, and Platform System Modules 1600 as well as all subscription functionality.

Social Media App(s) 110-1 for User 104-1 utilizes Message Board App Module 3404, Payment App Module 1334, and Subscription App Module 1342. Subscription App Module 1342 interfaces with Subscription System Modules 842 which provides subscription options and their prices to User 104-1 for Publisher 3502. If User 104-1 decides they want a subscription, then Payment App Module 1334 interfaces with Payment System Modules 834 to make a payment to Publisher 3502. Once payment is made, then Subscription System Modules 842 associates User 104-1 with access to paid content. The same goes for User 104-2 to User 104-N.

This diagram illustrates that publishers can publish both free and paid content on Distributed Social Media Network 300 in FIG. 3. The platform provides a way for them to offer and manage subscriptions, consistent with Level Playing Field 3610 and Users Get Paid for their Content 3628 in FIG.

36. Struggling independent news organizations or content providers can actually run a business on the platform as they now have the technical infrastructure and support necessary to compete with centralized social media networks. This diagram also illustrates that not all chronicles have to go out to the public domain. They can be used for managing aspects of business functionality, like subscriptions, where a publisher needs to have a source of record.

Figure 60:
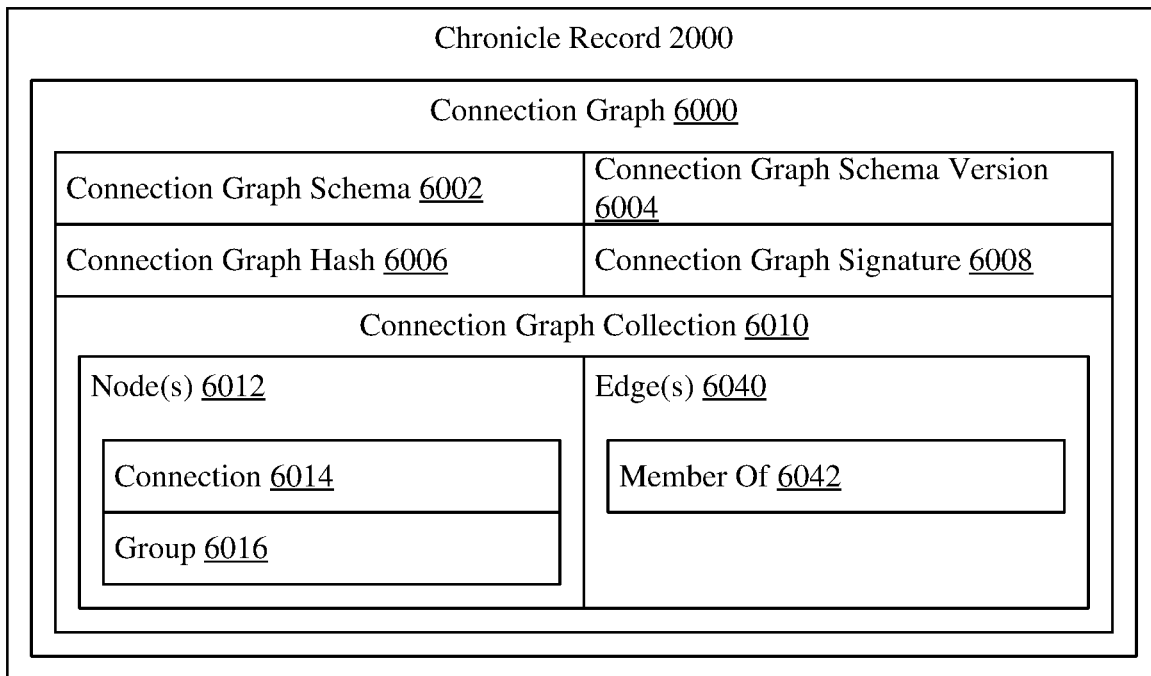
FIG. 60 is a block diagram of a Chronicle Record.

FIG. 60 is a block diagram of Chronicle Record 2000 which is comprised of Connection Graph 6000. Connection Graph 6000, which descends from Base Graph 2050 in FIG. 20, consists of Connection Graph Schema 6002, Connection Graph Schema Version 6004, Connection Graph Hash 6006, and Connection Graph Signature 6008. It also has Connection Graph Collection 6010 which contains Node(s) 6012 and Edge(s) 6040. Node(s) 6012 consists of Connection 6014 and Group 6016. Edge(s) 6040 consists of Member of 6042. This diagram illustrates that connections exist within Chronicle Record 2000.

Figure 61:
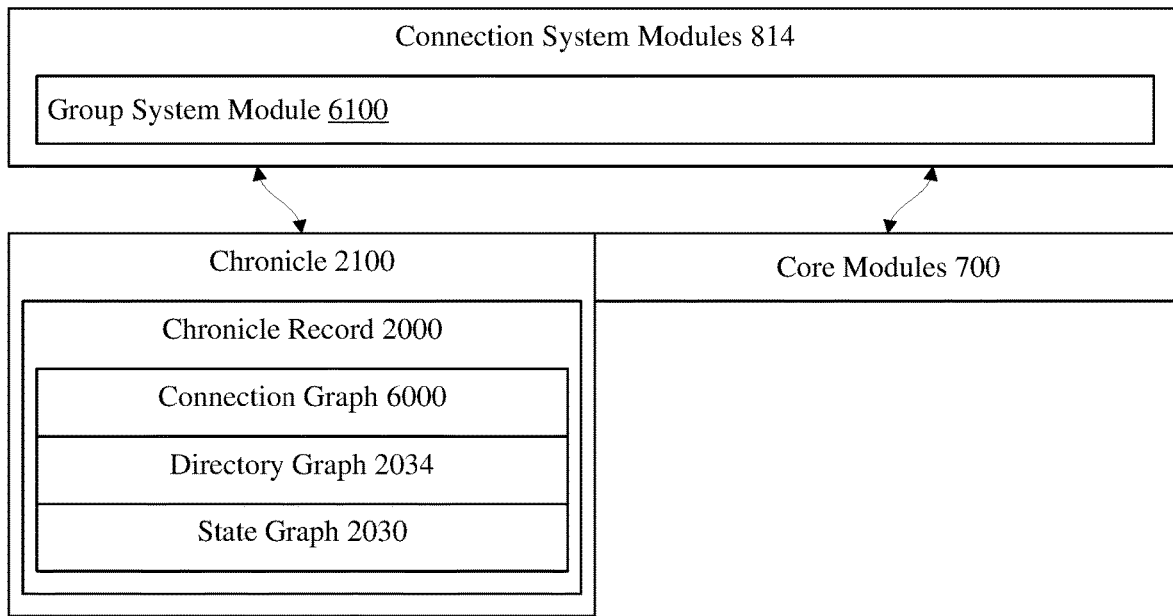
FIG. 61 is a block diagram of Connection System Modules.

FIG. 61 is a block diagram of Connection System Modules 814 which is comprised of Connection System Module 6100. This system module represents the functionality required for Social Media System 106 in FIG. 1 to work with a connection data set which consists of Chronicle Record 2000 along with Connection Graph 6000, Directory Graph 2034, and State Graph 2030 inside Chronicle 2100. All new connections are stored in Chronicle Record 2000, specifically in Connection Graph 6000, which is able to track state via State Graph 2030 and is associated to Directory Graph 2034. Connection System Modules 814 also interacts with Core Modules 700 which provides all the cross-cutting functionality for Connection System Modules 814.

Figure 62:
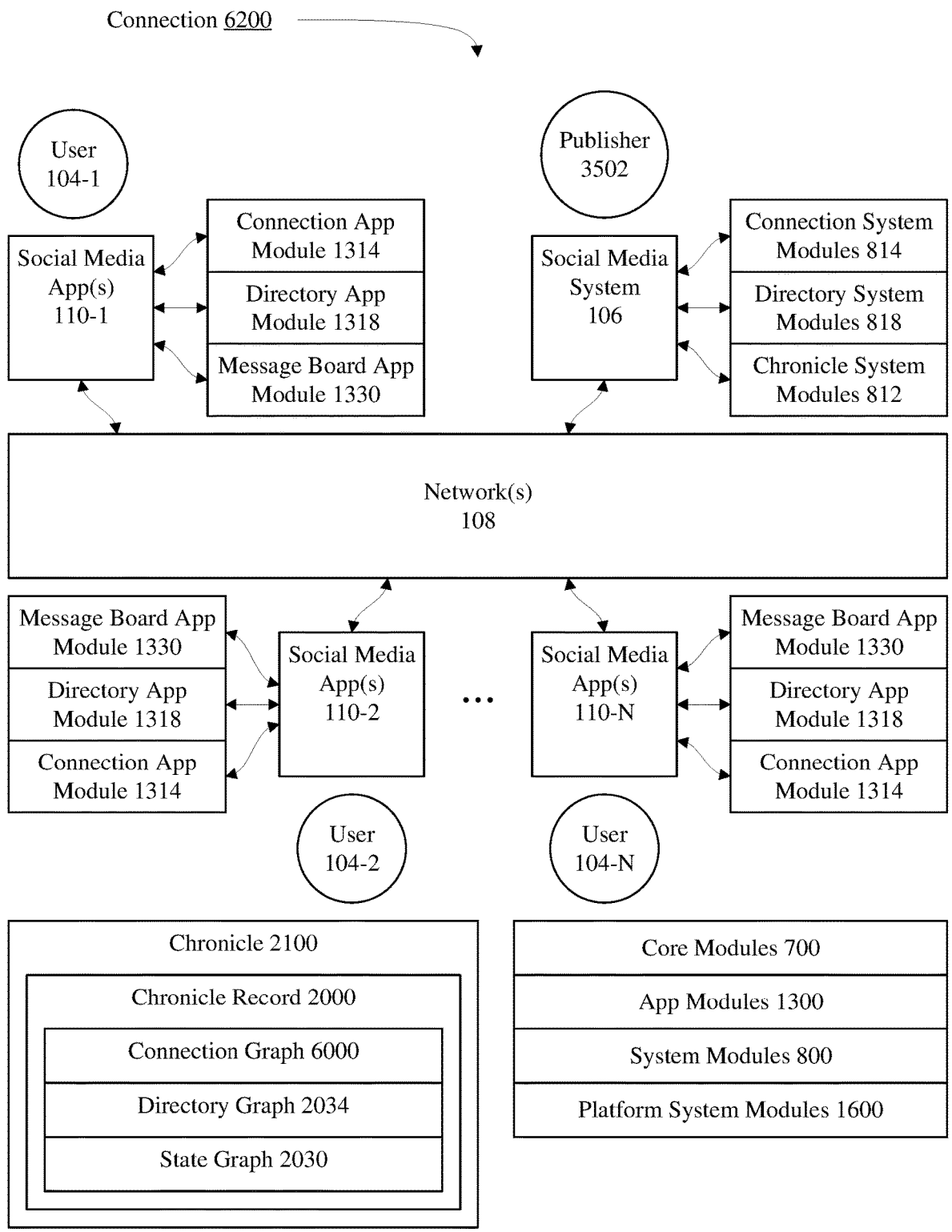
FIG. 62 is a block diagram of Connection.

FIG. 62 is a block diagram of Connection 6200 which illustrates the connection functionality of the platform. Connection 6200 is comprised of Chronicle 2100 which consists of Chronicle Record 2000 which contains Connection Graph 6000, Directory Graph 2034, and State Graph 2030. User 104-1 has Social Media App(s) 110-1 which utilizes Message Board App Module 1330, Directory App Module 1318, and Connection App Module 1314. User 104-2 has Social Media App(s) 110-2 which utilizes Message Board App Module 1330, Directory App Module 1318, and Connection App Module 1314. User 104-N has Social Media App(s) 110-N which utilizes Message Board App Module 1330, Directory App Module 1318, and Connection App Module 1314. The ellipse between Social Media App(s) 110-2 and Social Media App(s) 110-N illustrates that there are N number of social media apps for every user on the network. Social Media App(s) 110-1, Social Media App(s) 110-2, and Social Media App(s) 110-N connect to Social Media System 106 for Publisher 3502 via Network(s) 108. Social Media System 106 utilizes Chronicle System Modules 812, Directory System Modules 818, and Connection System Modules 814. Connection 6200 is also comprised of Core Modules 700 which are used for any cross-cutting concerns across Social Media App(s) 110-1 to Social Media App(s) 110-N, Social Media System 106, App Modules 1300, System Modules 800, and Platform System Modules 1600 as well as all connection functionality.

This diagram illustrates how User 104 in FIG. 1 can create connections, which are stored in Connection 6014 in FIG. 60. User 104-1 to User 104-N uses Message Board App Module 1330, Directory App Module 1318, and Connection App Module 1314 to create connection requests. This workflow is further detailed in Connections and Groups 4500 in FIG. 45. Social Media System 106 using Directory System Modules 818 and Connection System Modules 814 for Publisher 3502 can also create connections. There are three use cases for creating connections: user to user, publisher to user, and user to publisher. The connection functionality of the platform is distinct and separate from directory, accounts, and subscriptions. Each function stands on its own with its own set of system modules and app modules. Connections are not stored in the platform's directory. Each User 104 in FIG. 1 stores their connections in their own local Chronicle 2100 in FIG. 21 on their own Social Media System 106 in FIG. 1. Users own and control all their connections, which means they can delete them at any time, as part of Distributed Social Media Network 300 in FIG. 3.

FIG. 63 is a block diagram of Chronicle Record 2000 which is comprised of Ad Graph 6300. Ad Graph 6300, which descends from Base Graph 2050 in FIG. 20, consists of Ad Graph Schema 6302, Ad Graph Schema Version 6304, Ad Graph Hash 6306, and Ad Graph Signature 6308. It also has Ad Graph Collection 6309 which contains Node(s) 6310 and Edge(s) 6340. Node(s) 6310 consists of Ad 6312, Ad Campaign 6314, Ad Performance 6316, Content 2912, State 2610, Ad Purchase 6318, Ad Feature 6320, and Ad Category 6322. Edge(s) 6340 consists of Ad Belongs To 6342, Ad Metrix Of 6344, and Ad Contains 6346. Ad 6312 has the properties Ad Id 6350, Ad Timestamp 6352, Ad Subject 6354, Ad Location 6356, Ad Size 6358, and Ad Cost 6360. This diagram illustrates that ads exist within Chronicle Record 2000.

FIG. 64 is a block diagram of the properties of Ad Campaign 6314 and Ad Performance 6316 nodes introduced in FIG. 63. Ad Campaign 6314 has the properties Ad Campaign Id 6470, Ad Campaign Timestamp 6472, Ad Campaign Duration 6474, Ad Campaign Reach 6476, Ad Campaign Frequency 6478, Ad Campaign Targets 6480, Ad Campaign Rotation 6482, and Ad Campaign Cost 6484. Ad Performance 6316 has the properties Ad Performance Id 6485, Ad Performance Timestamp 6486, Ad Performance Impressions 6488, Ad Performance Cost Per Impression 6490, Ad Performance Click Thru Rate 6492, Ad Performance Cost Per Click 6494, Ad Performance Actions 6496, Ad Performance Cost Per Action 6498, and Ad Performance Return on Spend 6499.

Figure 65:
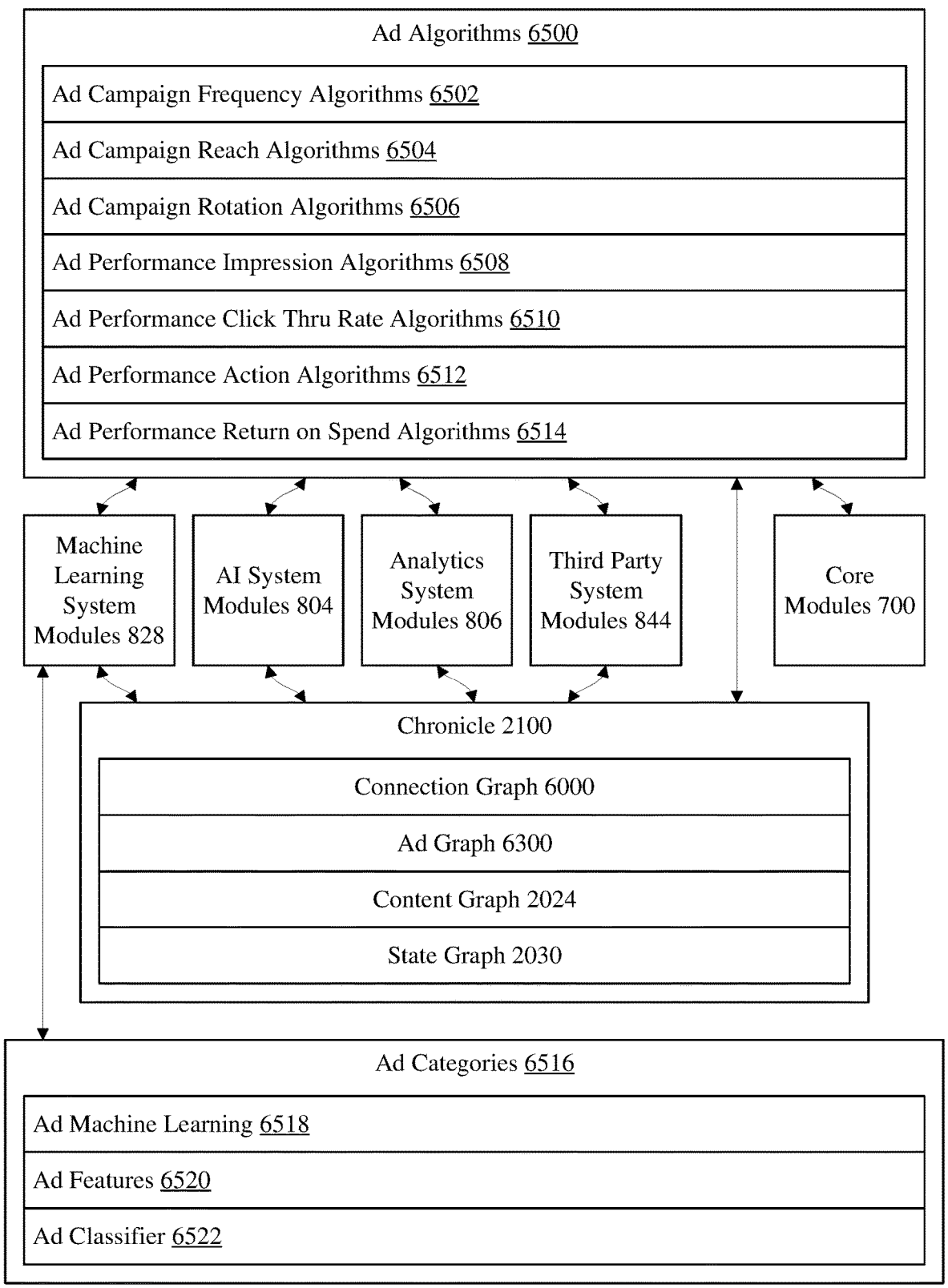
FIG. 65 is a block diagram of Ad Algorithms.

FIG. 65 is a block diagram of Ad Algorithms 6500 which is comprised of Ad Campaign Frequency Algorithms 6502, Ad Campaign Reach Algorithms 6504, Ad Campaign Rotation Algorithms 6506, Ad Performance Impression Algorithms 6508, Ad Performance Click Thru Rate Algorithms 6510, Ad Performance Action Algorithms 6512, and Ad Performance Return on Spend Algorithms 6514. Ad Algorithms 6500 is associated with Machine Learning System Modules 828, AI System Modules 804, Analytics System Modules 806, Third Party System Modules 844, and Core Modules 700. Ad Categories 6516 includes Ad Machine Learning 6518, Ad Features 6520, and Ad Classifier 6522. Ad Categories 6516 is associated with Machine Learning System Modules 828. Chronicle 2100 includes Chronicle Record 2000 which consists of Connection Graph 6000, Ad Graph 6300, Content Graph 2024, and State Graph 2030. Chronicle 2100 is associated with Machine Learning System Modules 828, AI System Modules 804, Analytics System Modules 806, Third Party System Modules 844, and Ad Algorithms 6500.

Ad Campaign Frequency Algorithms 6502 utilizes Ad Campaign Frequency 6478 in FIG. 64 in conjunction with Machine Learning System Modules 828 and Ad Categories 6516. Ad Campaign Reach Algorithms 6504 utilizes Ad Campaign Reach 6476 in FIG. 64 in conjunction with Machine Learning System Modules 828 and Ad Categories

6516. Ad Campaign Rotation Algorithms 6506 utilizes Ad Campaign Rotation 6482 in FIG. 64 in conjunction with Machine Learning System Modules 828 and Ad Categories 6516. Ad Performance Impression Algorithms 6508 utilizes Ad Performance Impressions 6488 and Ad Performance Cost Per Impression 6490 in FIG. 64 in conjunction with Machine Learning System Modules 828 and Ad Categories 6516. Ad Performance Click Thru Rate Algorithms 6510 utilizes Ad Performance Click Thru Rate 6492 and Ad Performance Cost Per Click 6494 in FIG. 64 in conjunction with Machine Learning System Modules 828 and Ad Categories 6516. Ad Performance Action Algorithms 6512 utilizes Ad Performance Actions 6496 and Ad Performance Cost Per Action 6498 in FIG. 64 in conjunction with Machine Learning System Modules 828 and Ad Categories 6516. Ad Performance Return on Spend Algorithms 6514 utilizes Ad Performance Return on Spend 6499 in FIG. 64 in conjunction with Machine Learning System Modules 828 and Ad Categories 6516.

Ad Algorithms 6500 could also work in conjunction with AI System Modules 804, Analytics System Modules 806, and Third Party System Modules 844 which may provide additional functionality that can be integrated into Ad Algorithms 6500. Core Modules 700 provides the cross-cutting functionality for Ad Algorithms 6500. In particular, all interactions with the elements in FIG. 65 utilize Telemetry Core Module 714, Logging Core Module 710, and Exception Handling Core Module 702 in FIG. 7. Telemetry Core Module 714 in FIG. 7 provides auditing insight into every interaction that can be audited and reported on vis-a-vis Audit System Modules 810 on FIG. 8. Machine Learning System Modules 828 utilizes Ad Categories 6516 consisting of Ad Machine Learning 6518 which is based on a training set of data containing instances whose features and assigned category membership is known, Ad Features 6520 which are derived from system composition profiles and their resulting performance metrics from telemetry data managed by Telemetry System 226 in FIG. 2, and Ad Classifier 6522 which is a classification algorithm that maps a new instance's system profile data to a category.

This diagram illustrates how machine learning and AI can be used at various touch points on Distributed Social Media Network 300 in FIG. 3. Here Machine Learning System Modules 828 utilizes Ad Algorithms 6500, Chronicle 2100, and Ad Categories 6516 to monitor and optimize ad performance on the platform. In another embodiment of the invention, Machine Learning System Modules 828 and AI System Modules 804 can be used to verify that ad content conforms to the agreements of the network and ad standards. In another embodiment of the invention, Machine Learning System Modules 828 and AI System Modules 804 can be used to add another dimensionality to ad analysis by looking at performance metrics across other populations, categories, and features. For example, assume User 104 publishes a circular flier for a small grocery co-op in Boise, ID. Because this co-op is in a certain population and category, its ad performance could be compared to those of a similarly sized grocery co-op in Portland, OR, giving User 104 a much more robust analysis as well as additional insights for ad optimization not currently available.

Figure 66:
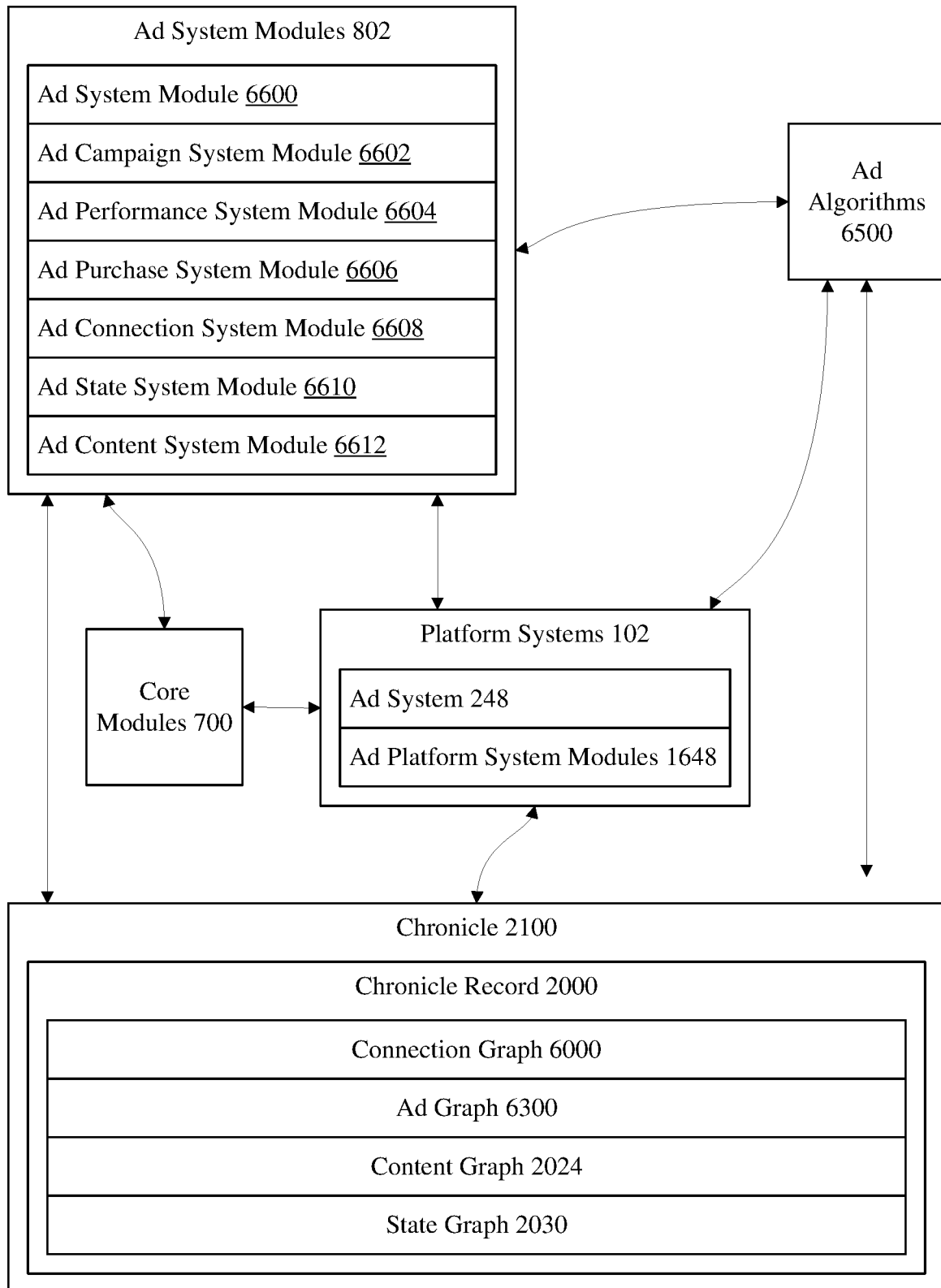
FIG. 66 is a block diagram of Ad System Modules.

FIG. 66 is a block diagram of Ad System Modules 802 which is comprised of Ad System Modules 6600, Ad Campaign System Modules 6602, Ad Performance System Module 6604, Ad Purchase System Module 6606, Ad Connection System Module 6608, Ad State System Module 6610, and Ad Content System Modules 6612. Ad System Modules 802 interfaces with Platform Systems 102, Chronicle 2100, Ad Algorithms 6500, and Core Modules 700. Platform Systems 102, which consists of Ad System 248 and Ad Platform System Modules 1648, utilizes Chronicle 2100 as well as Ad Algorithms 6500. Ad Algorithms 6500 interfaces with Ad System Modules 802, Platform Systems 102 and Chronicle 2100. Chronicle 2100 is comprised of Chronicle Record 2000 which consists of Connections Graph 6000, Ad Graph 6300, Content Graph 2024 and State Graph 2030. Core Modules 700 is used for any cross-cutting concerns across Ad System Modules 802 and Platform Systems 102. This diagram illustrates Ad System Modules 802 as it relates to Platform Systems 102, Ad Algorithms 6500, Core Modules 700, and Chronicle 2100. FIG. 66 also illustrates Platform Systems 102's relationship to Ad Algorithms 6500, Chronicle 2100, and Core Modules 700.

Figure 67:
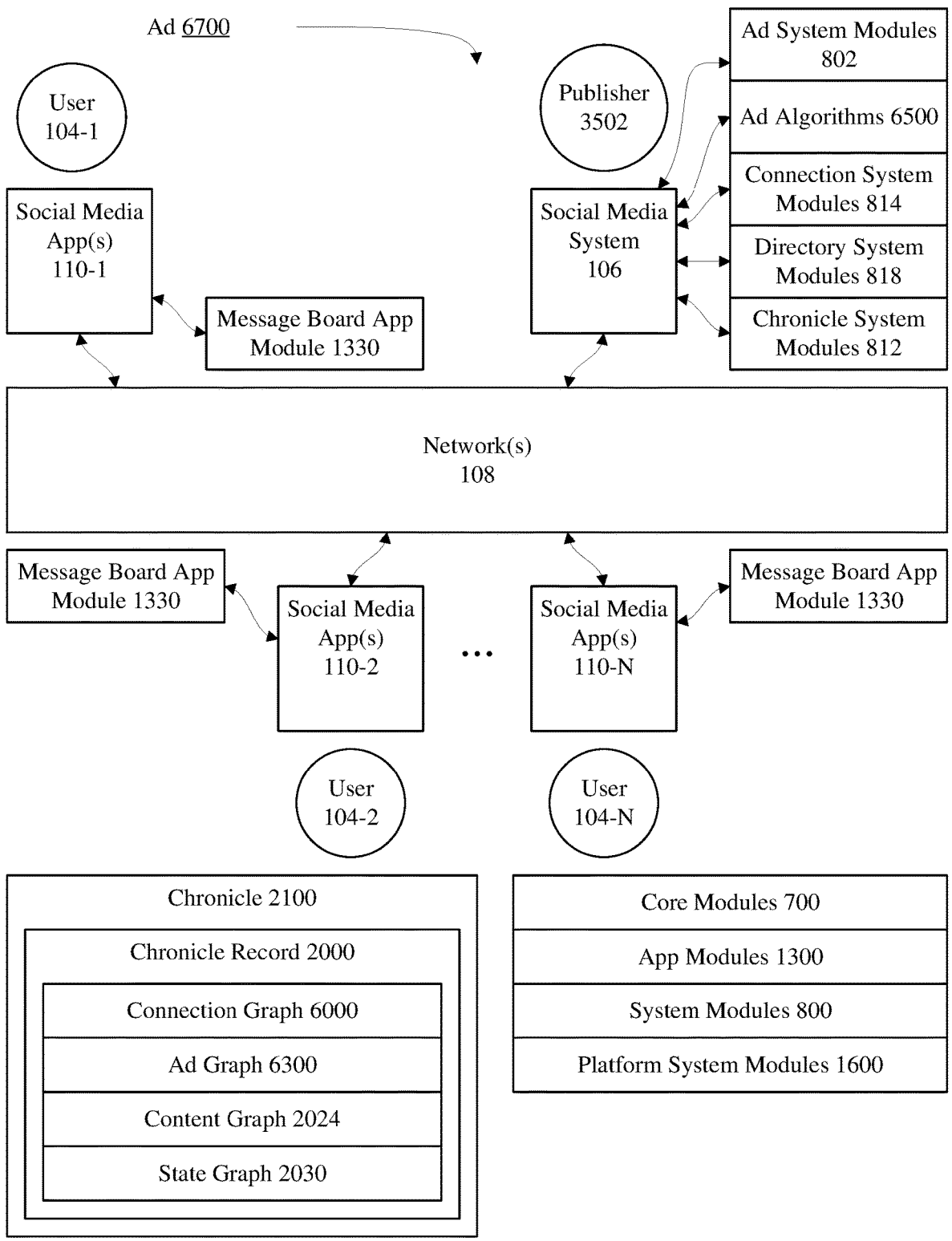
FIG. 67 is a block diagram of an Ad.

FIG. 67 is a block diagram of Ad 6700 which illustrates the ad functionality of the platform. Ad 6700 is comprised of Chronicle 2100 which consists of Chronicle Record 2000 which contains Connection Graph 6000, Ad Graph 6300, Content Graph 2024, and State Graph 2030. User 104-1 has Social Media App(s) 110-1, User 104-2 has Social Media App(s) 110-2, and User 104-N has Social Media App(s) 110-N, all of which utilize Message Board App Module 1330 to see ads. The ellipse between Social Media App(s) 110-2 and Social Media App(s) 110-N illustrates that there are N number of social media apps for every user on the network. Social Media App(s) 110-1, Social Media App(s) 110-2, and Social Media App(s) 110-N connect to Social Media System 106 for Publisher 3502 via Network(s) 108. Social Media System 106 utilizes Chronicle System Modules 812, Directory System Modules 818, Connection System Modules 814, Ad Algorithms 6500, and Ad System Modules 802. Ad 6700 is also comprised of Core Modules 700 which is used for any cross-cutting concerns across Social Media App(s) 110-1 to Social Media App(s) 110-N, Social Media System 106, App Modules 1300, System Modules 800, and Platform System Modules 1600 as well as all ad functionality.

This diagram shows that publishers are responsible for the advertising that appears on Distributed Social Media Network 300 in FIG. 3, and unlike existing centralized options, they keep the bulk of any ad revenue. The network makes the transaction between User 104 and Publisher 3502 possible with workflows that leverage Chronicle 2100 and select system modules to create, publish and pay for ads all through Social Media App(s) 110. All ads run by the day. Most will be local or subject specific given the distributed nature of the network. The network will make a select number of ads available at the regional and national level, whereby some national placements will be available for delivery to 100% of users every day. In one embodiment of the invention, every user gets every ad that has been placed with a publisher that they are connected to. In another embodiment of the invention, Publisher 3502 can micro target ad content for User 104.

Figure 68:
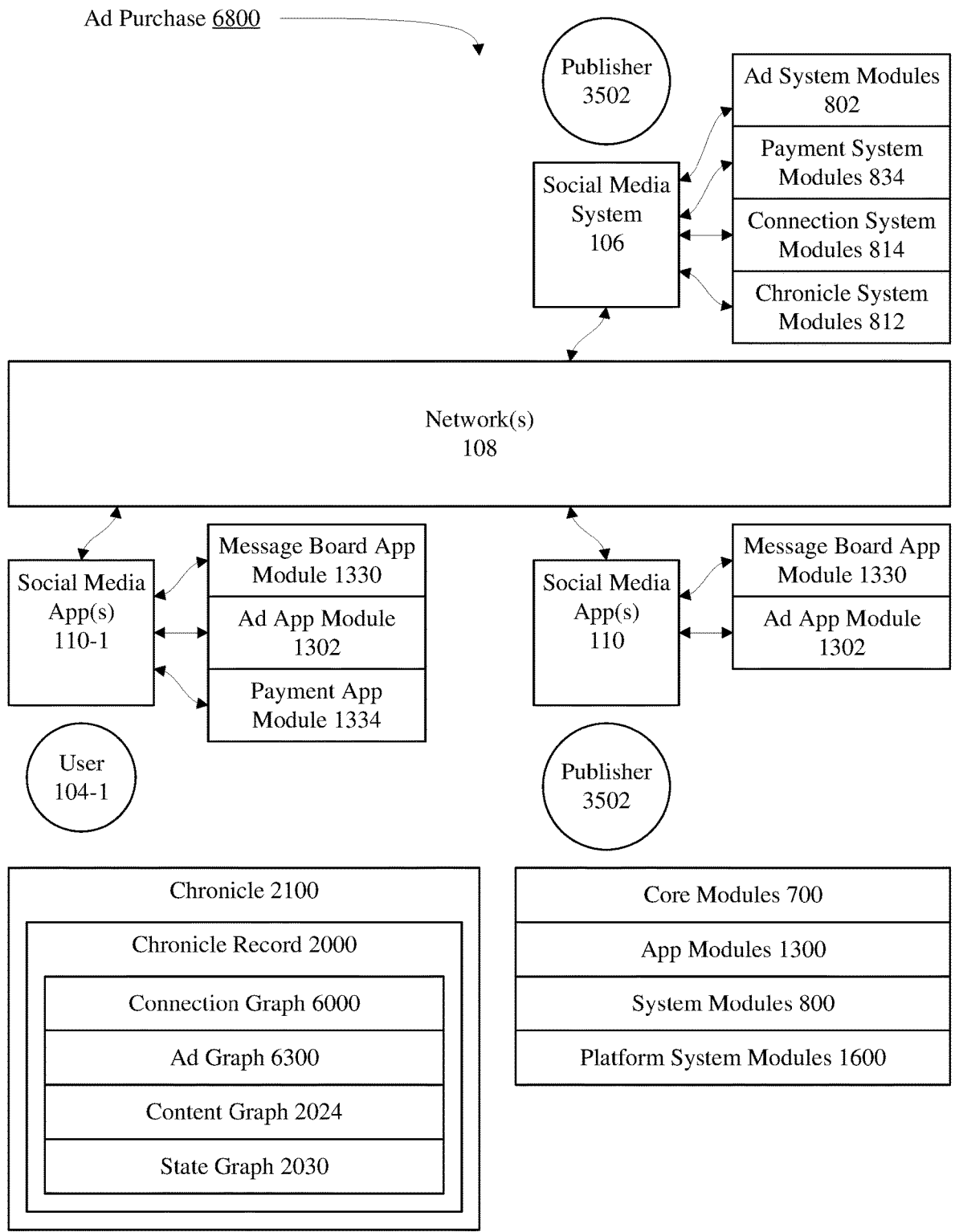
FIG. 68 is a block diagram of an Ad Purchase.

FIG. 68 is a block diagram of Ad Purchase 6800 which illustrates the ad purchase functionality of the platform. Ad Purchase 6800 is comprised of Chronicle 2100 which consists of Chronicle Record 2000 which contains Connection Graph 6000, Ad Graph 6300, Content Graph 2024, and State Graph 2030. User 104-1 has Social Media App(s) 110-1 which utilizes Message Board App Modules 1330, Ad App Module 1302, and Payment App Module 1334 to purchase an ad to run with Publisher 3502. Publisher 3502 has Social Media System 106 which utilizes Ad System Modules 802, Payment System Modules 834, Connection System Modules 814, and Chronicle System Modules 812 to accept payment for User 104's ad. Publisher 3502 also has Social Media App(s) 110, which utilizes Message Board App Module 1330 and Ad App Module 1302 to manage ads. Publisher 3502's Social Media System 106 connects to their Social Media App(s) 110 and User 104-1's Social Media App 110-1 via Network(s) 108. Ad Purchase 6800 is also comprised of Core Modules 700 which is used for any cross-cutting concerns across Social Media App(s) 110, Social Media App(s) 110-1, Social Media System 106, App Modules 1300, System Modules 800, and Platform System Modules 1600 as well as all ad purchase functionality.

This diagram shows how User 104-1 can purchase an ad from any Publisher 3502 they select on Distributed Social Media Network 300 in FIG. 3. Both parties work inside their own social media app(s) to facilitate the ad purchase, and Publisher 3502 uses select system modules and Chronicle 2100 to manage the process. In another embodiment of the invention, User 104 calls or emails Publisher 3502 to make an ad purchase.

Figure 69:
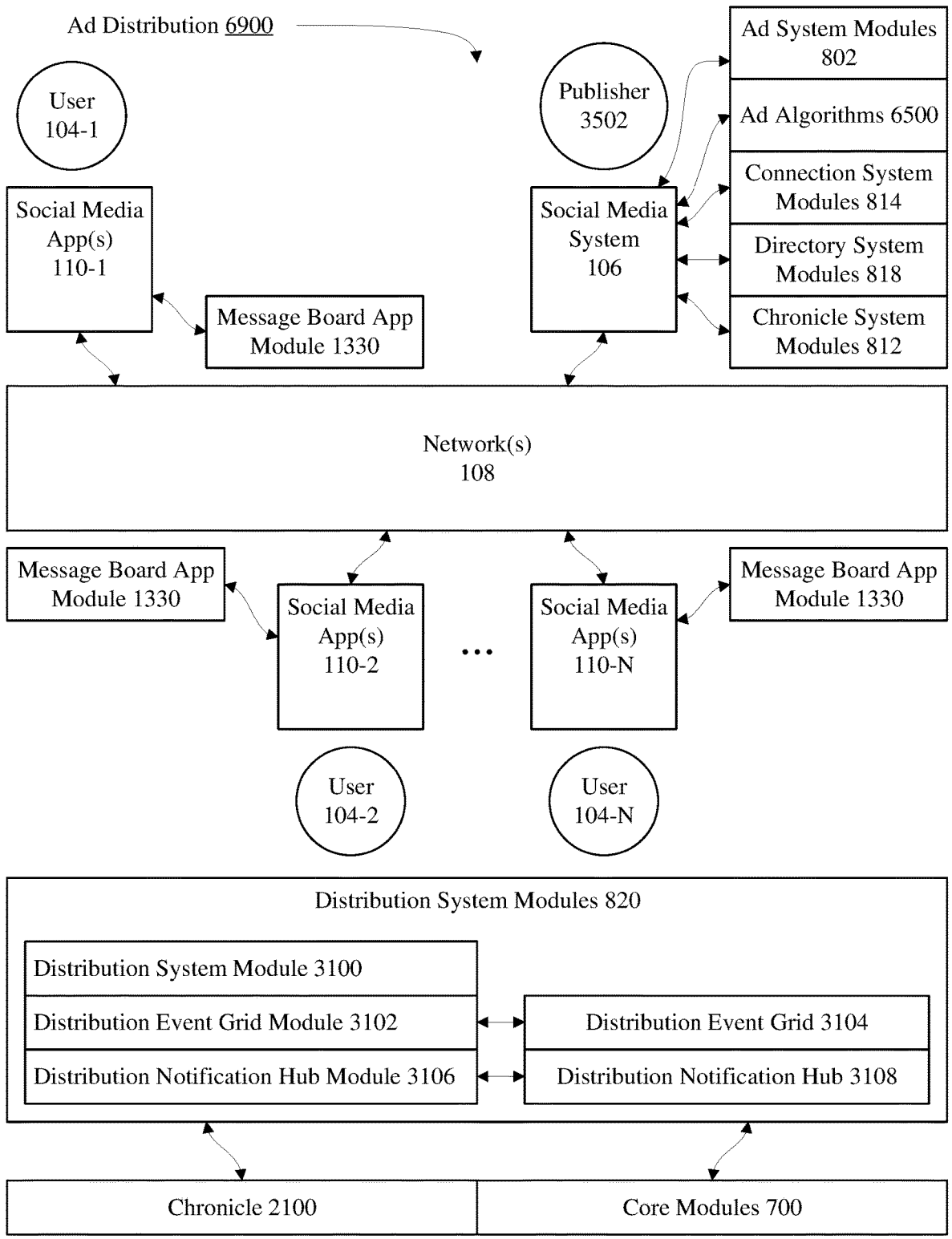
FIG. 69 is a block diagram of Ad Distribution.

FIG. 69 is a block diagram of Ad Distribution 6900 which illustrates the ad distribution functionality of the platform. User 104-1 has Social Media App(s) 110-1, User 104-2 has Social Media App(s) 110-2, and User 104-N has Social Media App(s) 110-N, all of which utilize Message Board App Module 1330. The ellipse between Social Media App(s) 110-2 and Social Media App(s) 110-N illustrates that there are N number of social media apps for every user on the network. Social Media App(s) 110-1, Social Media App(s) 110-2, and Social Media App(s) 110-N connect to Social Media System 106 for Publisher 3502 via Network(s) 108. Social Media System 106 utilizes Chronicle System Modules 812, Directory System Modules 818, Connection System Modules 814, Ad Algorithms 6500, and Ad System Modules 802. Ad Distribution 6900 is also comprised of Distribution System Modules 820 which consists of Distribution System Module 3100, Distribution Event Grid Module 3102, and Distribution Notification Hub Module 3106. Distribution Event Grid Module 3102 is connected to Distribution Event Grid 3104. Distribution Notification Hub Module 3106 is connected to Distribution Notification Hub 3108. Distribution System Modules 820 interacts with Chronicle 2100 as well as Core Modules 700 which provides all the cross-cutting functionality for Distribution System Modules 820. Core Modules 700 is also used for any cross-cutting concerns across Social Media App(s) 110-1 to Social Media App(s) 110-N and Social Media System 106. This diagram shows that ads (new content plus any state changes) can be distributed across Distributed Social Media Network 300 in FIG. 3 using both pull and push techniques as detailed in FIG. 31.

Figure 70:
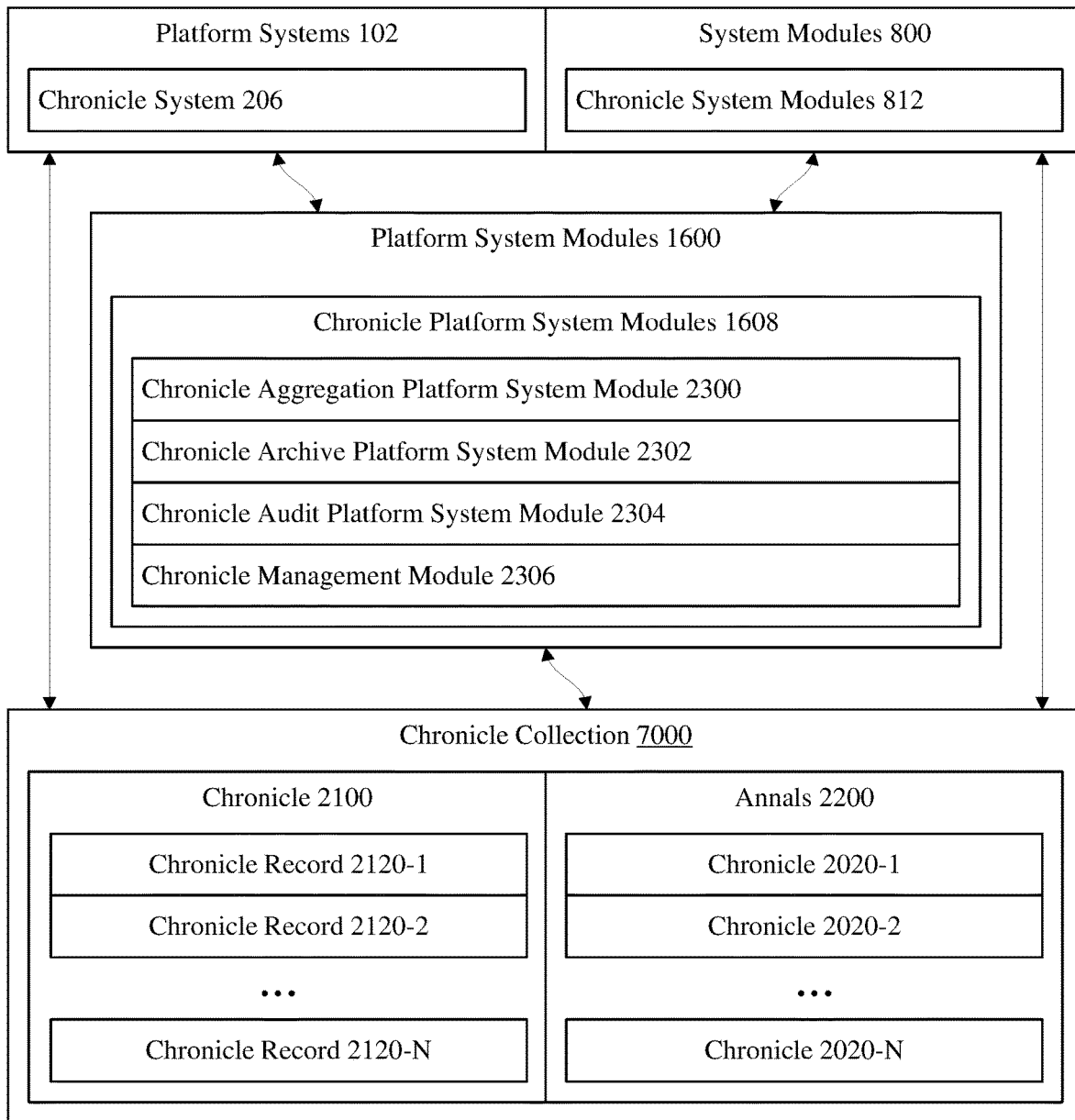
FIG. 70 is a block diagram of a Chronicle Collection.

FIG. 70 is a block diagram of Chronicle Collection 7000 which is comprised of Chronicle 2100 and Annals 2200. Chronicle 2100 consists of Chronicle Record 2120-1, Chronicle Record 2120-2, and Chronicle Record 2120-N. The ellipse between Chronicle Record 2120-1 and Chronicle Record 2120-N indicates that there are N number of chronicle records in Chronicle 2100. Annals 2200 consists of Chronicle 2020-1, Chronicle 2020-2, and Chronicle 2020-N. The ellipse between Chronicle 2020-2 and Chronicle 2020-N indicates that there are N number of chronicles in Annals 2200. Platform Systems 102 is comprised of Chronicle System 206. Platform System Modules 1600 is comprised of Chronicle Platform System Modules 1608 which consists of Chronicle Aggregation Platform System Module 2300, Chronicle Archive Platform System Module 2302, Chronicle Audit Platform System Modules 2304, and Chronicle Management Module 2306. System Modules 800 is comprised of Chronicle System Modules 812. This diagram illustrates how Platform Systems 102, System Modules 800, and Platform System Modules 1600 interface with Chronicle Collection 7000.

Figure 71:
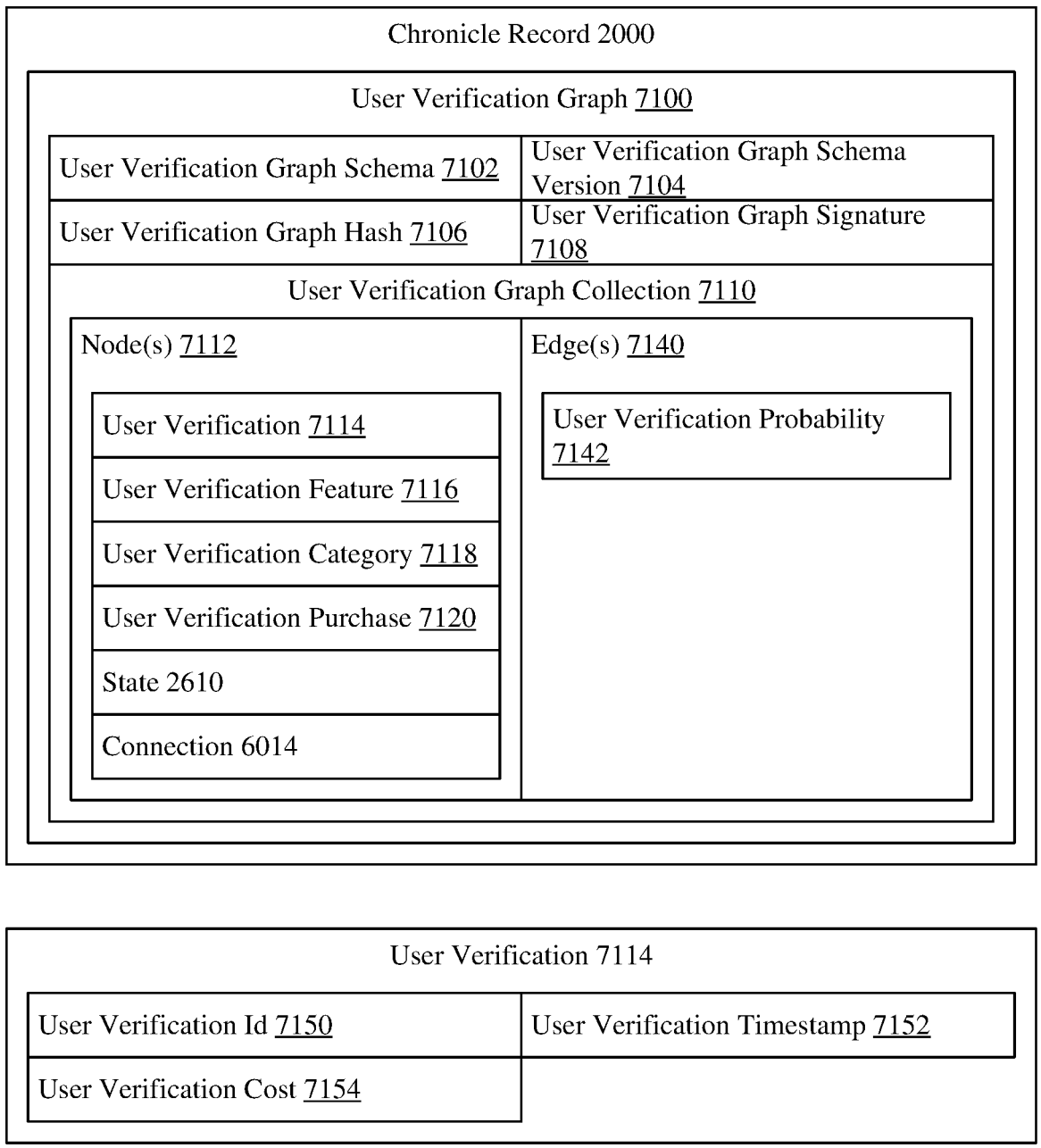
FIG. 71 is a block diagram of a Chronicle Record.

FIG. 71 is a block diagram of Chronicle Record 2000 which is comprised of User Verification Graph 7100. User Verification Graph 7100, which descends from Base Graph 2050 in FIG. 20, consists of User Verification Graph Schema 7102, User Verification Graph Schema Version 7104, User Verification Graph Hash 7106, and User Verification Graph Signature 7108. It also consists of User Verification Graph Collection 7110 which contains Node(s) 7112 and Edge(s) 7140. Node(s) 7112 consists of User Verification 7114, User Verification Feature 7116, User Verification Category 7118, User Verification Purchase 7120, State 2610, and Connection 6014. Edge(s) 7140 consists of User Verification Probability 7142. User Verification 7114 has the properties User Verification Id 7150, User Verification Timestamp 7152, and User Verification Cost 7154. This diagram illustrates that user verification exists within Chronicle Record 2000.

FIG. 72 is a block diagram of Chronicle Record 2000 which is comprised of User Verification Features 7200. User Verification Features 7200 consists of Password Confirmation by Email 7202, 2FA Enabled 7204, Email Source 7206, Device Type 7208, Device Count 7210, Mobile Network 7212, Verification Location Match 7214, Verification Purchase 7216, Verification Payment Method 7218, ACH Authorization Verification 7220, In-Person Verification 7222, In-Person Verification Id Type 7224, In-Person Verification Id Check 7226, In-Person Verification Photo Taken 7228, SSN Verification 7230, EIN Verification 7232, Credit Soft Inquiry 7234, and Background Check 7236. All users on the platform must be verified for their safety as well as for the integrity of Distributed Social Media Network 300 in FIG. 3. This diagram details the User Verification Features 7200 used by Machine Learning System Modules 828 in FIG. 8 to verify users. User 104 in FIG. 1 has a number of ways that they can prove they are who they say they are. They are able to choose how they want to be verified and at what expense. The platform aims to significantly increase the probability that User 104 is who they say they are before making all platform functionality available for use. For example, the bar required to Post 3400 in FIG. 34 is not as high as it is to Publish 4400 in FIG. 44.

Figure 73:
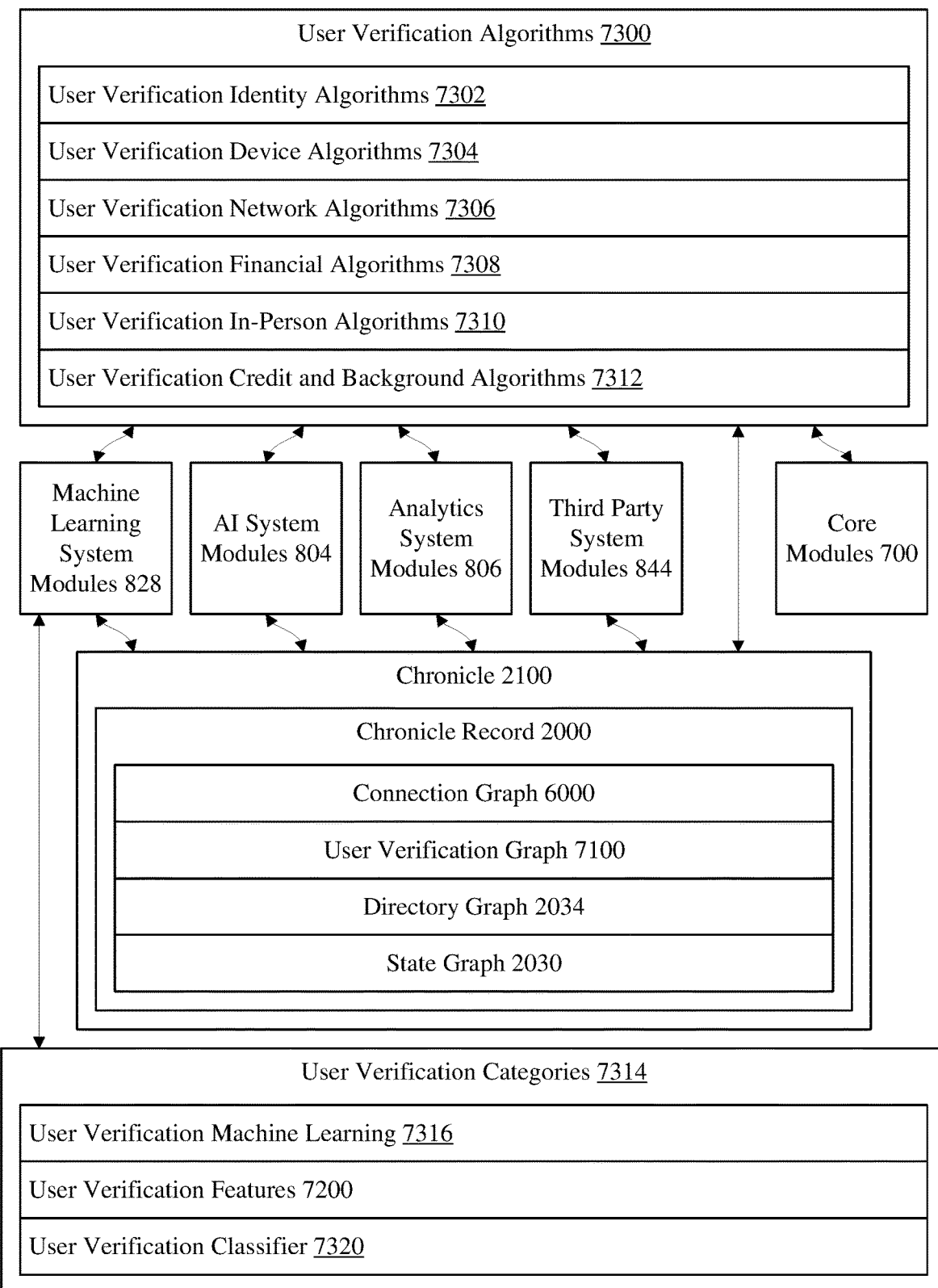
FIG. 73 is a block diagram of User Verification Algorithms.

FIG. 73 is a block diagram of User Verification Algorithms 7300 which contains User Verification Identity Algorithms 7302, User Verification Device Algorithms 7304, User Verification Network Algorithms 7306, User Verification Financial Algorithms 7308, User Verification In-Person Algorithms 7310, and User Verification Credit and Background Algorithms 7312. User Verification Algorithms 7300 is associated with Machine Learning System Modules 828, AI System Modules 804, Analytics System Modules 806, Third Party System Modules 844, and Core Modules 700. User Verification Categories 7314 includes User Verification Machine Learning 7316, User Verification Feature 7200, and User Verification Classifier 7320. User Verification Categories 7314 is associated with Machine Learning System Modules 828. Chronicle 2100 includes Chronicle Record 2000 which consists of Connection Graph 6000, User Verification Graph 7100, Directory Graph 2034, and State Graph 2030. Chronicle 2100 is associated with Machine Learning System Modules 828, AI System Modules 804, Analytics System Modules 806, Third Party System Modules 844, and User Verification Algorithms 7300.

User Verification Identity Algorithms 7302 utilizes Password Confirmation by Email 7202, 2FA Enabled 7204, and Email Source 7206 features in FIG. 72. It is intended to be used with features involving identity and data around authentication and authorization for user verification in conjunction with Machine Learning System Modules 828 and User Verification Categories 7314. User Verification Device Algorithms 7304 utilizes Device Type 7208 and Device Count 7210 features in FIG. 72. It is intended to be used with features involving device(s) related data in conjunction with Machine Learning System Modules 828 and User Verification Categories 7314. User Verification Network Algorithms 7306 utilizes Mobile Network 7212 and Verification Location Match 7214 features in FIG. 72. It is intended to be used with features involving network related data in conjunction with Machine Learning System Modules 828 and User Verification Categories 7314. User Verification Financial Algorithms 7308 utilizes Verification Purchase 7216, Verification Payment Method 7218, and ACH Authorization Verification 7220 features in FIG. 72. It is intended to be used with features involving financial related data in conjunction with Machine Learning System Modules 828 and User Verification Categories 7314. User Verification In-Person Algorithm 7310 utilizes In-Person Verification 7222, In-Person Verification Id Type 7224, In-Person Verification Id Check 7226, and In-Person Verification Photo Taken 7228 features in FIG. 72. It is intended to be used with features involving in-person related data in conjunction with Machine Learning System Modules 828 and User Verification Categories 7314. This data is collected when User 104 in FIG. 1 goes to Publisher 3502 in FIG. 35 and gets verified by them in person. User Verification Credit and Background Algorithms 7312 utilizes SSN Verification 7230, EIN Verification 7232, Credit Soft Inquiry 7234, and Background Check 7236 features in FIG. 72. It is intended to be used with features involving credit and background related data in conjunction with Machine Learning System Modules 828 and User Verification Categories 7314.

User Verification Algorithms 7300 could also work in conjunction with AI System Modules 804, Analytics System Modules 806, and Third Party System Modules 844 which may provide additional user verification systems or functionality that can be integrated into User Verification Algorithms 7300. Core Modules 700 provides the cross-cutting functionality for User Verification Algorithms 7300. In particular, all interactions with the elements in FIG. 73 utilize Telemetry Core Module 714, Logging Core Module 710, and Exception Handling Core Module 702 in FIG. 7. Telemetry Core Module 714 in FIG. 7 provides auditing insight into every interaction that can be audited and reported on vis-a-vis Audit System Modules 810 on FIG. 8. Machine Learning System Modules 828 utilizes User Verification Categories 7314 consisting of User Verification Machine Learning 7316 which is based on a training set of data containing instances whose features and assigned category membership is known, User Verification Features 7200 which are derived from system composition profiles and their resulting performance metrics from telemetry data managed by Telemetry System 226 in FIG. 2, and User Verification Classifier 7320 which is a classification algorithm that maps a new instance's system profile data to a category.

This diagram illustrates how Machine Learning System Modules 828 looks at User Verification Features 7200 in FIG. 72, puts weight on different features, creates probability for authenticity of user verification, and put User 104 in FIG. 1 into User Verification Classifier 7320 regarding identity. Existing centralized social media networks have very flat onboarding experiences. Various embodiments of the present technology are very dynamic. Depending on what path User 104 in FIG. 1 chooses to take, there is a higher probability of user verification. The platform also has User 104 in FIG. 1 re-verify at different times (e.g. annually) since it is critical that Users are Known 3624 and Users are Verified 3626 in FIG. 36 to maintain user safety and network integrity. Because Publisher 3502 in FIG. 35 can verify users as part of Distributed Social Media Network 300 in FIG. 3, there are economies of scale and increased probability of accuracy not possible with central authorities.

Figure 74:
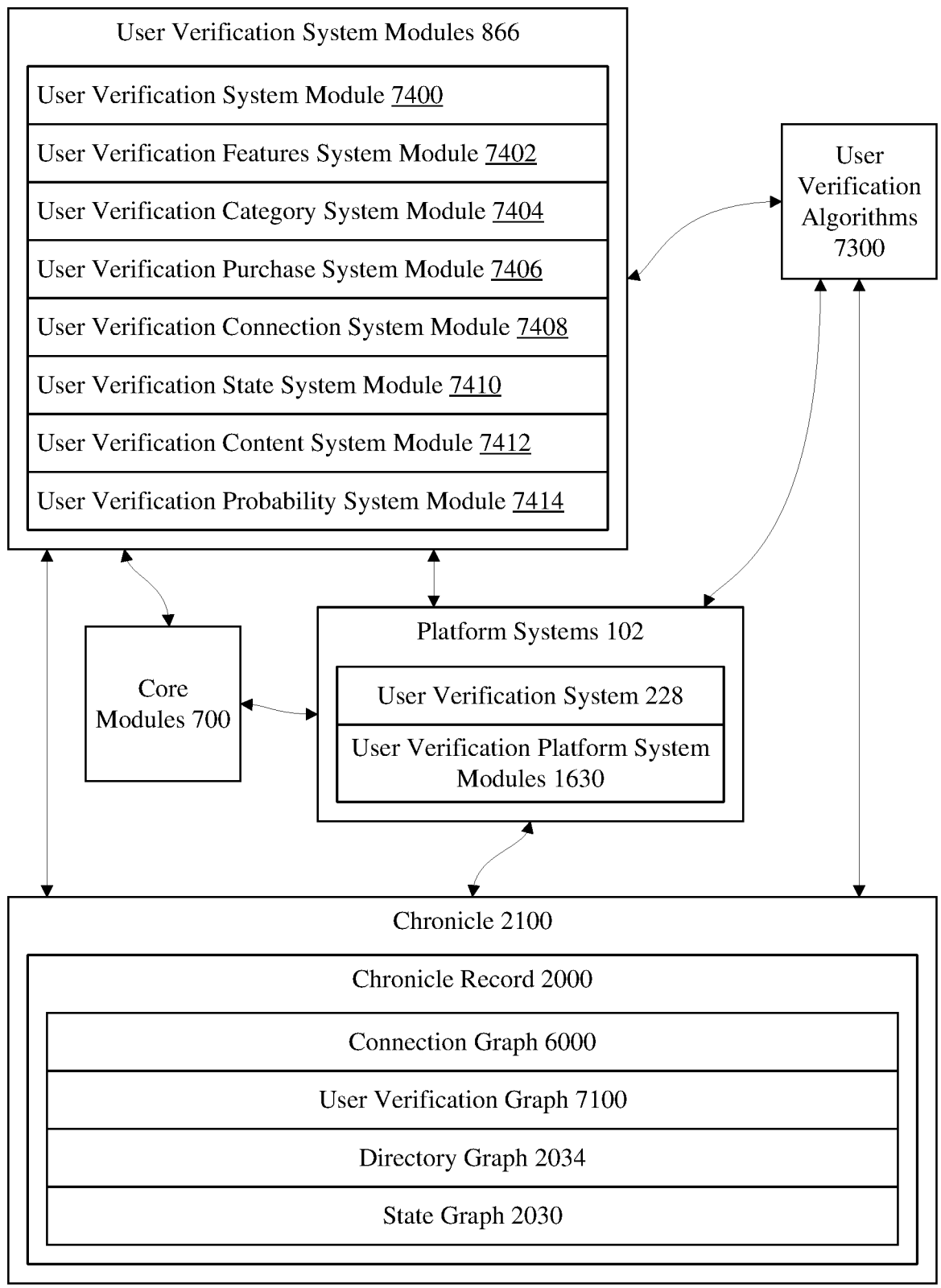
FIG. 74 is a block diagram of User Verification System Modules.

FIG. 74 is a block diagram of User Verification System Modules 866 which is comprised of User Verification System Module 7400, User Verification Features System Module 7402, User Verification Category System Module 7404, User Verification Purchase System Module 7406, User Verification Connection System Module 7408, User Verification State System Module 7410, User Verification Content System Module 7412, and User Verification Probability System Module 7414. User Verification System Modules 866 interfaces with Platform Systems 102, Chronicle 2100, User Verification Algorithms 7300, and Core Modules 700. Platform Systems 102, which consists of User Verification System 228 and User Verification Platform System Modules 1630, utilizes Chronicle 2100 as well as User Verification Algorithms 7300. User Verification Algorithms 7300 interfaces with User Verification System Modules 866, Platform Systems 102, and Chronicle 2100. Chronicle 2100 is comprised of Chronicle Record 2000 which consists of Connection Graph 6000, User Verification Graph 7100, Directory Graph 2034, and State Graph 2030. Core Modules 700 is used for any cross-cutting concerns across Verification System Modules 866 and Platform Systems 102. This diagram illustrates User Verification System Modules 866 as it relates to Platform Systems 102, User Verification Algorithms 7300, Core Modules 700, and Chronicle 2100. FIG. 74 also illustrates Platform Systems 102's relationship to User Verification Algorithms 7300, Chronicle 2100, and Core Modules 700.

Figure 75:
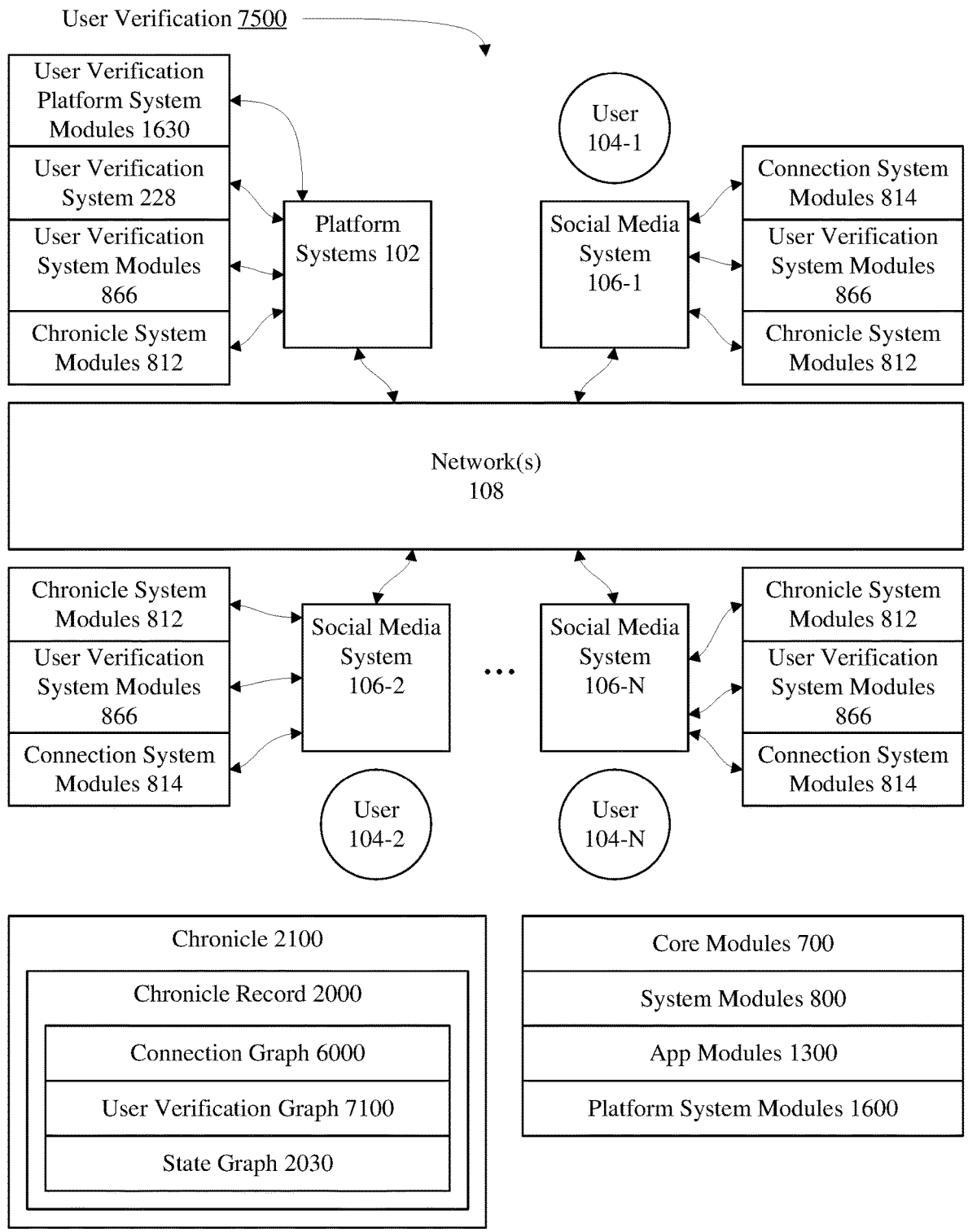
FIG. 75 is a block diagram of User Verification.

FIG. 75 is a block diagram of User Verification 7500 which illustrates the user verification functionality of the platform. User Verification 7500 is comprised of Chronicle 2100 which consists of Chronicle Record 2000 which contains Connection Graph 6000, User Verification Graph 7100, and State Graph 2030. Platform Systems 102 utilizes Chronicle System Modules 812, User Verification System Modules 866, User Verification System 228, and User Verification Platform System Modules 1630. Platform Systems 102 connects to Social Media System 106-1 for User 104-1, Social Media System 106-2 for User 104-2, and Social Media System 106-N for User 104-N via Network(s) 108. User 104-1's Social Media System 106-1 utilizes Chronicle System Modules 812, User Verification System Modules 866, and Connection System Modules 814. User 104-2's Social Media System 106-2 utilizes Chronicle System Modules 812, User Verification System Modules 866, and Connection System Modules 814. User 104-N's Social Media System 106-N utilizes Chronicle System Modules 812, User Verification System Modules 866, and Connection System Modules 814. The ellipse between Social Media System 106-2 and Social Media System 106-N illustrates that there are N number of social media systems for every user on the network. User Verification 7500 is also comprised of Core Modules 700 which are used for any cross-cutting concerns across Platform Systems 102, Social Media System 106-1 to Social Media System 106-N, App Modules 1300, System Modules 800, and Platform System Modules 1600 as well as all user verification functionality.

This diagram illustrates how User Verification System Modules 866 is utilized by Platform Systems 102 and all social media systems on Distributed Social Media Network 300 in FIG. 3 for user verification. Any other System Modules 800 can also be used in conjunction with User Verification System Modules 866 if appropriate to facilitate various workflows, such as Onboarding System Modules 832, Payment System Modules 834, or Subscription System Modules 842 in FIG. 8.

Figure 76:
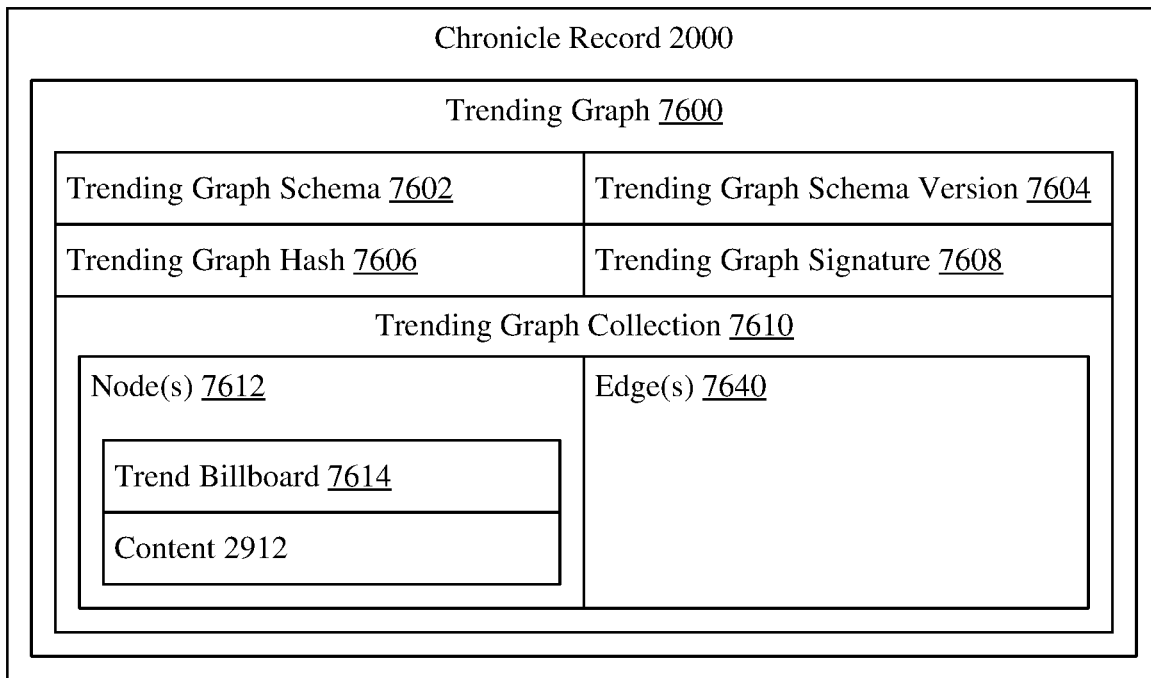
FIG. 76 is a block diagram of a Chronicle Record.

FIG. 76 is a block diagram of Chronicle Record 2000 which is comprised of Trending Graph 7600. Trending Graph 7600, which descends from Base Graph 2050 in FIG. 20, consists of Trending Graph Schema 7602, Trending Graph Schema Version 7604, Trending Graph Hash 7606, and Trending Graph Signature 7608. It also consists of a Trending Graph Collection 7610 which contains Node(s) 7612 and Edge(s) 7640. Node(s) 7612 consists of Trend Billboard 7614 and Content 2912. This diagram illustrates that trending information exists within Chronicle Record 2000.

Figure 77:
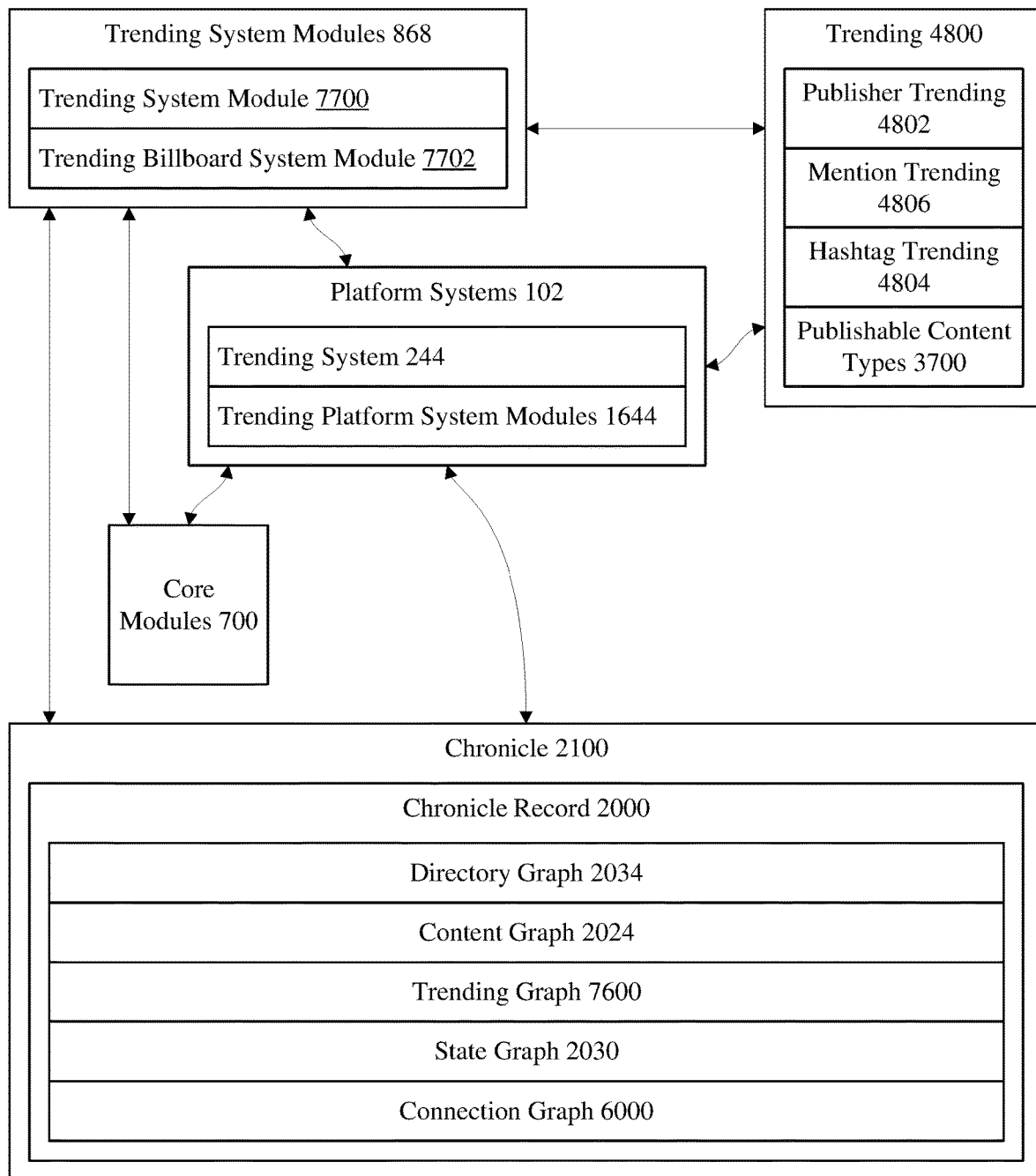
FIG. 77 is a block diagram that illustrates Trending System Modules.

FIG. 77 is a block diagram that illustrates Trending System Modules 868 and its relationship to Platform Systems 102, Trending 4800, Core Modules 700 and Chronicle 2100. Trending System Modules 868 consists of Trending System Module 7700 and Trending Billboard System Module 7702. Platform Systems 102 consists of Trending System 244 and Trending Platform System Modules 1644. Trending 4800 consists of Publisher Trending 4802, Mention Trending 4806, Hashtag Trending 4804, and Publishable Content Types 3700. Chronicle 2100 consists of Chronicle Record 2000, which contains Directory Graph 2034, Content Graph 2024, Trending Graph 7600, State Graph 2030, and Connection Graph 6000. Trending System Modules 868 interfaces with Platform Systems 102, Chronicle 2100, Trending 4800, and Core Modules 700. Platform Systems 102 utilizes Chronicle 2100, Trending 4800, and Core Modules 700. Trending 4800 interfaces with Trending System Modules 868 and Platform Systems 102. Core Modules 700 is used for any cross-cutting concerns across Trending System Modules 868 and Platform Systems 102.

Figure 78:
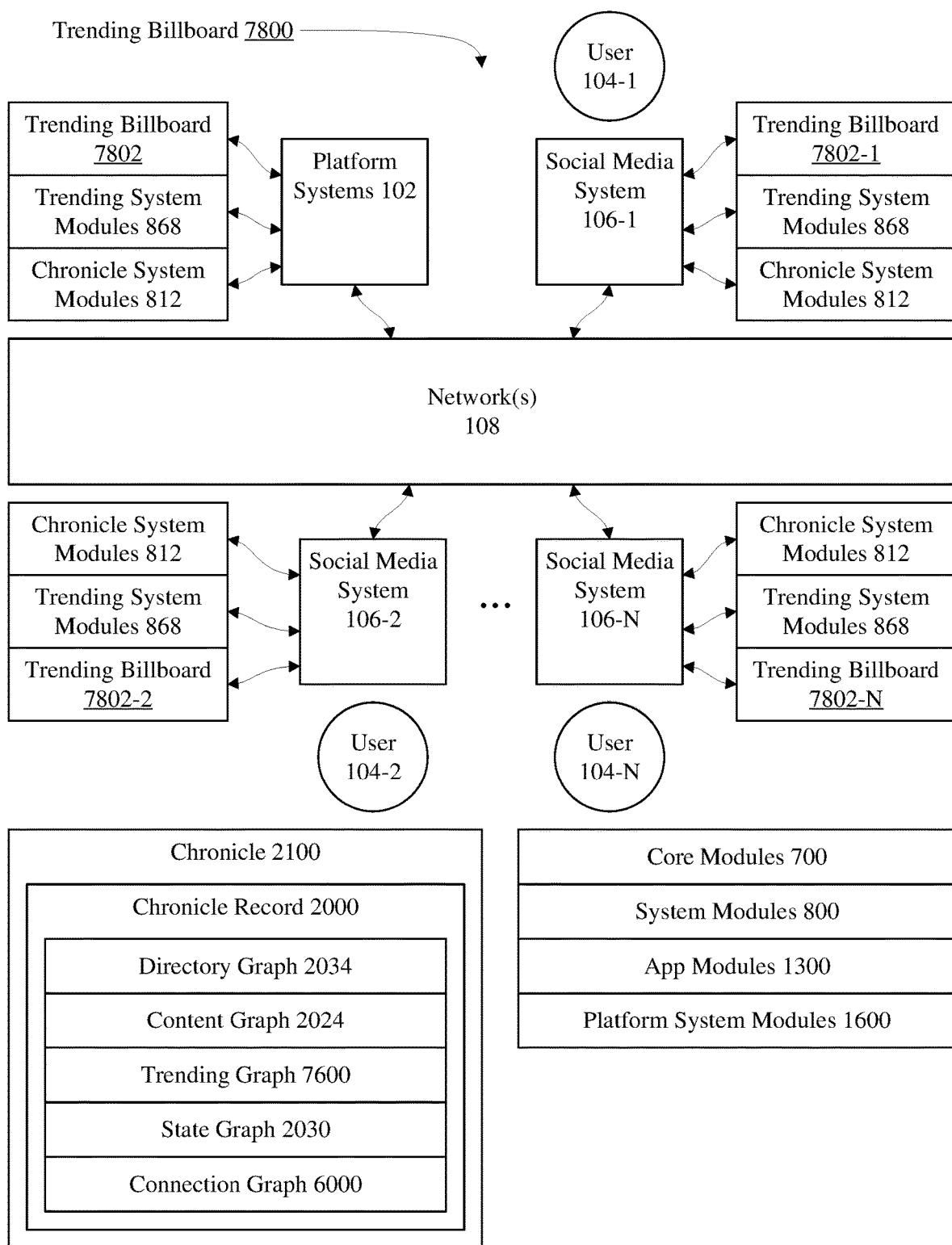
FIG. 78 is a block diagram of a Trending Billboard.

FIG. 78 is a block diagram of Trending Billboard 7800 which illustrates the trending billboard functionality of the platform. Trending Billboard 7800 is comprised of Chronicle 2100 which consists of Chronicle Record 2000 which contains Directory Graph 2034, Content Graph 2024, Trending Graph 7600, State Graph 2030, and Connection Graph 6000. Platform Systems 102 utilizes Chronicle System Modules 812, Trending System Modules 868, and Trending Billboard 7802. Platform Systems 102 connects to Social Media System 106-1 for User 104-1, Social Media System 106-2 for User 104-2, Social Media System 106-N for User 104-N via Network(s) 108. User 104-1's Social Media System 106-1 utilizes Chronicle System Modules 812, Trending System Modules 868, and Trending Billboard 7802-1. User 104-2's Social Media System 106-2 utilizes Chronicle System Modules 812, Trending System Modules 868, and Trending Billboard 7802-2. User 104-N's Social Media System 106-N utilizes Chronicle System Modules 812, Trending System Modules 868, and Trending Billboard 7802-N. The ellipse between Social Media System 106-2 and Social Media System 106-N illustrates that there are N number of social media systems for every user on the network. Trending Billboard 7800 is also comprised of Core Modules 700 which provides the cross-cutting functionality for Platform Systems 102, Social Media System 106-1 to Social Media System 106-N, App Modules 1300, System Modules 800, and Platform System Modules 1600 as well as all trending billboard functionality.

All of the trending functionality of FIG. 78 builds on the trending functionality detailed in FIG. 48. This diagram shows that Trending Billboard 7800 is essentially a roll up of the trending for each Social Media System 106 as well as for Platform System 102, which represents a complete aggregation of all trending across Distributed Social Media Network 300 in FIG. 3. Each trending Billboard 7802 lives in Chronicle 2100. The platform will provide pre-canned trends for each day as well as unique tools that give User 104 the ability to find and consume trending data that is important to them. There is no algorithm, such as those utilized within existing centralized social media networks, that tells User 104 what they are interested in or provides trends that are skewed or biased based on some complex promotional scheme. Instead User 104 gets to explore the content for themselves and see what is trending across multiple domains such as the content metadata detailed in FIG. 29, the type of content or publisher detailed in FIG. 37, and location (city, state, region, national, global). So not only does User 104 own and control their content, they can actually consume it in unique and customized ways.

Figure 79:
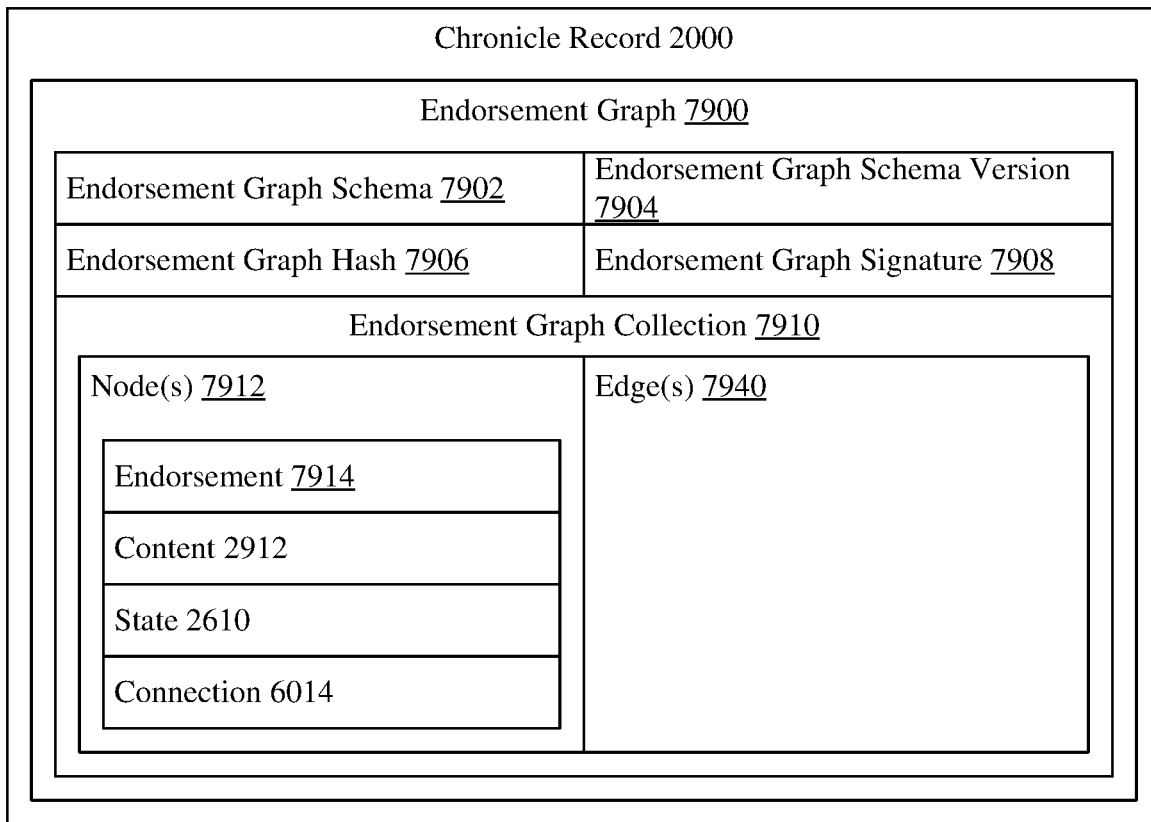
FIG. 79 is a block diagram of a Chronicle Record.

FIG. 79 is a block diagram of Chronicle Record 2000 which is comprised of Endorsement Graph 7900. Endorsement Graph 7900, which descends from Base Graph 2050 in FIG. 20, consists of Endorsement Graph Schema 7902, Endorsement Graph Schema Version 7904, Endorsement Graph Hash 7906, and Endorsement Graph Signature 7908. It also consists of Endorsement Graph Collection 7910 which contains Node(s) 7912 and Edge(s) 7940. Node(s) 7912 consists of Endorsement 7914, Content 2912, State 2610, and Connection 6014. This diagram illustrates that endorsements exist within Chronicle Record 2000.

Figure 80:
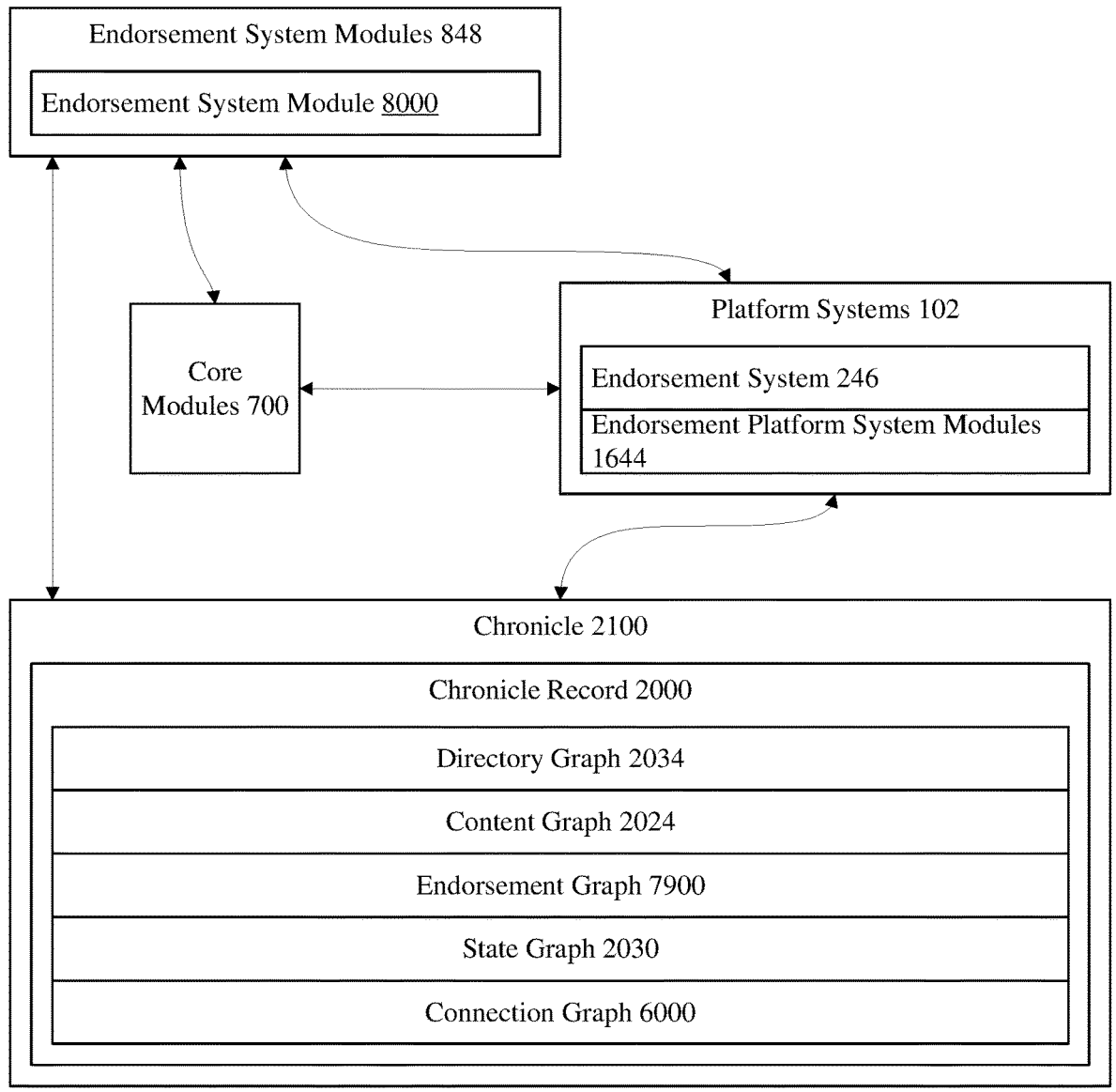
FIG. 80 is a block diagram of Endorsement System Modules.

FIG. 80 is a block diagram of Endorsement System Modules 848 which is comprised of Endorsement System Module 8000. Endorsement System Modules 848 interfaces with Platform Systems 102, Chronicle 2100, and Core Modules 700. Platform Systems 102, which consists of Endorsement System 246 and Endorsement Platform System Modules 1646, utilizes Chronicle 2100 and Core Modules 700. Chronicle 2100 is comprised of Chronicle Record 2000 which consists of Directory Graph 2034, Content Graph 2024, Endorsement Graph 7790, State Graph 2030, and Connection Graph 6000. Core Modules 700 is used for any cross-cutting concerns across Endorsement System Modules 848 and Platform Systems 102. This diagram illustrates Endorsement System Modules 848 as it relates to Platform Systems 102, Core Modules 700, and Chronicle 2100. FIG. 80 also illustrates Platform Systems 102's relationship to Chronicle 2100 and Core Modules 700.

Figure 81:
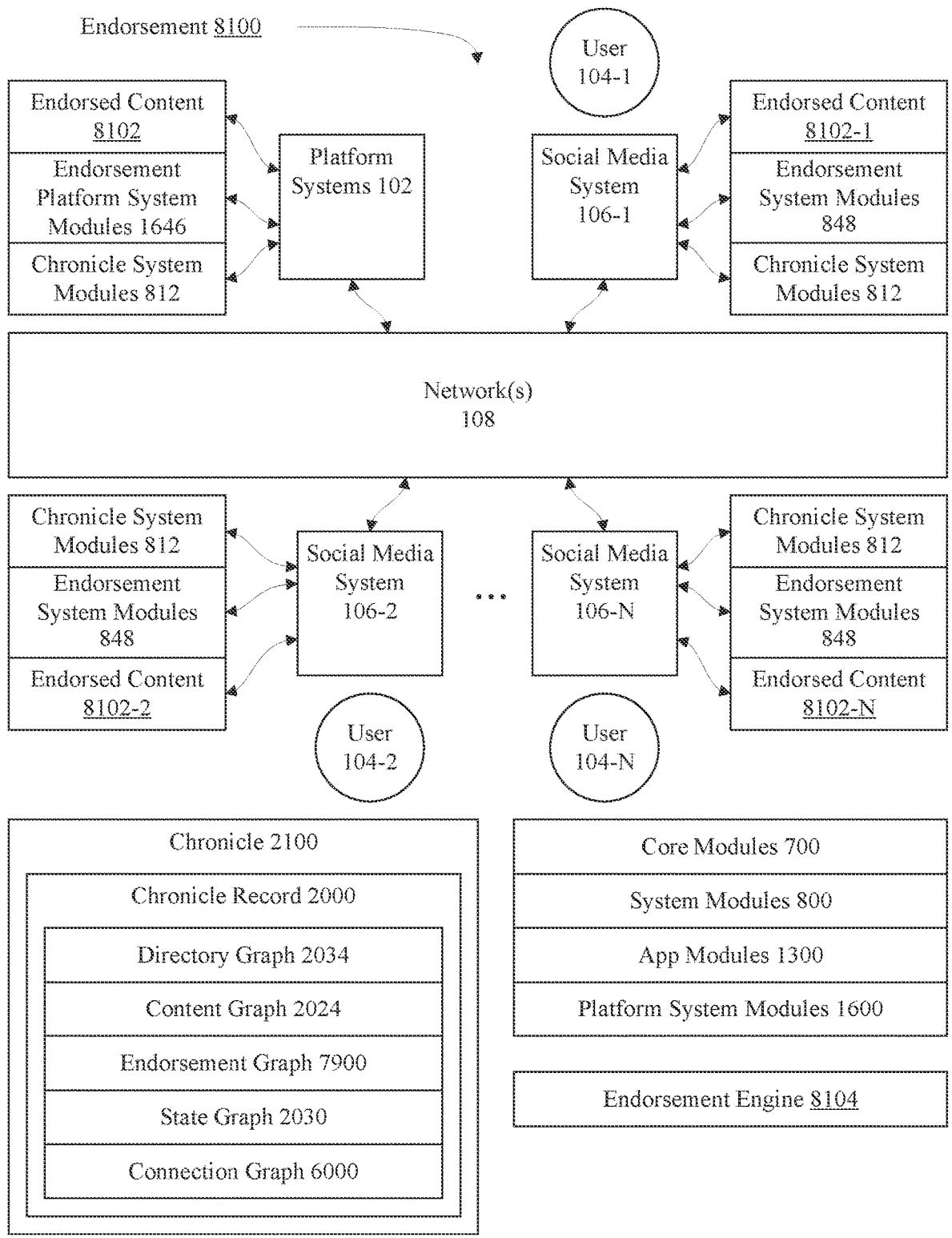
FIG. 81 is a block diagram of an Endorsement.

FIG. 81 is a block diagram of Endorsement 8100 which illustrates the endorsement functionality of the platform. Endorsement 8100 is comprised of Chronicle 2100 which consists of Chronicle Record 2000 which contains Directory Graph 2034, Content Graph 2024, Endorsement Graph 7900, State Graph 2030, and Connection Graph 6000. Platform Systems 102 utilizes Chronicle System Modules 812, Endorsement Platform System Modules 1646, and Endorsed Content 8102. Platform Systems 102 connects to Social Media System 106-1 for User 104-1, Social Media System 106-2 for User 104-2, Social Media System 106-N for User 104-N via Network(s) 108. User 104-1's Social Media System 106-1 utilizes Chronicle System Modules 812, Endorsement System Modules 848, and Endorsed Content 8102-1. User 104-2's Social Media System 106-2 utilizes Chronicle System Modules 812, Endorsement System Modules 848, and Endorsed Content 8102-2. User 104-N's Social Media System 106-N utilizes Chronicle System Modules 812, Endorsement System Modules, and Endorsed Content 8102-N. The ellipse between Social Media System 106-2 and Social Media System 106-N illustrates that there are N number of social media systems for every user on the network. Endorsement 8100 is also comprised of Endorsement Engine 8104 and Core Modules 700 which provides the cross-cutting functionality for Platform Systems 102, Social Media System 106-1 to Social Media System 106-N, App Modules 1300, System Modules 800, and Platform System Modules 1600 as well as all endorsement functionality.

This diagram illustrates that every Social Media System 106 has the ability to generate endorsed content for Distributed Social Media Network 300 in FIG. 3. All content, including ads, can be endorsed. In one embodiment of the invention, endorsements are free. One sample use case is an Editorial/Opinion 3720 in FIG. 37 that is endorsed by academics or politicians who want to lend their name to the notion expressed in the content. In another embodiment of the invention, endorsements are paid for utilizing Payment System Modules 834 and Payment App Module 1334. One sample use case is a content producer who uses Endorsement Engine 8104 to have their content matched with celebrities, noted sports figures, etc. who want to be paid for their endorsement. Note that an endorsement that appears inside of a message as Endorsed Content 8102 is different from Display Ads 3718 as a Publishable Content Type 3700 in FIG. 37. Various embodiments of the present technology support both.

Figure 82:
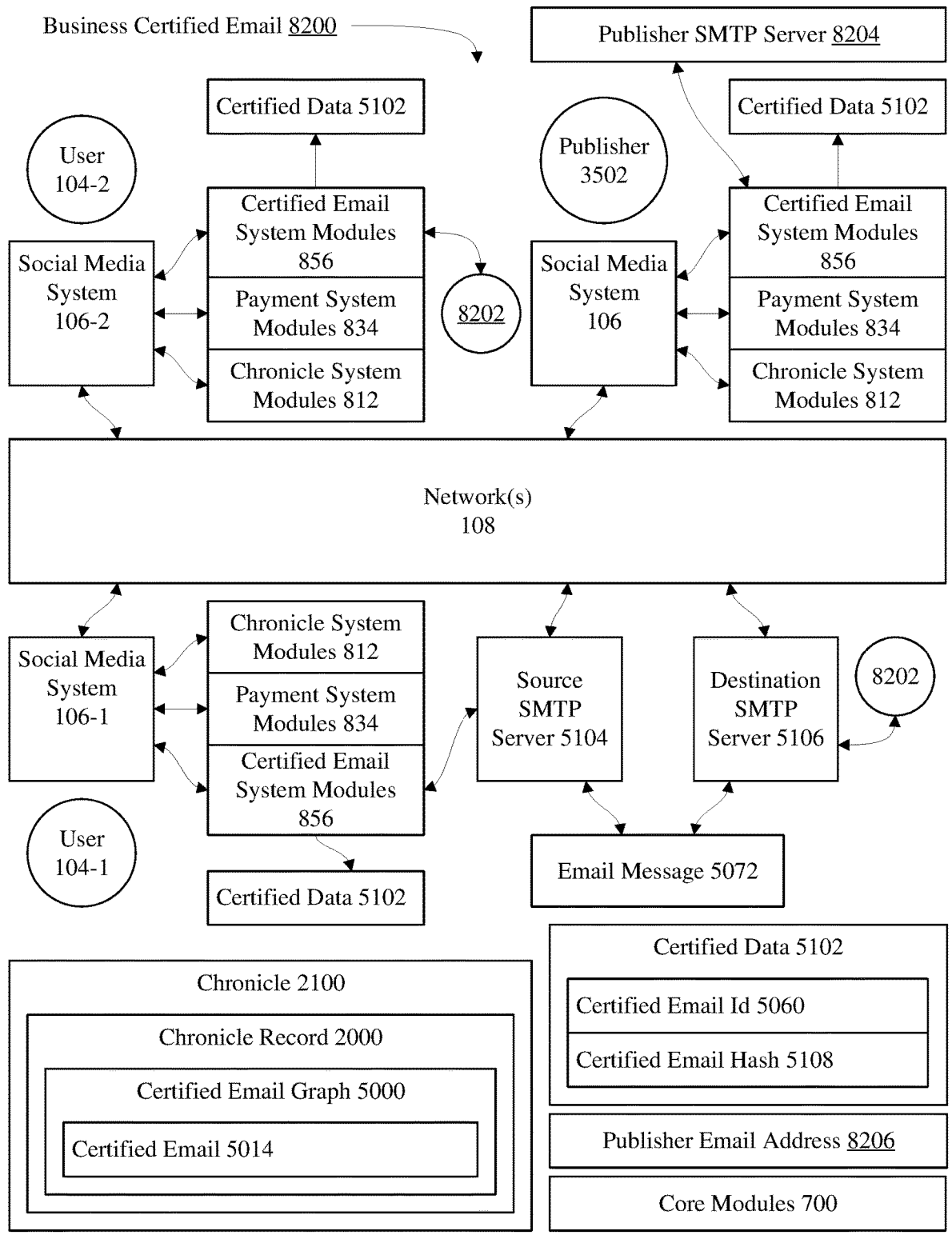
FIG. 82 is a block diagram of a Certified Business Email.

FIG. 82 is a block diagram of Certified Business Email 8200 which illustrates the business certified email functionality of the platform. Business Certified Email 8200 is comprised of Chronicle 2100 which contains Chronicle Record 2000 which consists of Certified Email Graph 5000 which contains Certified Email 5014. It is also comprised of Certified Data 5102 which contains Certified Email Id 5060 and Certified Email Hash 5108. FIG. 82 also contains the Publisher Email Address 8206 and Core Modules 700 which provides all the cross-cutting functionality for Business Certified Email 8200. Social Media System 106-1 for User 104-1 utilizes Chronicle System Modules 812, Payment System Modules 834, and Certified Email System Modules 856. Certified Email System Modules 856 utilizes Certified Data 5102. Email Message 5072 is associated to Source SMTP Server 5104 and Destination SMTP Server 5106. Social Media System 106-2 for User 104-2 utilizes Chronicle System Modules 812, Payment System Modules 834, and Certified Email System Modules 856. Certified Email System Modules 856 utilizes Certified Data 5102. Social Media System 106 for Publisher 3502 utilizes Chronicle System Modules 812, Payment System Modules 834, and Certified Email System Modules 856. Certified Email System Modules 856 utilizes Certified Data 5102 and Publisher Certified Email Address 8240. User 104-1's Social Media System 106-1 and User 104-2's Social Media System 106-2 interface with Publisher 3502's Social Media System 106, Source SMTP Server 5104, and Destination SMTP Server 5106 via Network(s) 108.

Business Certified Email 8200 in FIG. 82 illustrates how Certified Email System Modules 856 integrate with SMTP to facilitate secure email exchanges for business so that source email addresses, content and attachments are captured as an immutable, traceable hash that enable recipients to verify email sources, content and attachments, and thereby thwart email security hazards such as viruses, trojan horses, phishing, spear-fishing, etc. Business Certified Email 8200 verified email reduces security risks inherent with emails containing malicious URI and attachments.

Certified Email System Modules 856 for Social Media System 106-1 integrates with Source SMTP Server 5104 to capture outgoing email messages. Once an email is captured, a Merkle root is calculated from the email addresses, content and attachments. The Merkle root, email timestamp, from address, to addresses, cc addresses are sent to the Certified Email System Modules 856 for the Publisher 3502 which creates a Certified Email 5014 node from FIG. 50 for a new Chronicle Record 2000.

The Merkle root is stored in Email Hash 5076, email timestamp is stored in Email Timestamp 5064, from address is stored in Email From Address 5066, to addresses is stored in Email To Address 5068, and cc addresses is stored in Email CC Address 5070 of Certified Email 5014.

Certified Email Timestamp 5062, Certified Email Id 5060, and Certified Email Key 5074 are then generated and stored in Certified Email 5014. Certified Email Hash 5108 is a Merkle root generated from Certified Email 5014 properties. Certified Data 5102 containing Certified Email Id 5060 and Certified Email Hash 5108 are then sent back to Certified Email System Modules 856 for the User 104-1. Certified Data 5102 and Publisher Email Address 8206 are added to outgoing email messages as the final processing step before being sent.

Upon receipt of the email, Certified Email System Modules 856 for Publisher 3502 utilizes Certified Data 5102 to locate Chronicle Record 2000, and then encrypts and stores the email to the Email Message 5072 property of Certified Email 5014. Certified Email System Modules 856 then calculates a Merkle root from the received email addresses, content and attachments. The hash value is used to verify the stored value in the Email Hash 5076 property of Certified Email 5014. The verification result is stored in the Certified Email Verified 5078 property of Certified Email 5014.

Upon receipt of the email, Certified Email System Modules 856 for the User 104-2, associated with Destination SMTP Server 5106, intercepts the incoming email, removes the Certified Data 5102 data and calculates a Merkle root from the received email addresses, content, and attachments. The resulting hash, Certified Email Id 5060, and Certified Email Hash 5108 is then sent to Certified Email System Modules 856 for Publisher 3502 to certify the email.

Upon determining the certification results, Certified Email System Modules 856 for Publisher 3502 returns Certified Email Verified 5078 to Certified Email System Modules 856 for User 104-2. If Certified Email Verified 5078 is true, then the email is delivered to the recipients, else it is sent to a "hazard" email box for further processing or inspection.

In one embodiment of the invention Certified Email System Modules 856 is a proxy server for Source SMTP Server 5104 and Destination SMTP Server 5106. In another embodiment of the invention, Certified Email System Modules 856 is integrated into Source SMTP Server 5104 and Destination SMTP Server 5106.

Payment System Modules 834 for Publisher 3502, User 104-1 and User 104-2 can be used to setup payments for certified email processing. Core Modules 700 provides all cross-cutting functions for systems and system modules.

FIG. 83 is a block diagram of Chronicle Record 2000 which is comprised of Content Verification Graph 8300. Content Verification Graph 8300, which descends from Base Graph 2050 in FIG. 20, consists of Content Verification Graph Schema 8302, Content Verification Graph Schema Version 8304, Content Verification Graph Hash 8306, and Content Verification Graph Signature 8308. It also consists of Content Verification Graph Collection 8310 which contains Node(s) 8312 and Edge(s) 8340. Node(s) 8312 consists of Content Verification 8314, Content Verification Feature 8316, Content Verification Category 8318, State 2610, and Connection 6014. Edge(s) 8340 consists of Content Verification Probability 8342. Content Verification 8314 has the properties Content Verification Id 8350 and Content Verification Timestamp 8352. This diagram illustrates that content verification exists within Chronicle Record 2000.

FIG. 84 is a block diagram of Chronicle Record 2000 which is comprised of Content Verification Features 8400. Content Verification Features 8400 consists of Content Type 8402, Content Meta Data 8404, Source Location 8406, Content Size 8408, Associated Content 8410, Content Source Frequency 8412, Content Device 8414, Content Filter Scan 8416, Video Sound Analysis 8418, Video Text Analysis 8420, Video Object Analysis 8422, Video Subject Analysis 8424, Picture Text Analysis 8426, Picture Object Analysis 8428, Picture Subject Analysis 8430, Source Hash Analysis 8432, Text Subject Analysis 8434, and Text Key Word Analysis 8436.

This diagram details the Content Verification Features 8400 used by Machine Learning System Modules 828 in FIG. 8 to verify content. Content Type 8402 is the type of content. Content Meta Data 8404 is the content metadata. Source Location 8406 is where the content originates from, specifically what device plus the location metadata on the content. Content Size 8408 is the content size. Associated Content 8410 is what other content is submitted with the content in question. Content Source Frequency 8412 is how frequently the source is submitting content. Content Device 8414 is the kind of device the content originated from. Content Filter Scan 8416 is a scan of text, looking for key words that might require flagging. Video Sound Analysis 8418 is analysis of video sound. Video Text Analysis 8420 is analysis of video text. Video Object Analysis 8422 is analysis of video objects. Video Subject Analysis 8424 is analysis of video subject. Picture Text Analysis 8426 is analysis of picture text. Picture Object Analysis 8428 is analysis of picture objects. Picture Subject Analysis 8430 is analysis of picture subjects. Source Hash Analysis 8432 is analysis of source hash and searching for same hash for known offensive or illegal material. Text Subject Analysis 8434 is analysis of text subject. Text Key Word Analysis 8436 is analysis of text key words.

Figure 85:
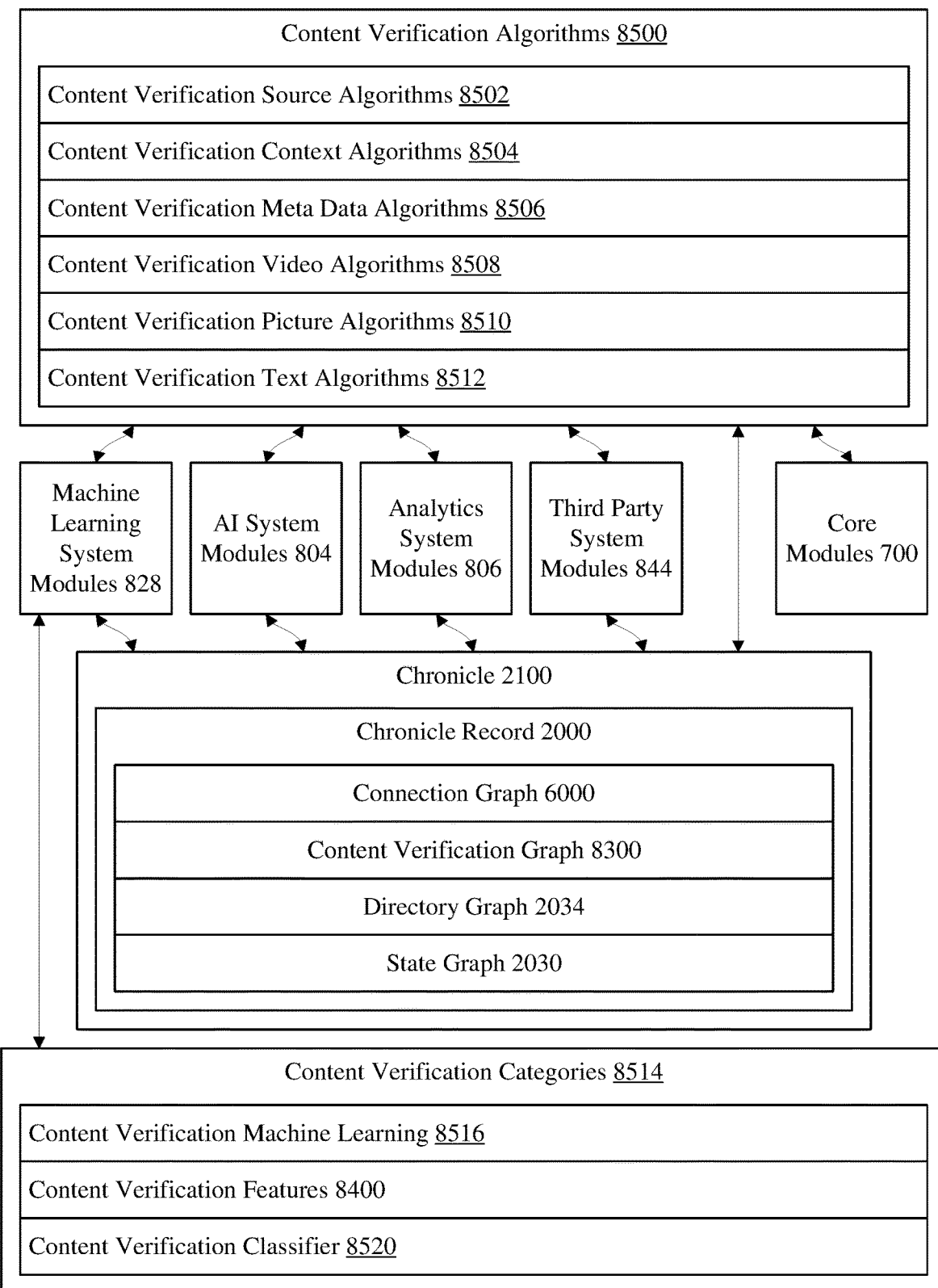
FIG. 85 is a block diagram of Content Verification Algorithms.

FIG. 85 is a block diagram of Content Verification Algorithms 8500 which contains Content Verification Source Algorithms 8502, Content Verification Context Algorithms 8504, Content Verification Meta Data Algorithms 8506, Content Verification Video Algorithms 8508, Content Verification Picture Algorithms 8510, and Content Verification Text Algorithms 8512. Content Verification Algorithms 8500 is associated with Machine Learning System Modules 828, AI System Modules 804, Analytics System Modules 806, Third Party System Modules 844, and Core Modules 700. Content Verification Categories 8514 includes Content Verification Machine Learning 8516, Content Verification Features 8400, and Content Verification Classifier 8520. Content Verification Categories 8514 is associated with Machine Learning System Modules 828. Chronicle 2100 includes Chronicle Record 2000 which consists of Connection Graph 6000, Content Verification Graph 8300, Directory Graph 2034, and State Graph 2030. Chronicle 2100 is associated with Machine Learning System Modules 828, AI System Modules 804, Analytics System Modules 806, Third Party System Modules 844, and Content Verification Algorithms 8500.

Content Verification Algorithms 8500 utilizes Content Verification Features 8400 in FIG. 84. It is intended to be used with features involving source, context, metadata, video, picture and text related data in conjunction with Machine Learning System Modules 828 and Content Verification Categories 8514. Content Verification Algorithms 8500 could also work in conjunction with AI System Modules 804, Analytics System Modules 806, and Third Party System Modules 844 which may provide additional content verification systems or functionality that can be integrated into Content Verification Algorithms 8500. Core Modules 700 provides the cross-cutting functionality for Content Verification Algorithms 8500. In particular, all interactions with the elements in FIG. 85 utilize Telemetry Core Module 714, Logging Core Module 710, and Exception Handling Core Module 702 in FIG. 7. Telemetry Core Module 714 in FIG. 7 provides auditing insight into every interaction that can be audited and reported on vis-a-vis Audit System Modules 810 on FIG. 8. Machine Learning System Modules 828 utilizes Content Verification Categories 8514 consisting of Content Verification Machine Learning 8516 which is based on a training set of data containing instances whose features and assigned category membership is known, Content Verification Features 8400 which are derived from system composition profiles and their resulting performance metrics from telemetry data managed by Telemetry System 226 in FIG. 2, and Content Verification Classifier 8520 which is a classification algorithm that maps a new instance's system profile data to a category.

This diagram illustrates how Machine Learning System Modules 828 looks at Content Verification Features 8400 in FIG. 84, puts weight on different features, creates probability for authenticity of content verification, and puts the content in question into Content Verification Classifier 8520.

Figure 86:
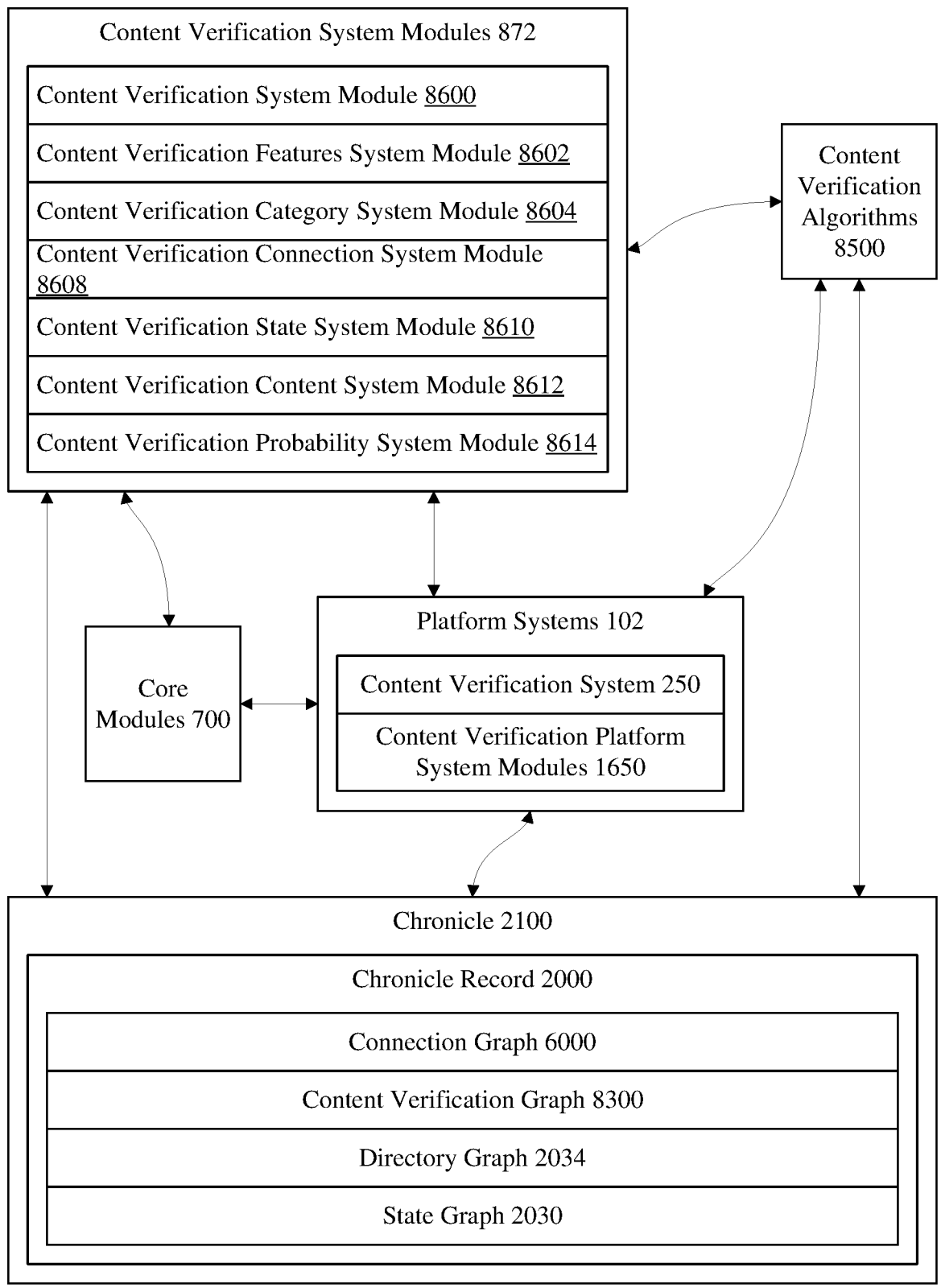
FIG. 86 is a block diagram of Content Verification System Modules.

FIG. 86 is a block diagram of Content Verification System Modules 872 which is comprised of Content Verification System Module 8600, Content Verification Features System Module 8602, Content Verification Category System Module 8604, Content Verification Connection System Module 8608, Content Verification State System Module 8610, Content Verification Content System Module 8612, and Content Verification Probability System Module 8614. Content Verification System Modules 872 interfaces with Platform Systems 102, Chronicle 2100, Content Verification Algorithms 8500, and Core Modules 700. Platform Systems 102, which consists of Content Verification System 250 and Content Verification Platform System Modules 1650, utilizes Chronicle 2100 as well as Content Verification Algorithms 8500. Content Verification Algorithms 8500 interfaces with Content Verification System Modules 872, Platform Systems 102, and Chronicle 2100. Chronicle 2100 is comprised of Chronicle Record 2000 which consists of Connection Graph 6000, Content Verification Graph 8300, Directory Graph 2034, and State Graph 2030. Core Modules 700 provides all the cross-cutting functionality for Content Verification System Modules 872 and Platform Systems 102. This diagram illustrates Content Verification System Modules 802 as it relates to Platform Systems 102, Content Verification Algorithms 8500, Core Modules 700, and Chronicle 2100. FIG. 86 also illustrates Platform Systems 102's relationship to Content Verification Algorithms 8500, Chronicle 2100, and Core Modules 700.

Figure 87:
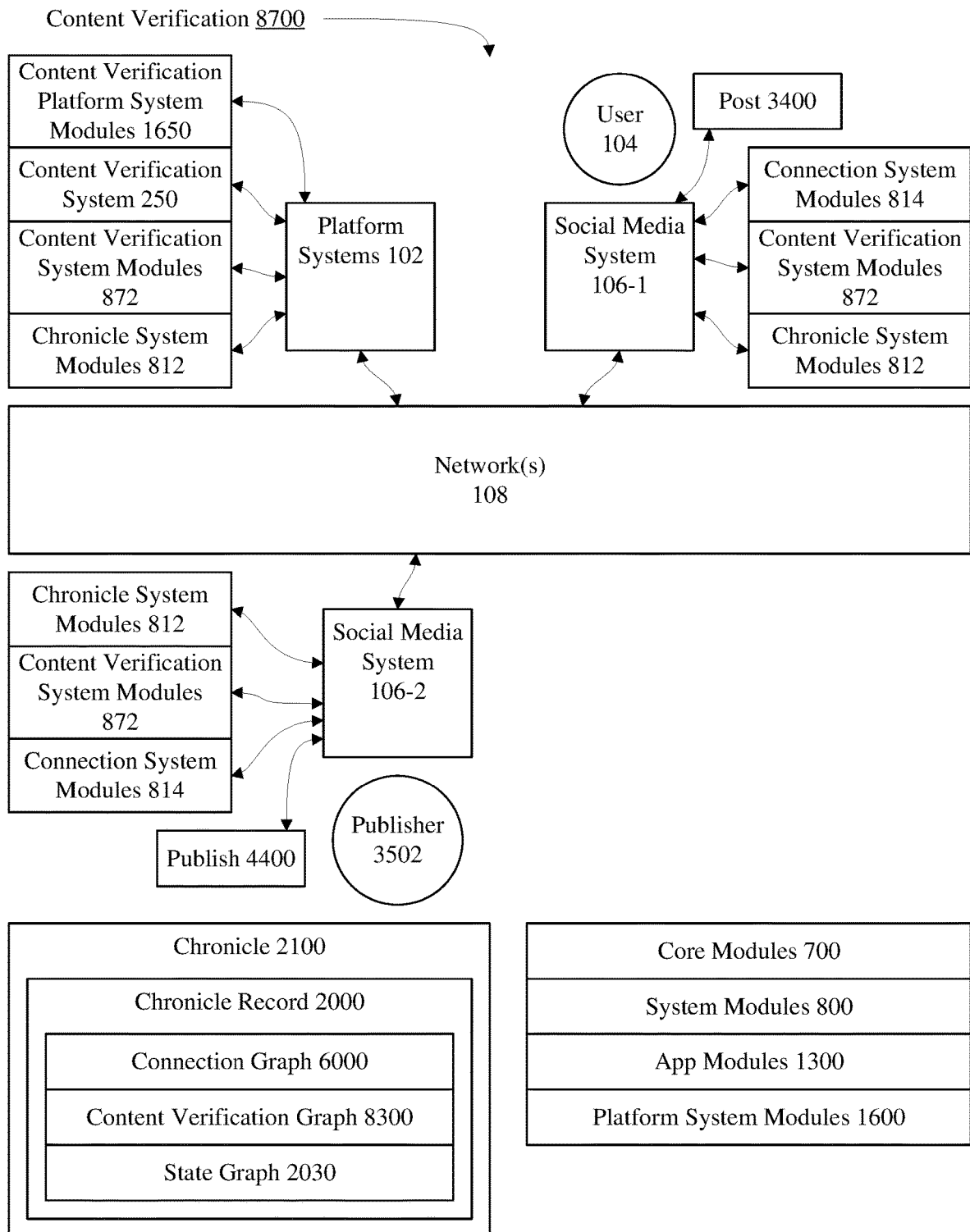
FIG. 87 is a block diagram of Content Verification.

FIG. 87 is a block diagram of Content Verification 8700 which illustrates the content verification functionality of the platform. Content Verification 8700 is comprised of Chronicle 2100 which consists of Chronicle Record 2000 which contains Connection Graph 6000, Content Verification Graph 8300, and State Graph 2030. Platform Systems 102 utilizes Chronicle System Modules 812, Content Verification System Modules 872, Content Verification System 250, and Content Verification Platform System Modules 1650. Platform Systems 102 connects to Social Media System 106-1 for User 104 and Social Media System 106-2 for Publisher 3502 via Network(s) 108. User 104's Social Media System 106-1 utilizes Chronicle System Modules 812, Content Verification System Modules 872, and Connection System Modules 814. Social Media System 106-1 connects to Post 3400. Publisher 3502's Social Media System 106-2 utilizes Chronicle System Modules 812, Content Verification System Modules 872, and Connection System Modules 814. Social Media System 106-2 connects to Publish 4400. Content Verification 8700 is also comprised of Core Modules 700 which are used for any cross-cutting concerns across Platform Systems 102, Social Media System 106-1, Social Media System 106-2, App Modules 1300, System Modules 800, and Platform System Modules 1600 as well as all content verification functionality.

This diagram illustrates that all content on Distributed Social Media Network 300 in FIG. 3, whether posted or published, goes through Content Verification System Module 872 and Content Verification Platform System Modules 1650 for verification before distribution. Every Chronicle Record 2000 and its associated Connection Graph 6000, Content Verification Graph 8300, and State Graph 2030 are inspected to ensure the content meets with network terms of service, including compliance with state and federal laws, as well journalistic or ad standards. If content is rejected for posting, User 104 can be notified via Content Verification App Module 1372 working in conjunction with Message Board App Module 1330. If content is flagged before publishing, Publisher 3502 can use Content Verification App Module 1372 in FIG. 13 to actually inspect the flagged content and either inform User 104 that the content has been edited and needs to be re-submitted or that the content has been rejected. Publisher 3502 can also use Third Party System Modules 844 to integrate third party systems for content verification, which is especially useful if a government agency, for example, has a warrant to investigate and document suspected unlawful activity of bad actors on the network.

In sum, Distributed Architecture 100 in FIG. 1 enables the examination and verification of content, both automatically and manually, in ways that are highly scalable, processed through parallelism, and far more efficient and effective at the micro level than the approaches being attempted by centralized social media networks at the macro level. Furthermore, the use of Chronicle 2100 with its traceability, visibility, and immutability holds both users and publishers to a much higher standard of content quality because they are held accountable for what is ultimately distributed on the network.

Figure 88:
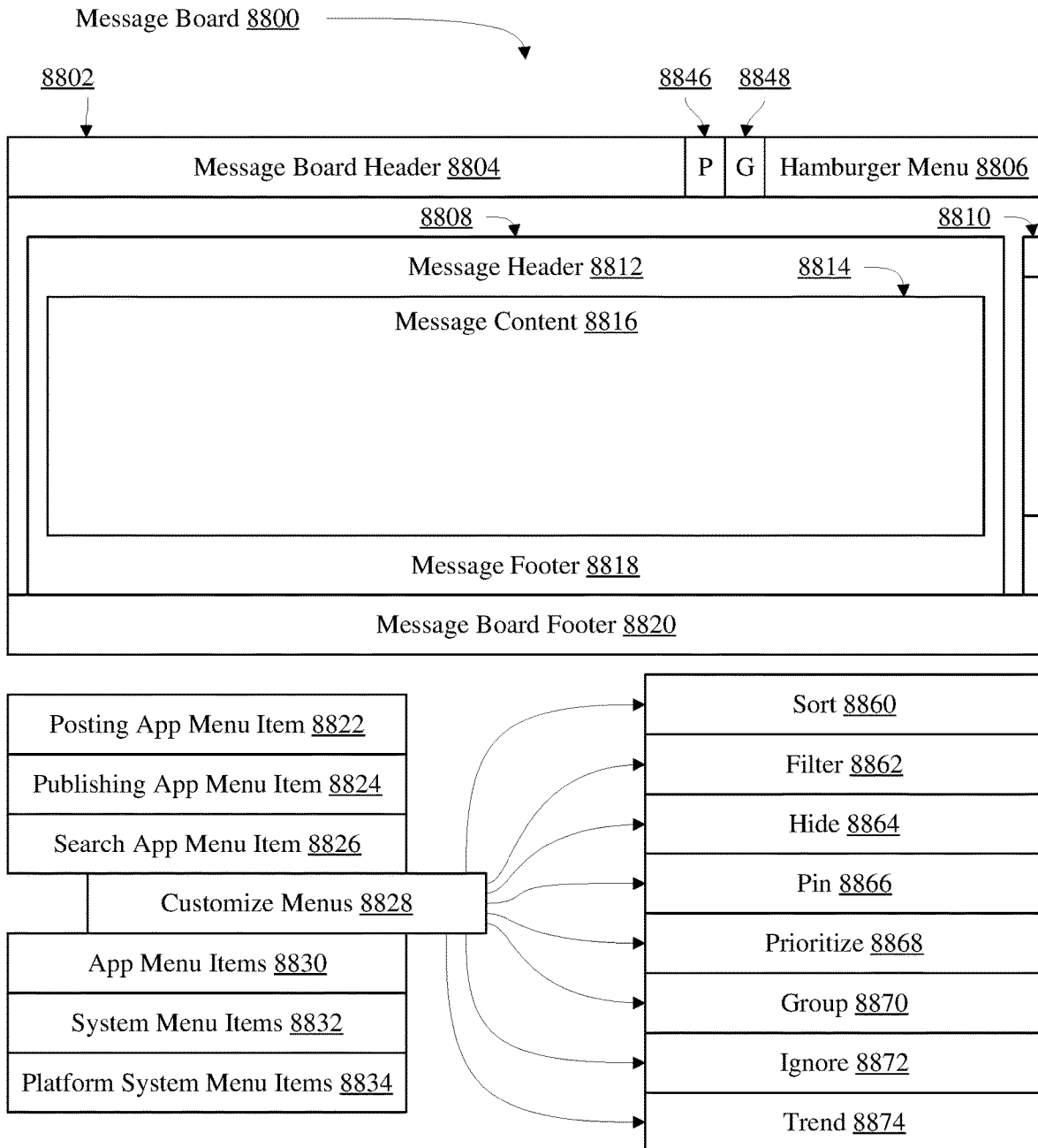
FIG. 88 is a block diagram of a Message Board.

FIG. 88 is a block diagram of Message Board 8800 which illustrates Message Board Boundary 8802 which contains Message Board Header 8804, element "P" 8846, element "G" 8848, Hamburger Menu 8806, Message Content Border 8808, Message Board Scroll Bar 8810, and Message Board Footer 8820. Message Content Border 8808 contains Message Header 8812, Message Footer 8818, and Message Border 8814. Message Border 8814 contains Message Content 8816.

The figure also illustrates Posting App Menu Item 8822, Publishing App Menu Item 8824, Search App Menu Item 8826, Customize Menus 8828, App Menu Items 8830, System Menu Items 8832, and Platform System Menu Items 8834. Customize Menus 8828 references Sort 8860, Filter 8862, Hide 8864, Pin 8866, Prioritize 8868, Group 8870, Ignore 8872, and Trend 8874 menus.

Message Board 8800 contains one or more messages. Each message has Message Header 8812, Message Border 8814, Message Content 8816, and Message Footer 8818. Message Border 8814 may utilize different colors or graphics to illustrate Publishable Content Types 3700 in FIG. 37.

Each menu illustrates buttons or links to user interface screens that enable application features and functionality. Hamburger Menu 8806 illustrates a button or link to display dropdown items for Posting App Menu Item 8822, Publishing App Menu Item 8824, Search App Menu Item 8826, and Customize Menus 8828 menus. Element "P" 8846 illustrates a button or link to display dropdown items for Posting App Menu Item 8822 and Publishing App Menu Item 8824 menus. The element "G" 8848 illustrates a button or link to display dropdown items for Sort 8860, Filter 8862, Hide 8864, Pin 8866, Prioritize 8868, Group 8870, Ignore 8872, and Trend 8874 menus.

Figure 91:
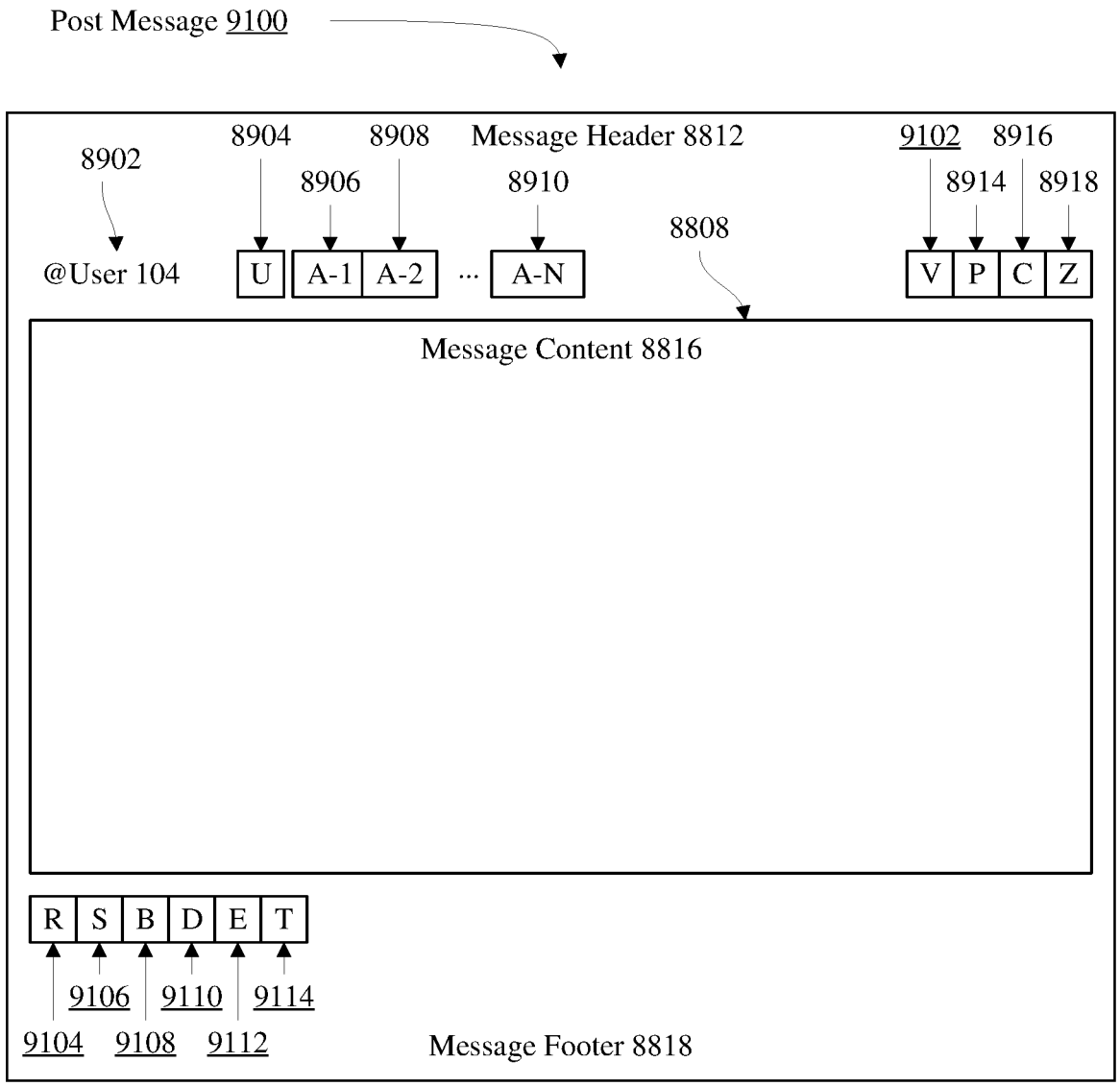
FIG. 91 illustrates the Post Message.

Activating Posting App Menu Item 8822 menu displays the screen for Post Message 9100 in FIG. 91.

Figure 89:
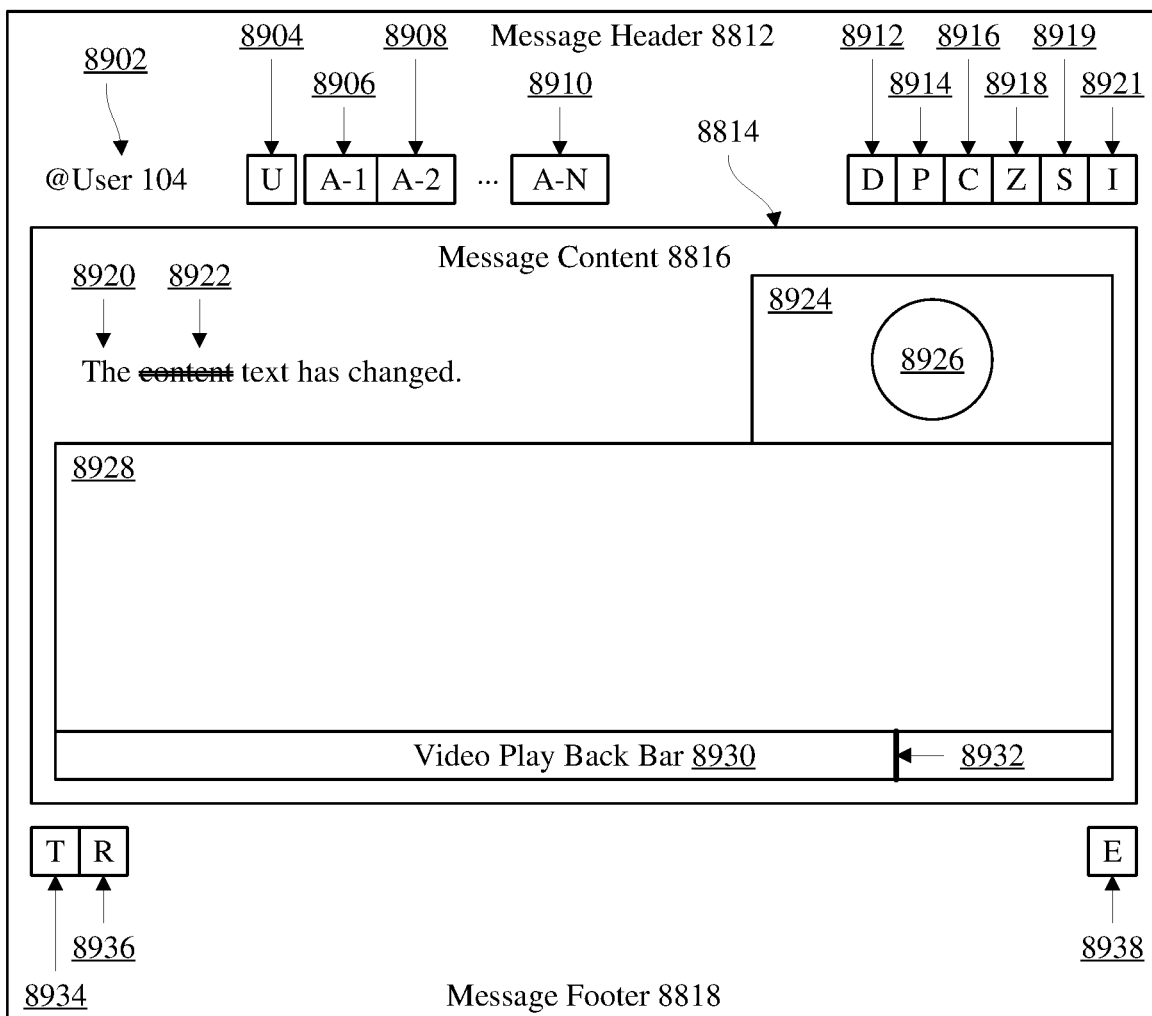
FIG. 89 illustrates the Publish Message.
Figure 90:
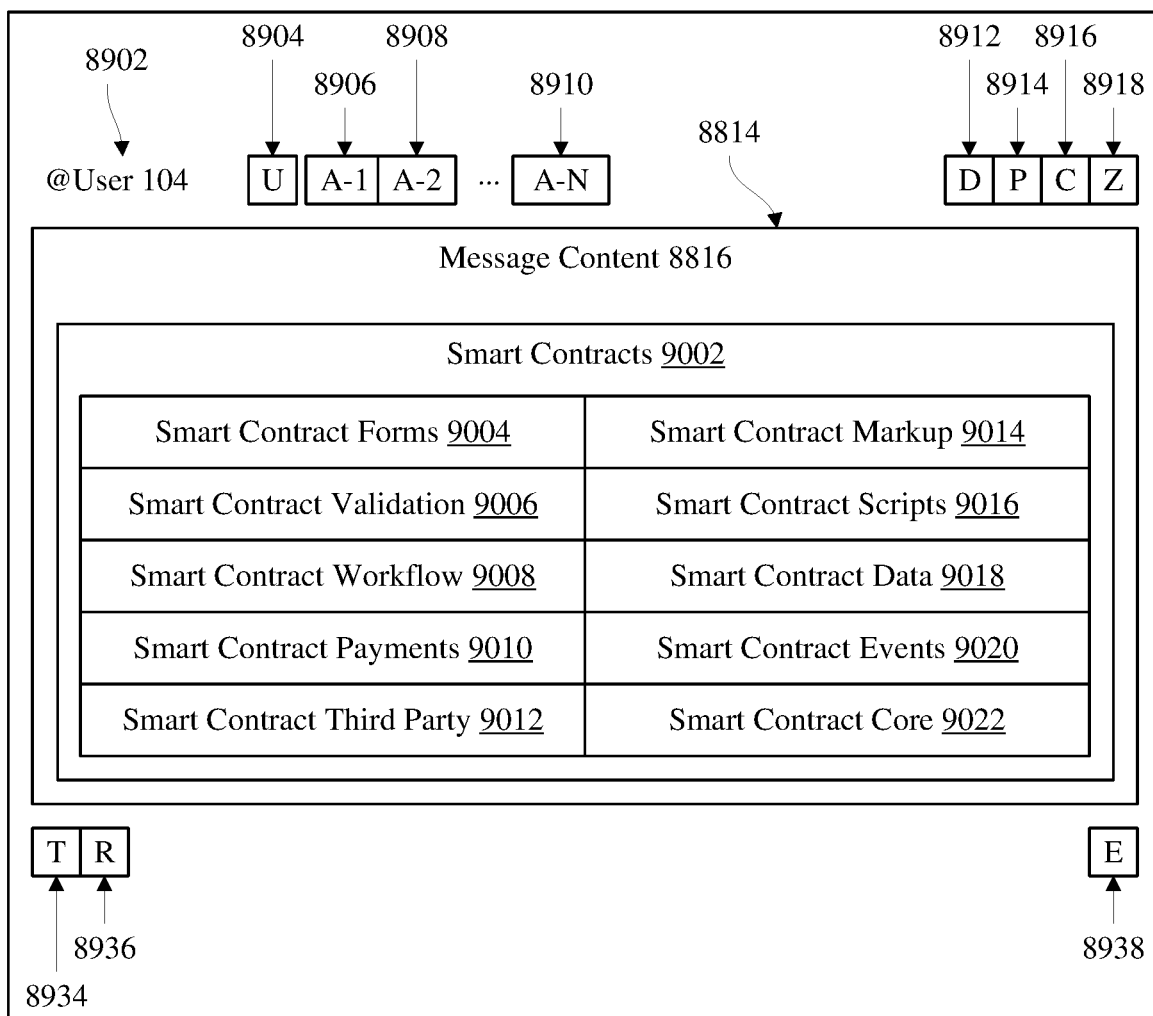
FIG. 90 illustrates the Publish Message Smart Contracts.

Activating Publishing App Menu Item 8824 menu displays the screen for Publish Message 8900 in FIG. 89 or the screen for Publish Message Smart Contracts 9000 in FIG. 90.

Activating Search App Menu Item 8826 menu displays the search screen to search Message Board 8800 content.

Activating Sort 8860 menu displays the sort screen for sort customization of Message Board 8800 content. Sort customizations can also be stored in Social Media System 106 in FIG. 1 and utilized by Social Media System 106 in FIG. 1 for sorting content.

Activating Filter 8862 menu displays the sort screen for filter customization of Message Board 8800 content. Filter customizations can also be stored in Social Media System 106 in FIG. 1 and utilized by Social Media System 106 in FIG. 1 for filtering content.

Activating Hide 8864 menu displays the hide screen for hide customization of Message Board 8800 content. Hide customizations can also be stored in Social Media System 106 in FIG. 1 and utilized by Social Media System 106 in FIG. 1 for hiding content.

Activating Pin 8866 menu displays the pin screen for pin customization of Message Board 8800 content. Pin customizations can also be stored in Social Media System 106 in FIG. 1 and utilized by Social Media System 106 in FIG. 1 for pinning content.

Activating Prioritize 8868 menu displays the prioritize screen for priority customization of Message Board 8800 content. Priority customizations can also be stored in Social Media System 106 in FIG. 1 and utilized by Social Media System 106 in FIG. 1 for prioritizing content.

Activating Group 8870 menu displays the group screen for group customization of Message Board 8800 content. Group customizations can also be stored in Social Media System 106 in FIG. 1 and utilized by Social Media System 106 in FIG. 1 for grouping content.

Activating Ignore 8872 menu displays the ignore screen for ignore customization of Message Board 8800 content. Ignore customizations can also be stored in Social Media System 106 in FIG. 1 and utilized by Social Media System 106 in FIG. 1 for the ignoring content.

Activating Trend 8844 menu displays the trend screen for trend customization of Message Board 8800. Trend customizations can also be stored in and utilized by Social Media System 106 in FIG. 1.

Activating Connection 8846 menu displays the connection screen for connection management and settings. Connection management and settings can also be stored in and utilized by Social Media System 106 in FIG. 1.

The figure is not drawn to scale. In one embodiment of the invention, the elements illustrate their location relative to other elements. In another embodiment of the invention, the elements may have different locations.

FIG. 89 illustrates the Publish Message 8900 user interface elements for a published message.

The Message Header 8812 contains the mention @User 104 at element 8902, the user type "U" element 8904, the user type "U" element 8904, the user associations "A-1" element 8906, the user associations "A-2" element 8908, the user associations "A-N" element 8910, the content difference notification "D" element 8912, the publisher icon "P" element 8914, the content type "C" element 8916, the pinned "Z" element 8918, and the priority "S" element 8919.

The ellipse between element 8908 and element 8910 indicate that there can be an unlimited list of user associations. User associations have a graphic illustrating the type association. User associations include employer, professional, union, civic, etc. membership or relationships. As an example, a graphic illusion for an employer association could be the employer's logo.

Content difference notification "D" element 8912 indicates that content has changed. Different graphic illustrations indicate the type of change. Activating the content difference notification "D" element 8912 causes the Message Board 8800 to display an overlay or difference screen that displays the history of the content changes, the details for each change, and comparison tools.

Pinned "Z" element 8918 indicates a "pinned" message that is placed on top of all unpinned messages in the Message Board 8800 and has a graphic illustrating a pushpin emoji. Priority "S" element 8919 indicates a "priority" message that is placed on top of all pinned and unpinned messages in the Message Board 8800 and has a graphic illustrating a sparkling emoji. The more sparkles, the higher the priority. Ignored "I" element 8921 indicates an "ignored" message and is illustrated by a "talk to the hand" emoji.

Message Content 8816 illustrates content elements and content changed elements. Element 8920 illustrates text content, and element 8922 illustrates text content with a double strikethrough. Element 8922 gives a visual indicator in the content to the reader that the content text has changed. Element 8922 is actionable. If a user clicks on the strikethrough text, the Message Board 8800 displays an overlay or difference screen that displays the history of the content changes, the details for each change, and comparison tools.

Element 8924 illustrates a picture for content, and element 8926 illustrates a circle that encompasses the changes in the picture. The graphic area has the word "Changed" or an icon as a graphics overlay to indicate to the user that the content has changed. Element 8926 is actionable. If a user clicks on or in the circle, the Message Board 8800 displays an overlay or difference screen that displays the history of the content changes, the details for each change, and comparison tools.

Element 8928 illustrates a video for content, and element Video Play Back Bar 8930 illustrates a common video play back bar to control playback. The vertical line segment at element 8932 in the video playback bar indicates the location of changes in the video content. Clicking on element 8932 takes the user to the location of the video content change. The changed video content has the word "Changed" or an icon as a graphics overlay to indicate to the user that the content has changed. Clicking the video player element 8928 while "changed" content is in context causes the Message Board 8800 to display an overlay or difference screen that displays the history of the content changes, the details for each change, and comparison tools.

Message Footer 8818 illustrates trending "T" element 8934, rhetoric "R" element 8936, and endorsement "E" element 8938. Element 8934 is actionable. If a user clicks on element 8934, the Message Board 8800 displays an overlay or trending screen that displays the trending information about the content. Trending "T" element 8934 is illustrated by a trend emoji.

Element 8936 is actionable. If a user clicks on element 8936, the Message Board 8800 displays an overlay or rhetoric screen that displays the rhetoric information about the content or enables the user to participate in the rhetoric features and functions. Rhetoric "R" element 8936 is illustrated by a rhetoric emoji.

Element 8938 is actionable. If a user clicks on element 8938, the Message Board 8800 displays an overlay or trending screen that displays the endorsement information for the content. Endorsement displays are actionable and the provide analytics data. Endorsement "E" element 8938 is illustrated by an endorsement emoji. Message Content 8816 displays the endorsement popup banner as a graphic overlay.

Some elements allow for hard press or context menus to provide additional features.

A hard press of the mention @User 104 at element 8902 causes the Message Board 8800 to display the profile screen for User 104 in FIG. 1.

A hard press of the user associations "A-1" element 8906, the user associations "A-2" element 8908, or the user associations "A-N" element 8910 causes the Message Board 8800 to display the profile screen for the association.

A hard press of the content difference notification "D" element 8912 toggles on and off the differencing display features for content in the Message Content 8816 display area.

A hard press of the publisher icon "P" element 8914 causes the Message Board 8800 to display the profile screen for the publisher.

A hard press of the content type "C" element 8916 causes the Message Board 8800 to display the content details screen to provide complete traceability and transparency about the content as well as content type, see FIG. 7, Publishable Content Types 3700, license, copyright, subject headings, subdivisions, classifications and catalog information. See FIG. 29, License 2914, Copyright 2916, Subject Headings 2918, Subdivisions 2920, Classification 2922, and Catalog 2924.

A hard press of the pinned "Z" element 8918 toggles on and off the pinned status of the Published Message 8900.

A hard press of the priority "S" element 8919 enables users to select the number of sparkles to indicate the relative priority status of the Published Message 8900.

A hard press of the Ignored "I" element 8921 toggles on and off ignore status of the Published Message 8900. A soft press of the Ignored "I" element 8921 toggles on and off the Message Content 8816 display area. This action is customizable, whereby all ignored messages are affected or a single ignored message is affected.

FIG. 90 illustrates the Publish Message Smart Contracts 9000 user interface elements for a published message with smart contract elements.

The Message Content 8816 element contains the Smart Contracts 9002 element. The Smart Contracts 9002 element contains the Smart Contract Forms 9004, Smart Contract Validation 9006, Smart Contract Workflow 9008, Smart Contract Payments 9010, Smart Contract Third Party 9012, Smart Contract Markup 9014, Smart Contract Scripts 9016, Smart Contract Data 9018, Smart Contract Events 9020, and Smart Contract Core 9022 elements.

The Smart Contracts 9002 element enable smart contract features and functionality in the Message Board 8800.

FIG. 91 illustrates the Post Message 9100 user interface elements for a post message.

The Message Header 8812 contains the content version "V" element 9102.

The Message Footer 8818 contains the read only "R" element 9104, the re-share "S" element 9106, the bump "B" element 9108, the download "D" element 9110, the "for your eyes only" "E" element 9112, the "set time limit" "T" element 9114.

The read only "R" element 9104 indicates that the post message is read only. The message cannot be re-shared, downloaded or commented on.

The re-share "S" element 9106 indicates that users can re-share the post message.

The bump "B" element 9108 indicates the post message to be redistributed to users.

The download "D" element 9110 indicates that users can download the post message.

The "for your eyes only" "E" element 9112 is an indicator that lets users know that the post message contains private, confidential, or sensitive information.

The "set time limit" "T" element 9114 enables users to set a delete timestamp wherein the message is auto deleted by their FIG. 1, Social Media System 106.

Figure 92:
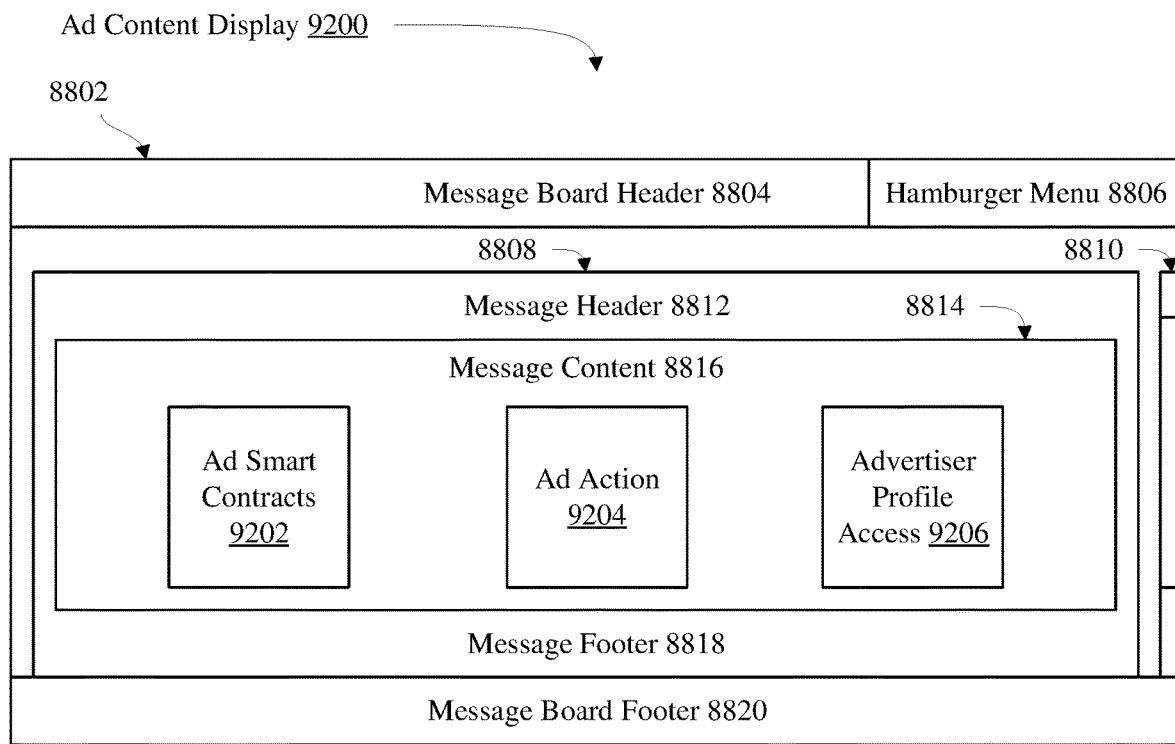
FIG. 92 illustrates the Ad Content Display.

FIG. 92 illustrates the Ad Content Display 9200 user interface elements for an ad message.

Ad Smart Contract 9202 enables users to initialize a transaction within the ad itself.

Ad Action 9204 enables users to take an action within the ad, such as flagging or printing a circular ad for their next visit to the grocery store.

Advertiser Profile Access 9206 enables users to see the advertiser's profile in the directory.

Figure 93:
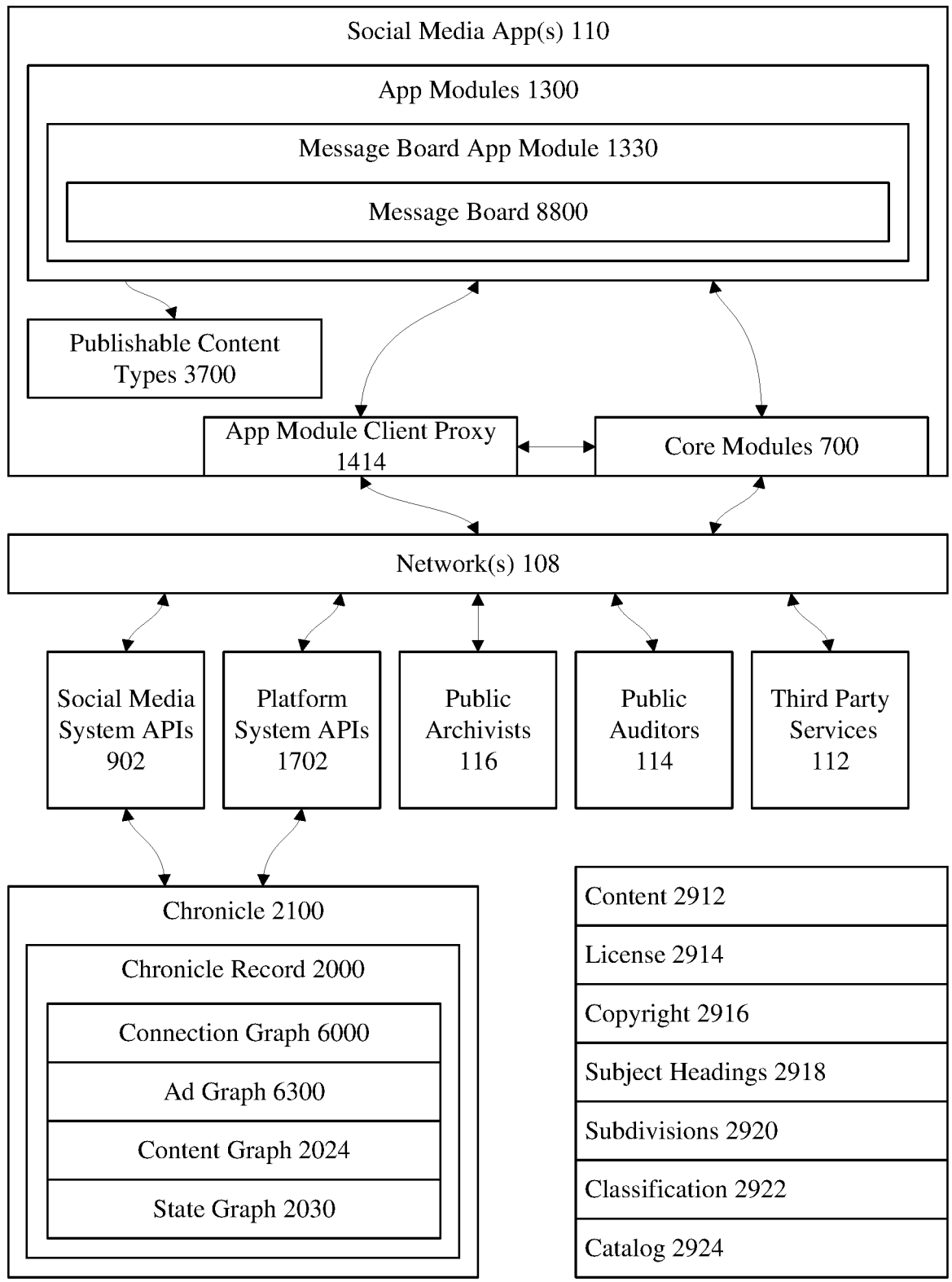
FIG. 93 is a block diagram of Social Media App(s).

FIG. 93 is a block diagram of Social Media App(s) 110 which is comprised of App Modules 1300, Publishable Content Types 3700, App Module Client Proxy 1414 and Core Modules 700. App Modules 1300 consists of Message Board App Module 1330 which contains Message Board 8800. App Modules 1300 interacts with Publishable Content Types 3700, App Module Client Proxy 1414 and Core Modules 700. App Module Client Proxy 1414 interacts with Core Modules 700. App Module Client Proxy 1414 and Core Modules 700 connect to Social Media System APIs 902, Platform System APIs 1702, Public Archivists 116, Public Auditors 114 and Third Party Services 112 via Network(s) 108. Social Media System APIs 902 and Platform System APIs 1702 utilize Chronicle 2100 which is comprised of Chronicle Record 2000 which consists of Connection Graph 6000, Ad Graph 6300, Content Graph 2024, and State Graph 2030. FIG. 93 also includes Content 2912, License 2914, Copyright 2916, Subject Headings 2918, Subdivisions 2920, Classification 2922, and Catalog 2924.

This diagram illustrates Message Board 8800 and its relationship to Message Board App Module 1330, App Modules 1300, and Social Media App(s) 110. It illustrates Social Media App(s) 110's relationship to Publishable Content Types 3700, App Module Client Proxy 1414, and Core Modules 700. It illustrates how Chronicle 2100 and its contents are accessed by Social Media System APIs 902 and Platform System APIs 1702 which are then accessed by App Module Client Proxy 1414 and Core Modules 700 via Network(s) 108. It illustrates how App Module Client Proxy 1414 and Core Modules 700 via Network(s) 108 interface with Public Archivists 116, Public Auditors 114, and Third Party Services 112.

FIG. 94 is a block diagram of Chronicle Record 2000 which is comprised of Index Graph 9400. Index Graph 9400, which descends from Base Graph 2050 in FIG. 20, consists of Index Graph Schema 9402, Index Graph Schema Version 9404, Index Graph Hash 9406, and Index Graph Signature 9408. It also has Index Graph Collection 9410 which consists of Node(s) 9412 and Edge(s) 9440. Node(s) 9412 contains Index 9414, Index Feature 9416, Index Category 9418, Meta Data Index 9420, Context Index 9422, Distinction Index 9424, Hashtag Index 9426, Mention Index 9428, Full-Text Index 9430, and State 2610. Edge(s) 9440 contains Index Probability 9442. Index 9414 has the properties Index Id 9450, Index Timestamp 9452, and Index Cost 9454. This diagram illustrates that each time a new Chronicle Record 2000 is created, post consensus, an Index Graph 9400 is generated as part of the Chronicle Record 2000 before being added to Chronicle 2100 in FIG. 21.

Figure 95:
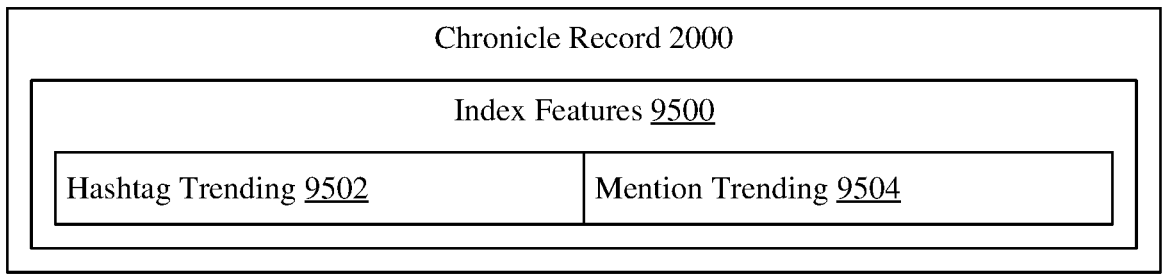
FIG. 95 is a block diagram of a Chronicle Record.

FIG. 95 is a block diagram of Chronicle Record 2000 which is comprised of Index Features 9500 which consists of Hashtag Trending 9502 and Mention Trending 9504. This diagram details two possible features utilized by Machine Learning System Modules 828 in FIG. 8 to create Index Probability 9442 in relationship to Distinction Index 9424 in FIG. 94.

Figure 96:
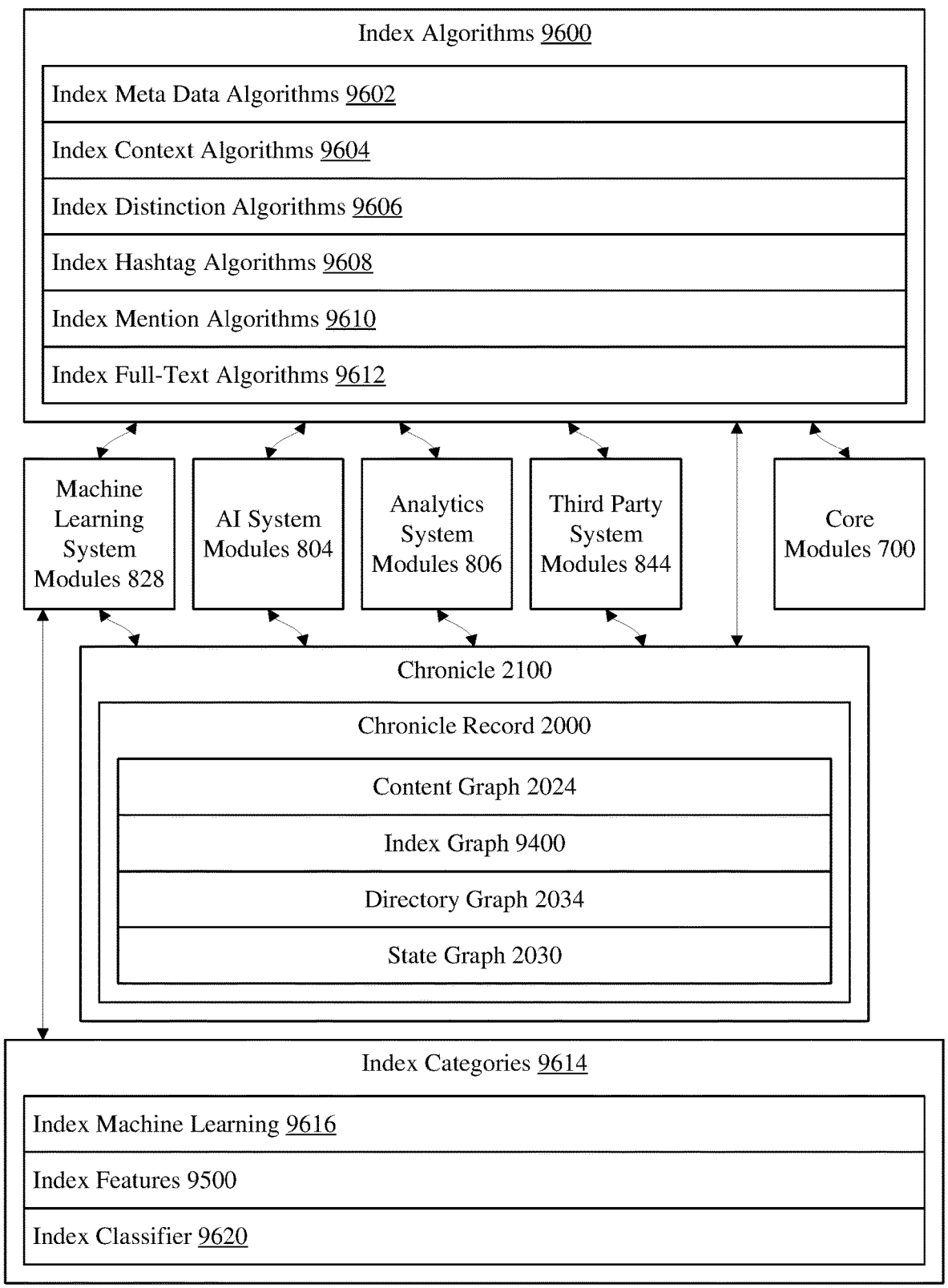
FIG. 96 is a block diagram of Index Algorithms.

FIG. 96 is a block diagram of Index Algorithms 9600 which is comprised of Index Meta Data Algorithms 9602, Index Context Algorithms 9604, Index Distinction Algorithms 9606, Index Hashtag Algorithms 9608, Index Mention Algorithms 9610, Index Full-Text Algorithms 9612. Index Algorithms 9600 is associated with Machine Learning System Modules 828, AI System Modules 804, Analytics System Modules 806, Third Party System Modules 844, and Core Modules 700. Index Categories 9614 includes Index Machine Learning 9616, Index Features 9500, and Index Classifier 9620. Index Categories 9614 is associated with Machine Learning System Modules 828. Chronicle 2100 includes Chronicle Record 2000 which consists of Content Graph 2024, Index Graph 9400, Directory Graph 2034, and State Graph 2030. Chronicle 2100 is associated with Machine Learning System Modules 828, AI System Modules 804, Analytics System Modules 806, Third Party System Modules 844, and Index Algorithms 9600.

Index Algorithms 9600 utilizes Index Features 9500 and select Node(s) 9412 within Index Graph Collection 9410 in FIG. 94. It is intended to be used with data related to metadata, context, distinction, hashtag, mention, and full-text in conjunction with Machine Learning System Modules 828 and Index Categories 9614. Index Algorithms 9600 could also work in conjunction with AI System Modules 804, Analytics System Modules 806, and Third Party System Modules 844 which may provide additional index systems or functionality that can be integrated into Index Algorithms 9600. Core Modules 700 provides the cross-cutting functionality for Index Algorithms 9600. In particular, all interactions with the elements in FIG. 96 utilize Telemetry Core Module 714, Logging Core Module 710, and Exception Handling Core Module 702 in FIG. 7. Telemetry Core Module 714 in FIG. 7 provides auditing insight into every interaction that can be audited and reported on vis-a-vis Audit System Modules 810 on FIG. 8. Machine Learning System Modules 828 utilizes Index Categories 9614 consisting of Index Machine Learning 9616 which is based on a training set of data containing instances whose features and assigned category membership is known, Index Features 9500 which are derived from system composition profiles and their resulting performance metrics from telemetry data managed by Telemetry System 226 in FIG. 2, and Index Classifier 9620 which is a classification algorithm that maps a new instance's system profile data to a category.

This diagram illustrates that Index Algorithms 9600 collectively can be used by Machine Learning System Modules 828, AI System Modules 804, Analytics System Modules 806, and Third Party System Modules 844. All of these modules have access to Chronicle 2100 and its contents. Machine Learning System Modules 828 also utilizes Index Categories 9614.

Figure 97:
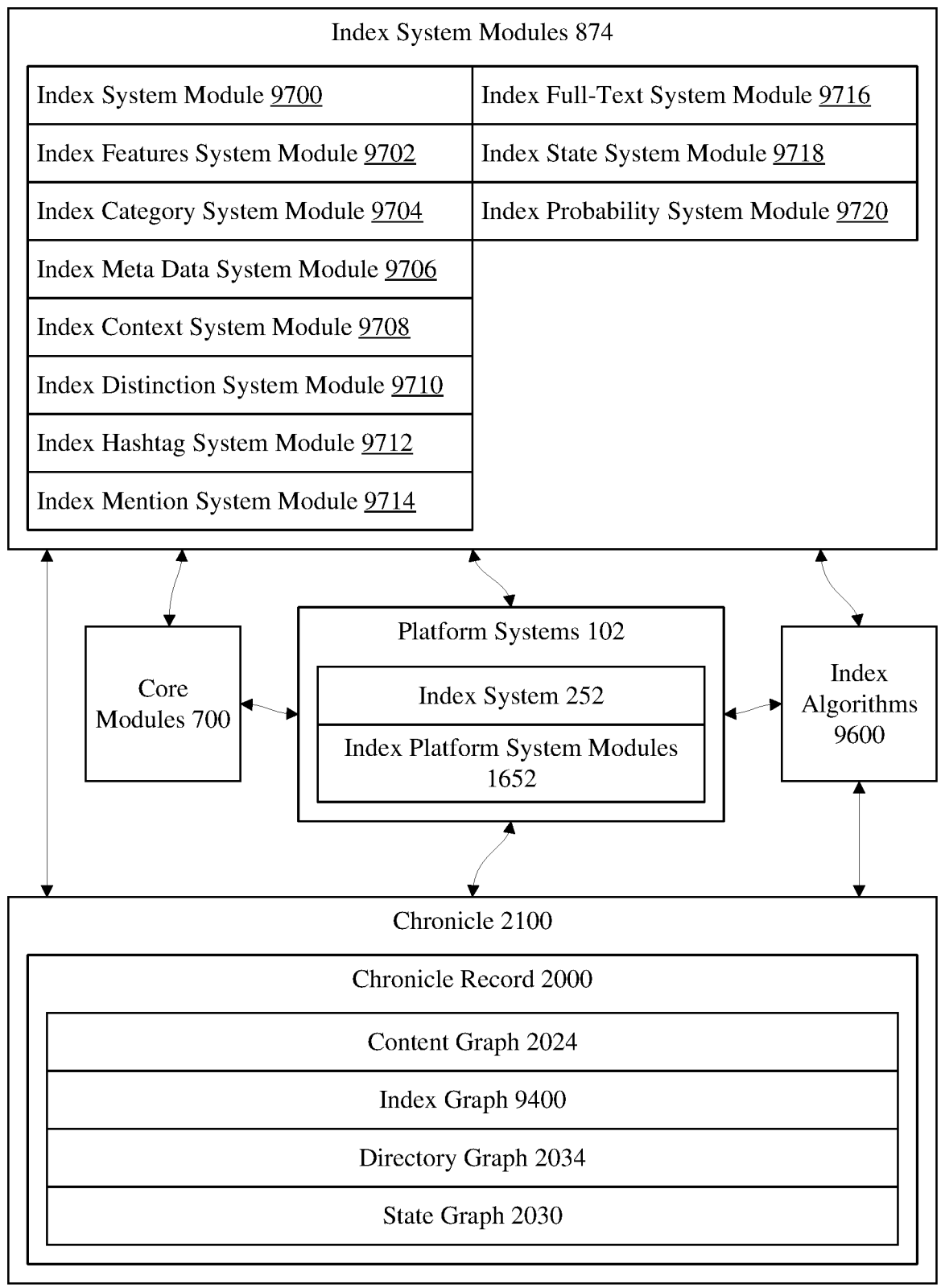
FIG. 97 is a block diagram of Index System Modules.

FIG. 97 is a block diagram of Index System Modules 874 which is comprised of Index System Module 9700, Index Features System Module 9702, Index Category System Module 9704, Index Meta Data System Module 9706, Index Context System Module 9708, Index Distinction System Module 9710, Index Hashtag System Module 9712, Index Mention System Modules 9714, Index Full-Text System Module 9716, Index State System Module 9718, and Index Probability System Module 9720. Index System Modules 874 interfaces with Platform Systems 102, Chronicle 2100, Index Algorithms 9600, and Core Modules 700. Platform Systems 102, which consists of Index System 252 and Index Platform System Modules 1652, utilizes Chronicle 2100 as well as Index Algorithms 9600. Index Algorithms 9600 interfaces with Index System Modules 874, Platform Systems 102, and Chronicle 2100. Chronicle 2100 is comprised of Chronicle Record 2000 which consists of Content Graph 2024, Index Graph 9400, Directory Graph 2034, and State Graph 2030. Core Modules 700 provides all the cross-cutting functionality for Index System Modules 874 and Platform Systems 102. This diagram illustrates Index System Modules 874 as it relates to Platform Systems 102, Index Algorithms 9600, Core Modules 700, and Chronicle 2100. It also illustrates Platform Systems 102's relationship to Index Algorithms 9600, Chronicle 2100 and Core Modules 700.

Figure 98:
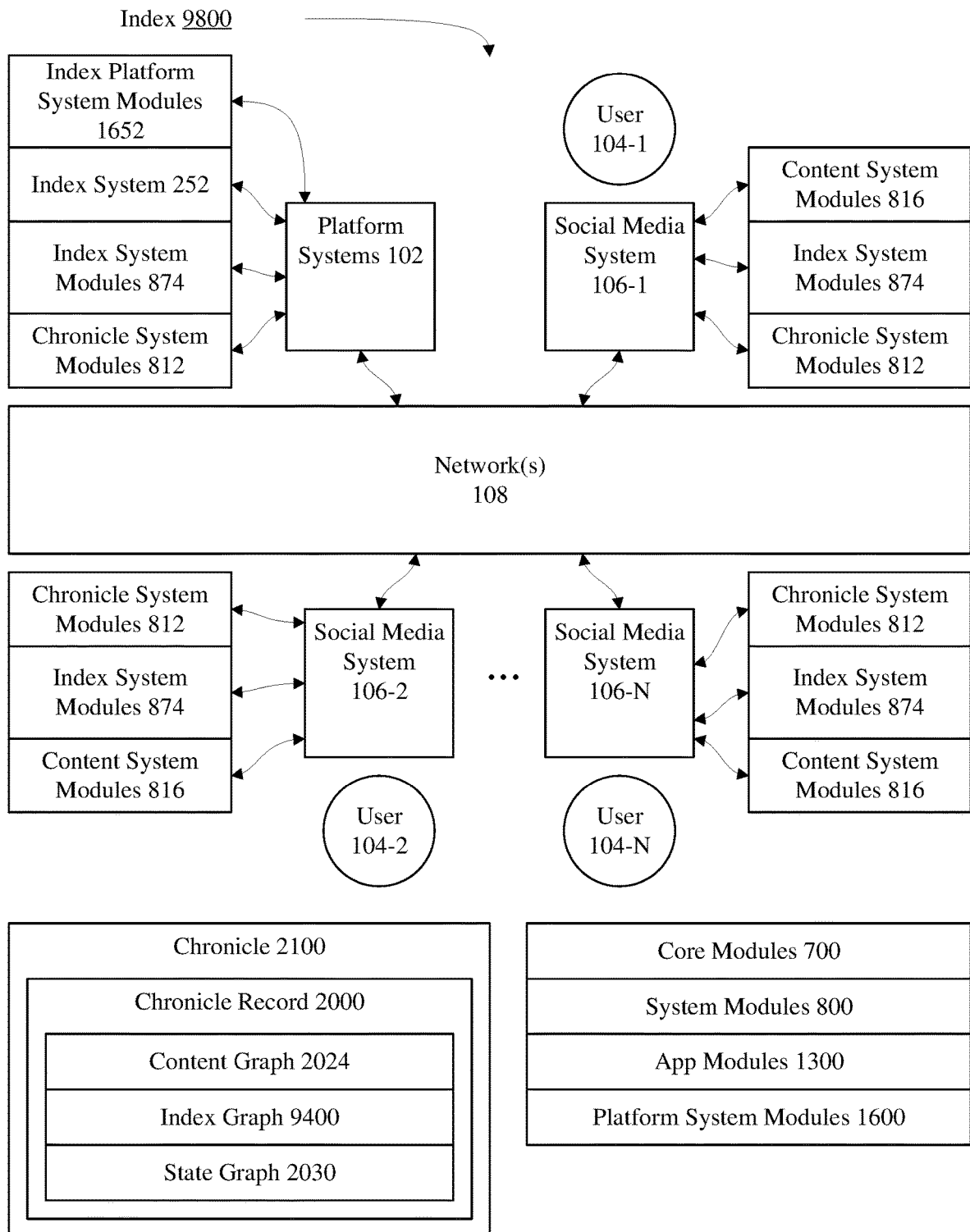
FIG. 98 is a block diagram of an Index.

FIG. 98 is a block diagram of Index 9800 which illustrates the indexing functionality of the platform. Index 9800 is comprised of Chronicle 2100 which consists of Chronicle Record 2000 which contains Content Graph 2024, Index Graph 9400, and State Graph 2030. Platform System 102 utilizes Chronicle System Modules 812, Index System Modules 874, Index System 252, and Index Platform System Modules 1652. Platform Systems 102 connects to Social Media System 106-1 for User 104-1, Social Media System 106-2 for User 104-2, Social Media System 106-N for User 104-N via Network(s) 108. User 104-1's Social Media System 106-1 utilizes Chronicle System Modules 812, Index System Modules 874, and Chronicle System Modules 812. User 104-2's Social Media System 106-2 utilizes Chronicle System Modules 812, Index System Modules 874, and Chronicle System Modules 812. User 104-N's Social Media System 106-N utilizes Chronicle System Modules 812, Index System Modules 874, and Chronicle System Modules 812. The ellipse between Social Media System 106-2 and Social Media System 106-N illustrates that there are N number of social media systems for every user on the network. Index 9800 is also comprised of Core Modules 700 which provides the cross-cutting functionality for Platform Systems 102, Social Media System 106-1 to Social Media System 106-N, App Modules 1300, System Modules 800, and Platform System Modules 1600 as well as all indexing functionality.

This diagram illustrates how Index 9800 is utilized by Distributed Social Media Network 300 in FIG. 3. Oftentimes, the topic of indexing gets collapsed with searches, especially since searches have an indexing component. However, various embodiments of the present technology separate indexing from searching, because indexing happens when the content is committed to Chronicle 2100 in FIG. 21. As a result, index information is always current and does not need to be merged. If a content item changes, a new Chronicle Record 2000 in FIG. 20 is created, and therefore new index information is created and added to the new record.

Indexing is distributed because every Social Media System 106 in FIG. 1 has an indexing service. This reinforces the overarching theme of scaling and parallelism in Distributed Architecture 100 in FIG. 1 and solves the problems often found when searching web content.

Indexing on the platform also benefits from the scalability and parallelism of Consensus by Conference 3800 in FIG. 38, specifically the utilization of Publisher Consensus System Category Classification 3816, the multitude of consensus networks, and the multi-threading processing ability of Social Media System 106 in FIG. 1. It is actually in the economic interest of Publisher 3502 in FIG. 35 to document specific aspects of their content for review, because if they make the content relevant and easy to find, they will sell more of it. See Users Get Paid for their Content 3628 in FIG. 36.

In sum, the platform utilizes Index System 252, Index Platform System Modules 1652, and Index System Modules 874 in conjunction with Chronicle 2100 and a multitude of users to offer indexing that is uniquely accurate and deep. This enables users to locate content with great efficiency and speed.

Figure 99:
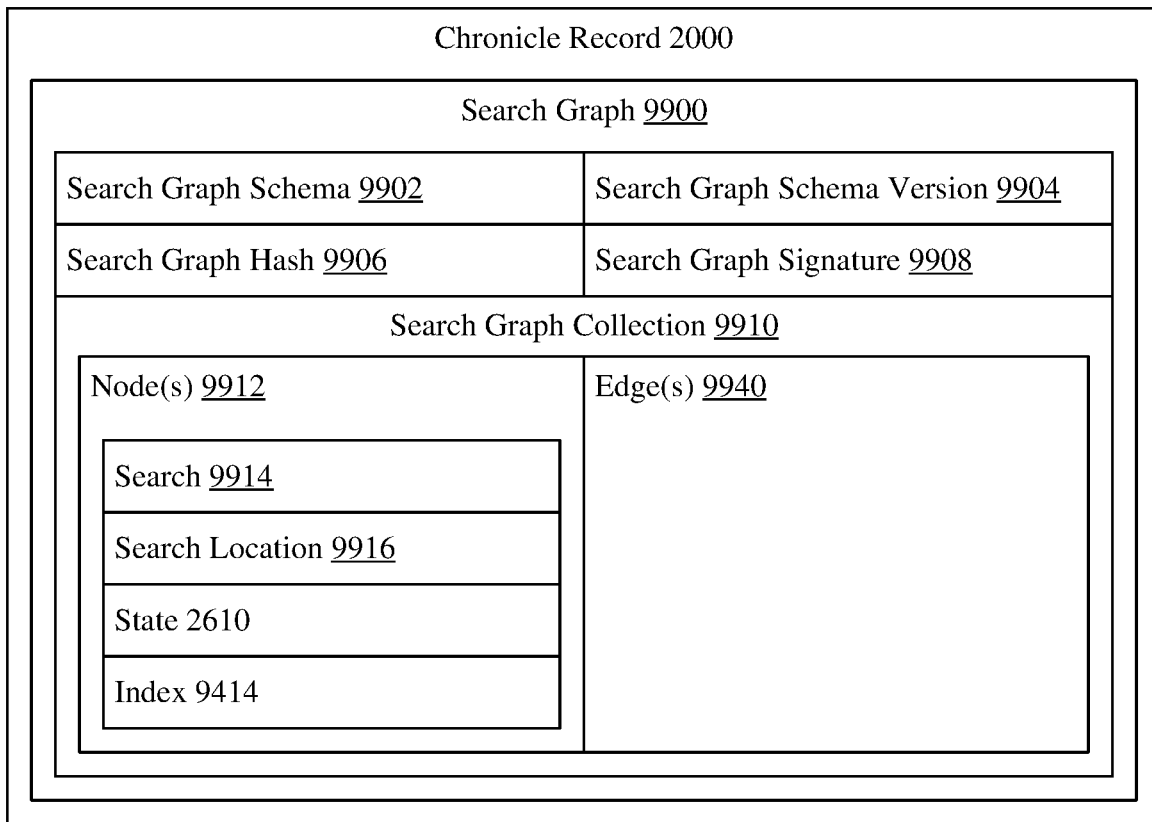
FIG. 99 is a block diagram of a Chronicle Record.

FIG. 99 is a block diagram of Chronicle Record 2000 which is comprised of Search Graph 9900. Search Graph 9900, which descends from Base Graph 2050 in FIG. 20, consists of Search Graph Schema 9902, Search Graph Schema Version 9904, Search Graph Hash 9906, and Search Graph Signature 9908. It also has Search Graph Collection 9910 which consists of Node(s) 9912 and Edge(s) 9940. Node(s) 9912 contains Search 9914, Search Location 9916, State 2610, and Index 9414. This diagram represents the Chronicle Record 2000 information for Search Graph 9900. Note that Search Graph 9900 is not separate or on its own. State 2610 and Index 9414 can pull in other nodes from other graphs.

Figure 100:
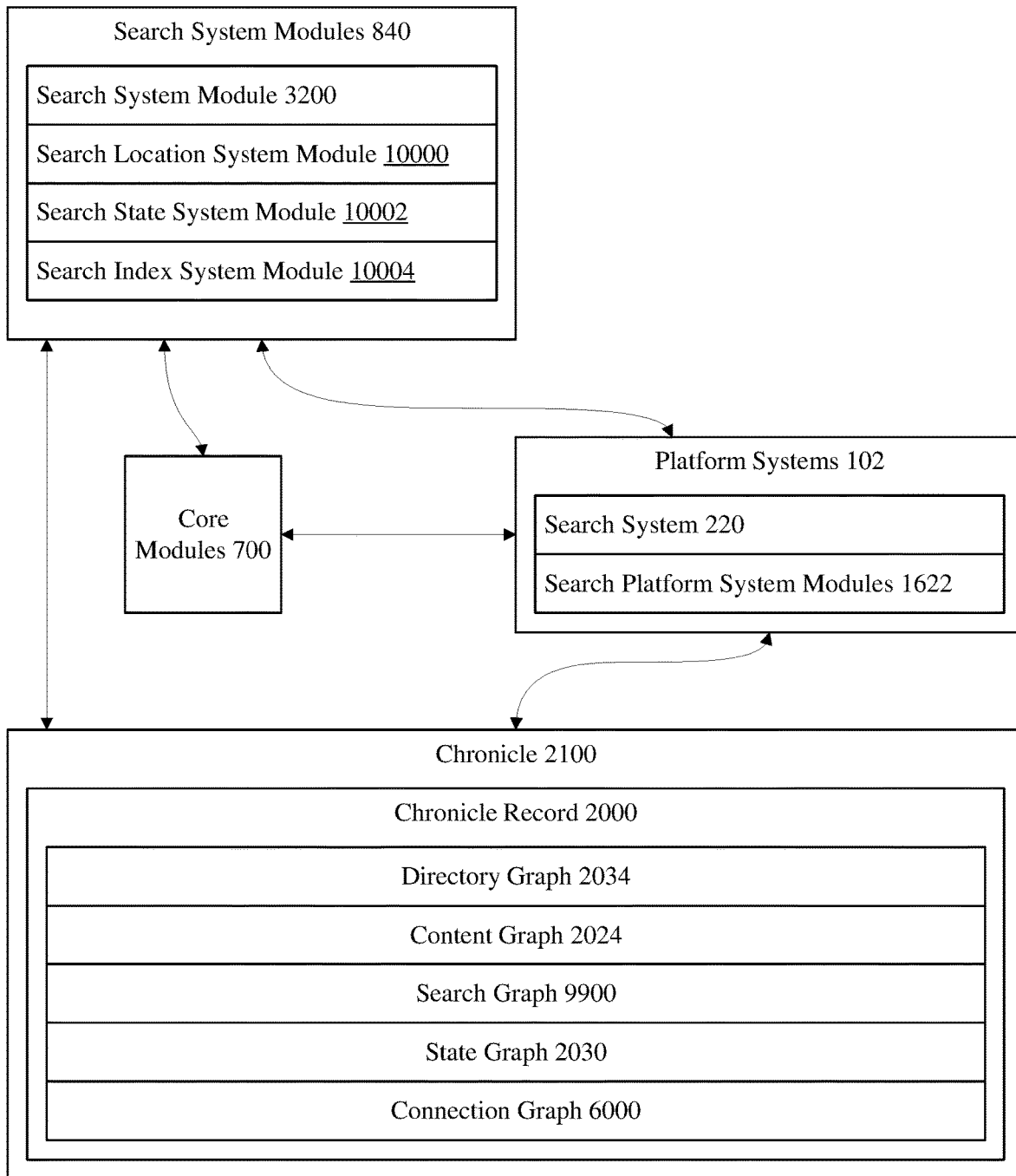
FIG. 100 is a block diagram of Search System Modules.

FIG. 100 is a block diagram of Search System Modules 840 which is comprised of Search System Module 3200, Search Location System Module 10000, Search State System Module 10002, and Search Index System Module 10004. Search System Modules 840 interfaces with Platform Systems 102, Chronicle 2100, and Core Modules 700. Platform Systems 102, which consists of Search System 220 and Search Platform System Modules 1622, utilizes Chronicle 2100. Chronicle 2100 is comprised of Chronicle Record 2000 which consists of Directory Graph 2034, Content Graph 2024, Search Graph 9900, State Graph 2030 and Connection Graph 6000. Core Modules 700 provides all the cross-cutting functionality for Search System Modules 840 and Platform Systems 102. This diagram illustrates Search System Modules 840 connecting to Platform Systems 102 and Core Modules 700. It also illustrates how Search System Modules 840 Platform Systems 102 relate to Chronicle 2100.

Figure 101:
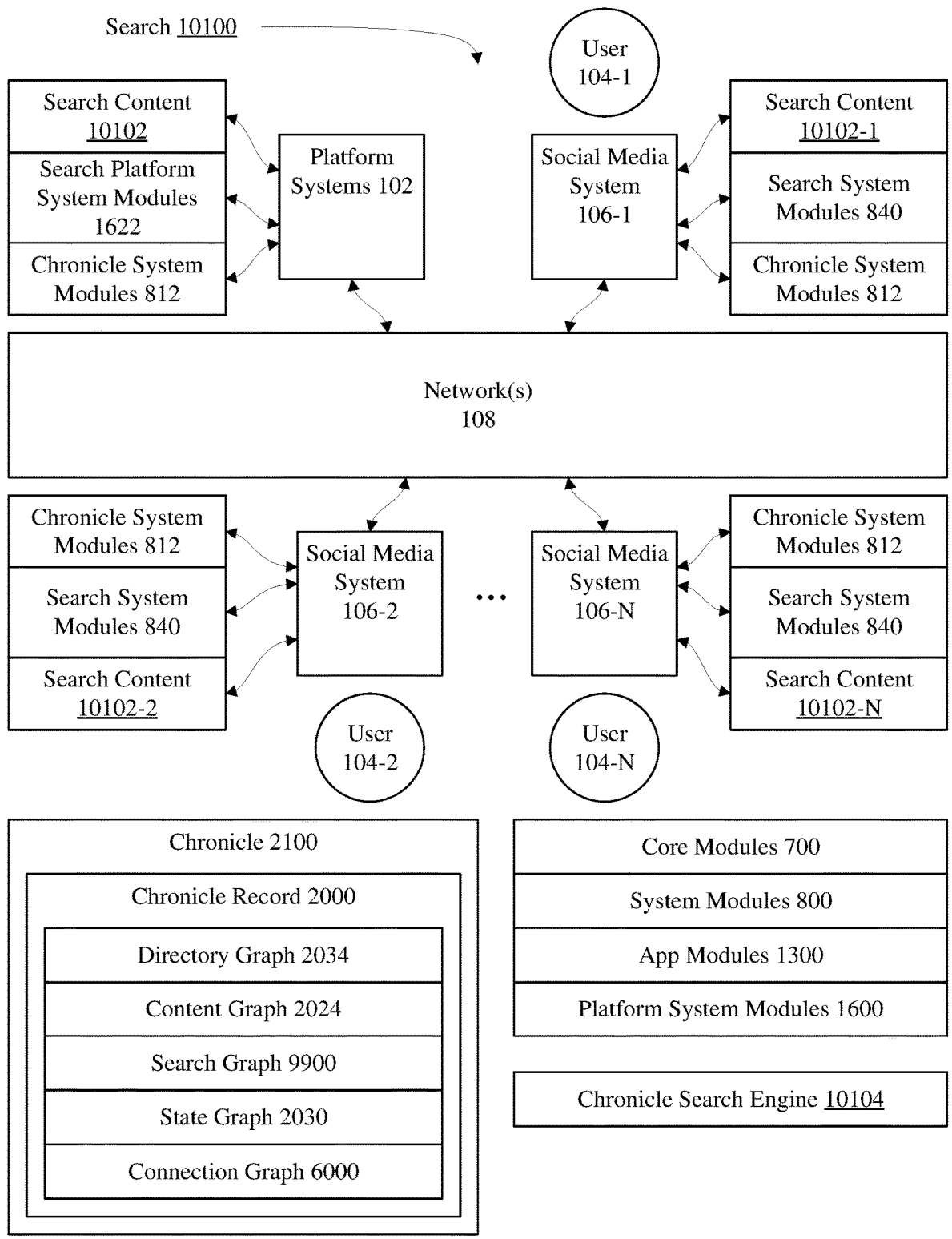
FIG. 101 is a block diagram of Search.

FIG. 101 is a block diagram of Search 10100 which illustrates the search functionality of the platform. Search 10100 is comprised of Chronicle 2100 which consists of Chronicle Record 2000 which contains Directory Graph 2034, Content Graph 2024, Search Graph 9900, State Graph 2030, and Connection Graph 6000. Platform System 102 utilizes Chronicle System Modules 812, Search Platform System Modules 1622, and Search Content 10102. Platform Systems 102 connects to Social Media System 106-1 for User 104-1, Social Media System 106-2 for User 104-2, Social Media System 106-N for User 104-N via Network(s) 108. User 104-1's Social Media System 106-1 utilizes Chronicle System Modules 812, Search System Modules 840, and Search Content 10102-1. User 104-2's Social Media System 106-2 utilizes Chronicle System Modules 812, Search System Modules 840, and Search Content 10102-2. User 104-N's Social Media System 106-N utilizes Chronicle System Modules 812, Search System Modules 840, and Search Content 10102-N. The ellipse between Social Media System 106-2 and Social Media System 106-N illustrates that there are N number of social media systems for every user on the network. Search 10100 is also comprised of Chronicle Search Engine 10104 as well as Core Modules 700 which provides the cross-cutting functionality for Platform Systems 102, Social Media System 106-1 to Social Media System 106-N, App Modules 1300, System Modules 800, and Platform System Modules 1600 as well as all search functionality.

This diagram illustrates the use of Search System Modules 840 and Search Platform System Modules 1622 for Search 10100. Platform System 102 also uses Search System 220 in FIG. 2 and Search App Module 1340 in FIG. 13. All search related modules and systems utilize Chronicle 2100 for search as well as for their own storage use. Search 10100 is optimized for easy indexing, using Index System 252 in FIG. 2, Index Platform System Modules 1652 in FIG. 16, Index System Modules 874 in FIG. 8, and Index App Module 1374 in FIG. 13. These index modules also facilitate the searching of Chronicle 2100. Search Content 10102 to Search Content 10102-N represents all the different search content accessed by User 104-1 to User 104-N.

Figure 102:
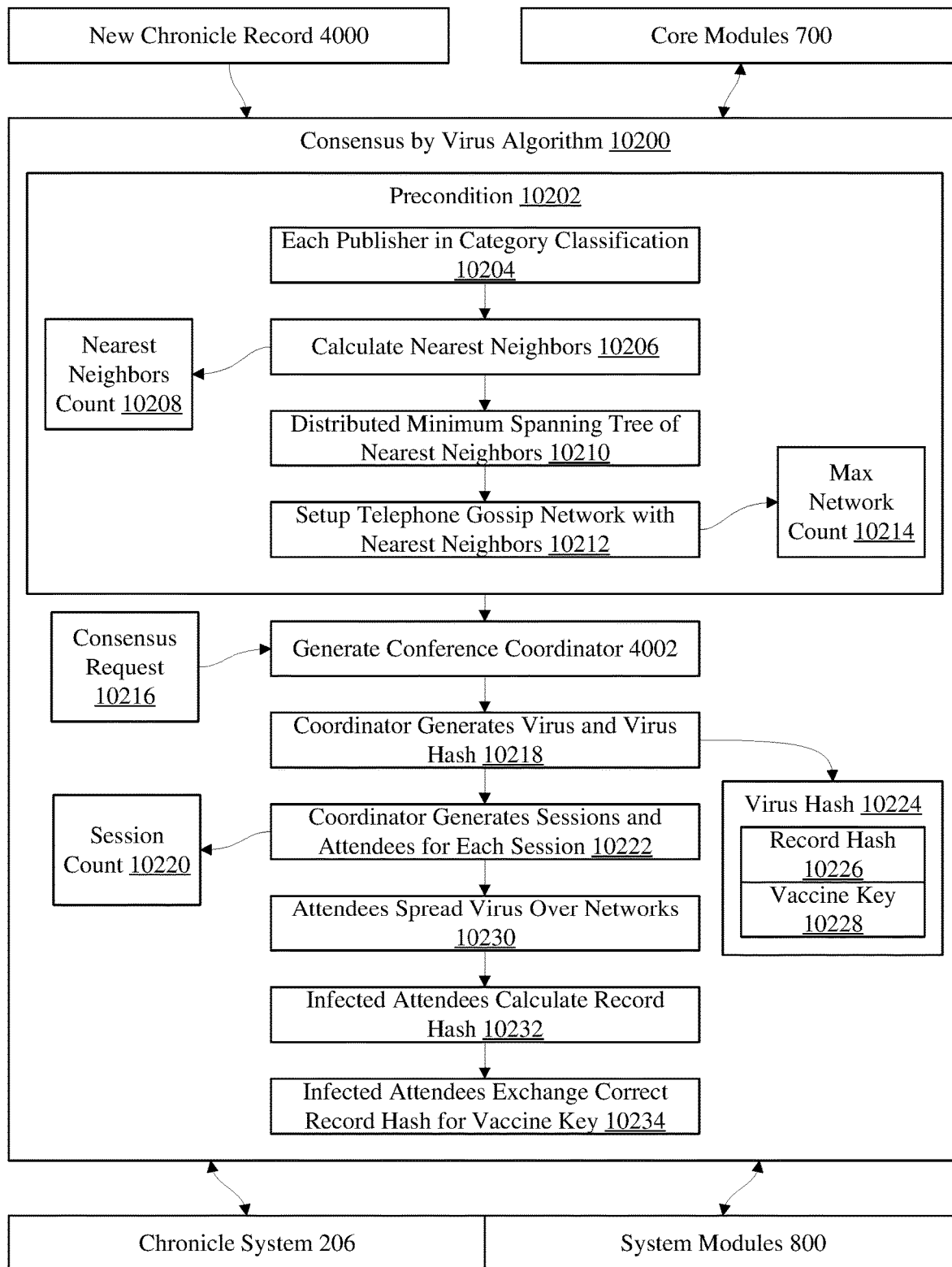
FIG. 102 is a block diagram of Consensus by Virus Algorithm.

FIG. 102 is a block diagram of Consensus by Virus Algorithm 10200 which illustrates another workflow for determining consensus. Consensus by Virus Algorithm 10200 is associated with New Chronicle Record 4000, Chronicle System 206, System Modules 800, and Core Modules 700 which provide all the cross-cutting functionality required for the consensus workflow. The workflow for Consensus by Virus Algorithm 10200 begins with Precondition 10202, which includes Each Publisher in Category Classification 10204, Calculate Nearest Neighbors 10206 which is associated with Nearest Neighbor Count 10208, Distributed Minimum Spanning Tree of Nearest Neighbors 10210, and Setup Telephone Gossip Network with Nearest Neighbors 10212 which is associated to Max Network Count 10214. Consensus Request 10216 leads to Generate Conference Coordinator 4002 and Coordinator Generates Virus and Virus Hash 10218. Virus Hash 10224 consists of Record Hash 10226 and Vaccine Key 10228. Next Coordinator Generates Sessions and Attendees for Each Session 10222 which is associated with Session Count 10220. Then Attendees Spread Virus Networks 10230, Infected Attendees Calculate Record Hash 10232, and Infected Attendees Exchanges Correct Record for Vaccine Key 10234. This diagram illustrates that Consensus by Virus Algorithm 10200 utilizes elements from Consensus by Conference 4200 in FIG. 42 and introduces a virus to compel consensus, whereby all attendees are infected with a virus. In order for attendees to get a vaccine key to disable the virus, they have to calculate and exchange the correct record hash.

FIG. 103 is a block diagram of App Menu Items 8830 which is comprised of Ad App Menu Item 10302, AI App Menu Item 10304, Analytics App Menu Item 10306, Archive App Menu Item 10308, Audit App Menu Item 10310, Chronicle App Menu Item 10312, Connection App Menu Item 10314, Content App Menu Item 10316, Directory App Menu Item 10318, Distribution App Menu Item 10320, Identity App Menu Item 10322, Ledger App Menu Item 10324, Licensing App Menu Item 10326, Machine Learning App Menu Item 10328, Message Board App Menu Item 10330, Onboarding App Menu Item 10332, Payment App Menu Item 10334, Posting App Menu Item 8822, Publishing App Menu Item 8824, Search App Menu Item 8826, Subscription App Menu Item 10342, Third Party App Menu Items 10344, Wallet App Menu Item 10346, Endorsement App Menu Item 10348, Compliance App Menu Item 10350, Consensus App Menu Item 10352, Notary App Menu Item 10354, Certified Email Menu Item 10356, Workflow App Menu Item 10358, SDK App Menu Item 10360, Copyright App Menu Item 10362, Rhetoric App Menu Item 10364, User Verification App Menu Item 10366, Trending App Menu Item 10368, Account App Menu Item 10370, Content Verification App Menu Item 10372, and Index App Menu Item 10374. This diagram details all of the App Menu Items 8830 that become user interface screens, libraries, configurations, settings, etc. These menu items essentially represent all of the user interface features and functionality required to work with all aspects of Social Media App(s) 110 in FIG. 1.

FIG. 104 is a block diagram of System Menu Items 8832 which is comprised of Ad System Menu Item 10402, AI System Menu Item 10404, Analytics System Menu Item 10406, Archive System Menu Item 10408, Audit System Menu Item 10410, Chronicle System Menu Item 10412, Connection System Menu Item 10414, Content System Menu Item 10416, Directory System Menu Item 10418, Distribution System Menu Item 10420, Identity System Menu Item 10422, Ledger System Menu Item 10424, Licensing System Menu Item 10426, Machine Learning System Menu Item 10428, Message Board System Menu Item 10430, Onboarding System Menu Item 10432, Payment System Menu Item 10434, Posting System Menu Item 10436, Publishing System Menu Item 10438, Search System Menu Item 10440, Subscription System Menu Item 10442, Third Party System Menu Item 10444, Wallet System Menu Item 10446, Endorsement System Menu Item 10448, Compliance System Menu Item 10450, Consensus System Menu Item 10452, Notary System Menu Item 10454, Certified Email System Menu Item 10456, Workflow System Menu Item 10458, SDK System Menu Item 10460, Copyright System Menu Item 10462, Rhetoric System Menu Item 10464, User Verification System Menu Item 10466, Trending System Menu Item 10468, Account System Menu Item 10470, Content Verification System Menu Item 10472, and Index System Menu Item 10474. This diagram details all of the System Menu Items 8832 that become user interface screens, libraries, configurations, settings, etc. These menu items essentially represent all of the user interface features and functionality required to work with all aspects of Social Media System 106 in FIG. 1.

FIG. 105 is a block diagram of Platform System Menu Items 8834 which is comprised of API Platform System Menu Item 10502, Archive Platform System Menu Item 10504, Audit Platform System Menu Item 10506, Chronicle Platform System Menu Item 10508, Directory Platform System Menu Item 10510, Identity Platform System Menu Item 10512, Ledger Platform System Menu Item 10514, Onboarding Platform System Menu Item 10516, Payment Platform System Menu Item 10518, Platform Management System Menu Item 10520, Search Platform System Menu Item 10522, Third Party Platform System Menu Item 10524, Account Platform System Menu Item 10526, Telemetry Platform System Menu Item 10528, User Verification Platform System Menu Item 10530, Connection Platform System Menu Item 10532, Consensus Platform System Menu Item 10534, SDK Platform System Menu Item 10536, AI Platform System Menu Item 10538, Analytics Platform System Menu Item 10540, Machine Learning Platform System Menu Item 10542, Trending Platform System Menu Item 10544, Endorsement Platform System Menu Item 10546, Ad Platform System Menu Item 10548, Content Verification Platform System Menu Item 10550, Index Platform System Menu Item 10552, and Content Platform System Menu Item 10554. This diagram details all of the Platform System Menu Items 8834 that become user interface screens, libraries, configurations, settings, etc. These menu items essentially represent all of the user interface features and functionality required to work with all aspects of Platform Systems 102 in FIG. 1.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations.

Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A distributed consensus by conference communications network architecture comprising:
    a CPU coupled to a memory, the memory including instructions for:
    a social media system communicatively connected to a distributed communications network;
    social media apps communicatively connected to the distributed communications network;
    platform systems communicatively connected to the distributed communications network;
    a distributed architecture comprised by a user integrated with the social media system, the social media app and the platform systems over the distributed communications network, wherein the user owns the social media system and one or more of the social media apps;
    a distributed social media network comprised of a plurality of users utilizing their own social media system and their one or more social media apps in a distributed architecture;
    systems modules comprised of high-level cross-cutting programming and configuration utilized to manage services of the social media system;
    the social media system comprised of one or more or all of the systems modules depending on user type and requirements;
    a consensus by conference required for publishing on a platform;
    the consensus by conference utilized to generate a protected consensus within a protected network where every user, social media system and social media app in a distributed social media network is known, authenticated and authorized;
    the consensus by conference comprised of conference consensus categories, conference consensus preconditions, and conference consensus settings;
    conference consensus machine learning based on a training set of data containing instances whose features and assigned category membership is known;
    conference consensus features derived from system composition profiles and their resulting performance metrics from telemetry data managed by the telemetry system;
    conference consensus classifier classification algorithm that maps a new instance's system profile data to a category;
    the conference consensus categories comprised of the conference consensus machine learning, the conference consensus features, and the conference consensus classifier algorithm;

the consensus by conference machine learning utilizing the consensus by conference features and the consensus by conference classifier placing the social media system for each publisher in the distributed social media network into a publisher consensus system category classification;

the consensus by conference machine learning dynamically placing the social media system for each publisher in the distributed social media network into a new publisher consensus system category classification when the social media system changes system footprint and/or produces more or less publishable content;

the publisher consensus system category classification resulting in a population of publisher social media systems in the distributed social media network having similar performance capabilities and workload capacities;

distribution system modules comprised of a consensus event grid module connected to and managing a consensus event grid;

the consensus event grid configured to utilize the publisher consensus system category classification;

the consensus event grid configured to utilize a platform system category conference topics and a publisher consensus system category conference event subscription;

the consensus event grid configured to utilize a platform system category attendee topics and a publisher consensus system category attendee event subscription;

the conference consensus preconditions comprised of the platform system category conference topics, the platform system category attendee topics, the publisher consensus system category classification, the publisher consensus system category conference event subscription, and the publisher consensus system category attendee event subscription;

the consensus event grid configured to enable the social media system to communicate the triggering of a consensus request on the distributed social media network;

the social media system configured to utilize thread pools to handle multiple consensus requests;

the publisher consensus system category classification utilized to enable the platform to create a multitude of consensus networks based on classification allowing the platform to scale and process consensus requests in parallel;

the conference consensus settings comprised of a category conference attendee count, a category conference session count, and a category conference attendees per session count;

the consensus by conference for each publisher consensus system category classification utilizing the category conference attendee count, the category conference session count, and the category conference attendees per session count to enable degrees of parallelism;

the publisher consensus system category classification utilized to dynamically generate the conference consensus settings;

the conference consensus settings utilized by the consensus by conference categories to fine tune scalability;

a generate conference coordinator module functionality utilized by a publisher to designate another publisher in the same publisher consensus system category classification as a conference coordinator to set up and coordinate a consensus by conference to generate a consensus result;

the generate conference coordinator module comprised of functionality to link a coordinator invitation queue to a coordinator reservation service configured to listen for and accept a coordinator RSVP at a coordinator RSVP address;

the generate conference coordinator module further comprised of functionality to determine a coordinator invitation event source, select a category coordinator topic, and publish a coordinator invitation to the consensus event grid;

the generate conference coordinator module further comprised of functionality to subscribe to the category coordinator event subscription for the publisher consensus system category classification, receive events for the category coordinator topic, and submit the coordinator RSVP;

the generate conference coordinator module further comprised of a coordinator request retry setting, wherein the setting is utilized to determine the number of retry attempts to generate the conference coordinator for the consensus by conference;

the generate conference coordinator module further comprised of a coordinator request transitory fault policy, wherein the policy is utilized to mitigate technical exceptions encountered during the generation of the conference coordinator for the consensus by conference;

a generate conference attendees module comprised of functionality utilized by the conference coordinator to gather publishers in the same publisher consensus system category classification as conference attendees in a consensus by conference to generate a consensus result;

the generate conference attendees module further comprised of functionality to utilize the category conference attendee count to determine the number of the conference attendees to gather for the consensus by conference;

the generate conference attendees module further comprised of functionality to link a attendee invitation queue to a coordinator reservation service configured to listen for and accept one or more attendee RSVP at an attendee RSVP address;

the generate conference attendees module further comprised of functionality to determine a attendee invitation event source, select a category attendee topic, and publish a attendee invitation to the consensus event grid;

the generate conference attendees module further comprised of functionality to subscribe to the category attendee event subscription for the publisher consensus system category classification, receive events for the category attendee topic, and submit the attendee RSVP;

the generate conference attendees module further comprised of an attendee request retry setting, wherein the setting is utilized to determine the number of retry attempts to generate the conference attendees for the consensus by conference;

the generate conference attendees module further comprised of an attendee request transitory fault policy, wherein the policy is utilized to mitigate technical exceptions encountered during the generation of the conference attendees for the consensus by conference.

2. The distributed consensus by conference communications network architecture of claim 1, further comprising:

the platform systems comprised of an API system, an archive system, an audit system, a chronicle system, a directory system, an identity system, a ledger system, an onboarding system, a payment system, a platform management system, a search system, third party systems, an account system, a telemetry system, a user verification system, a connection system, a consensus system, a SDK system, an AI system, an analytics system, a machine learning system, a trending system, an endorsement system, an ad system, a content verification system, and an index system;

the API system managing APIs for the platform;
the archive system managing archiving for the platform;
the audit system managing auditing for the platform;
the chronicle system managing chronicles for the platform;
the directory system managing the directory for the platform;
the identity system managing identity for the platform;
the ledger system managing ledgers for the platform;
the onboarding system managing onboarding for the platform;
the payment system managing payments for the platform;
the platform management system is the main system managing and integrating with all other platform systems on the platform;
the platform management system further comprising functionality to compose, deploy, configure, update, and decommission the social media system and the social media apps;
the platform management system further comprising functionality to dynamically create the social media system and the social media apps delivering a unique set of features and functionality for the user based on a user type and requirements;
the search system managing search for the platform;
the third party systems managing third parties for the platform;
the account system managing accounts for the platform;
the telemetry system managing telemetry for the platform;
the user verification system managing user verification for the platform;
the connection system managing connections for the platform;
the consensus system managing consensus for the platform;
the SDK system managing software development kits for the platform;
the AI system managing AI for the platform;
the analytics system managing analytics for the platform;
the machine learning system managing machine learning for the platform;
the trending system managing trending for the platform;
the endorsement system managing endorsements for the platform;
the ad system managing ads for the platform;
the content verification system managing content verification for the platform;
the index system managing indexing for the platform;
the platform systems sub-systems affect the entire platform and are cross-cutting in their impact on the social media system and the social media app.

3. The distributed consensus by conference network architecture of claim 1, further comprising:
the user classified by the classification system of the United States Internal Revenue Service or may be classified by an alternative classification system;
the user comprising individuals that may be users of the distributed social media network and classified as U.S. citizens or residents, wherein individuals may have associations with businesses, charities & non-profits, and government;
the user further comprising businesses that may be users of the distributed social media network and include self employed, small businesses, and corporations;
the user further comprising charities & non-profits that may be users of the distributed social media network and include charitable organizations, churches & religious organizations, political organizations, private foundations, and other non-profits;
the user further comprising government that may be users of the distributed social media network and include federal, state, local, and Indian tribal;
the user created by the distributed social media network for elected and appointed government positions at all levels of government, specifically federal, state, local and Indian tribal, wherein access will be given to each elected or appointed individual, or their designated appointees for official government use during their term or appointment; and
the user created for elected and appointed government positions is not owned by and is in no way associated with the individual;
in another embodiment, the user created by the platform systems for elected and appointed government positions; and
in yet another embodiment, the user created by the social media system for elected and appointed government positions.

4. The distributed consensus by conference communications network architecture of claim 1, further comprising:
the distributed social media network further comprising the platform system services all the social media systems and all the social media apps across the distributed communications network, wherein all of the sub-systems in the platform systems are available to all social media systems and all the social media apps across the distributed communications network;
third party services communicatively connected to the distributed communications network;
the third party services providing a plurality of services to the platform systems, all the social media systems and all the social media apps across to the distributed communications network;
public auditors communicatively connected to the distributed communications network;
the public auditors providing auditing services to the platform systems, all the social media systems and all the social media apps across to the distributed communications network;
public archivists communicatively connected to the distributed communications network;
the public archivists providing archiving services in the public domain outside of the platform and interact with the platform systems, all the social media systems and all the social media apps across the distributed communications network.

5. The generate consensus by conference distributed architecture of claim 1, further comprising:
the systems modules utilized for a systems layer;
the systems modules alternatively utilized by the platform systems across the entire platform;
the systems modules alternatively utilized by the social media apps in an application layer;
the systems modules alternatively utilized alone or in combination;

the systems modules combined by compilation or as separate systems communicatively connected by network or communicatively connected by API or SDK in the same operating system;

the system modules is comprised of ad system modules, AI system modules, analytics system modules, archive system modules, audit system modules, chronicle system modules, connection system modules, content system modules, directory system modules, distribution system modules, identity system modules, ledger system modules, licensing system modules, machine learning system modules, message board system modules, onboarding system modules, payment system modules, posting system modules, publishing system modules, search system modules, subscription system modules, third party system modules, wallet system modules, endorsement system modules, compliance system modules, consensus system modules, notary system modules, certified email system modules, workflow system modules, SDK system modules, copyright system modules, rhetoric system modules, user verification system modules, trending system modules, account system modules, content verification system modules, and index system modules;

the system modules interact with the core modules providing all the cross-cutting functionality for system modules;

the ad system modules providing the system modules for managing the advertising features and functionality of the platform;

the AI system modules providing the system modules for managing the AI features and functionality of the platform;

the analytics system modules providing the system modules for managing the analytics features and functionality of the platform;

the archive system modules providing the system modules for managing the archiving features and functionality of the platform;

the audit system modules providing the system modules for managing the auditing features and functionality of the system;

the chronicle system modules providing the system modules for managing the chronicle features and functionality of the platform;

the connection system modules providing the system modules for managing the connection features and functionality of the platform;

the content system modules providing the system modules for managing the content features and functionality of the platform;

the directory system modules providing the system modules for managing the directory features and functionality of the platform;

the distribution system modules providing the system modules for managing the distribution of posted and published content across the distributed social media network;

the identity system modules providing the system modules for managing the identity features and functionality of the platform;

the ledger system modules providing the system modules for managing the ledger features and functionality of the platform;

the licensing system modules providing the system modules for managing the licensing features and functionality of the platform;

the machine learning system modules providing the system modules for managing the machine learning features and functionality of the platform;

the message board system modules providing the system modules for managing the message board features and functionality of the platform;

the onboarding system modules providing the system modules for managing the onboarding features and functionality of the platform;

the payment system modules providing the system modules for managing the payment features and functionality of the platform;

the posting system modules providing the system modules for managing the posting features and functionality of the platform;

the publishing system modules providing the system modules for managing the publishing features and functionality of the platform;

the search system modules providing the system modules for managing the search features and functionality of the platform;

the subscription system modules providing the system modules for managing the subscription features and functionality of the platform;

the third party system modules providing the system modules for managing the third-party features and functionality of the platform;

the wallet system modules providing the system modules for managing the wallet features and functionality of the platform;

the endorsement system modules providing the system modules for managing the endorsement features and functionality of the platform;

the compliance system modules providing the system modules for managing the compliance features and functionality of the platform;

the consensus system modules providing the system modules for managing the consensus features and functionality of the platform;

the notary system modules providing the system modules for managing the notary features and functionality of the platform;

the certified email system modules providing the system modules for managing the certified email features and functionality of the platform;

the workflow system modules providing the system modules for managing the workflow features and functionality of the platform;

the SDK system modules providing the system modules for managing software development kits to build additional features and functionality on the platform;

the copyright system modules providing the system modules for managing the copyright features and functionality of the platform;

the rhetoric system modules providing the system modules for managing the rhetoric features and functionality of the platform;

the user verification system modules providing the system modules for managing the user verification features and functionality of the platform;

the trending system modules providing the system modules for managing the trending features and functionality of the platform;

the account system modules providing the system modules for managing the accounting features and functionality of the platform;

the content verification system modules providing the system modules for managing the content verification features and functionality of the platform;

the index system modules providing the system modules for managing the index features and functionality of the platform.

6. The distributed consensus by conference communications network architecture of claim 1, further comprising:

a distribution event grid module connected to and managing a distribution event grid;

a distribution notification hub module connected to and managing a distribution notification hub;

the distribution system modules comprising the distribution system module, the distribution event grid module, the distribution notification hub module, and the consensus event grid module;

the distribution systems modules connected to the core modules;

the distribution systems modules distributing information in parallel across the distributed social media network.

* * * * *